US012645783B2

(12) United States Patent

Hamilton et al.

(10) Patent No.: US 12,645,783 B2

(45) Date of Patent: Jun. 2, 2026

(54) VIEWING OPTIC WITH SOFTWARE CAPABILITIES IMPLEMENTED BY AN ENABLER

(71) Applicant: Sheltered Wings Inc., Barneveld, WI (US)

(72) Inventors: Sam Hamilton, Barneveld, WI (US); Ian Klemm, Barneveld, WI (US); Calen Havens, Barneveld, WI (US); Tom Cody, Barneveld, WI (US); Garrison Bollig, Barneveld, WI (US); William Lowry, Barneveld, WI (US); Cory Taylor, Barneveld, WI (US); Tim Rue, Barneveld, WI (US); Tony Palzkill, Barneveld, WI (US); Alexander Lewis, Barneveld, WI (US); Keegan Jauch, Barneveld, WI (US); Zach Sausen, Barneveld, WI (US)

(73) Assignee: Sheltered Wings Inc., Barneveld, WI (US)

( * ) Notice: Subject to any disclaimer, the term of this patent is extended or adjusted under 35 U.S.C. 154(b) by 7 days.

(21) Appl. No.: 18/455,501

(22) Filed: Aug. 24, 2023

(65) Prior Publication Data

US 2024/0070259 A1 Feb. 29, 2024

Related U.S. Application Data

(60) Provisional application No. 63/373,428, filed on Aug. 24, 2022.

(51) Int. Cl.
*G06F 21/44* (2013.01)
*F41G 1/34* (2006.01)
(Continued)

(52) U.S. Cl.
CPC .............. *G06F 21/44* (2013.01); *F41G 1/345* (2013.01); *F41G 1/38* (2013.01); *G02B 23/02* (2013.01)

(58) Field of Classification Search
CPC . F41G 1/345; F41G 1/38; G06F 21/44; G02B 23/02
See application file for complete search history.

(56) References Cited

U.S. PATENT DOCUMENTS

| | | | |
|---|---|---|---|
| 1,882,790 A | 10/1932 | Eyre et al. | |
| 2,514,257 A | 7/1950 | Reavis | |

(Continued)

FOREIGN PATENT DOCUMENTS

| | | |
|---|---|---|
| EP | 1772695 B1 | 7/2010 |
| EP | 1340956 B2 | 11/2011 |

(Continued)

OTHER PUBLICATIONS

International Preliminary Report on Patentability issued for International Application No. PCT/US2021/030874 dated Nov. 8, 2022, 7 pages.

(Continued)

*Primary Examiner* — Mohamed A. Wasel

(74) *Attorney, Agent, or Firm* — Husch Blackwell LLP

(57) ABSTRACT

The disclosure relates to a viewing optic. In one embodiment, the disclosure relates to a viewing optic with an integrated display system. In one embodiment, the disclosure relates to a enabler configured to provide or activate or unlock select software to a viewing optic having an integrated display system.

12 Claims, 106 Drawing Sheets

(51) Int. Cl.
  *F41G 1/38*          (2006.01)
  *G02B 23/02*        (2006.01)

(56)              References Cited

U.S. PATENT DOCUMENTS

| 3,058,391 | A | 10/1962 | Leupold |
| 3,464,770 | A | 9/1969 | Horst |
| 3,533,696 | A | 10/1970 | De Winter |
| 3,597,040 | A | 8/1971 | Gotoh |
| 4,248,496 | A | 2/1981 | Akin, Jr. et al. |
| 4,395,096 | A | 7/1983 | Gibson |
| 4,554,744 | A | 11/1985 | Huckenbeck |
| 4,561,204 | A | 12/1985 | Binion |
| 4,695,161 | A | 9/1987 | Reed |
| 4,863,269 | A | 9/1989 | Ellis |
| 4,965,439 | A | 10/1990 | Moore |
| 5,026,158 | A | 6/1991 | Golubic |
| 5,052,801 | A | 10/1991 | Downes, Jr. et al. |
| 5,092,670 | A | 3/1992 | Preston |
| 5,225,838 | A | 7/1993 | Kanter et al. |
| 5,291,263 | A | 3/1994 | Kong |
| 5,303,495 | A | 4/1994 | Harthcock |
| 5,311,203 | A | 5/1994 | Norton |
| 5,339,720 | A | 8/1994 | Pellarin et al. |
| 5,355,224 | A | 10/1994 | Wallace |
| 5,375,072 | A | 12/1994 | Cohen |
| 5,491,546 | A | 2/1996 | Wascher et al. |
| 5,528,354 | A | 6/1996 | Uwira |
| 5,669,174 | A | 9/1997 | Teetzel |
| 5,686,690 | A | 11/1997 | Lougheed et al. |
| 5,721,641 | A | 2/1998 | Aoki |
| 5,771,623 | A | 6/1998 | Pernstich et al. |
| 5,903,996 | A | 5/1999 | Morley |
| 5,920,995 | A | 7/1999 | Sammut |
| 5,926,259 | A | 7/1999 | Bamberger et al. |
| 6,032,374 | A | 3/2000 | Sammut |
| 6,128,054 | A | 10/2000 | Schwarzenberger |
| 6,132,048 | A | 10/2000 | Gao et al. |
| 6,247,259 | B1 | 6/2001 | Tsadka et al. |
| 6,252,706 | B1 | 6/2001 | Kaladgew |
| 6,269,581 | B1 | 8/2001 | Groh |
| 6,453,595 | B1 | 9/2002 | Sammut |
| 6,487,809 | B1 | 12/2002 | Gaber |
| 6,516,551 | B2 | 2/2003 | Gaber |
| 6,516,699 | B2 | 2/2003 | Sammut et al. |
| 6,583,862 | B1 | 6/2003 | Perger |
| 6,614,975 | B2 | 9/2003 | Richardson et al. |
| 6,640,482 | B2 | 11/2003 | Carlson |
| 6,681,512 | B2 | 1/2004 | Sammut |
| 6,691,447 | B1 | 2/2004 | Otteman |
| 6,862,832 | B2 | 3/2005 | Barrett |
| 7,124,531 | B1 | 10/2006 | Florence et al. |
| 7,196,329 | B1 | 3/2007 | Wood et al. |
| 7,269,920 | B2 | 9/2007 | Staley, III |
| 7,295,296 | B1 | 11/2007 | Galli |
| 7,296,358 | B1 | 11/2007 | Murphy et al. |
| 7,310,071 | B2 | 12/2007 | Cuprys |
| 7,325,320 | B2 | 2/2008 | Gnepf et al. |
| 7,333,270 | B1 | 2/2008 | Pochapsky et al. |
| 7,516,571 | B2 | 4/2009 | Scrogin et al. |
| 7,575,327 | B2 | 8/2009 | Uchiyama |
| 7,586,586 | B2 | 9/2009 | Constantikes |
| 7,614,805 | B2 | 11/2009 | Showalter |
| 7,654,029 | B2 | 2/2010 | Peters et al. |
| 7,690,145 | B2 | 4/2010 | Peters et al. |
| 7,703,679 | B1 | 4/2010 | Bennetts et al. |
| 7,712,225 | B2 | 5/2010 | Sammut |
| 7,719,769 | B2 | 5/2010 | Sugihara et al. |
| 7,721,481 | B2 | 5/2010 | Houde-Walter |
| 7,805,020 | B2 | 9/2010 | Trudeau et al. |
| 7,832,137 | B2 | 11/2010 | Sammut et al. |
| 7,856,750 | B2 | 12/2010 | Sammut et al. |
| 7,859,650 | B2 | 12/2010 | Vermillion et al. |
| 7,864,432 | B2 | 1/2011 | Ottney |
| 7,905,046 | B2 | 3/2011 | Smith, III |
| 7,911,687 | B2 | 3/2011 | Scholz |
| 7,937,878 | B2 | 5/2011 | Sammut et al. |
| 7,946,048 | B1 | 5/2011 | Sammut |
| 8,001,714 | B2 | 8/2011 | Davidson |
| 8,046,951 | B2 | 11/2011 | Peters et al. |
| 8,051,597 | B1 | 11/2011 | D'Souza et al. |
| 8,081,298 | B1 | 12/2011 | Cross |
| 8,109,029 | B1 | 2/2012 | Sammut et al. |
| 8,201,741 | B2 | 6/2012 | Bennetts et al. |
| 8,230,635 | B2 | 7/2012 | Sammut et al. |
| 8,353,454 | B2 | 1/2013 | Sammut et al. |
| 8,365,455 | B2 | 2/2013 | Davidson |
| 8,448,372 | B2 | 5/2013 | Peters et al. |
| 8,468,930 | B1 | 6/2013 | Bell |
| 8,488,969 | B1 | 7/2013 | Masarik |
| 8,656,630 | B2 | 2/2014 | Sammut |
| 8,707,608 | B2 | 4/2014 | Sammut et al. |
| 8,713,843 | B2 | 5/2014 | Windauer |
| 8,826,583 | B2 | 9/2014 | Kepler et al. |
| 8,833,655 | B2 | 9/2014 | Mccarty et al. |
| 8,857,714 | B2 | 10/2014 | Benson |
| 8,886,046 | B2 | 11/2014 | Masarik |
| 8,893,971 | B1 | 11/2014 | Sammut et al. |
| 8,905,307 | B2 | 12/2014 | Sammut et al. |
| 8,923,703 | B2 | 12/2014 | Masarik et al. |
| 8,959,824 | B2 | 2/2015 | Sammut et al. |
| 8,966,806 | B2 | 3/2015 | Sammut et al. |
| 8,991,702 | B1 | 3/2015 | Sammut et al. |
| 9,038,901 | B2 | 5/2015 | Paterson et al. |
| 9,042,736 | B2 | 5/2015 | Masarik |
| 9,068,794 | B1 | 6/2015 | Sammut |
| 9,121,671 | B2 | 9/2015 | Everett |
| 9,151,574 | B2 | 10/2015 | Lowrey, III |
| 9,175,927 | B2 | 11/2015 | Tubb |
| 9,225,419 | B2 | 12/2015 | Masarik |
| 9,250,038 | B2 | 2/2016 | Sammut et al. |
| 9,255,771 | B2 | 2/2016 | Sammut et al. |
| 9,279,975 | B2 | 3/2016 | Berlips |
| 9,310,163 | B2 | 4/2016 | Bay |
| 9,322,616 | B2 | 4/2016 | Craven et al. |
| 9,323,061 | B2 | 4/2016 | Edwards et al. |
| 9,335,123 | B2 | 5/2016 | Sammut |
| 9,355,224 | B1 | 5/2016 | Le Hir et al. |
| 9,389,425 | B2 | 7/2016 | Edwards et al. |
| 9,429,745 | B2 | 8/2016 | Brumfield |
| 9,438,774 | B2 | 9/2016 | Masarik |
| 9,459,077 | B2 | 10/2016 | Sammut et al. |
| 9,500,444 | B2 | 11/2016 | Sammut et al. |
| 9,516,202 | B2 | 12/2016 | Masarik et al. |
| 9,574,850 | B2 | 2/2017 | Sammut et al. |
| 9,612,068 | B2 | 4/2017 | Burden |
| 9,612,086 | B2 | 4/2017 | Sammut et al. |
| 9,615,004 | B2 | 4/2017 | Masarik |
| 9,632,304 | B2 | 4/2017 | Waterman et al. |
| 9,705,605 | B2 | 7/2017 | Masarik |
| 9,869,530 | B2 | 1/2018 | Sammut et al. |
| 9,995,901 | B2 | 6/2018 | Petersen |
| 10,003,756 | B2 | 6/2018 | Masarik et al. |
| 10,060,703 | B2 | 8/2018 | Sammut et al. |
| 10,113,837 | B2 | 10/2018 | Masarik et al. |
| 10,175,031 | B2 | 1/2019 | Vanbecelaere |
| 10,180,565 | B2 | 1/2019 | Havens et al. |
| 10,254,082 | B2 | 4/2019 | Sammut et al. |
| 10,295,307 | B2 | 5/2019 | Sammut et al. |
| 10,480,901 | B2 | 11/2019 | Thomas |
| 10,534,166 | B2 | 1/2020 | Summerfield et al. |
| 10,584,941 | B2 | 3/2020 | Masarik et al. |
| 10,673,301 | B1 | 6/2020 | Mcauley |
| 10,693,341 | B1 | 6/2020 | Mcauley |
| 10,721,000 | B2 | 7/2020 | Masarik |
| 10,742,913 | B2 | 8/2020 | Vaklev et al. |
| 10,796,860 | B2 | 10/2020 | Iliev et al. |
| 10,801,813 | B2 | 10/2020 | Moseman et al. |
| 10,812,687 | B2 | 10/2020 | Masarik et al. |
| 10,823,532 | B2 | 11/2020 | Gallery et al. |
| 10,942,006 | B2 * | 3/2021 | VanBecelaere .......... F41G 1/345 |
| 11,402,175 | B2 * | 8/2022 | York ...................... F41G 1/387 |
| 11,435,585 | B1 * | 9/2022 | Yaroshchuk ....... G02B 27/1086 |
| 11,473,873 | B2 | 10/2022 | Hamilton et al. |

(56) References Cited

U.S. PATENT DOCUMENTS

| 11,480,781 B2 | 10/2022 | Hamilton et al. |
| 11,994,364 B2 | 5/2024 | Hamilton et al. |
| 2002/0159148 A1 | 10/2002 | Huber |
| 2003/0010190 A1 | 1/2003 | Sammut et al. |
| 2003/0012035 A1 | 1/2003 | Bernard |
| 2003/0132860 A1 | 7/2003 | Feyereisen et al. |
| 2004/0025396 A1 | 2/2004 | Schlierbach et al. |
| 2004/0080938 A1 | 4/2004 | Holman et al. |
| 2004/0201886 A1 | 10/2004 | Skinner et al. |
| 2005/0021282 A1 | 1/2005 | Sammut et al. |
| 2005/0046706 A1 | 3/2005 | Sesek et al. |
| 2005/0198885 A1 | 9/2005 | Staley |
| 2005/0219690 A1 | 10/2005 | Lin et al. |
| 2005/0250085 A1 | 11/2005 | Lemp et al. |
| 2005/0268521 A1 | 12/2005 | Cox et al. |
| 2006/0020104 A1 | 1/2006 | Freitag |
| 2006/0048432 A1 | 3/2006 | Staley |
| 2006/0201047 A1 | 9/2006 | Lowrey |
| 2006/0254115 A1 | 11/2006 | Thomas et al. |
| 2007/0044364 A1 | 3/2007 | Sammut et al. |
| 2007/0089598 A1 | 4/2007 | Courty |
| 2007/0097351 A1 | 5/2007 | York et al. |
| 2007/0137008 A1 | 6/2007 | Anstee |
| 2007/0137088 A1 | 6/2007 | Peters et al. |
| 2007/0157502 A1 | 7/2007 | Holmberg |
| 2007/0180751 A1 | 8/2007 | Joannes |
| 2007/0223087 A1 | 9/2007 | Pochapsky |
| 2007/0234626 A1 | 10/2007 | Murdock et al. |
| 2007/0277421 A1 | 12/2007 | Perkins et al. |
| 2008/0039962 A1 | 2/2008 | Mcrae |
| 2008/0107414 A1 | 5/2008 | Showalter |
| 2008/0163536 A1 | 7/2008 | Koch et al. |
| 2008/0290164 A1 | 11/2008 | Papale et al. |
| 2009/0109404 A1 | 4/2009 | Thornton |
| 2009/0200376 A1 | 8/2009 | Peters et al. |
| 2009/0205239 A1 | 8/2009 | Smith, III |
| 2009/0225236 A1 | 9/2009 | Yoon |
| 2009/0320348 A1 | 12/2009 | Kelly |
| 2010/0077646 A1 | 4/2010 | Gaber et al. |
| 2010/0207152 A1 | 8/2010 | Won |
| 2010/0225833 A1 | 9/2010 | Methe et al. |
| 2010/0275768 A1 | 11/2010 | Quinn |
| 2010/0281725 A1 | 11/2010 | Arbouw |
| 2011/0121159 A1 | 5/2011 | Mourar et al. |
| 2011/0141381 A1 | 6/2011 | Minikey, Jr. et al. |
| 2011/0162250 A1 | 7/2011 | Windauer et al. |
| 2011/0252682 A1 | 10/2011 | Delgado Acarreta |
| 2011/0280040 A1* | 11/2011 | Schick .................... F41G 1/345 |
| | | 362/559 |
| 2011/0314720 A1 | 12/2011 | Cheng |
| 2012/0000108 A1 | 1/2012 | Zusman |
| 2012/0030985 A1 | 2/2012 | Mauricio |
| 2012/0044571 A1 | 2/2012 | Mukawa |
| 2012/0048931 A1 | 3/2012 | Arbouw |
| 2012/0075168 A1 | 3/2012 | Osterhout et al. |
| 2012/0097741 A1 | 4/2012 | Karcher |
| 2012/0126001 A1 | 5/2012 | Justice et al. |
| 2012/0167423 A1 | 7/2012 | Kindt et al. |
| 2012/0186131 A1 | 7/2012 | Windauer |
| 2013/0033746 A1 | 2/2013 | Brumfield |
| 2013/0167425 A1 | 7/2013 | Crispin |
| 2013/0199074 A1 | 8/2013 | Paterson et al. |
| 2013/0279013 A1 | 10/2013 | Edwards et al. |
| 2014/0059115 A1 | 3/2014 | Sammut et al. |
| 2014/0063261 A1 | 3/2014 | Betensky et al. |
| 2014/0075820 A1 | 3/2014 | Ben-Ami |
| 2014/0092470 A1 | 4/2014 | Szapiel |
| 2014/0101982 A1 | 4/2014 | Mcphee |
| 2014/0110482 A1 | 4/2014 | Bay |
| 2014/0182187 A1 | 7/2014 | Mchale |
| 2014/0226214 A1 | 8/2014 | Edwards et al. |
| 2014/0259854 A1 | 9/2014 | Williams et al. |
| 2015/0055119 A1 | 2/2015 | Hamilton |
| 2015/0106046 A1 | 4/2015 | Chen et al. |
| 2015/0233674 A1 | 8/2015 | Beckman |
| 2015/0247702 A1 | 9/2015 | Davidson et al. |
| 2015/0362288 A1 | 12/2015 | Sammut et al. |
| 2015/0369565 A1 | 12/2015 | Kepler |
| 2015/0377572 A1 | 12/2015 | Darragjati |
| 2016/0061566 A1 | 3/2016 | Chen |
| 2016/0061567 A1 | 3/2016 | Regan et al. |
| 2016/0069629 A1 | 3/2016 | Seckman |
| 2016/0138890 A1 | 5/2016 | Hofmann et al. |
| 2016/0169625 A1 | 6/2016 | Richards |
| 2016/0195351 A1 | 7/2016 | Burden |
| 2016/0223293 A1 | 8/2016 | Maryfield et al. |
| 2016/0223805 A1 | 8/2016 | Waterman et al. |
| 2016/0265880 A1 | 9/2016 | Maryfield et al. |
| 2017/0051993 A1 | 2/2017 | Imbriano et al. |
| 2017/0143442 A1 | 5/2017 | Tesar et al. |
| 2017/0191796 A1* | 7/2017 | Scroggins ................. F41G 1/38 |
| 2017/0227327 A1 | 8/2017 | Thomas et al. |
| 2018/0224241 A1 | 8/2018 | Havens et al. |
| 2018/0224244 A1 | 8/2018 | Havens et al. |
| 2018/0224650 A1 | 8/2018 | Havens et al. |
| 2018/0224651 A1 | 8/2018 | Havens et al. |
| 2018/0224652 A1 | 8/2018 | Havens et al. |
| 2019/0146205 A1 | 5/2019 | Havens et al. |
| 2019/0219812 A1 | 7/2019 | Havens et al. |
| 2019/0324260 A1* | 10/2019 | Hamilton ............... G02B 23/04 |
| 2019/0360780 A1* | 11/2019 | Jahromi .................... F41G 1/30 |
| 2019/0376764 A1 | 12/2019 | Hammond |
| 2020/0232762 A1 | 7/2020 | Hamilton et al. |
| 2021/0348886 A1 | 11/2021 | Lewis et al. |
| 2022/0283440 A1* | 9/2022 | VanBecelaere ......... F41G 1/473 |
| 2023/0194206 A1* | 6/2023 | Davidson ................. F41G 1/38 |
| | | 42/122 |

FOREIGN PATENT DOCUMENTS

| JP | 2006003020 A | 1/2006 |
| JP | 2009500637 A | 1/2009 |
| JP | 2020-506434 A | 2/2020 |
| WO | 2005015285 A2 | 2/2005 |
| WO | 2006060007 A1 | 6/2006 |
| WO | 2011158013 A1 | 12/2011 |
| WO | 2014167276 A1 | 10/2014 |
| WO | 2015103155 A1 | 7/2015 |
| WO | 2018145097 A1 | 8/2018 |
| WO | 2018172738 A1 | 9/2018 |
| WO | 2020033369 A1 | 2/2020 |

OTHER PUBLICATIONS

International Search Report and Written Opinion for International Application No. PCT/US2021/030874 dated Aug. 13, 2021, 13 pages.

International Search Report and Written Opinion for International Application No. PCT/US2023/72855 dated Nov. 17, 2023, 10 pages.

International Preliminary Report on Patentability issued for International Application No. PCT/US2023/072855, dated Feb. 25, 2025, 7 pages.

Nightforce Optics Inc. Reticle MIL-R product sheets 2013 2 pages.

3-9x First Focal Plane Adjustable Objective Rifle Scope—Monstrum Tactical; http://monstrumtractical.com/products/3-9x-first-focal-plan-rifle-scope-adjustable—Objective-range-finder-reticle?variant= 15621625091 printed Jul. 12, 2016 7 pages.

ATN X-Sight 3-12x Digital Scopes for Rifles—Day & Night vision optics https://www.atncorp.com/x-sight-night-vision-rifle-scope-3-12x printed Jul. 12, 2016 10 pages.

T. Edwards et al. High-brightness display in integrated weapon sight systems abstract http://proceedings.spiedigitallibrary.org/proceeding.aspx?articleid=1882790 printed Jul. 12, 2016 2 pages.

International Search Report and Written Opinion for International Patent Application No. PCT/US2018/017079 dated Apr. 26, 2018, 29 pages.

International Search Report and Written Opinion for International Patent Application No. PCT/US19/28540, dated Aug. 16, 2019, 7 pages.

(56) References Cited

OTHER PUBLICATIONS

International Preliminary Report on Patentability for International Application No. PCT/US2020/014082 dated Jun. 16, 2021, 9 pages.
International Search Report and Written Opinion for International Application No. PCT/US19/45493 dated Apr. 28, 2020, 13 pages.
International Search Report and Written Opinion for International Application No. PCT/US2020/014082 dated Apr. 1, 2020, 18 pages.
Office Action issued for Chinese Patent Application No. 202080015937.X dated Dec. 21, 2022, 26 pages.
Extended European Search Report issued for European Patent Application No. 207 40873.3, dated Feb. 3, 2023, 7 pages.
Barska 2013 Master Catalog 2013 124 pages.

\* cited by examiner

3305

4530

5305                    5305

5305                                    5310

5305                              5305

5305

5309

5300

6720

6710

7200

7215

7300

7500

7510

7520

7900

7900

8010

7900

8010

8010

7900

8010

8010

8205

8300

8305     8310     8315

VIEWING OPTIC WITH SOFTWARE CAPABILITIES IMPLEMENTED BY AN ENABLER

CROSS-REFERENCE TO RELATED APPLICATIONS

This application claims priority to and is a non-provisional patent application of U.S. Provisional Patent Application No. 63/373,428 filed Aug. 24, 2022, which is incorporated herein by reference in its entirety.

FIELD

The disclosure relates to a viewing optic. In one embodiment, the disclosure relates to a viewing optic with an integrated display system. In one embodiment, the disclosure relates to a enabler configured to provide or activate or unlock select software to a viewing optic having an integrated display system.

BACKGROUND

Illuminators, also known as flashlights or weapon lights, serve an important tool in tactical environments. They allow the user to positively identify threats no matter the lighting system. They are even important for use with night vision goggles (NVG).

Traditional night vision gathers IR light to form an image. In environments where there is little to no ambient light—like inside a blacked-out building or a cave, there isn't enough IR light for the user to see even under night optical/observation device (NODs). To counter this, users employ IR illuminators to light up their environment. However, like white light flashlights, there is a tradeoff between spill (the amount of area illuminated) and throw (distance).

Each beam profile has its own place. Beams with high throw are great for illuminating targets at distance and penetrating photonic barriers (other environmental light that washes out the user's light source). Beams with high spill are useful for room clearing operations. In that Close Quarter Battle (CQB) environment, users don't need to see very far, but they need maximum situational awareness, so they want a very wide area to be illuminated.

To address the most possible scenarios, many IR illuminators often have an adjustable focus, or have multiple settings so that the user can choose the beam profile that is best suited for their needs. The PEQ-15 family of lasers uses a focusing dial that tightens or widens the beam profile. It also comes with a flip cap that, when employed, acts as a diffusor creating maximum spill. The MAWL by B. E. Myers has two buttons with 3 different settings, providing the user with 6 different beam profiles that switch between very wide spill, long throw, and combination/hybrid profiles for mid distance ranges. The disadvantage of these legacy systems is that they are slow to employ, or they add substantial complication to the user interface by increasing complexity of button operation.

Thus, there exists a need for an illumination and aiming apparatus that will allow a user to rapidly adjust the settings of the illumination and aiming functions in response to target position and environmental conditions for a particular engagement, without requiring the user to alter or adjust firing grip, or spend unnecessary time adjusting and changing illumination and aiming settings. There is also a need for an illumination and aiming apparatus that is modular and highly adaptable to a user's specific mission and environmental requirements.

Further, there is a need for a device to provide one or more software programs to the viewing optic. Different software programs have applicability under different conditions/scenarios and having an efficient way to access these software programs would be beneficial.

The apparatuses, systems, and methods disclosed herein address all of these shortcomings in an innovative fashion.

SUMMARY

In one embodiment, the disclosure relates to a system comprising: a viewing optic having an optical system with an objective lens system that focuses a target image from an outward scene to a first focal plane located between the objective lens system and an erector lens system that inverts the target image, an active display configured to generate an image that is viewed in the first focal plane of the optical system and a computer processing unit; and an enabler configured to provide software capabilities to the computer processing unit of the viewing optic.

In one embodiment, the disclosure relates to a system comprising: a viewing optic having an optical system having an objective lens system that focuses a target image from an outward scene to a first focal plane; an erector lens system that inverts the target image; a beam combiner placed between the objective lens system and the erector lens system; and an active display configured to generate an image and a collector lens system configured to collect light from the active display, and a reflective material configured to direct the generated digital image from the active display to the beam combiner, wherein the generated image and the target image are viewed in the first focal plane and a computer processing unit; and an enabler configured to provide software capabilities to the computer processing unit of the viewing optic.

In one embodiment, the disclosure relates to a system comprising: a viewing optic having an optical system for viewing a target image, an erector lens system that inverts the target image, an active display configured to generate an image, wherein the generated image is combined into an image of the outward scene in a first focal plane of the optical system, wherein the first focal plane is located between an objective lens system and the erector lens system; and a computer processing unit; and an enabler configured to provide software capabilities to the computer processing unit of the viewing optic.

In one embodiment, an enabler is configured to provide the viewing optic access to one or more software programs. In another embodiment, an enabler is configured to provide the computer processing unit of the viewing optic access to one or more software programs.

In one embodiment, the enabler is configured to provide additional memory to the computer processing unit of the enabler.

In one embodiment, the enabler is configured to unlock software that is stored within the viewing optic. In one embodiment, the enabler is configured to provide new software to the viewing optic, wherein the new software was not present on the viewing optic. In one embodiment, the enabler is configured to provide software selected from the group consisting of training software, night vision software, camera software, maintenance software, and advanced user software.

In one embodiment, the enabler is coupled to a top portion of the viewing optic. In one embodiment, the enabler is a remote control. In one embodiment, the enabler is a plug-in apparatus.

In one embodiment, the viewing optic has at least two enabler interfaces. In one embodiment, one of the at least two enabler interfaces is located forward an etched reticle elevation adjustment. In another embodiment, the second of the at least two enabler interfaces is located behind an etched reticle elevation adjustment.

In one embodiment, the enabler is coupled to one of the at least two enabler interfaces.

In one embodiment, the disclosure relates to a system comprising: a viewing optic having an optical system having an objective lens system that focuses a target image from an outward scene to a first focal plane; an erector system that inverts the target image; a beam combiner placed between the objective lens system and the erector lens system; and an active display configured to generate an image and a collector lens system configured to collect light from the active display, and a reflective material configured to direct the generated digital image from the active display to the beam combiner, wherein the generated image and the target image are viewed in the first focal plane; and an enabler configured to provide software capabilities to the viewing optic.

In one embodiment, the disclosure relates to a system comprising: a viewing optic having an optical system for viewing a target image, an erector system that inverts the target image, and an active display configured to generate an image, wherein the generated image is combined into an image of the outward scene in a first focal plane of the optical system, wherein the first focal plane is located between an objective lens system and the erector system; and an enabler configured to provide software capabilities to the viewing optic.

In one embodiment, the disclosure relates to a viewing optic is provided including a main tube, an objective system coupled to a first end of the main tube and an ocular system coupled to a second end of the main tube. The main tube, the objective system and the ocular system are cooperatively configured to define at least one focal plane. The viewing optic further includes a beam combiner located between the objective system and the first focal plane. The viewing optic further includes an integrated display system comprising an active display, wherein the active display generates and projects a digital image to the beam combiner so the digital image and the target image from the objective lens system can be combined at the first focal plane.

In one embodiment, the disclosure relates to a viewing optic with a first optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), a beam combiner that is placed between the objective lens system and the FFP Target Image, an eyepiece lens system that collimates the SFP Target Image so that it can be observed by the human eye, and a second optical system. In one embodiment, the second optical system has an active display for generating an image, and a lens system that collects the light from the active display. The image from the digital display is directed to the beam combiner so that the digital image and the target image from the objective lens system can be combined at the first focal plane and viewed simultaneously.

In one embodiment, the disclosure relates to a viewing optic having a body with direct viewing optics for viewing images of an outward scene and a base having an integrated display system, wherein the integrated display system generates images with an active display and directs the images for simultaneous overlaid viewing of the generated images and images of the outward scene.

In one embodiment, the disclosure relates to a viewing optic with a body having a main optical system comprised of an objective lens system that focuses an image from a target down to a first focal plane (hereafter referred to as the "FFP Target Image"), a beam combiner that is placed between the objective lens system and the FFP Target Image, followed by an erector lens system that inverts the FFP Target Image and focuses it to a second focal plane (hereafter referred to as the "SFP Target Image"), and finally an eyepiece lens system that collimates the SFP Target Image so that it can be observed by the human eye, and a base coupled to a bottom portion of the body having a cavity with an integrated display system for generating images and directing the generated images for simultaneous overlaid viewing of the generated images and images of the outward scene in the first focal plane of the body.

In one embodiment, the integrated display system comprises an active display, collector optics and a reflective surface or material, including but not limited to a mirror. In one embodiment, the active display can generate images including but not limited to text, alpha-numerics, graphics, symbols, and/or video imagery, icons, etc., including active target reticles, corrected aim-points, range measurements, and wind information.

In one embodiment, the disclosure relates to a viewing optic comprising: a body having (i) a first optical system having an objective lens system that focuses a target image from an outward scene to a first focal plane, an erector lens system that inverts the target image, a second focal plane, an ocular lens system for viewing the target image, (ii) a beam combiner; (iii) a second optical system with an active display for generating an image, and a reflective material that directs the generated image from the active display to the beam combiner, and one or more adjustment mechanisms for performing one or more of the following: (a) moving the active display in relation to the reflective material, (b) moving the reflective material in relation to the active display, (c) moving the reflective material in relation to the beam combiner, (d) moving the beam combiner in relation to the reflective material, and (e) moving the erector lens system in relation to the beam combiner, wherein the image from the active display and the target image from the objective lens system are combined into the first focal plane and viewed simultaneously.

In one embodiment, the integrated display system has collector optics or a lens system to collect light from an active display. The light from the display is directed to a reflective surface or material, including but not limited to a mirror, and from the reflective surface to a beam combiner in the main tube assembly of the viewing optic and an image of the display is formed, which is coincident with the first focal plane of the optical system. This image of the display is combined with the image coming from the scene (target) and is perceived as being "underneath" the traditional wire or glass etched reticle.

In one embodiment, the disclosure relates to a viewing optic comprising: a main body having an objective lens system that focuses a target image from an outward scene to a first focal plane having a first reticle, a power varying lens element mounted within the body; a magnification adjustment mechanism mounted within the body to adjust an optical magnification of the target image from an outward scene; a sensor operatively associated with the magnification adjustment mechanism to produce a signal indicative of an adjustment of the optical magnification; and a base coupled to a bottom portion of the main body having an integrated display system for producing a set of marks and overlaying or superimposing the set of marks onto the first reticle, an electronic controller in communication with the sensor and operable, in response to the signal produced by the sensor, to adjust the size of at least a portion of the first set of marks that are overlaid onto the first reticle.

In one embodiment, the disclosure relates to a viewing optic with a main body having an objective lens system that focuses an image from a target down to a first focal plane having a first reticle, a beam combiner that is placed between the objective lens system and the first focal plane, and a laser range finder for determining a distance to the target; and a base coupled to a bottom portion of the main body and having an integrated display system for producing a set of marks and overlaying or superimposing the set of marks onto the first reticle, an electronic controller in communication with the laser range finder and operable, in response to the distance ranged by the LRF, to produce a first set of marks arranged on an active display old the integrated display system to correspond to hold-over marks in response to the distance ranged.

In one embodiment, the active display is configured to emit light in a direction that is substantially parallel to an optical axis of the viewing scope.

In one embodiment, the active display is configured to emit light in a direction that is substantially perpendicular to an optical axis of the viewing scope.

In one embodiment, the mirror is oriented at an angle of approximately 45° relative to the emitted light of the display.

In one embodiment, the display and the mirror are located on a common side of the viewing optic main body.

In one embodiment, the display and the mirror are located on opposite sides of the viewing optic main body.

In one embodiment, the display and the mirror are located on a common side of a base coupled to the viewing optic main body.

In one embodiment, the display and the mirror are located on opposite sides of a base coupled to the viewing optic main body.

In one embodiment, the mirror is located on the objective side of the base coupled to the viewing optic main body.

In one embodiment, the active display is located on the ocular side of the base coupled to the viewing optic main body.

In one embodiment, the methods and apparatuses disclosed herein allow the end user to easily discern a digital overlay from a day optic scene.

In one embodiment, the disclosure relates to a viewing optic that has both an analog reticle and a digital reticle visible to the user when looking through the scope.

In one embodiment, the viewing optic is used in conjunction with a firearm. In one embodiment, the viewing optic is a riflescope. In one embodiment, the riflescope can be used with an external laser rangefinder with ballistic calculation capability. In one embodiment, the riflescope is rigidly mounted to the firearm and the laser rangefinder is mounted to either the firearm or the riflescope.

In one embodiment, the disclosure relates to sighting system comprising a riflescope having a main body with a first optical viewing system for viewing an outward scene and a base having an integrated display system for generating an image, wherein the base is coupled to a bottom portion of the main body, and further wherein the generated image and an image of the outward scene are combined in a first focal plane of the optics system, a laser rangefinder that measures the distance to the target and components to compute the ballistics for hitting that target. In one embodiment, the integrated display system can digitally display computed information and the correct point of aim, which corresponds with the point of impact of the rifle bullet, wherein the digitally displayed aim point and the outward scene are overlaid and displayed in the first focal plane of the riflescope.

In one embodiment, the disclosure relates to sighting system comprising a riflescope having a main body with a first optical viewing system for viewing an outward scene and a base having an integrated display system for generating an image, wherein the base is coupled to a bottom portion of the main body, and further wherein the generated image and an image of the outward scene are combined in a first focal plane of the optics system, a laser rangefinder that measures the distance to the target and the components to compute the ballistics for hitting that target are located in the main body of the riflescope.

In one embodiment, the disclosure relates to a riflescope with an internal magnification tracking device to scale a digital image projected on the first focal plane reticle.

In another embodiment, the disclosure relates to a magnification tracking device to scale a digital image projected on the first focal plane with the change of magnification.

In one embodiment, the disclosure relates to methods and apparatuses for orientation of a display in an active reticle rifle optic for maximum vertical compensation.

In another embodiment, the methods and apparatuses disclosed herein allows for the maximized range of vertical adjustment of an active reticle within a riflescope by specifically orientating the device responsible for emitting the augmentation image.

In another embodiment, the disclosure relates to a method for aligning the tilt of the vertical axis of a micro display and the vertical axis of a reticle in the optical system of a viewing optic, which is compact, simple, and accurate.

In one embodiment, the methods and apparatuses disclosed herein allow for the seamless combination of a processed digital image into a day visible optic.

In one embodiment, the disclosure relates to a system comprising a viewing optic having an integrated display system and a remote, wherein the remote has flood light capability.

In one embodiment, the disclosure relates to a remote with flight light capability substantially as shown and described herein.

In one embodiment, the disclosure relates to a remote comprising an illumination source and a cable for connecting to the viewing optic.

In one embodiment, the disclosure relates to a remote comprising an illumination source, a cable for connecting to the viewing optic and a connector.

An advantage of the apparatuses and methods disclosed herein is that a multitude of advanced targeting functions can be utilized while preserving a direct view of the target scene.

An advantage of the apparatuses and methods disclosed herein is that the generated image from the integrated display system is combined with the outward image from the target in front of the first focal plane and then focused onto the first focal plane, as such, the target image and generated image from the integrated display system never move in relation to one another.

An advantage of the apparatuses and methods disclosed herein is that the injection of the generated image from the active display into the first focal plane of the optics system allows the generated image to be unaffected by any change in the turret adjustment or position of the erector system.

An advantage of the apparatuses and methods disclosed herein is that by superimposing the generated image of an active display onto the first focal plane, the user is able to use a traditional glass etched reticle for aiming purposes if the electronics should fail or the power supply be exhausted. This is an important failsafe which the apparatuses and methods disclosed herein supplies.

An advantage of the apparatuses and methods disclosed herein is that by displaying the generated image from the integrated display system on the first focal plane, the location of the electronic aiming point stays accurate in relation to the target regardless of the current magnification setting of the riflescope or any other adjustments.

Features, components, steps or aspects of one embodiment described herein may be combined with features, components, steps or aspects of other embodiments without limitation.

DETAILED DESCRIPTION

Figure 1A:
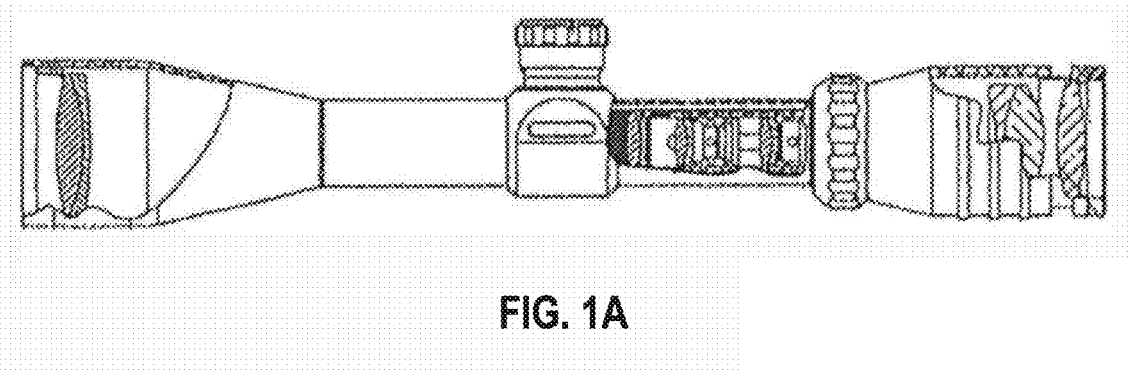
FIG. 1A is a schematic depicting parts of a riflescope.

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on", "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure. However, the term a "first focal plane" refers to a focal plane located between the objective lens system and an erector lens system. The term "second focal plane" refers to focal plane near the ocular lens system.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

I. Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, an "active display" comprises image-creating pixel modulation. In one embodiment, the active display is an emissive active display. Emissive active displays, including but not limited to Organic light-emitting diodes (OLED) and Light-Emitting Diodes (LED), feature the image and light source in a single device, and therefore an external light source is not required. This minimizes system size and power consumption, while providing exceptional contrast and color space. OLEDs are made from ultra-thin organic semiconducting layers, which light up when they are connected to voltage (charge carriers become injected and luminance mainly is proportional to the forward current). The major layers comprise several organic materials in sequence (for example, charge transport, blocking and emission layers each with a thickness of several nanometers), which are inserted between an anode and a cathode. The terms "active display," "digital display" and "microdisplay" are used interchangeably.

As used herein, an "enabler" is a system or device that can be used with a viewing optic. In one embodiment, an enabler is a system or device that can provide information that aids the user of a viewing optic. In one embodiment, an enabler is a system or device that can couple to a portion of a viewing optic. In one embodiment, an enabler includes but is not limited to laser range finder, a camera, a compass module, a communication module, a laser aiming unit, a device for storing and/or implementing one or more software programs, an illuminator, a back-up sight (iron sights, red dots, or another sight), a pivoting sighting modules, or other devices useful to the user. As used herein, the terms "enabler" and "enabler device" are used interchangeably.

As used herein, an "enabler interface" is a location that allows an enabler to be coupled to a viewing optic.

As used herein, an "erector sleeve" is a protrusion from the erector lens mount which engages a slot in the erector tube and/or cam tube or which serves an analogous purpose. This could be integral to the mount or detachable.

As used herein, an "erector tube" is any structure or de ice having an opening to receive an erector lens mount.

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle, and an assault rifle.

As used herein, the term "flood light" refers to large amount of light provided to a particular area. In one embodiment, the light is provided by one or more light emitting diodes.

As used herein, an "integrated display system" refers to a system for generating an image. In one embodiment, the integrated display system includes an active display. In one embodiment, the integrated display system includes an active display and collector optics. In yet another embodiment, the integrated display system includes an active display, collector optics, and a reflective surface.

In one embodiment, the integrated display system can be used to generate a digital image with an active display and direct the digital image into a first focal plane of an optical system for simultaneous viewing of the digital image and an image of an outward scene. As used herein, a "sighting system" refers to one or more optical devices and other systems that assist a person in aiming a firearm or other implement.

As used herein, the term "marks" may comprise any of various visually perceptible lines, circles, dots, cross hairs, horseshoe patterns, geometric shapes, characters, numbers, letters, indicia, or symbols.

As used herein, the term "passive reticle" refers to a reticle with fixed marks that cannot be altered by a user. A representative example of a passive reticle is an etch and fill reticle. Another example is a holographic reticle, where the marks cannot be altered by the user. A passive reticle can be located in a first focal plane, a second focal plane or both the first and second focal planes.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "outward scene" refers to a real world scene, including but not limited to a target.

As used herein, the term "shooter" applies to either the operator making the shot or an individual observing the shot in collaboration with the operator making the shot.

II. Viewing Optic

Figure 1B:
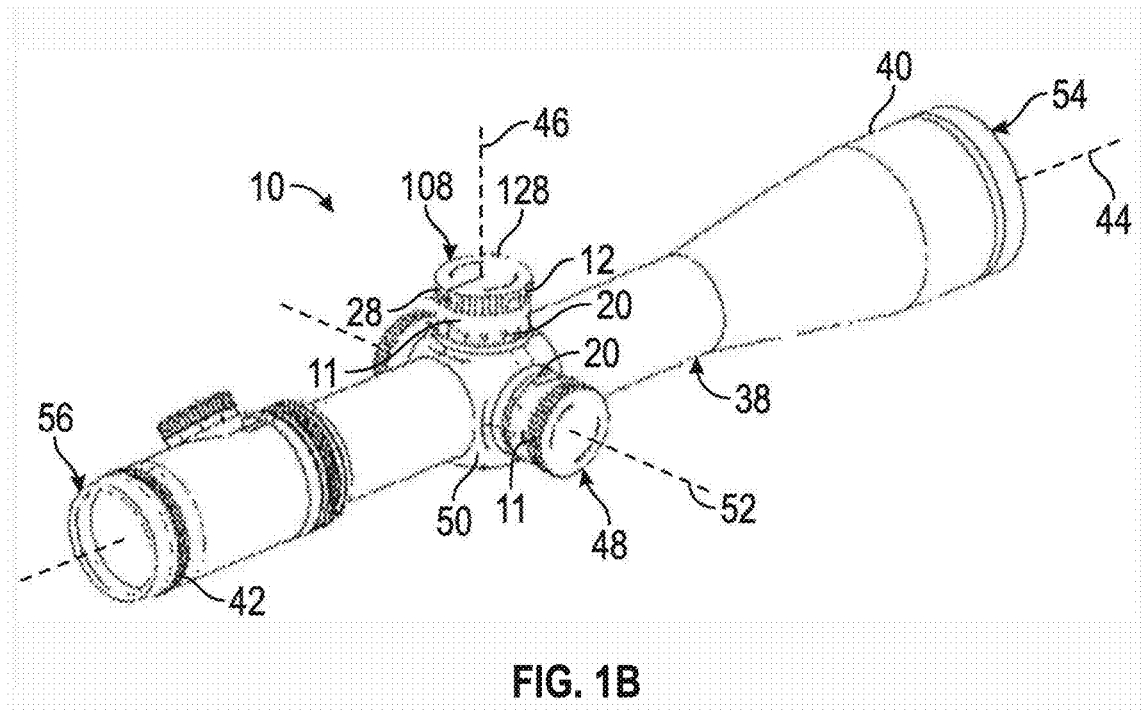
FIG. 1B is a schematic depicting additional parts and components of a viewing optic in accordance with one embodiment of the disclosure.

FIG. 1A illustrates the traditional design of a riflescope, which is a representative example of a viewing optic. FIG. 1B illustrates an exemplary viewing optic 10 in accordance with embodiments of the disclosure. Specifically, FIG. 1B illustrates a riflescope. More particularly, the riflescope 10 has a body 38 that encloses a movable optical element 15. The body 38 is an elongate tube tapering from a larger opening at its front 40 to a smaller opening at its rear 42. An eyepiece 56 is attached to the rear of the scope body, and an objective lens 54 is attached to the front of the scope body. The center axis of the movable optical element defines the optical axis 44 of the rifle scope.

An elevation turret 12 and a windage turret 48 are two dials that are often found in the outside center part of the body 38. They are marked in increments by indicia 20 on their perimeters 11 and are used to adjust the elevation and windage of the movable optical element for points of impact change. These dials protrude from the turret housing 50. The turrets are arranged so that the elevation turret rotation axis 46 is perpendicular to the windage turret rotation axis 52.

Figure 1C:
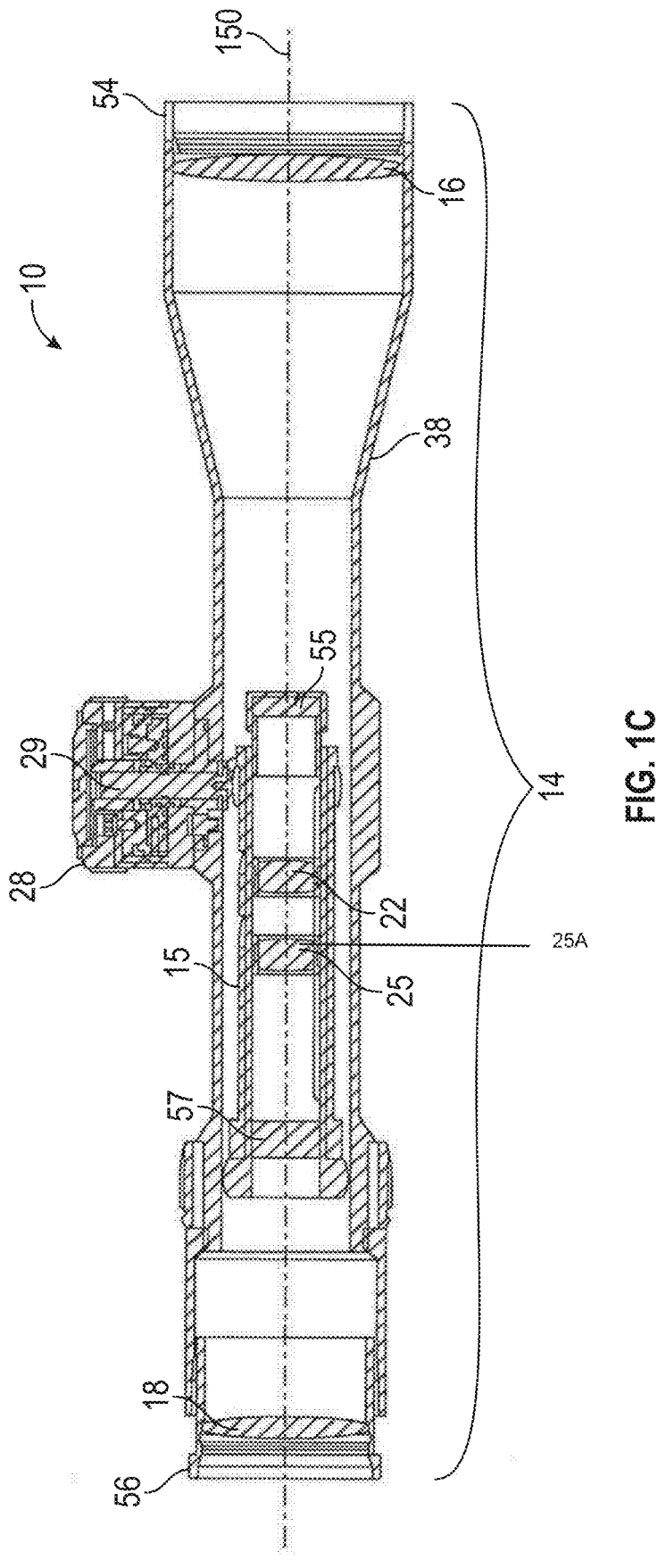
FIG. 1C is a cross section view of the viewing optic of FIG. 1B showing a moveable optic element inside the optic body according to one embodiment of the disclosure.

FIG. 1C shows a cross-section view of the sighting device from FIG. 1B with the basic components of optical system 14 and moveable optical element 15. As shown in FIG. 1C, optical system 14 includes an objective lens system 16, erector system 25, and eyepiece lens system 18. FIG. 1C shows a riflescope having a body 38, but optical system 14 could be used in other types of sighting devices as well. Erector system 25 may be included within a moveable optic element 15. The erector system 25 may include a power varying lens element or zoom element 25A. In FIG. 1C, moveable optic element 15 also includes a collector 22, as well as first focal plane reticle 55 and second focal plane reticle 57. When in use, adjustment of turret assembly 28 and turret screw 29 causes adjustment of moveable optic element 15.

The movable optical element 15 is adjusted by rotating the turret assembly 28 one or more clicks. As the turret is rotated, a turret screw 29 moves in and out of the scope, which pushes the erector tube. The erector tube is biased by a spring so when the turret screw is adjusted, it locates the erector tube against the bottom face of the turret screw. The erector tube provides a smaller view of the total image. As the erector tube is adjusted, the position of the reticle is modified against the image.

A reticle is a circular, planar or flat transparent panel or disk mounted within the scope body in perpendicular relationship to the optical axis or line-of-sight through the scope, and is positioned between the objective lens element 54 and the erector lens element, typically at a site considered to be a front focal plane of the optical system within the housing. In one embodiment, the reticle contains fine etched lines or hairline indicia comprising a center vertical hairline and a center horizontal hairline, which orthogonally or perpendicularly intersect at a center point.

Figure 1D:
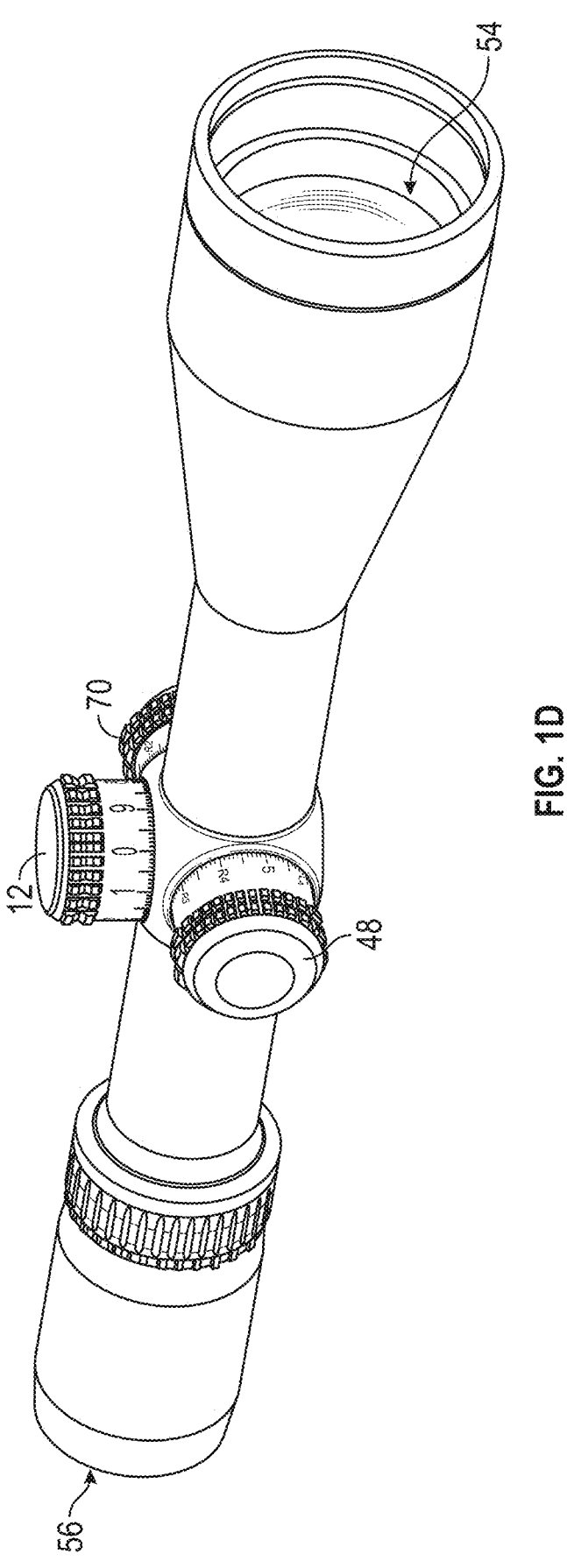
FIG. 1D is a schematic of a viewing optic depicting a parallax adjustment knob according to one embodiment of the disclosure.

In one embodiment, as shown in FIG. 1D, the viewing optic can have a parallax adjustment knob 70 or a focus knob. Parallax occurs when the optical plane of the image of a target is not coplanar with the optical plane of the image of the reticle. As a result of the offset between the two optical planes, the reticle can appear to move relative to the target when the marksman moves their eye around the center of the reticle. This parallax error can result in a shift in the point of impact from firing. The parallax adjustment of a viewing optic enables the marksman to eliminate optical error at different distances, by enabling the optical system to be adjusted to show the image of the target and the image of the reticle in the same optical plane. Parallax compensation changes neither the focus of the reticle nor the focus of the image; it simply moves the planes at which these two objects are in focus so that they share the same plane (are coincident).

As shown in FIG. 1D, the viewing optic can have a side wheel mounted to the rotatable parallax adjustment knob 70. The larger diameter of the side wheel provides more space for markers, such as range marker, to be applied, and is easier for the marksman to rotate and read when in use. The larger diameter of the side wheel serves to increase the accuracy and resolution of the range finding markers.

Figure 1E:
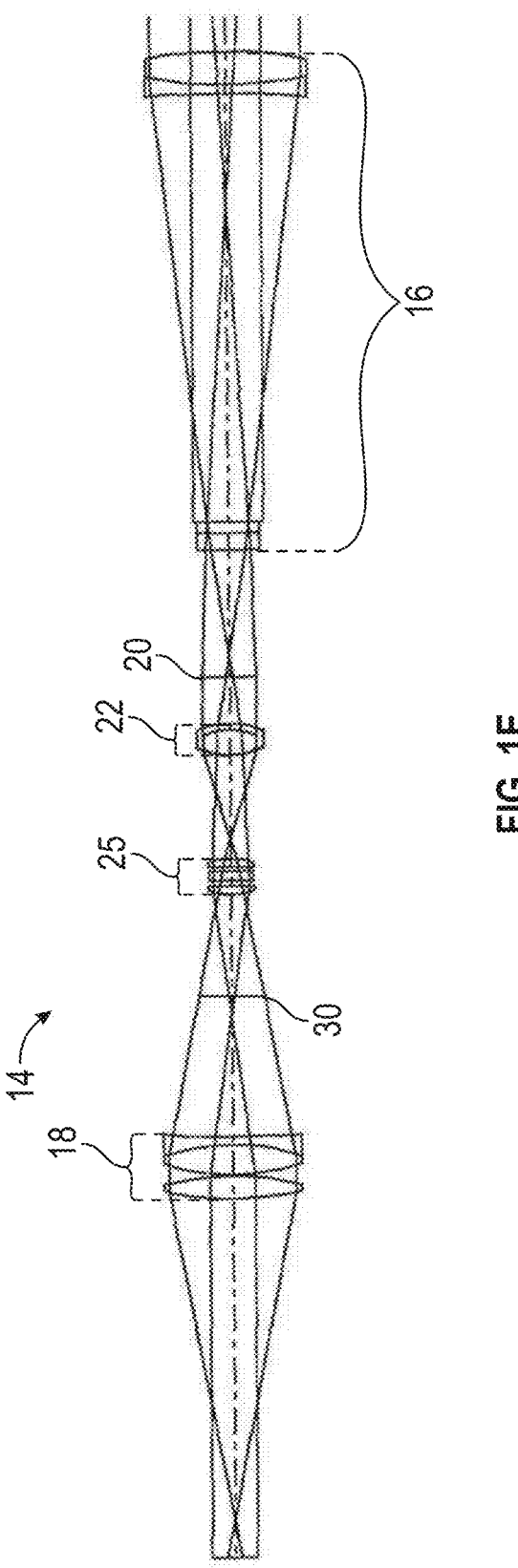
FIG. 1E is a schematic of the erector system in the optical element of the viewing optic according to one embodiment of the disclosure.

FIG. 1E shows a close-up view of an optical system 14 in cross-section, illustrating how light rays travel through the optical system 14. Optical system 14 may have additional optical components such as collector 22, and it is well known within the art that certain components, such as objective lens system 16, erector system 25, and eyepiece lens system 18 may themselves have multiple components or lenses.

In one embodiment, the viewing optic can have a focusing cell having one or more adjustable lens for providing parallax adjustment. In one embodiment, the one or more adjustable lens is one or parallax lenses.

In one embodiment, a focus lens is located between an ocular lens and an objective lens. The relative distance between the focus lens and the objective lens is adjustable, for providing parallax adjustment. In addition, erector lenses are located between the ocular lens and the focus lens. The relative distance between the erector lenses and the objective lens is adjustable, for providing magnification adjustment.

III. Viewing Optic with an Active Display

In one embodiment, the disclosure relates to a viewing optic having an active display that generates a digital image and projects the digital image into the first focal plane of the viewing optic. In one embodiment, the disclosure relates to a viewing optic that has an analog reticle and a digital image, including but not limited to a digital reticle, visible to the user when looking through the viewing optic. In one embodiment, the viewing optic can be used with an external laser rangefinder with ballistic calculation capability.

In one embodiment, the viewing optic has a moveable erector tube with an analog reticle or a glass etched reticle that is mounted to the erector tube in such a way that the analog or glass etched reticle moves in conjunction with said erector tube. In one embodiment, the digitally injected reticle does not move in conjunction with the erector tube. Thus, the digital reticle is accurate regardless of the turret or erector tube position.

In one embodiment, the disclosure relates to viewing optic with a digital display that can be injected into the first focal plane of the viewing optic such that the image of the digital display on the first focal plane is not tied to the movement of the erector tube. In one embodiment, the display can give users accurate ballistic hold points of aim, regardless of the erector tube/turret position of the riflescope.

In one embodiment, the disclosure relates to viewing optic with an aiming point that is agnostic to the position of the erector tube and/or turret position of the viewing optic. In one embodiment, if a ballistically determined aim point is beyond the field of view of the erector unit, the turrets can be dialed to bring the ballistically determined aimpoint into the field of view.

In one embodiment, the viewing optic has a main optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), a beam combiner that is placed between the objective lens system and the FFP Target Image, an eyepiece lens system that collimates the SFP Target Image so that it can be observed by the human eye, and a second optical system.

In one embodiment, the second optical system has an active display, and a lens system that collects the light from the active display. The image from the digital display is directed to the beam combiner so that the digital image and the target image from the objective lens system can be combined at the first focal plane and viewed simultaneously. In one embodiment, the second optical system can have a reflective material, including but not limited to a mirror.

Referring to the description above, the digital display is injected into the main optical system, between the objective lens system and the first focal plane, and then is focused onto the first focal plane. At the first focal plane, both the digital image from the digital display and the analog/glass etched reticle attached to the erector lens system share the same plane. However, the analog reticle is attached to a moveable erector lens system, while the image from the digital display is not. Therefore, if the erector lens system is moved, the analog reticle will move, but the digital image will remain stationary.

In one embodiment, the viewing optic can be rigidly mounted to a firearm. In another embodiment, a laser rangefinder can be mounted to either the firearm or the viewing optic. The laser rangefinder measures the distance to the target, computes the ballistics for hitting that target, provides that information into the active display so that the correct point of aim can be displayed with the point of impact of the rifle bullet.

It is important that the digital image remain stationary because the laser range finder is rigidly attached to viewing optic and its point of aim does not move. This allows the digital display to be digitally adjusted so that the digital laser designator corresponds with the laser on initial setup, and then the two will always remain in alignment, no matter how the erector lens system is moved.

Additionally, the barrel of a firearm is rigidly attached to the viewing optic, so the point of aim of the barrel never changes in relation to the digital display. This allows the digital display to be digitally adjusted so that a digital aim point corresponds with the barrel of the firearm at its initial "sight-in" distance during initial setup, and then the two will always remain in alignment.

When the need arises to shoot at different distances than the initial sight-in distance, the laser range finder can measure the distance and then do ballistic calculations to determine the new location of the point of aim. That new point of aim location is always relative to the initial sight in distance, so the riflescope simply needs to adjust the digital display aim point to correspond with the new point of aim.

A side benefit of this system is that, because the digital aim point is stationary, the user can easily test the accuracy of the turrets on the viewing optic that adjust the erector tube position using a reticle that has predetermined marks on it at regular intervals. As the erector tube moves, the reticle can be measured against the stationary digital aim point to see if the adjustment dialed on the turrets match the amount of movement measured between the digital aim point and the reticle attached to the erector lens system.

IV. Viewing Optic with A Base

In one embodiment, the disclosure relates to a viewing optic, including but not limited to a riflescope, having a first housing coupled to a second housing. In one embodiment, the first housing is a main body. In yet another embodiment, the second housing is a base.

In one embodiment, the disclosure relates to a riflescope having a main body and a base coupled to the main body. In one embodiment, the base is separable from the main body. In one embodiment, the base is attached to a bottom portion of the main body. In one embodiment, a gasket is used to enclose the main body and the base.

In one embodiment, the disclosure relates to a riflescope having a main body with an optics system for generating images of an outward scene and a base coupled to the main body with an integrated display system for generating digital images and directing the digital images into a first focal plane of the optics system, thereby providing simultaneous viewing of the digital images and images of the outward scene.

In another embodiment, the disclosure relates to a riflescope having a main body with an optics system for generating images of an outward scene and a base coupled to the main body with an integrated display system having an active display for generating images and directing the generated images into a first focal plane of the optics system providing simultaneous viewing of the generated images and images of the outward scene when looking through an eyepiece of the scope body.

Figure 2:
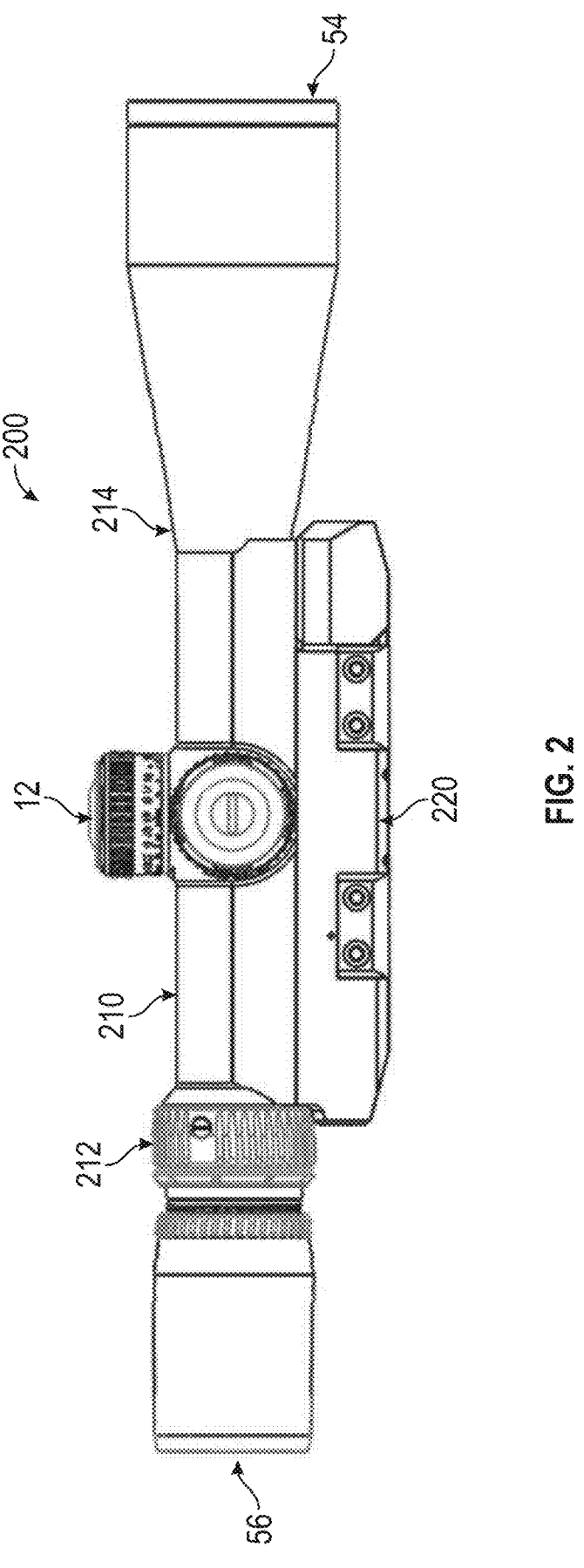
FIG. 2 is a side view of a riflescope having a main body and a base coupled to the main body according to one embodiment of the disclosure.

In a representative embodiment, FIG. 2 displays a side view of a riflescope 200 with a main body 210 and a base 220. In one embodiment, the base 220 is separable from the main body 210. The base 220 attaches at one end of the scope body near the magnification ring 212 and at the other end of the scope body near the objective assembly 214. In one embodiment, the main body 210 and the base 220 are made of the same material. In another embodiment, the scope body and the base are made of different material.

In one embodiment, the base 220 is approximately the length of the erector tube of the main body.

In one embodiment, the base has an integrated display system that can generate and display situational, geographical, and ballistic information in the first focal plane of the viewing optic including but not limited to: real time ballistic solutions; next round ballistic correction through in-flight tracer round detection and tracking; weapon pointing angle tracking using integrated high performance inertial sensors; precise pointing angle comparisons for advanced ballistic targeting and correction; target location and designation; pressure, humidity, and temperature; anti-fratricide and situational awareness data can be processed by the device and viewed while sighting; reticle targeting correction beyond scopes field of view for convenient ballistic drop correction at long ranges; weapon, round, and environmental characterization data.

In one embodiment, the viewing optic has one or more of the following capabilities and/or components; one or more microprocessors, one or more computers, a fully integrated ballistic computer; an integrated near infrared Laser Rangefinder; an integrated GPS and digital compass with the viewing optic capable of full coordinate target location and designation; integrated sensors for pressure, humidity, and temperature with the viewing optic capable of automatically incorporating this data in ballistic calculations; conventional viewing optic capabilities in all conditions, including zero-power off mode; wired and wireless interfaces for communication of sensor, environmental, and situational awareness data; ability to support digital interfaces such as Personal Network Node (PNN) and Soldier Radio Waveform (SR V); integrated tilt sensitivity with respect to vertical with ballistic correction possible for uphill and downhill shooting orientations; integrated imaging sensor; acquiring and processing target scene image frames; ability to record firing time history for purposes of applying cold bore/hot bore shot correction in an automated fashion; and built in backup optical range estimation capability with automatic angular to linear size conversion.

In one embodiment, the viewing optic can communicate wirelessly with one or more devices. In another embodiment, the viewing optic can communicate via a physical cable with one or more devices.

A. Main Body

In one embodiment, the main body is the shape of an elongate tube, which tapers from a larger opening at its front to a smaller opening at its rear and an eyepiece attached to the rear of the elongate tube, and an objective lens attached to the front of the elongate tube. In one embodiment, the first housing is a main body of a riflescope.

In one embodiment, the main body has a viewing input end, and a viewing output end, which can be aligned along viewing optical axis 44 (FIG. 1B), and can be inline. Objects or targets can be directly viewed by the eye of the user through the viewing input end, along the viewing direct view optics, and out the viewing output end. The main body can include an objective lens or lens assembly at the viewing input end. A first focal plane reticle can be positioned and spaced along the viewing optical axis A from the objective lens assembly.

In one embodiment, a picture or image reversal lens assembly can be positioned and spaced rearwardly along the viewing optical axis A from the first focal plane reticle. An erector tube having an erecting image system is located within the main body between the objective lens and the ocular lens in order to flip the image. This gives the image the correct orientation for laid viewing. The erecting image system is usually contained within an erector tube.

The reversal lens assembly or erecting image system can comprise one or more lenses spaced apart from each other. The erector image system may include one or more movable optical elements, such as a focus lens that is movable along its optical axis to adjust the focus of the image and a magnification lens movable along its optical axis to optically magnify the image at the rear focal plane so that the target appears closer than its actual distance. Typically, the erector assembly includes a mechanical, electro-mechanical, or electro-optical system to drive cooperative movement of both the focus lens and one or more power-varying lens elements of the magnification lens to provide a continuously variable magnification range throughout which the erector assembly produces a focused, erect image of the distant target at the rear focal plane.

Variable magnification can be achieved by providing a mechanism for adjusting the position of the erector lenses in relationship to each other within the erector tube. This is typically done through the use of a cam tube that fits closely around the erector tube. Each erector lens for lens group) is mounted in an erector lens mount that slides within the erector tube. An erector sleeve attached to the erector lens mount slides in a straight slot in the body of the erector tube to maintain the orientation of the erector lens. The erector sleeve also engages an angled, or curving, slot in the cam tube. Turning the cam tube causes the erector lens mount to move lengthwise within the guide tube, varying the magnification. Each erector lens will have its own slot in the cam tube and the configuration of these slots determines the amount and rate of magnification change as the cam tube is turned.

An aperture in a second focal plane can be positioned and spaced rearwardly along the viewing optical axis A from the picture reversal assembly. An ocular lens assembly can be positioned and spaced rearwardly along the viewing optical axis A from the aperture in the second focal plane, at the eyepiece. The ocular lens assembly can include one or more lenses spaced apart from each other. In some embodiments, the viewing optical axis A and the direct viewing optics can be folded.

In one embodiment, the main body has a beam combiner. In one embodiment, the beam combiner can be positioned on and optically coupled to a viewing optical axis 44 as shown in FIG. 1B. In one embodiment, a beam combiner can be positioned near a viewing optic reticle. In another embodiment, a beam combiner can be positioned near a first focal plane viewing optic reticle.

In one embodiment, the beam combiner is located between the objective assembly and the first focal plane.

In still another embodiment, the main body has a beam combiner, wherein the beam combiner is not located near the ocular assembly. In one embodiment, the beam combiner is not located beneath the ocular assembly.

In one embodiment, the main body has a beam combiner that is located closer to the objective assembly as compared to the ocular assembly in the main tube of the viewing optic.

Figure 3:
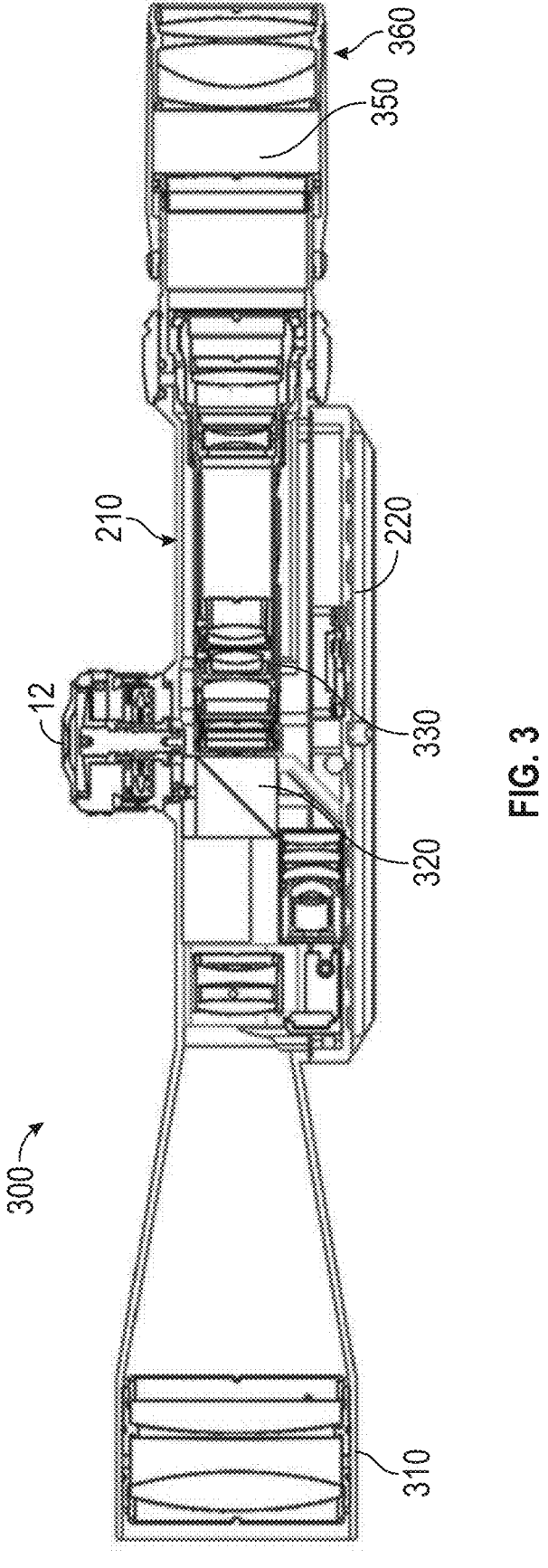
FIG. 3 is a cross-sectional view of a viewing optic with a main body having a beam combiner located between the objective assembly and the first focal plane according to one embodiment of the disclosure.

FIG. 3 displays a side cut-away view of a riflescope 300 with a main body 210 and a base 220. As shown, riflescope 300 has an objective assembly 310, a beam combiner 320, a first focal plane 330, a second focal plane 350, and an ocular assembly 360. The beam combiner 320 is located between the objective assembly 310 and the first focal plane 330.

Figure 4:
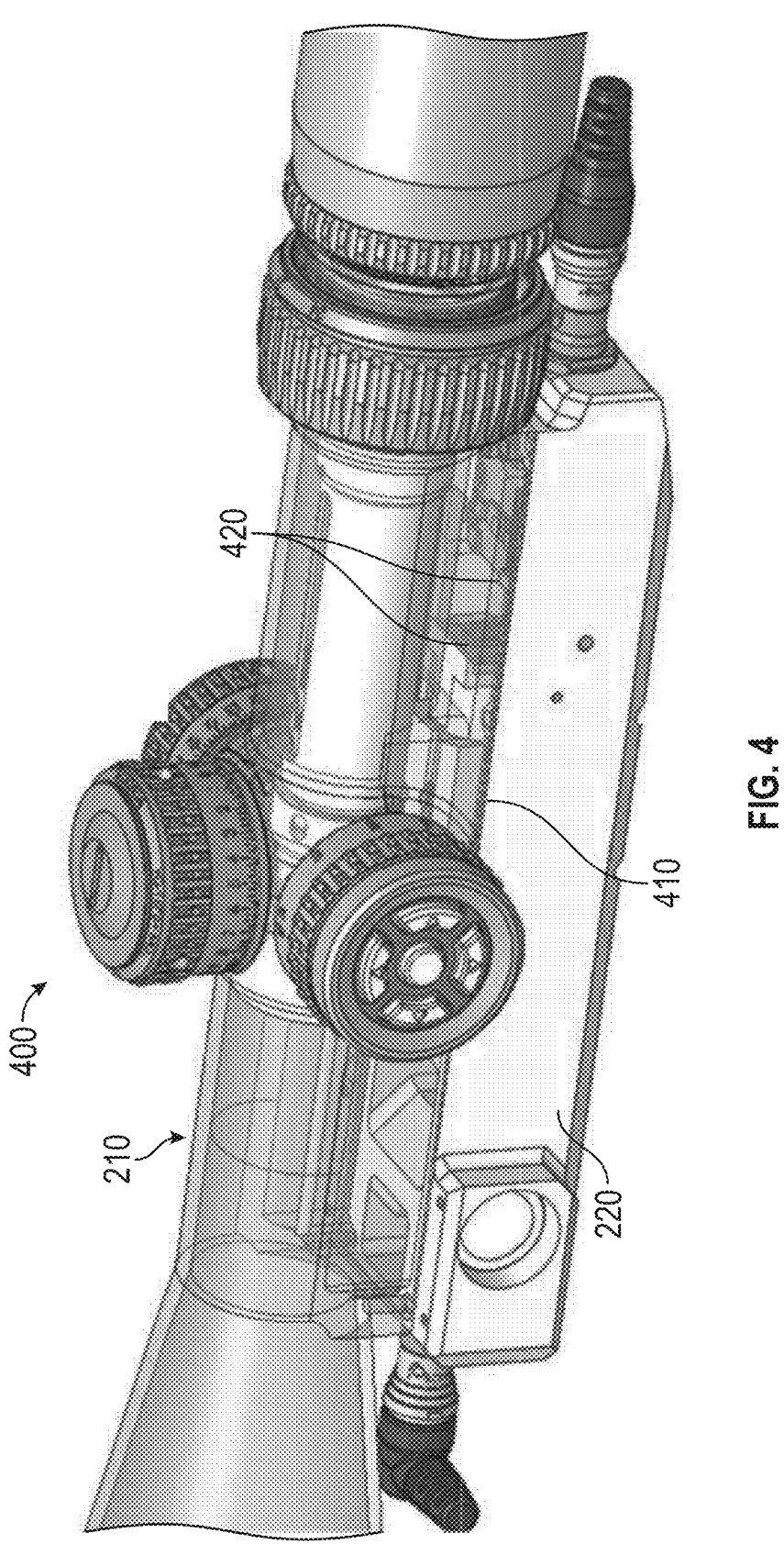
FIG. 4 is a representative schematic displaying a longitudinally-split main body of a viewing optic according to one embodiment of the disclosure.

In one embodiment, the viewing optic 400 can have a main body 210 that is longitudinally split to allow for assembly of the associated lenses and circuitry in the base 220. FIG. 4 is a representative example of a longitudinally split main tube 210 of a riflescope 400. FIG. 4 depicts the parting line 410 of the longitudinally split main tube. The split 420 in the bottom side of the main body 210 allows for coupling of a base 220 having an integrated display system.

In one embodiment, the bottom side of the main body has a longitudinal split. In one embodiment, the longitudinal split is approximately the length of the base that couples to the main body.

In one embodiment, the main body does not have an active display.

1. Beam Combiner

In one embodiment, the main body of the viewing optic has a beam combiner. In one embodiment, the beam combiner is one or more prismatic lenses (the prismatic lenses constitute the beam combiner). In another embodiment, the main body of the riflescope has a beam combiner that combines images generated from an integrated display system with images generated from the viewing optics along the viewing optical axis of the riflescope. In one embodiment, the integrated display system is located in a housing, which is separate and distinct from the main body. In one embodiment, the integrated display system is in a base that couples to the first housing or main body. In one embodiment, the integrated display system is in a cavity of a base that couples to the first housing or main body.

In one embodiment, a beam combiner is used to combine a generated image from an integrated display system with an image from an optical system for viewing an outward image, wherein the optical system is located in a main body of a riflescope, in front of a first focal plane in the main body, and then the combined image is focused onto the first focal plane, such that the generated image and the viewed image did not move in relation to one another. With the combined image focused onto the first focal plane, an aiming reference generated by the integrated display system will be accurate regardless of adjustments to the movable erector system.

In one embodiment, a beam combiner can be aligned with the integrated display system along the display optical axis, and positioned along the viewing optical axis of the viewing optics of the main body of a riflescope, thereby allowing for the images from the integrated display to be directed onto the viewing optical axis for combining with the field of view of the viewing optics in an overlaid manner.

In another embodiment, the beam combiner and the integrated display system are in the same housing. In one embodiment, the beam combiner is approximately 25 mm from the objective assembly.

In one embodiment, the beam combiner is approximately 5 mm distance from the objective assembly. In one embodiment the beam combiner is positioned at a distance from the objective assembly including but not limited to from 1 mm to 5 mm, or from 5 mm to 10 mm or from 5 mm to 15 mm, or from 5 mm to 20 mm, or from 5 mm to 30 mm, or from 5 mm to 40 mm or from 5 to 50 mm.

In yet another embodiment, the beam combiner is positioned at a distance from the objective assembly including but not limited to from 1 mm to 4 mm, or from 1 mm to 3 mm, or from 1 mm to 2 mm.

In one embodiment, the beam combiner is positioned at a distance from the objective assembly including but not limited to at least 3 mm, at least 5 mm, at least 10 mm, and at least 20 mm. In yet another embodiment, the beam combiner is positioned at a distance from the objective assembly from 3 mm to 10 mm.

In another embodiment, the beam combiner is approximately 150 mm distance from the ocular assembly. In one embodiment the beam combiner is positioned at a distance from the ocular assembly including but not limited to from 100 mm to 200 mm or from 125 mm to 200 mm or from 150 mm to 200 mm or from 175 mm to 200 mm.

In one embodiment the beam combiner is positioned at a distance from the ocular assembly including but not limited to from 100 mm to 175 mm or from 100 mm to 150 mm or from 100 mm to 125 mm.

In one embodiment the beam combiner is positioned at a distance from the ocular assembly including but not limited to from 135 mm to 165 mm or from 135 mm to 160 mm or from 135 mm to 155 mm or from 135 mm to 150 mm or from 135 mm to 145 mm or from 135 mm to 140 mm.

In one embodiment the beam combiner is positioned at a distance from the ocular assembly including but not limited to from 140 mm to 165 mm or from 145 mm to 165 mm or from 150 mm to 165 mm or from 155 mm to 165 mm or from 160 mm to 165 mm.

In one embodiment the beam combiner is positioned at a distance from the ocular assembly including but not limited to at least 140 mm or at least 145 mm or at least 150 mm or at least 155 mm.

In still another embodiment, the main body has a beam combiner, wherein the beam combiner is located beneath the elevation turret on the outside center part of the scope body.

In one embodiment, the beam combiner can have a partially reflecting coating or surface that reflects and redirects the output or at least a portion of the active display output from the integrated display system onto the viewing axis to the viewer's eye at eyepiece while still providing good transmissive see-through qualities for the direct viewing optics path.

In one embodiment, the beam combiner can be a cube made of optical material, such as optical glass or plastic materials with a partially reflective coating. The coating can be a uniform and neutral color reflective coating, or can be tailored with polarizing, spectrally selective or patterned coatings to optimize both the transmission and reflection properties in the eyepiece. The polarization and/or color of the coating can be matched to the active display. This can optimize reflectance and efficiency of the display optical path with minimal impact to the direct viewing optics transmission path.

Although the beam combiner is shown as a cube, in some embodiments, the beam combiner can have different optical path lengths for the integrated display system, and the direct viewing optics along viewing optical axis A. In some embodiments, the beam combiner can be of a plate form, where a thin reflective/transmissive plate can be inserted in the direct viewing optics path across the optical axis A.

In one embodiment, the position of the beam combiner can be adjusted in relation to the reflective material to eliminate any errors, including but not limited to parallax error. The position of the beam combiner can adjusted using a screw system, a wedge system or any other suitable mechanism.

In one embodiment, the position of the beam combiner can be adjusted in relation to the erector tube to eliminate any errors, including but not limited to parallax error.

2. Parallax System

In one embodiment, main body has a parallax adjustment system. In one embodiment, the parallax adjustment system uses a device to connect a focusing cell to the parallax adjustment element.

In one embodiment, the viewing optic disclosed herein has a main body with a focusing cell located closer to the objective end as compared to a traditional focusing cell and a beam combiner located in a space traditionally occupied by the focusing cell. In one embodiment, a connecting element connects the focusing cell to a parallax adjustment element.

Figure 5A:
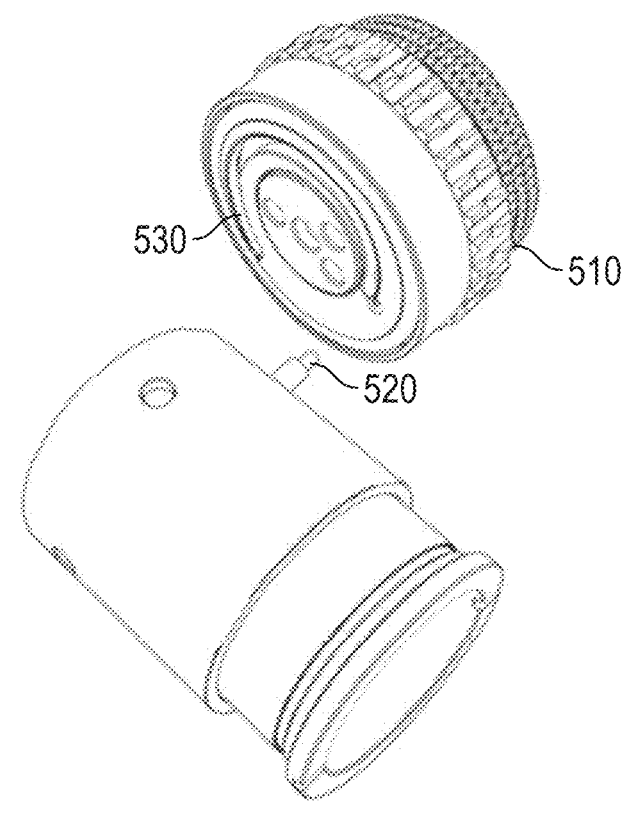
FIG. 5A is a representative schematic of a traditional parallax adjustment knob with a cam pin that rests in a cam grove on the parallax knob.
Figure 5B:
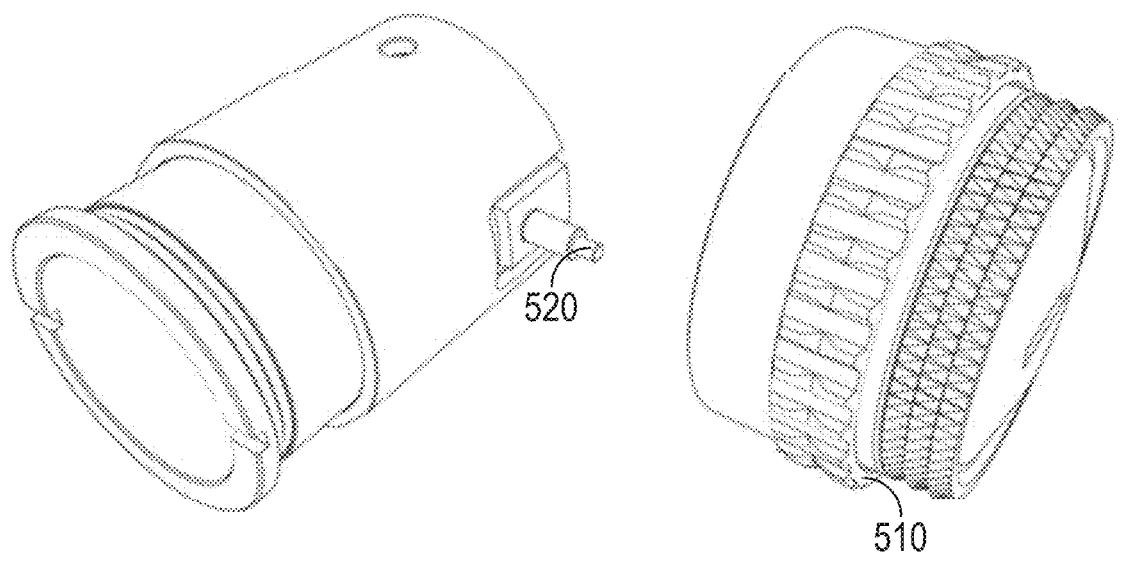
FIG. 5B is a representative schematic of traditional parallax adjustment knob showing a cam pin connecting aspects of a focus cell to a parallax knob.

In a typical riflescope, as depicted in FIG. 5A and FIG. 5B, the parallax knob 510 is connected to the focusing cell via a simple cross pin 520 that rides on a cam groove 530 in the parallax knob, converting the rotational motion of the knob into linear motion within the focusing cell. However, in some embodiments disclosed herein, the focusing cell is shifted toward the objective side, and thus, a connecting device is needed to connect the focusing cell to the parallax adjustment element.

The parallax adjustment system can eliminate or reduce parallax error between the image of the active display and a reticle in the main body of the viewing optic. The parallax adjustment system disclosed herein allows for a viewing optic having a digital display image and an image of an outward scene integrated into a first focal plane (FFP) of an optic system without parallax error.

In another embodiment, the focusing cell is located closer to the objective side of the main body as compared to the focusing cell of a traditional riflescope. In one embodiment, the focusing cell is shifted from about 5 mm to about 50 mm closer to the objective as compared to a focusing cell of a traditional riflescope. In one embodiment, the focusing cell is shifted at least 20 mm closer to the objective as compared to a focusing cell of a traditional riflescope. In one embodiment, the focusing cell is shifted at least 10 mm closer to the objective as compared to a focusing cell of a traditional riflescope. In yet another embodiment, the focusing cell is shifted no more than 50 mm closer to the objective side as compared to a focusing cell of a traditional riflescope. In one embodiment, the focusing cell is shifted 30 mm closer to the objective assembly as compared to a the location of a focusing cell in a Vortex Diamondback riflescope, Vortex Viper riflescope, Vortex Crossfire riflescope, Vortex Razor riflescope.

In one embodiment the focusing cell is shifted closer to the objective as compared to a focusing cell of a traditional riflescope including but not limited to 15, 16, 17, 18, 19, 20, 21, 22, 23, 24, 25, 26, 27, 28, 29, 30, 31, 32, 33, 34, 35, 36, 37, 38, 39, and 40 mm closer to the objective side of the viewing optic.

In one embodiment, a device connects the shifted focusing cell to the adjustment knob. In one embodiment, the device allows for the remote location of the parallax adjustment lenses located in the focusing cell. In one embodiment, the mechanical device is a push-rod, a rod, a shaft, In one embodiment, the rod is from about 5 mm to about 50 mm in length. In one embodiment, the rod is at least 20 mm in length. In one embodiment, the rod is at least 10 mm in length. In yet another embodiment, the rod is no more than 50 mm in length.

In one embodiment the rod is 15, 16, 17, 18, 19, 20, 21, 22, 23, 24, 25, 26, 27, 28, 29, 30, 31, 32, 33, 34, 35, 36, 37, 38, 39, and 40 mm in length.

Figure 5C:
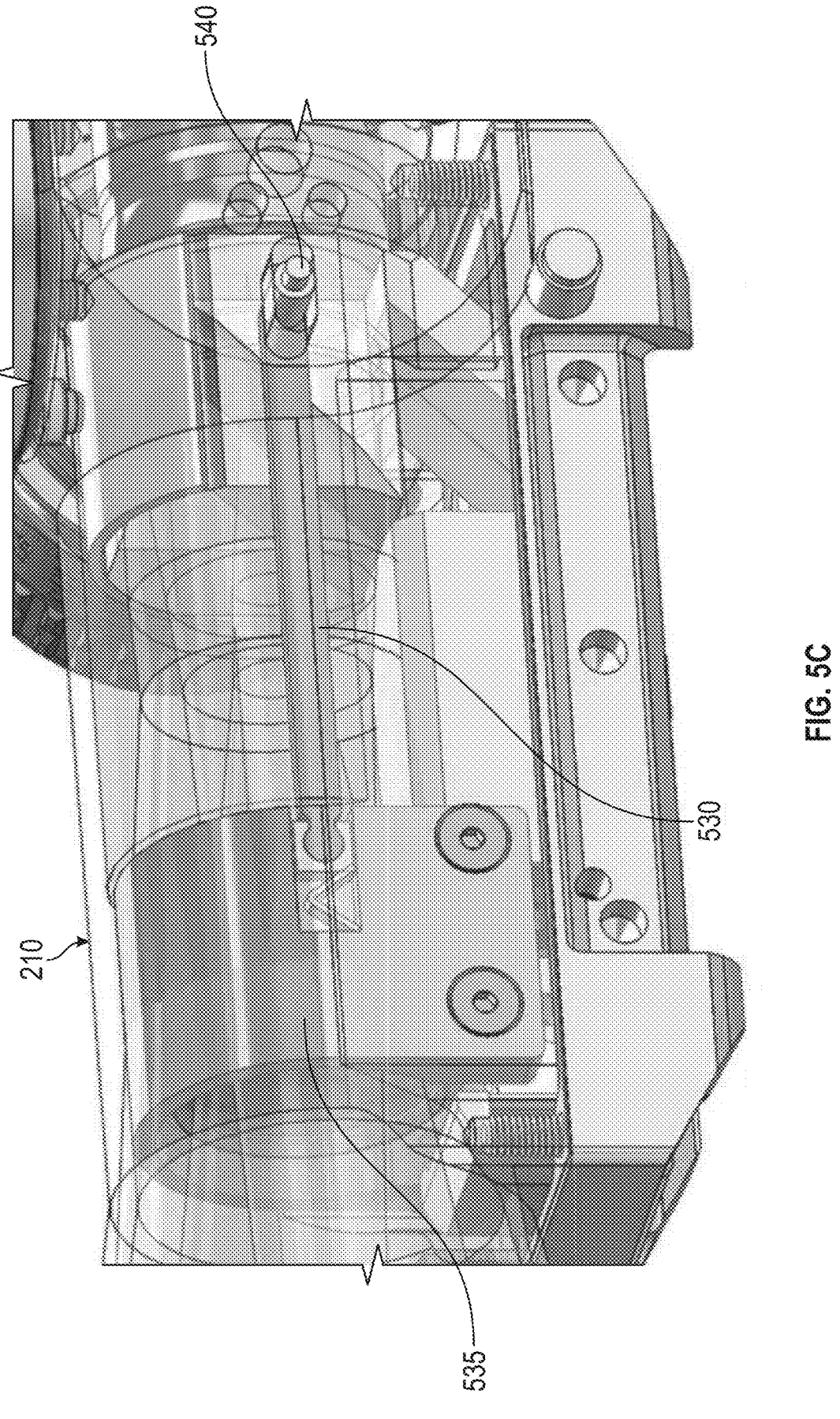
FIG. 5C is a representative schematic of a parallax adjustment system. A connecting rod is shown that can be used for parallax adjustment. The focusing cell (parallax lenses) has been moved to allow space for the beam combiner (prismatic lenses) to be placed forward of the first focal plane according to one embodiment of the disclosure.

FIGS. 5C-5F are representative schematics of a parallax adjustment system in the main tube 210 of a viewing optic according to one embodiment of the disclosure. As shown in FIG. 5C, a device, such as a rod or shaft, 530 connects the focusing cell (parallax lenses) 535, which have been moved closer to the objective end of the viewing optic, to a parallax cam track pin 540 within the parallax adjustment knob assembly. The shifted location of the parallax lenses provides the necessary space for the prismatic lenses forward of the first focal plane. One end of the connecting rod is coupled to the focusing cell and the other end of the connecting rod is coupled to a cam pin.

Figure 5D:
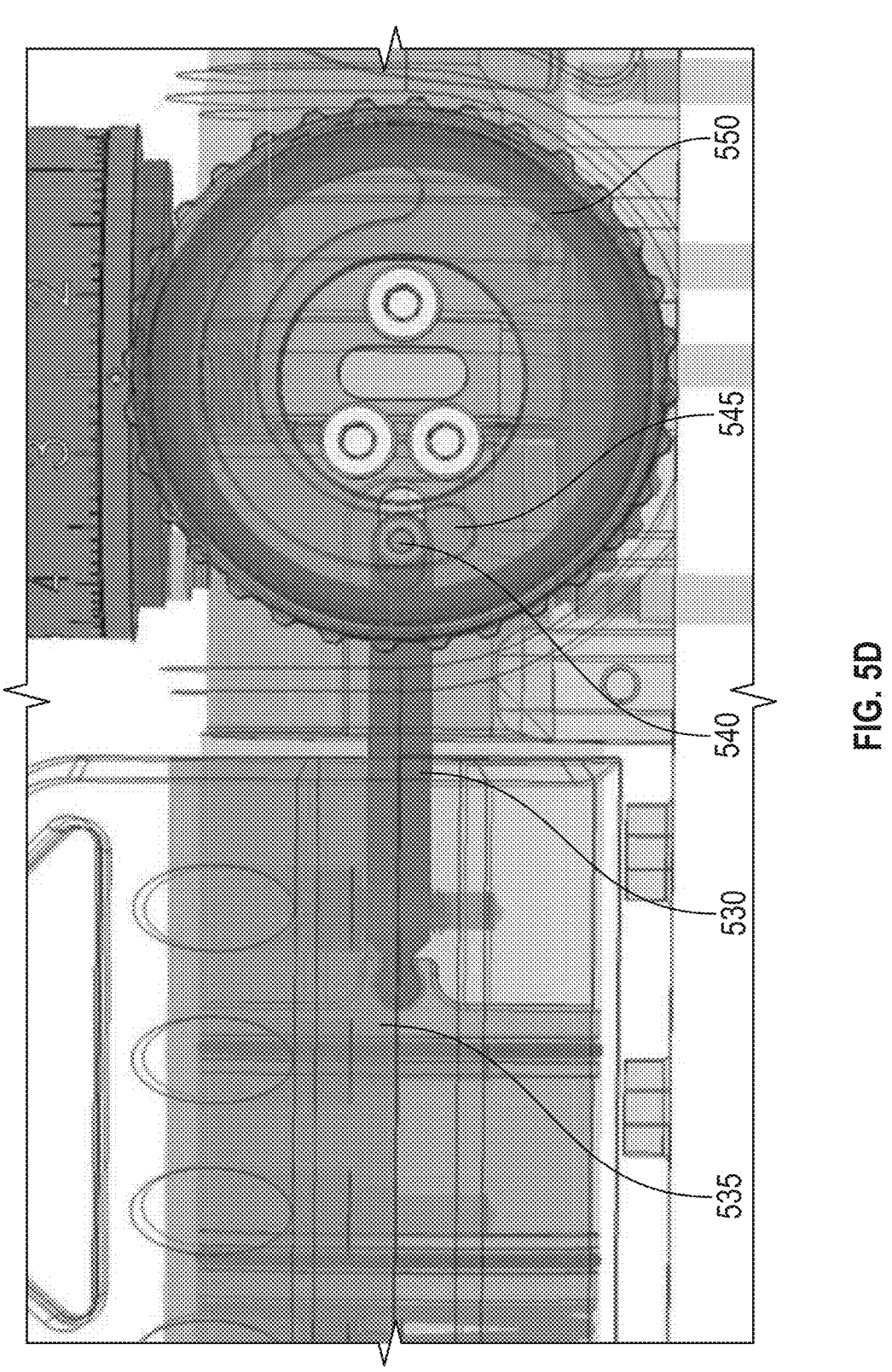
FIG. 5D is a representative schematic of a parallax adjustment system showing one end of the connecting rod having a cam-pin that rests in a cam grove of the parallax adjustment knob assembly according to one embodiment of the disclosure.

FIG. 5D shows the device 530 connecting the focusing cell 535 having the parallax lenses to the parallax cam track pin 540, which rides in the cam track 545 of the parallax adjustment assembly 550. In one embodiment, the parallax adjustment assembly 550 has a rotatable element to move the cam pin and adjust the parallax lenses.

Figure 5E:
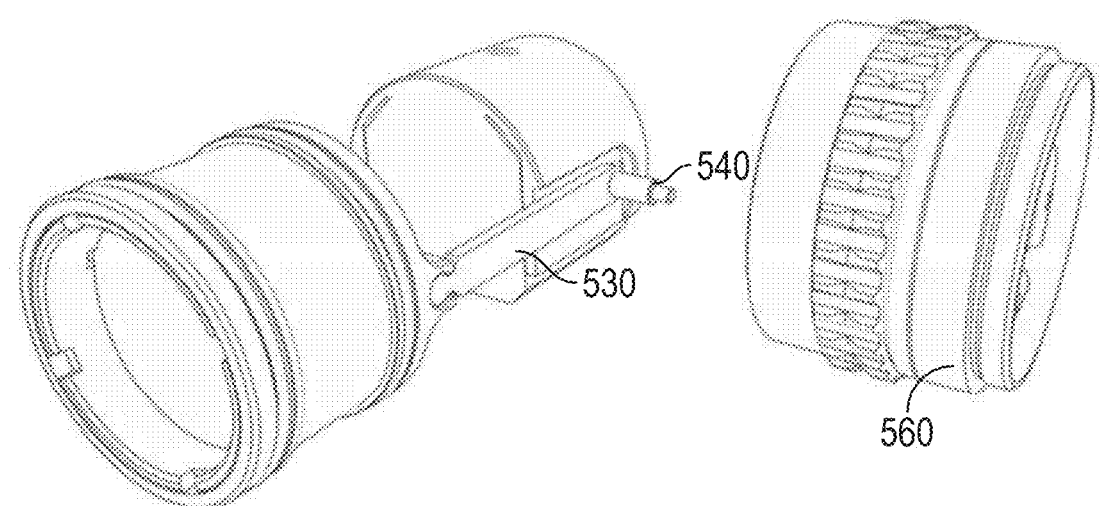
FIG. 5E is a representative schematic of a parallax adjustment system having a connecting rod with one end connected to a focusing cell and the other end of the rod connected to a cam pin according to one embodiment of the disclosure.

As shown in FIG. 5E, in order to provide space in the main body of the viewing optic for the beam combiner (prismatic lenses), the focusing shell is shifted closer to the objective assembly. Thus, a mechanism is needed to connect the focusing cell to the parallax knob assembly. A connecting device 530 connects the focusing cell to a cam pin 540 that rides in a cam groove of the parallax knob assembly 560.

Figure 5F:
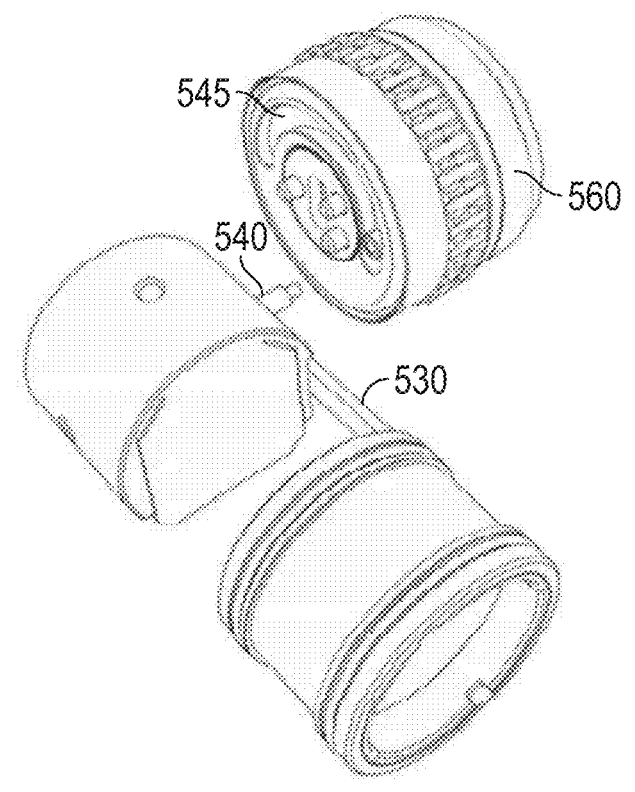
FIG. 5F is a representative schematic of a parallax adjustment system having a connecting rod with one end connected to a focusing cell and the other end of the rod connected to a cam pin that rests in a cam groove on the parallax knob according to one embodiment of the disclosure.

As shown in FIG. 5F the cam pin 540 rides in a cam groove 545 of the parallax knob assembly 560, allowing adjustment of the focusing cell via the parallax knob assembly.

In one embodiment, the shifted focusing cell, which has the parallax lenses, in the main body provides space to integrate a beam combiner ahead of a first focal plane of the objective system.

In one embodiment, the beam combiner in the main body of the riflescope disclosed herein is located in the space where the focusing cell is typically mounted in a traditional riflescope.

In one embodiment, the disclosure relates to a viewing optic comprising: (a) a main tube; (b) an objective system coupled to a first end of the main tube; (c) an ocular system coupled to the second end of the main tube, (d) a focusing cell located between the objective system and a beam combiner, wherein the beam combiner is positioned between the focusing cell and a first focal plane reticle; and (e) a rod connecting the focusing cell to a parallax adjustment element. In one embodiment, the rod connects the focusing cell to a cam pin of the parallax adjustment element. In some embodiments, the parallax adjustment element has a knob.

3. Magnification Tracking System

In one embodiment, the disclosure relates to viewing optic and methods for tracking the magnification setting of a viewing optic, wherein the components of the tracking mechanism are reliable, completely transparent to the operator, and environmentally protected.

When a reticle is in the first focal plane, the reticle is in front of the erector system and thus the reticle changes proportionally with the change in lens position creating a magnified image. The erector system changes position through the use of a magnification ring that is located on the external portion of a rifle scope near the ocular housing. Typically, a magnification ring is connected with a screw to an outer erector sleeve, forcing the outer erector sleeve to rotate with the magnification ring when rotated causing cam grooves to change the position of the zoom lenses located in the erector system. When projecting a digital image onto the first focal plane it is necessary to scale that image with the scaling of the reticle to make the digital image usable.

The magnification adjustment mechanism is coupled to the power-varying lens or zoom lens element, which provides the ability to adjust an optical magnification of the image of the distant object.

Figure 6:
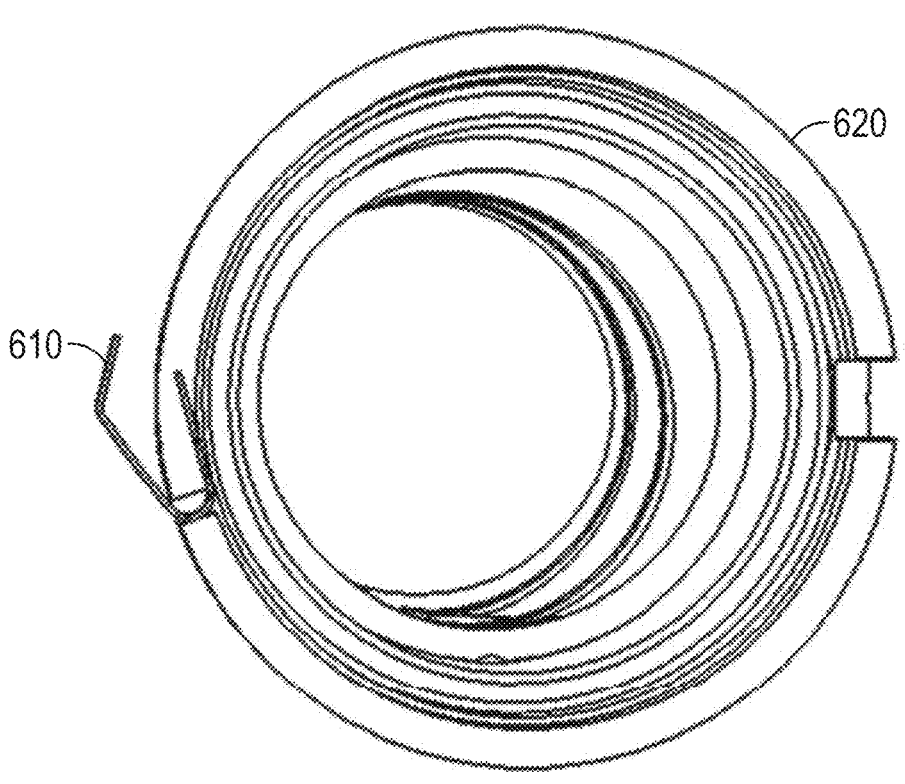
FIG. 6 is a representative schematic showing an outer erector sleeve with a potentiometer wiper according to one embodiment of the disclosure.
Figure 7:
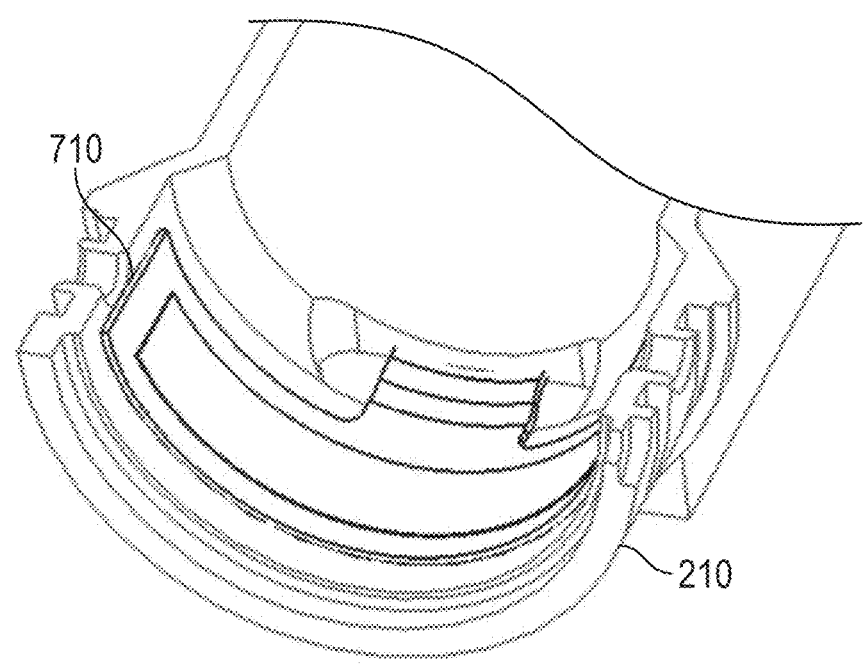
FIG. 7 is a representative schematic showing a membrane potentiometer placement on main body of a riflescope according to one embodiment of the disclosure.

In one embodiment, and as shown in FIG. 6, a potentiometer wiper 610 is located on the outside diameter of an outer erecter sleeve 620. The potentiometer wiper contacts a membrane potentiometer 710 located on the internal diameter of the main body 210 of the riflescope (see FIG. 7).

Figure 8:
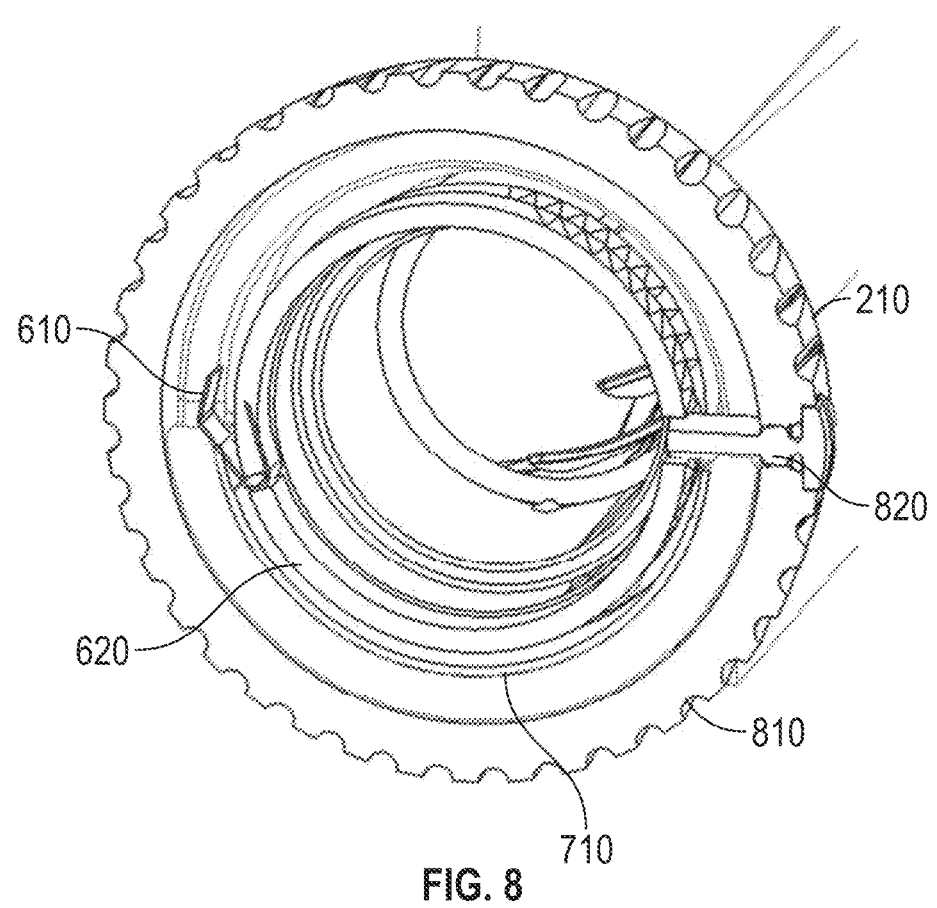
FIG. 8 is a representative schematic showing outer erector sleeve with potentiometer wiper installed and membrane potentiometer installed on main body of a riflescope according to one embodiment of the disclosure.

As shown in FIG. 8, in one embodiment, the potentiometer wiper 610 is a flat spring with two points of contact to insure it maintains contact with the membrane potentiometer 710. The flat spring is located between the outer erector sleeve 620 and inner erector tube. The potentiometer wiper 610 is located on the inside diameter of the riflescope on the opposing inner wall of the magnification ring slot screw 820. The potentiometer wiper 610 is fastened to the side inner side of the scope tube using adhesive.

In one embodiment, the potentiometer wiper has the ability to lay completely flat on the outside diameter of the outer erector sleeve. In one embodiment, the potentiometer wiper is placed internally on the outer erector sleeve.

In one embodiment, the potentiometer wiper is not placed on the magnification ring 810 of FIG. 8.

The magnification tracking system disclosed herein is located internally and no part is exposed to the environment, which offers a few advantages. First, the system is internal resulting in no seals being needed to protect the wiper/erector system from the environment. Secondly, magnification tracking system is completed when the erector system is installed into the riflescope. This eliminates the possibility for debris to enter the system through a screw hole on the exterior of the magnification ring.

In one embodiment, the disclosure relates to a system for tracking magnification setting of a viewing optic, wherein the system uses a sensor and a material that has varying degrees of optical reflectance/absorption. In one embodiment, the sensor is located in a base of a viewing optic, wherein the base couples to the main body of the viewing optic, and the material is located in the main body of a viewing optic.

In one embodiment, the disclosure relates to a viewing optic having a main body comprising an erector tube with an erector lens system, a cam tube or sleeve surrounding or encapsulating the erector tube, a material with varying degrees of optical reflectance/absorption coupled to the cam tube and a base coupled to the main body, wherein the base has an integrated display system and a photosensor for detecting optical reflectance/absorption from the material. In one embodiment, the base has a printed circuit board or microprocessor for communicating with the photosensor and one or more microcontrollers or electronic controllers.

In one embodiment, the viewing optic has a main body with a magnification adjustment ring for adjusting an optical magnification of an image, and a base coupled to the main body having an integrated display system, a micro-processor, and a system to deliver the magnification setting of the optic to the microprocessor, wherein the microprocessor communicates with the active display of the integrated display system.

In one embodiment, the disclosure relates to a system for tracking magnification setting of a viewing optic with no mechanical link between the moving parts of the opto-mechanical system and the sensing device. The magnification tracking system disclosed herein is embedded in a base coupled to the main body of the viewing optic and does not have a mechanical link between the stationary and the moving parts of the system.

In one embodiment, the disclosure relates to a viewing optic having a main body with an erector tube housing an erector lens assembly and a cam sleeve surrounding the erector tube and having a material with varying degrees of optical absorption/reflectance and a base coupled to the main body, wherein the base has a photosensor. In one embodiment, the material with varying degrees of optical absorption/reflectance surrounds the cam sleeve at the end of the cam sleeve near the magnification adjustment ring of the main body. In one embodiment, the photosensor is located beneath the material with varying degrees of optical absorption/reflectance on the cam sleeve.

When the magnification adjustment ring 212 of the viewing optic is rotated by the operator/user, the outer cam sleeve is rotated, which moves two lens cells, thereby changing the effective optical magnification of the riflescope.

In one embodiment, the cam sleeve has material with varying degrees of optical reflectance/absorption. In one embodiment, the material is affixed to the outer diameter of the cam sleeve.

In one embodiment, the material is a strip of material. In one embodiment, the material is approximately 10 mm wide and 40 mm long. In one embodiment, a first side of the material has an adhesive that is used to attach it to the outer cam sleeve. In another embodiment, the other side of the strip has a printed grayscale gradient on it, such that when an LED is directed to it, varying amounts of light are reflected depending on the portion of the gradient being exposed to the LED.

In one embodiment, the PCB has an LED and a photosensor. In one embodiment, the LED and photosensor are located directly beneath the gradient strip, which is attached to the outer diameter of the outer cam sleeve. The LED illuminates the gradient strip and the photosensor receives a portion of the light reflected off the gradient strip, which can then send a signal to a microcontroller, wherein the strength of the signal varies with the amount of light detected.

When the magnification adjustment ring is rotated by the operator a different portion of the gradient strip is exposed to the LED and photosensor, which in turn changes the signal strength sent to a microcontroller. The optical magnification setting of the system is therefore able to be tracked by associating it with the amount of light detected by the photosensor.

Figure 65:
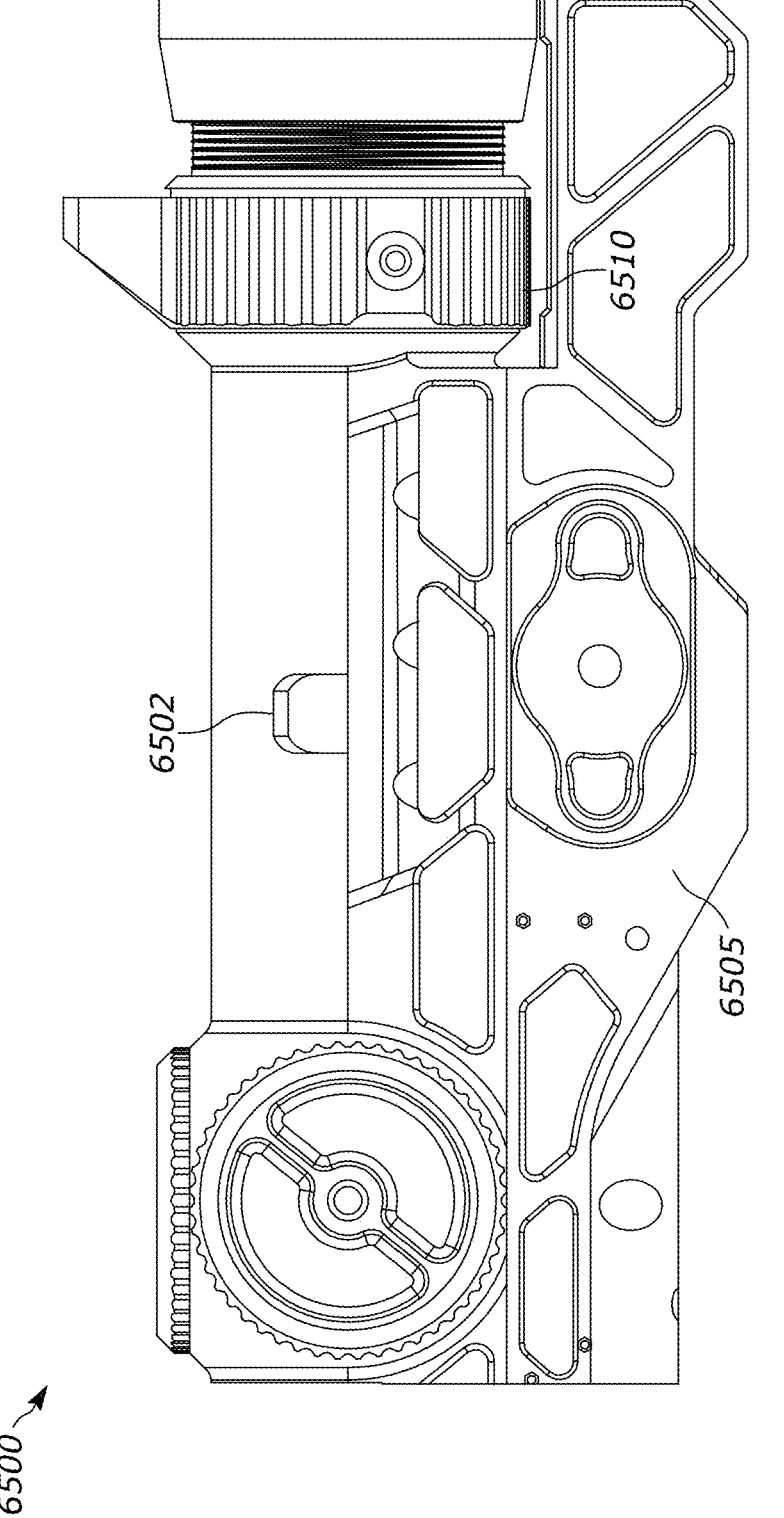
FIG. 65 is a representative depiction of a side view of a 1-8× Active Reticle riflescope. The magnification adjustment ring can be seen on the right side of the image.

FIG. 65 depicts a side view of a 1-8× riflescope 6500 having a main body 6502 and a base 6505 coupled to the main body 6502. The magnification adjustment ring 6510 can be seen on the right side of the image.

Figure 66:
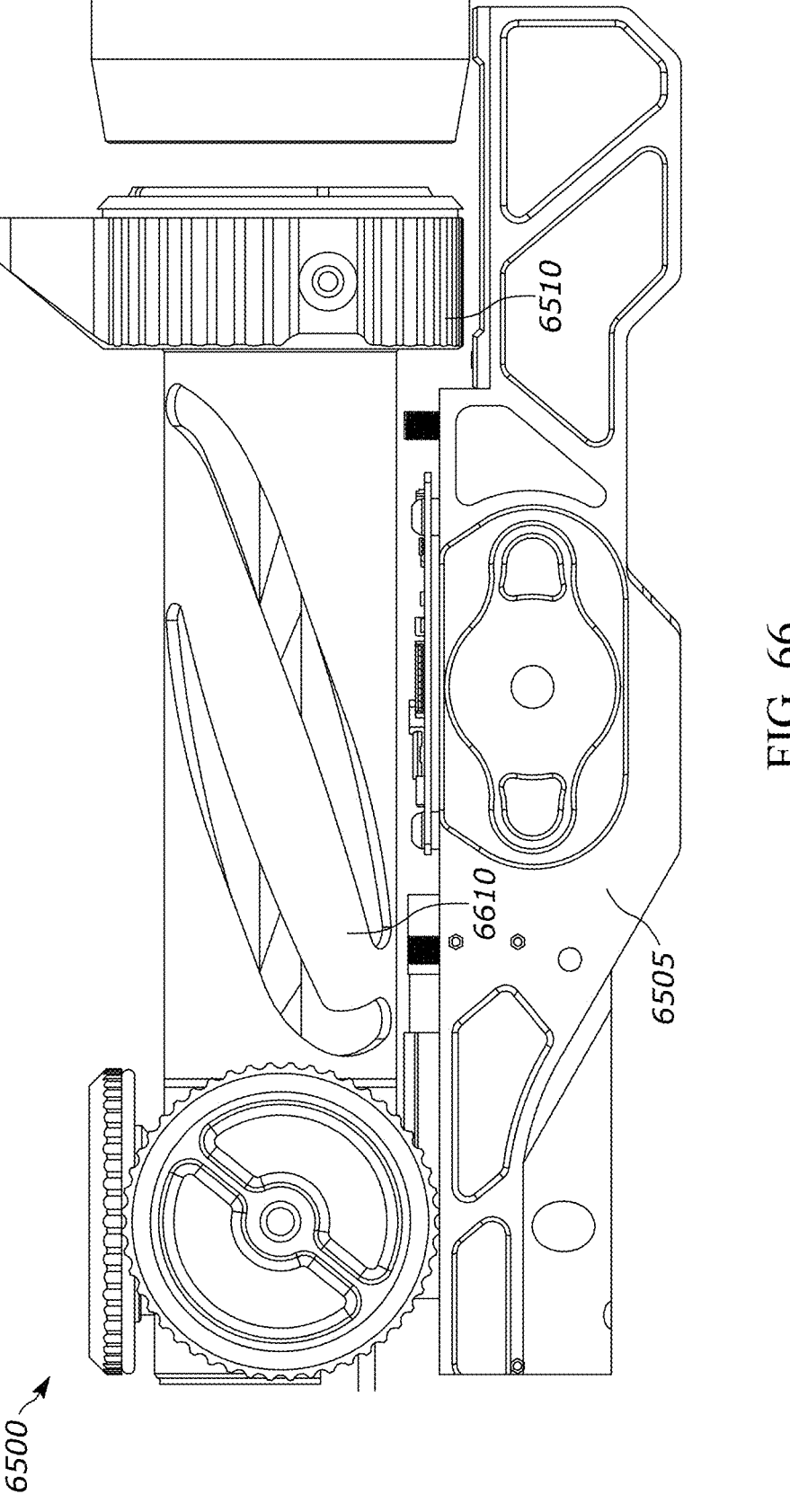
FIG. 66 is a representative depiction of a side view of a 1-8× Active Reticle riflescope with the body of the scope hidden and revealing the outer cam sleeve, which rotates with the magnification adjustment ring thereby changing the magnification setting.

FIG. 66 depicts a side view of riflescope 6500 with the body of the scope hidden and revealing the outer cam sleeve 6610, which rotates with the magnification adjustment ring 6510, thereby changing the magnification setting.

Figure 67:
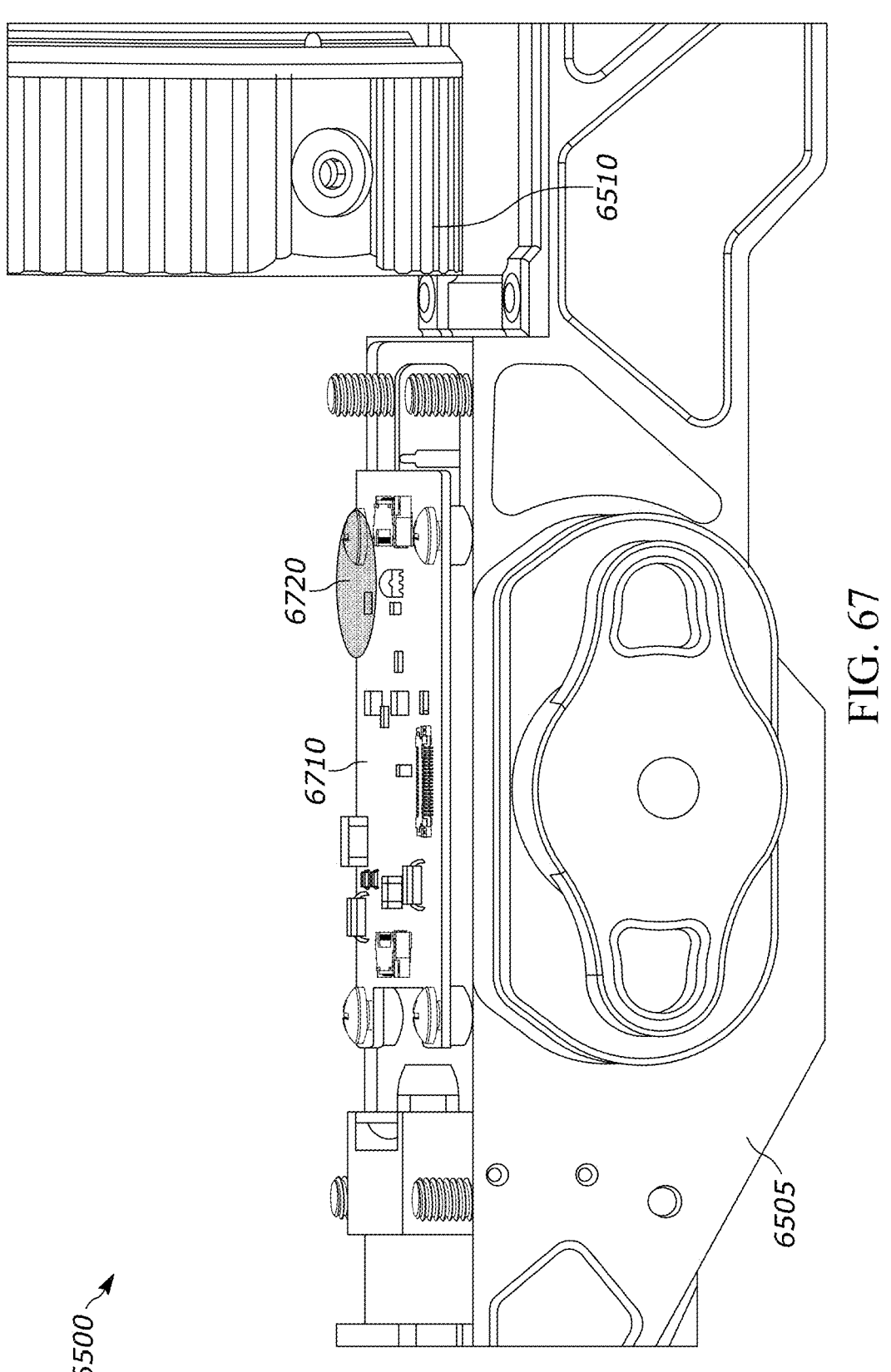
FIG. 67 is a representative depiction a view of the base of the viewing optic with a circuit board that contains the photosensor and LED used to measure the position of the reflective gradient material that is attached to the outer cam sleeve. The outer cam sleeve and associated optical system is hidden in this image.

FIG. 67 depicts a view of the base 6505 of the viewing optic 6500 with a printed circuit board 6710 that contains the photosensor and LED 6720 used to measure the position of the reflective gradient material that is attached to the outer cam sleeve in the main body. The outer cam sleeve and associated optical system is hidden in this image.

Figure 68:
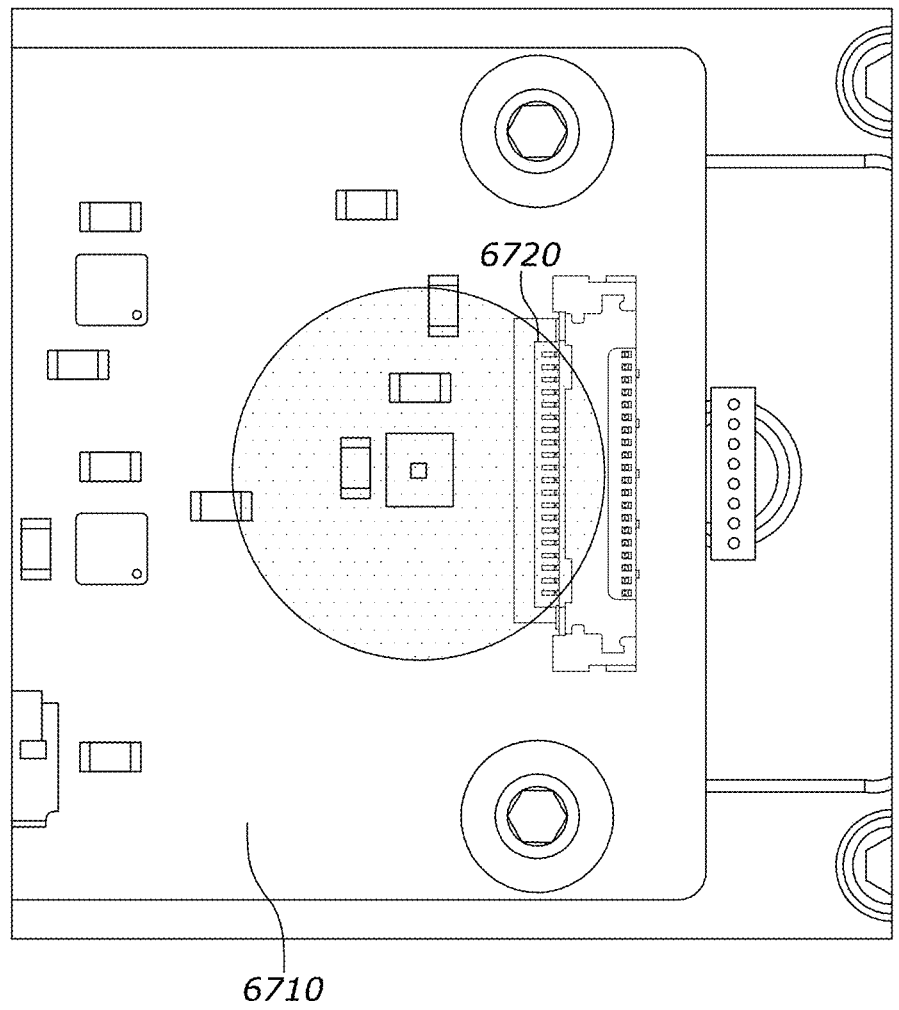
FIG. 68 is a representative exploded view of the photosensor and LED with a simulated cone of vision drawn to illustrate the angle of acceptance of light for the photosensor.

FIG. 68 is an exploded view of printed circuit board 6710 the photosensor and LED 6720 with a simulated cone of vision drawn to illustrate the angle of acceptance of light for the photosensor.

Figure 69:
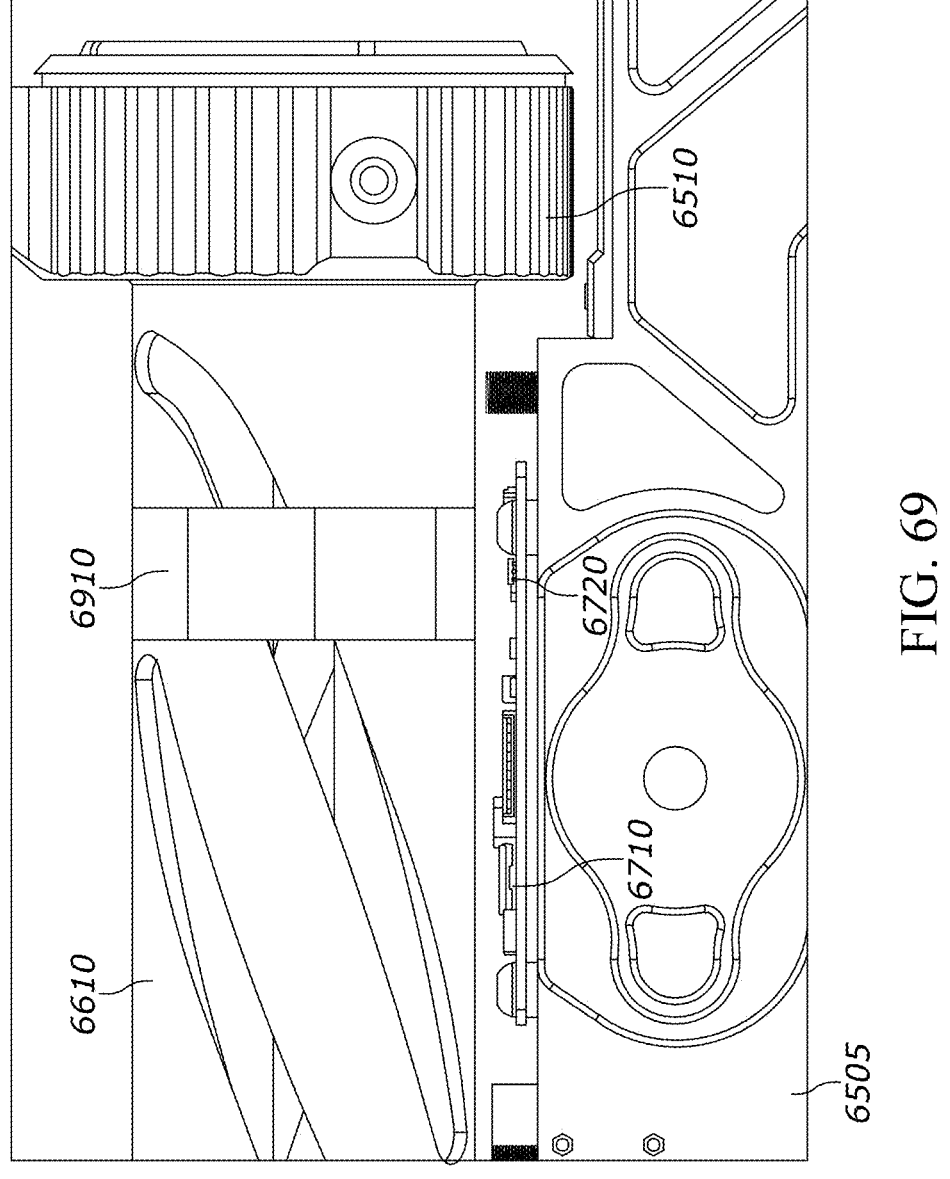
FIGS. 69 and 70 are representative images of the photosensor and LED working in conjunction with the reflective gradient strip that is attached to the outer cam sleeve to measure the magnification setting of the optic. This illustration shows a gradient strip that has 4 specific sections of differing reflectivities, each associated with an optical magnification setting, but it should be noted that this strip could be infinitely varying in its reflectivity.
Figure 70:
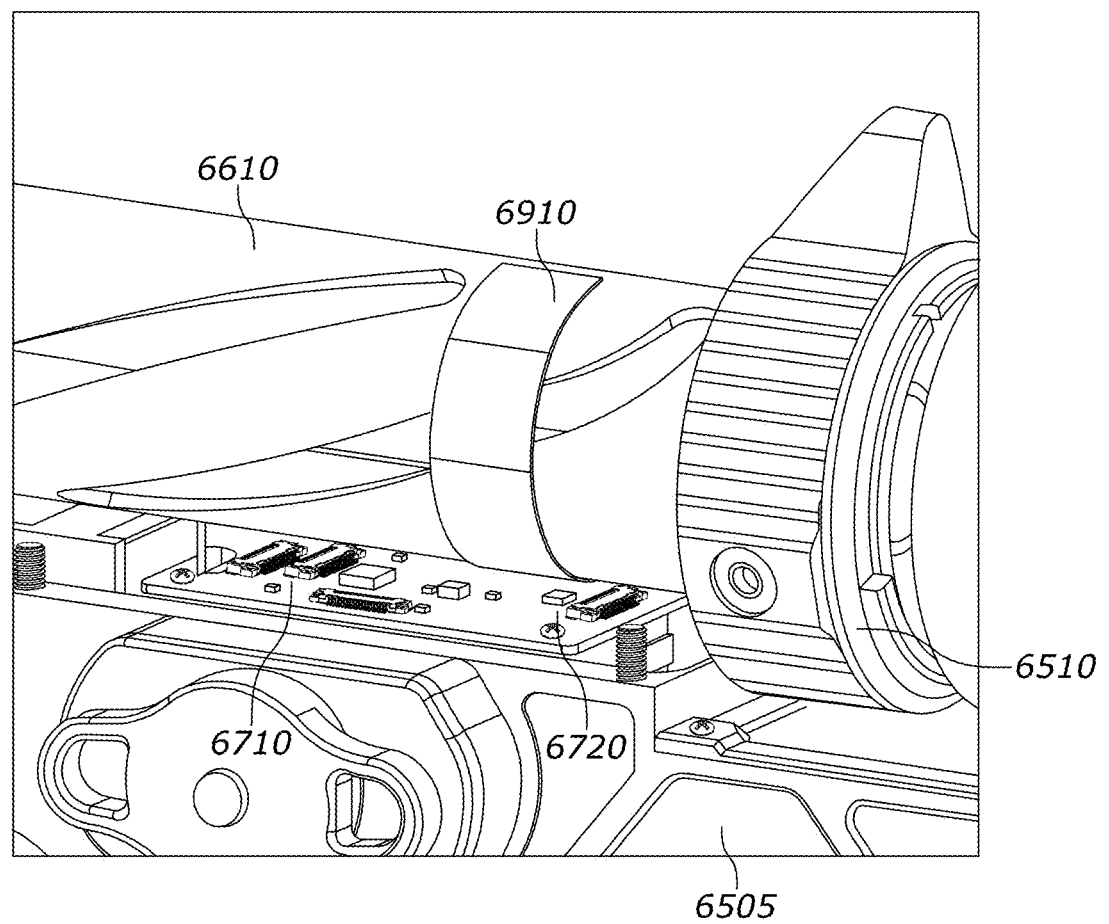

FIGS. 69 and 70 are images of the photosensor and LED 6720 working in conjunction with the reflective gradient strip 6910 that is attached to the outer cam sleeve 6610 to measure the magnification setting of the optic. This illustration shows a gradient strip 6910 that has 4 specific sections of differing reflectivities but it should be noted that this strip could be infinitely varying in its reflectivity. The gradient strip 6910 couples to the cam sleeve at a portion of the cam sleeve located near the magnification adjustment ring. The printed circuit board 6710 is located in the base 6505 that couples to the main body of the viewing optic. The LED and photosensor 6720 on the PCB 6710 are located below the gradient strip 6910.

In one embodiment, the disclosure relates to a viewing optic comprising: a main body with a first end and a second end and having a center axis; an objective lens system disposed within the body; an eyepiece lens disposed within the body; an erector tube disposed within the main body and having an erector lens system; the objective lens system, eyepiece lens, and erector lens system forming an optical system having a first focal plane and a second focal plane, the first focal plane proximate the objective lens system and the sec and focal plane proximate the eyepiece lens; a cam sleeve surrounding the erector tube that moves in conjunction with a magnification adjustment ring for adjusting the optical magnification of an image, a material with varying degrees of optical absorption/reflectance that is coupled to the cam sleeve; and a base coupled to the main body and having a photosensor that detects the light from the material, a microprocessor in communication with the photosensor, and an active display in communication with the microprocessor that generates an image based on the magnification setting and projects the generated image into the first focal plane of the viewing optic. In one embodiment, the generated image from the active display is based on the signal obtained from the photosensor.

Delivering the magnification setting to the microprocessor has many benefits including but not limited to changing a reticle pattern based on a magnification setting, and changing the font size of alpha-numeric information automatically as magnification changes. In addition, if multiple display "pages" are stored in a memory system, the microcontroller can automatically switch between the "display" pages depending on the magnification setting in order to present the operator with the most relevant data.

4. Additional Components

In one embodiment, viewing optic can be controlled by buttons that are integral to the riflescope or externally attached buttons.

In one embodiment, the main body of the viewing optic can have a camera system.

In one embodiment, the main body of the viewing optic may have one or more computational systems. The integrated display system described below may be in communication with, or otherwise associated with the computational system. In some embodiments, the computational system may be enclosed within the first housing or body of the viewing optic. In some embodiments, the computational system may be coupled to an exterior portion of the viewing optic.

Figure 9:
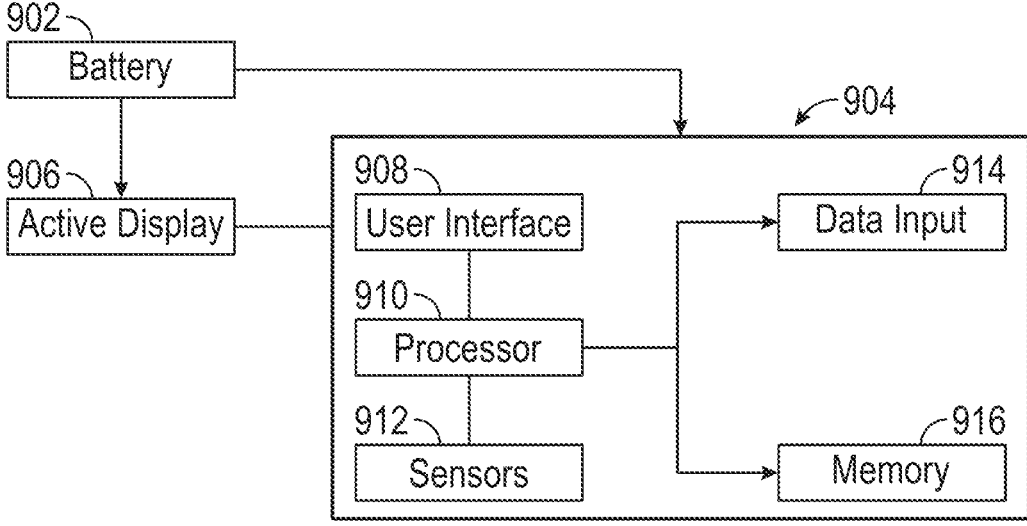
FIG. 9 is a block diagram of various components of the viewing optic according to an embodiment of the disclosure according to one embodiment of the disclosure.

FIG. 9 is a block diagram of various electronic components of the viewing optic according to an embodiment of the disclosure. A battery 902 can provide power to a computational system or control module 904 and an active display 906. In one embodiment, the computational system 904 may include, without limitation, a user interface 908, data input device 914, a processor 910, memory 916, and one or more sensors 912.

In one embodiment, the user interface 908 may include a plurality of input and/or output devices such as buttons, keys, knobs, touchscreens, displays, speakers, microphones, etc. Some components of the user interface such as, for example, buttons, may be used to manually enter data such as, for example, wind data, display intensity data, reticle intensity data, ballistic profile data, ballistic coefficient data, muzzle velocity data, primary zero data, static conditions of the rifle-scope system, GPS coordinate data, compass coordinate data, sight-above-bore data, etc. This data may be received by the processor and saved into the memory. The data may also be used by the processor in an algorithm or to execute an algorithm.

The data input device 914 may include wired or wireless communications devices and/or may include any type of data transfer technology such as, for example, a USB port, a mini USB port, a memory card slot (e.g., a microSD slot), NFC transceiver, Bluetooth® transceiver, Firewire, a Zig-Bee® transceiver, a Wi-Fi transceiver, an 802.6 device, cellular communication devices, and the like. It is noted that, while termed a data input device, such may be used in two way communications, providing data output as well.

In one embodiment, the processor 910 may be any type of processor known in the art that may receive inputs, execute algorithms and/or processes, and may include, without limitation, one or more general-purpose processors and/or one or more special-purpose processors (such as digital signal processing chips, graphics acceleration chips, and/or the like). The processor may be used to control various processes, algorithms, and/or methods in the operation of the riflescope. The processor may control operation of a display system and/or a reticle. The processor may also receive inputs from the user interface, the data input, the memory, the sensor(s), a position encoder associated with the position of an adjustable component (e.g., the vertical adjustment knob, the windage adjustment knob or the parallax dial), and/or from other sources.

In one embodiment, memory 916 may include any type of digital data storage such as such as random access memory ("RAM") and/or read-only memory ("ROM"), which can be programmable, flash-updateable, and/or the like. In other embodiments, the memory may include memory from an externally connected device including, for example, a disk drive, a drive array, an optical storage device, or a solid-state storage device. In some embodiments, the memory may be configured to store ballistic information that includes data that can be used, for example, to correct for the amount a bullet may drop over a given distance and/or the horizontal deflection of the bullet.

Data may be entered from another device (e.g., the processor may receive data via the data input device that may be entered from another device such as computer, laptop, GPS device, a rangefinder, tablet, or smartphone, etc.) and stored into the memory. Such data may include, for example, calibration data, a ballistic profile lookup table that cross-references rotational data and/or linear data with shoot-to-range values, rifle data, projectile data, user data, etc.

The sensor(s) 912 may be used to sense any of a variety of environmental conditions or characteristics associated with the use of the riflescope. For example, the sensor(s) may sense atmospheric conditions (such as humidity, temperature, pressure, etc.), inclination, rifle cant, and/or the sight direction of the rifle (compass direction). Any number of sensors may be included. Sensor data may be recorded by the processor and saved into the memory and/or used in the processing of instructions for operation of the viewing optic.

The control module 904 may also include software elements, which may be located within working memory 916. The software elements may include an operating system and/or other code, such as one or more application programs.

In one embodiment, a camera can communicate with control module.

B. Second Housing

In one embodiment, the second housing is coupled to the first housing and contains an integrated display system. In one embodiment, the second housing is a base coupled to a portion of the main body of a viewing optic. In one embodiment, the base is separable from the main body of a viewing optic.

In one embodiment, the second housing is not an image stabilization device. In one embodiment, the length of the base having an integrated display system is from 35% to 70% the length of the main body of a riflescope to which the base is coupled. In yet another embodiment, the base having an integrated display system is from 40% to 65% the length of the main body of a riflescope to which the base is coupled. In still another embodiment, the base having an integrated display system is no more than 65% of the length of the main body of the riflescope to which the base is coupled.

In one embodiment, the main body of the riflescope is about 2.5× the length of the base having an integrated display system. In yet another embodiment, the main body is from 1.5× to 2.5× the length of the base having an integrated display system. In yet another embodiment, the main body is at least 1.5× the length of the base having an integrated display system.

As shown in FIG. 2, the base 220 can be bolted to the scope body 210 of the riflescope to form a totally enclosed and integrated system. The base 220 can then be directly attached to the firearm without the need for traditional riflescope rings.

Figure 10:
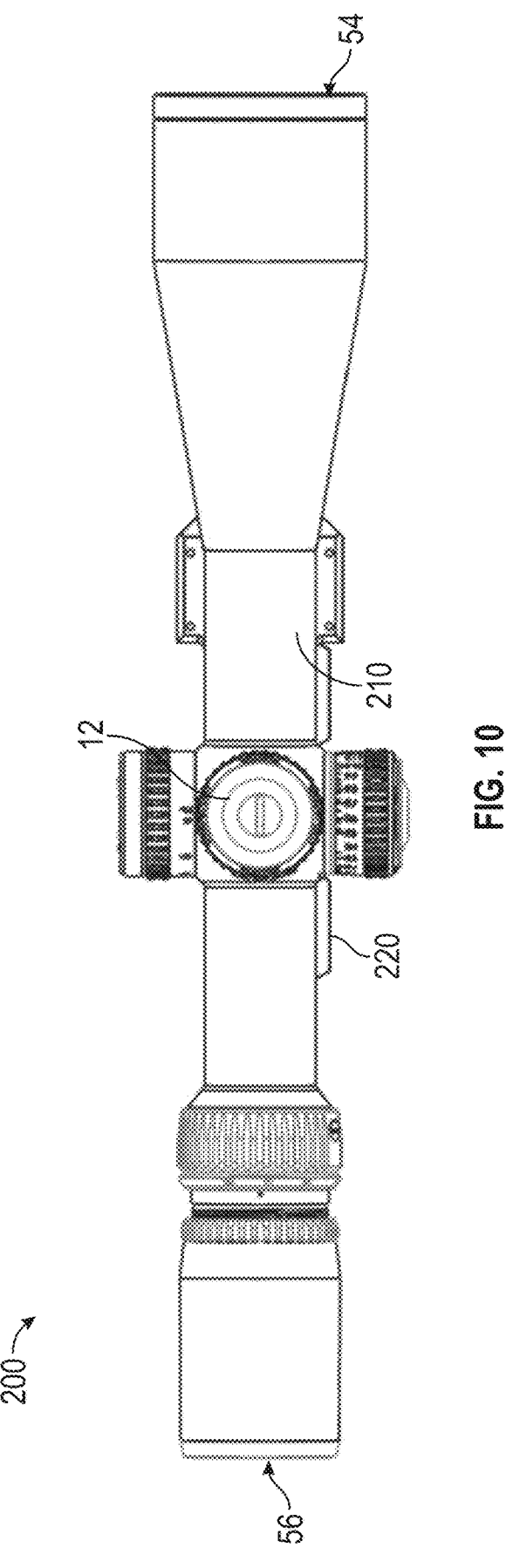
FIG. 10 is top view of a riflescope having a main body and a base according to one embodiment of the disclosure.

FIG. 10 displays a top view of the riflescope 200 with a main body 210 and a base 220. FIG. 10 demonstrates that the base 220 does not cause the riflescope to bulge at any position or be out of proportion with a traditional riflescope. The riflescope disclosed herein having a main body and a base maintains the traditional, sleek design of a riflescope.

Figure 11:
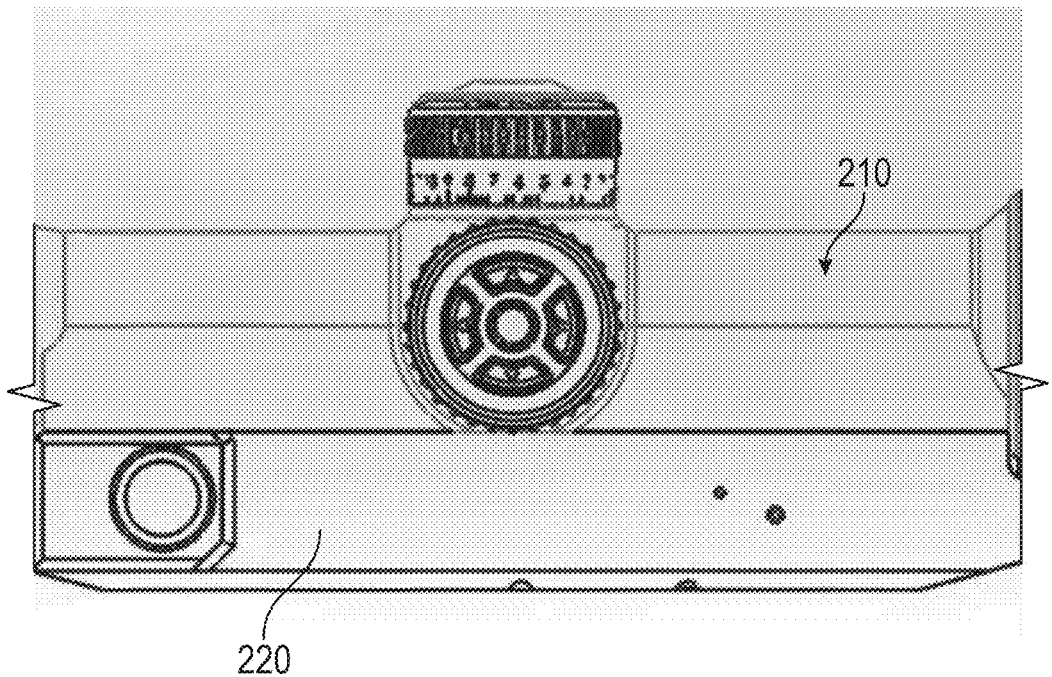
FIG. 11 is a side view of a portion of the riflescope having a main body and a base according to one embodiment of the disclosure.

FIG. 11 displays the base 220 attached to the main body 210 of the riflescope. The base 220 is aligned and flush with the outer edges of the main body 210.

In one embodiment, and as shown in FIG. 2, the base having an integrated display system is coupled to the bottom side of the main body 210 of the riflescope, with one end of the base coupling at approximately the power selection ring or magnification ring 212 of the main body 210 and the other end of the base coupling at about the start of the objective assembly 214 of the main body. In one embodiment, the base 220 is coupled to the main body 210 by threaded fasteners, unthreaded integral and non-integral locating and recoil transmission features, and an elastomeric seal.

In one embodiment, the base can be populated with the components necessary for generating a digital display and then the base can be bolted to the main body of the riflescope to form a totally enclosed and integrated system.

In one embodiment, the base and the main body of the scope are an enclosed, integrated system. In one embodiment, the base is coupled to the main body without the use of clamps, which are designed for easy removal.

In one embodiment, a viewing optic, which has a main body and a base coupled to the main body, can be coupled to a firearm without the need for traditional riflescope rings.

In one embodiment, a viewing optic has a main body and a base coupled to the main body, wherein the bottom side of the base has a mounting rail.

In one embodiment, the base of the viewing optic can include a mounting rail for mounting to a desired firearm, equipment or device, and can have an adjustment mechanism including an elevation adjustment drum for adjusting the elevational position of the optics. A lateral adjustment mechanism is also typically provided for side-to-side adjustment. The adjustment mechanisms can be covered with a protection cap.

In one embodiment, the top side of the base couples to the bottom-side of the main body of a viewing optic and the bottom-side of the base has a mounting rail. In one embodiment, the top side of the base couples to a lateral split in the bottom-side of the main body of a viewing optic.

In one embodiment, the base comprises an integrated display system for generating images with an active display and directing the images along the display optical axis for simultaneous overlaid viewing of the generated images with images of the outward scene, wherein the generated image is injected into the first focal plane of a main body of a viewing optic.

In one embodiment, the base is separate and distinct from a laser rangefinder device. In one embodiment, the base is an independent apparatus from a laser rangefinder device.

In one embodiment, the second housing or base is not an add-on accessory. In another embodiment, the second housing or base is not coupled as an add-on accessory adjacent to an eyepiece of the viewing optics with an adapter.

In one embodiment, the second housing or base is not separable from the main body by the end-user. In one embodiment, the second housing or base is not interchangeable with multiple or other viewing optics.

In one embodiment, the disclosure relates to a system comprising a viewing optic having a main body with a first optical system and a base coupled to the main body and having a second optical system, such as an integrated display system, and a laser rangefinder device.

1. Integrated Display System

In one embodiment, the second housing comprises an integrated display system. In another embodiment, a base comprises an integrated display system. In yet another embodiment, the base having an integrated display system is coupled to a main body of a riflescope. In still another embodiment, the base is coupled to a bottom portion of a main body of a riflescope.

In one embodiment, the base has an integrated display system comprising an active display, collector optics, and a reflective material, including but not limited to a mirror. In one embodiment, the integrated display system has the following architecture: an active display, followed by collector optics, followed by a reflective material such as a mirror.

Figure 12:
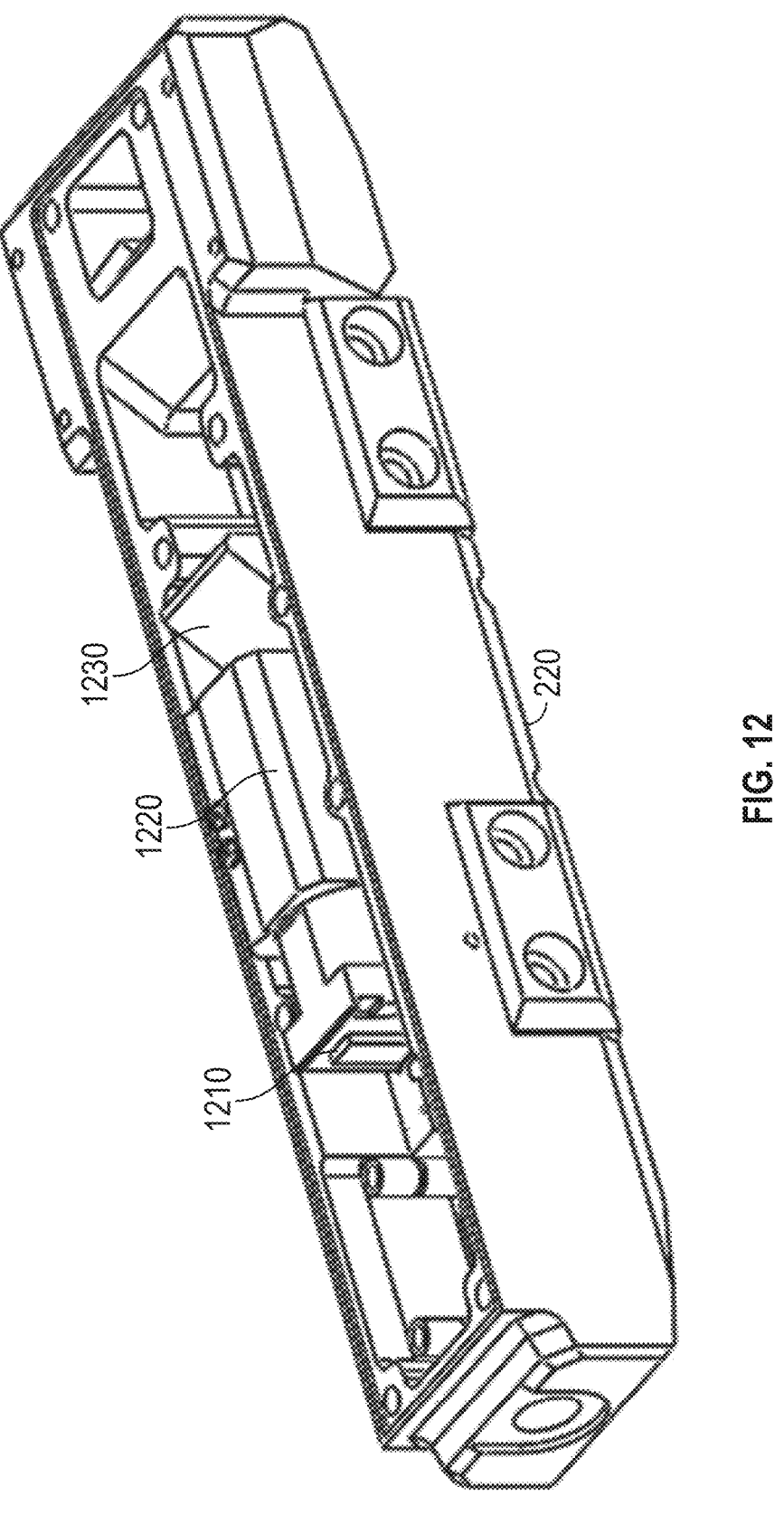
FIG. 12 is a schematic of a cut away side view of the riflescope with a main body having a glass etched reticle and a base with an integrated display system according to one embodiment of the disclosure.

FIG. 12 depicts a top cut-away view of the base 220 that couples to a main body of a viewing optic. The base 220 comprises an integrated display system having a micro display 1210, collector optics 1220, and a mirror 1230. In one embodiment, the mirror 1230 can be positioned at any suitable angle.

Figure 13:
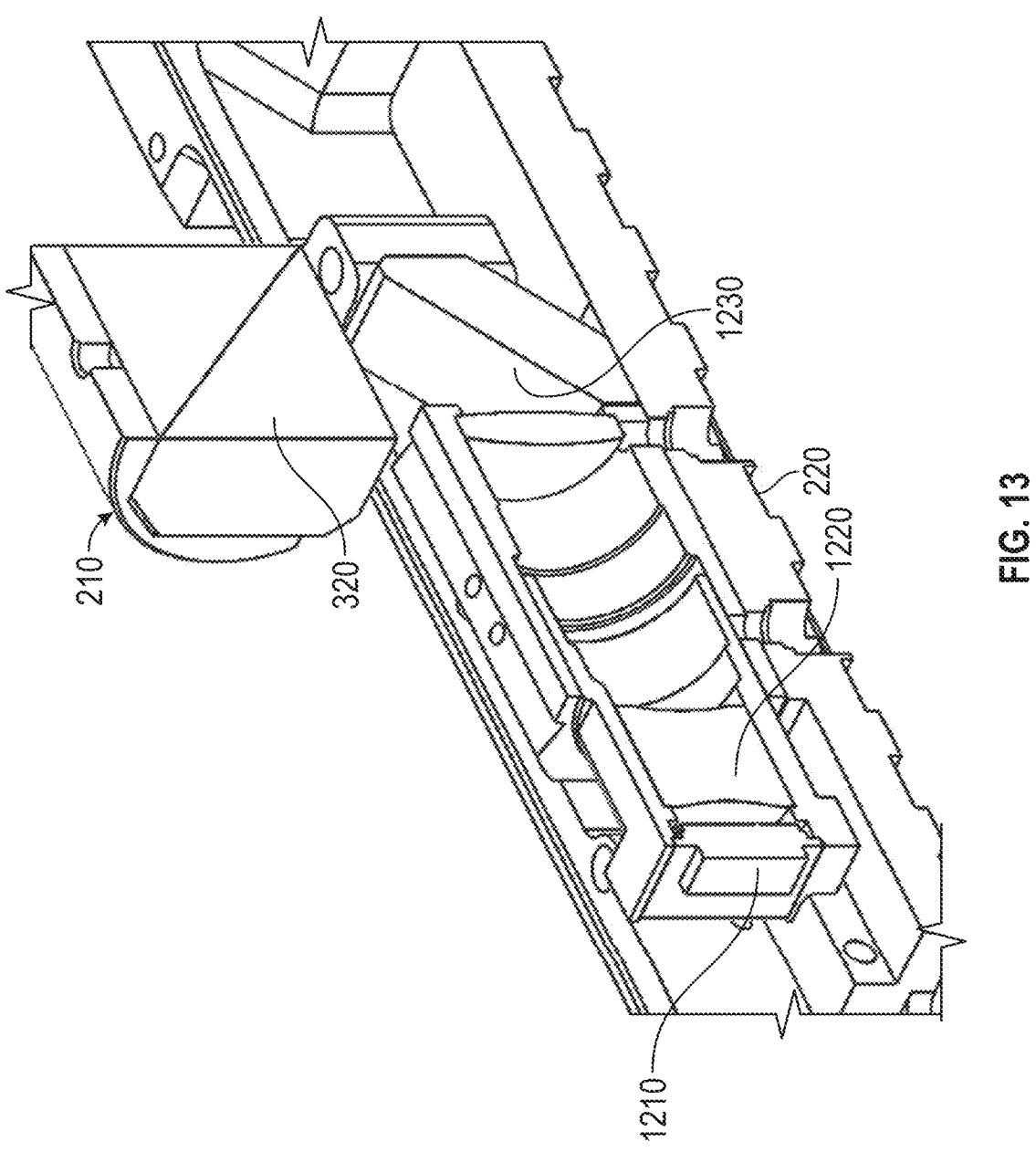
FIG. 13 is a representative schematic of showing a side cutaway view of an integrated display system according to one embodiment of the disclosure.

FIG. 13 depicts a side cut-away view of a base 220 with an integrated display system having a micro display 1210, collector optics 1220, and a mirror 1230. A main body 210 has a beam combiner 320 located above the mirror 1230.

Figure 14:
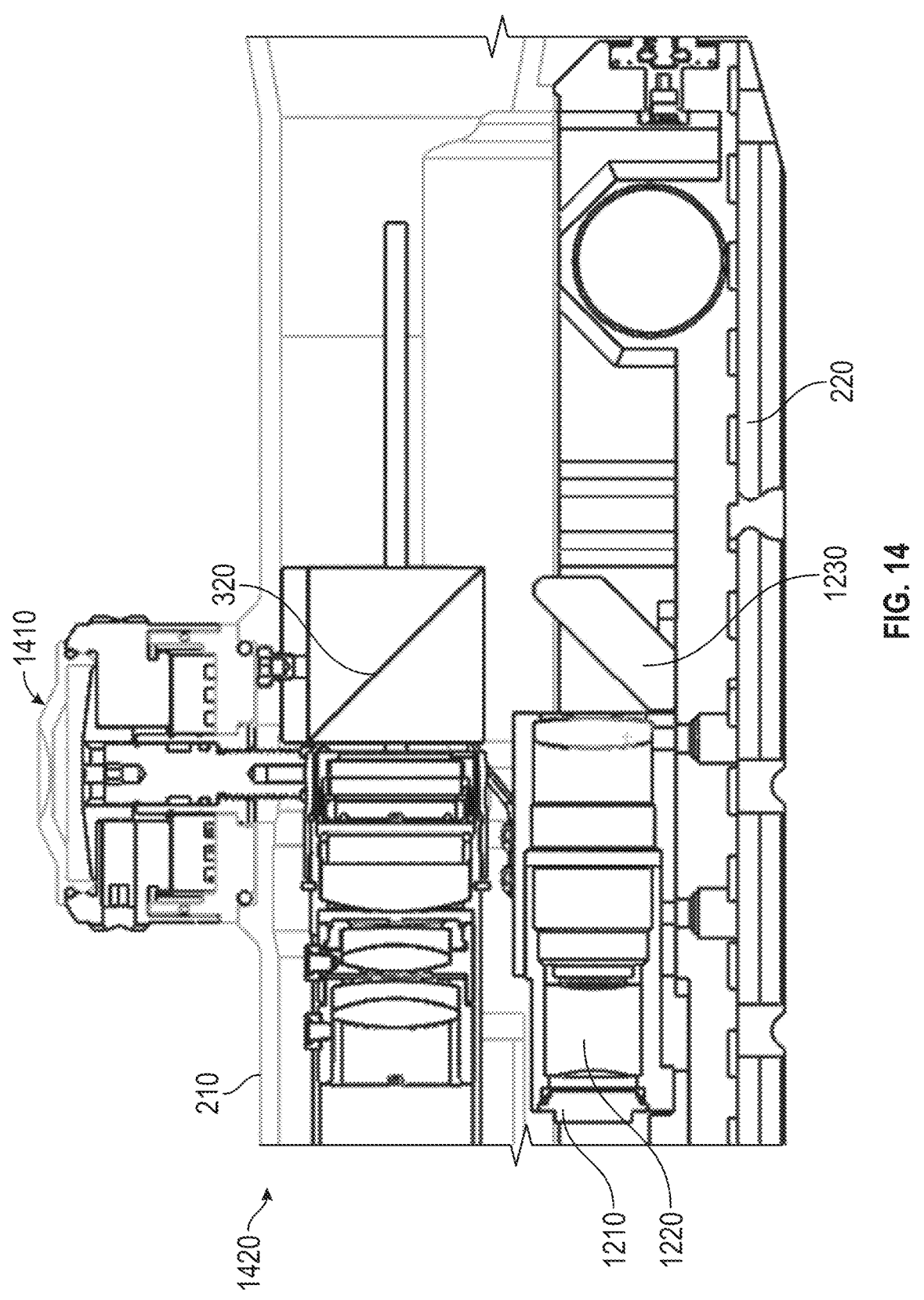
FIG. 14 is a schematic of a cut away side view of a main body of a viewing optic and a base with an integrated display system, with the base coupled to at least a portion of the main body according to one embodiment of the disclosure.

FIG. 14 depicts a side cut-away view of riflescope with a main body 210 and a separable base 220. The base 220 comprises a micro display 1210, collector optics 1220, and a mirror 1230. The mirror 1230 is positioned at about 45 degrees. The scope body 210 has a beam combiner 320 that is located approximately above the angled mirror 1230. The beam combiner 320 is located approximately below the elevation adjustment knob 1410 of the scope body 210. The active display 1210 is located in the base on the ocular assembly side 1420 when the base 220 is coupled to the main body 210 of the viewing optic.

Figure 15:
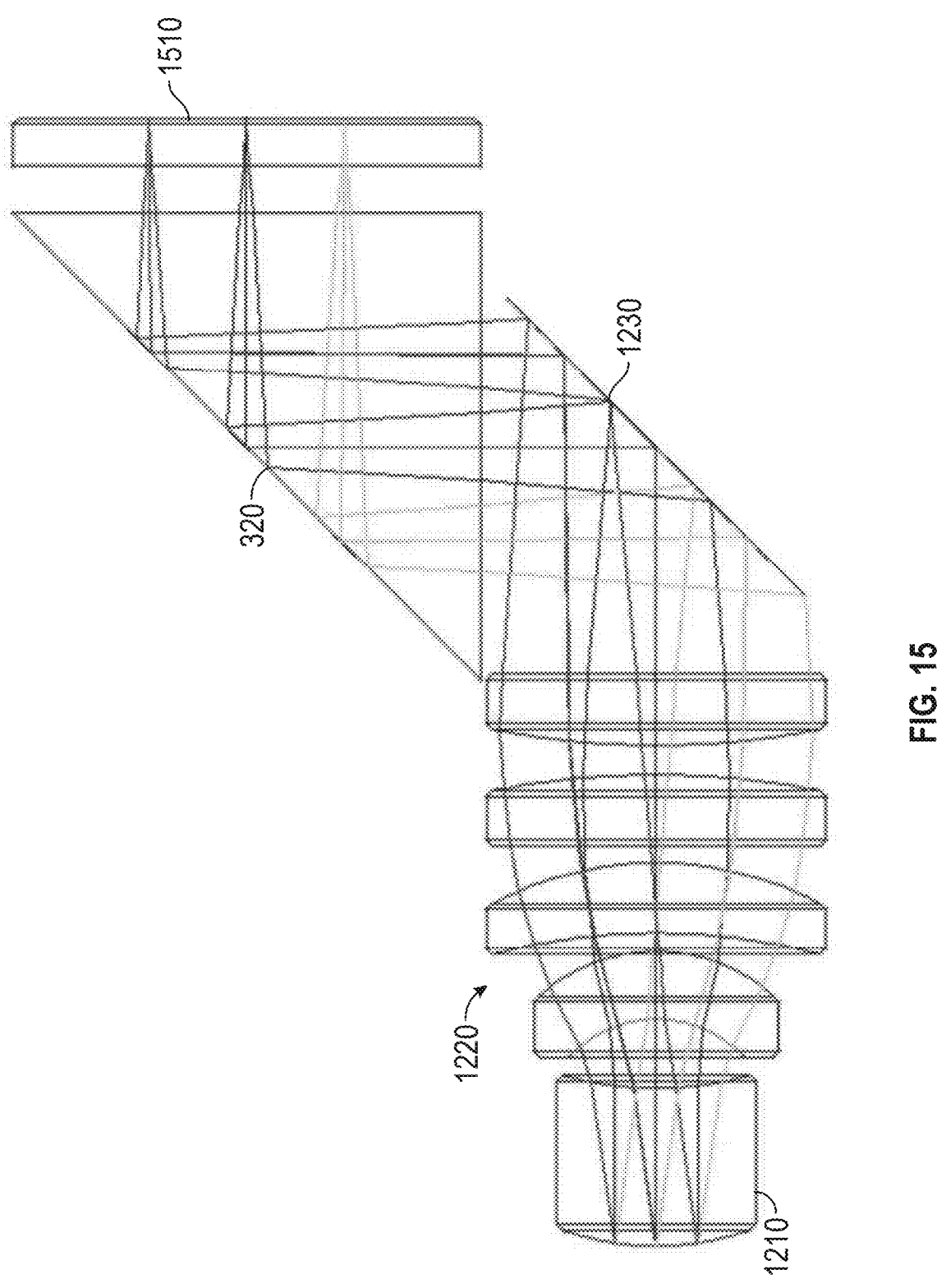
FIG. 15 is a representative depiction of an integrated display system for imaging the digital display onto a first focal plane of an optic system of the main body of the viewing optic according to one embodiment of the disclosure.

As depicted in FIG. 15, the images generated from the micro display 1210 can be redirected from the display optical axis A onto the viewing optical axis A through a mirror 1230 to a beam combiner 320 in the main body 210 for simultaneously superimposing or overlaying into the first focal plane 1510 the digital images onto the images of the scene viewed by the viewer through the optics. Because the beam combiner 320 is positioned before the first focal plane 1510, and the combined image is focused on the first focal plane, the displayed image and the viewed image do not move in relation to one another. This is a major advancement compared to devices that inject the image into the second focal plane.

Figure 16:
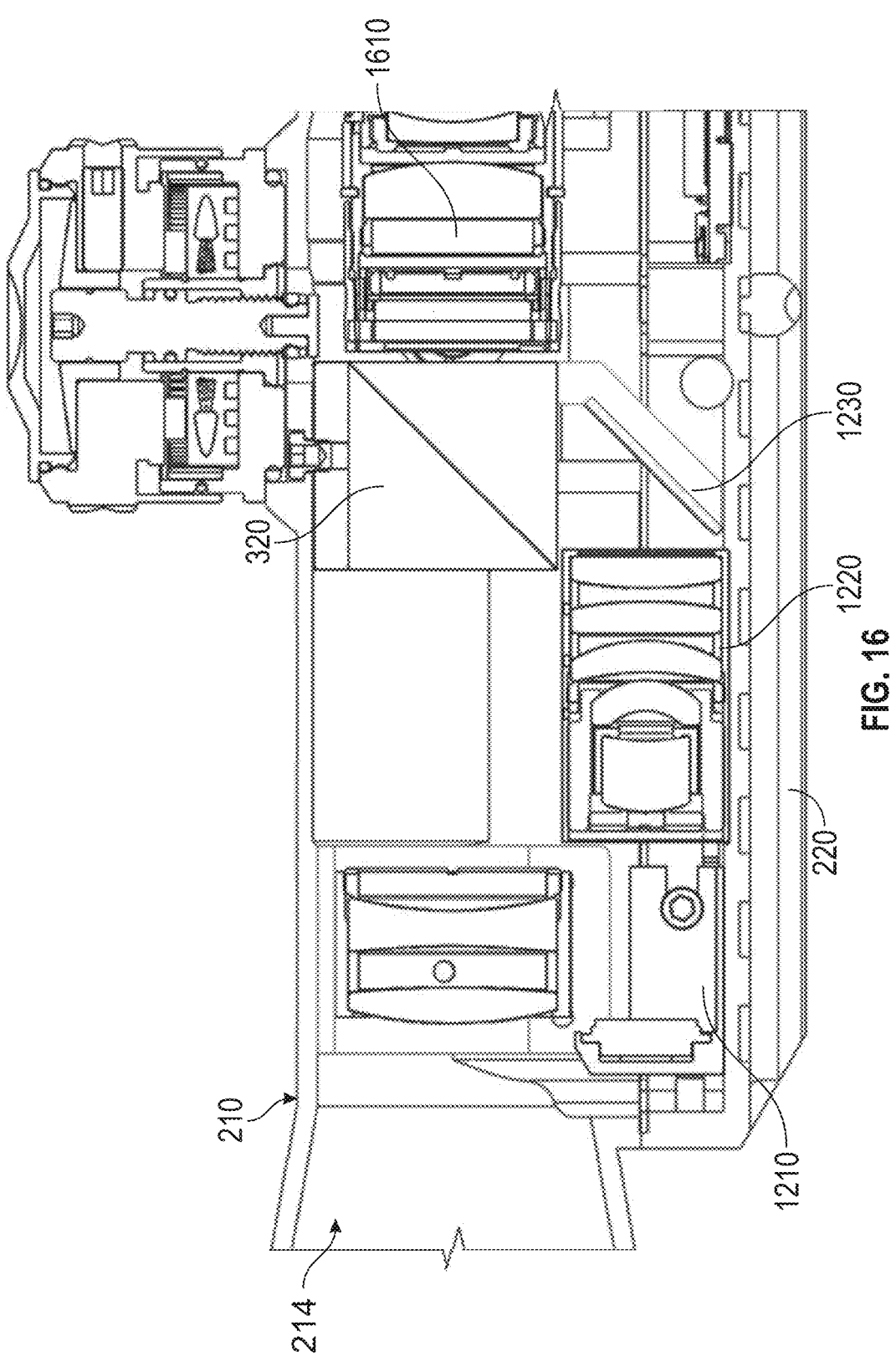
FIG. 16 is a schematic of a main body of a viewing optic and a base with an integrated display system with an active display located in a portion of the base closest to the objective assembly as compared to the ocular assembly of the main body of the viewing optic according to one embodiment of the disclosure.

In one embodiment, as shown in FIG. 16, the active display 1210 is located in a portion of the base closest to the objective assembly 214 as compared to the ocular assembly of the main body of a riflescope, when the base is coupled to the main body of a riflescope. The main body of the riflescope has an analog reticle 1610.

Figure 17:
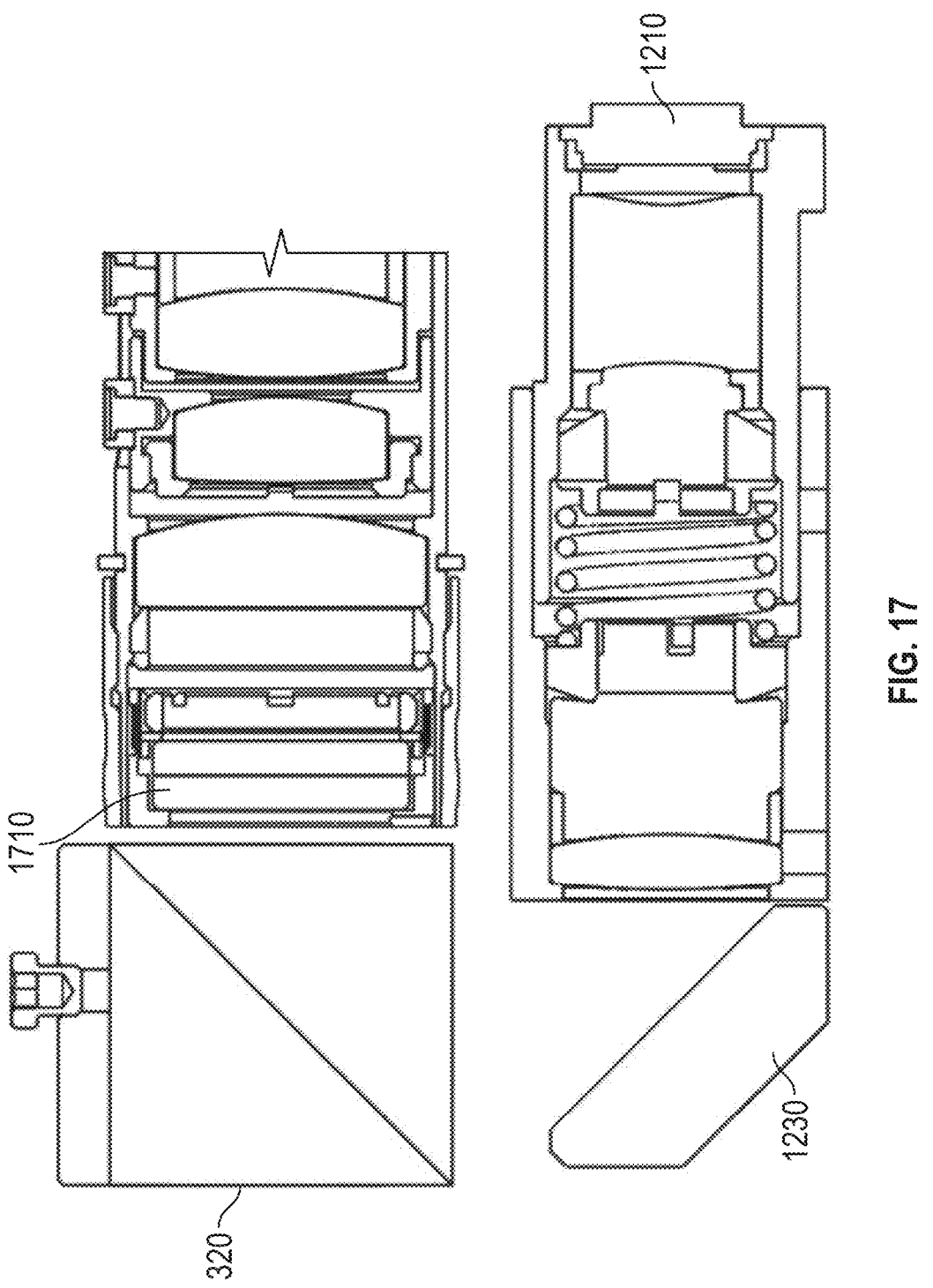
FIG. 17 is a schematic of a main body of a viewing optic and a base with an integrated display system with an active display located in a portion of the base closest to the ocular assembly as compared to the objective assembly of the main body of the viewing optic according to one embodiment of the disclosure.

FIG. 17 depicts the riflescope 200 with a main body 210 with a beam combiner 320 and a base 220 coupled to the main body and having an integrated display system. As shown in FIG. 17, the active display 1210 is located in a portion of the base closest to the ocular assembly as compared to the objective assembly of the main body of a riflescope, when the base is coupled to the main body of a riflescope. By superimposing the image from the integrated display system onto the first focal plane, the user is still able to use a traditional glass etched reticle 1610 for aiming purposes.

In one embodiment, the integrated display system can direct generated images from the active display along a display optical axis A. The generated images can be directed from the display optical axis A to a mirror in the base to a beam combiner in a main body of a riflescope for simultaneously superimposing or overlaying the generated images onto the images of the scene viewed by the viewer through an optics system of the main body, wherein the combined image is injected into or focused onto the first focal plane of the optic system of the main body.

In one embodiment, the image generated from the active display in the base is focused on the first focal plane of the main body of a riflescope, which allows the display generated images to maintain alignment with externally mounted accessories.

In one embodiment, the image generated from the active display in the base is focused on the first focal plane of the main body of a riflescope, thus, the generated image is not tied to the movement of the erector tube. The generated image is independent of movement of the erector tube.

In one embodiment, light from an active micro-display is collected by a group of optical lenses. The light from the display is reflected to a beam combiner in the riflescope main tube assembly and an image of the display is formed that is coincident with the first focal plane of the riflescope. This image of the display is combined with the image coming from the scene (target) and is perceived as being "underneath" the traditional wire or glass etched reticle. In one embodiment, the "traditional" reticle, which is still utilized, occludes both the image of the scene and the image of the display. If the luminance of the display is increased to sufficient brightness levels, the image of the OLED display will saturate the image of the scene and will appear to occlude the scene as well.

In yet another embodiment, the integrated display system in the base can direct generated images along a display optical axis "B," onto viewing optical axis A in the main body of a riflescope. The images can be redirected from the display optical axis B with a mirror or similar reflective material in the base to a beam combiner in the main body onto the viewing optical axis A in the main body, which allows for simultaneously superimposing or overlaying the generated images onto the images of the scene viewed by the viewer through the optics of the main body. The generated images from the active display in the base are directed toward a mirror, which reflects the images to a beam combiner.

In one embodiment, display optical axis "B" and viewing optical axis "A" are substantially parallel, although other embodiments may be differently oriented as desired.

A. Active Display

In one embodiment, the integrated display system has an active display. In one embodiment, the active display is controlled by a microcontroller or computer. In one embodiment, the active display is controlled by a microcontroller with an integrated graphics controller to output video signals to the display. In one embodiment, information can be sent wirelessly or via a physical connection into the viewing optic via a cable port. In still another embodiment, numerous input sources can be input to the microcontroller and displayed on the active display.

In one embodiment, an active display and a beam combiner are not located in the same housing. In one embodiment, an active display and a beam combiner are located in separate housings.

In one embodiment, the active display can be a reflective, transmissive or an emissive micro-display including but not limited to a micro display, transmissive active matrix LCD display (AMLCD), Organic light-emitting diode (OLED) display, Light-Emitting Diode (LED) display, e-ink display, a plasma display, a segment display, an electroluminescent display, a surface-conduction electron-emitter display, a quantum dot display, etc.

In one embodiment, the LED array is a micro-pixelated LED array and the LED elements are micro-pixelated LEDs (also referred to as micro-LEDs or μLEDs in the description) having a small pixel size generally less than 75 μm. In some embodiments, the LED elements may each have a pixel size ranging from approximately 8 μm to approximately 25 μm, and have a pixel pitch (both vertically and horizontally on the micro-LED array) ranging from approximately 10 μm to approximately 30 μm. In one embodiment, the micro-LED elements have a uniform pixel size of approximately 14 μm (e.g., all micro-LED elements are the same size within a small tolerance) and are arranged in the micro-LED array with a uniform pixel pitch of approximately 25 μm. In some embodiments, the LED elements may each have a pixel size of 25 μm or less and a pixel pitch of approximately 30 μm or less.

In some embodiments, the micro-LEDs may be inorganic and based on gallium nitride light emitting diodes (GaN LEDs). The micro-LED arrays (comprising numerous μLEDs arranged in a grid or other array) may provide a high-density, emissive micro-display that is not based on external switching or filtering systems. In some embodiments, the GaN-based, micro-LED array may be grown on, bonded on, or otherwise formed on a transparent sapphire substrate.

In one embodiment, the sapphire substrate is textured, etched, or otherwise patterned to increase the internal quantum efficiency and light extraction efficiency (i.e., to extract more light from the surface of the micro-LEDs) of the micro-LEDs. In other embodiments, silver nanoparticles may be deposited/dispersed on the patterned sapphire substrate to coat the substrate prior to bonding the micro-LEDs to further improve the light efficiency and output power of the GaN-based micro-LEDs and of the micro-LED array.

In one embodiment, the active display can be monochrome or can provide full color, and in some embodiments, can provide multi-color. In other embodiments, other suitable designs or types of displays can be employed. The active display can be driven by electronics. In one embodiment, the electronics can provide display functions, or can receive such functions from another device in communication therewith.

In one embodiment, the active display can be part of a backlight/display assembly, module or arrangement, having a backlight assembly including a backlight illumination or light source, device, apparatus or member, such as an LED backlight for illuminating the active display with light. In some embodiments, the backlight source can be a large area LED and can include a first or an integrated lens for collecting and directing generated light to a second, illumination or condenser lens, for collecting, concentrating and directing the light onto active display, along display optical axis B, with good spatial and angular uniformity. The backlight assembly and the active display are able to provide images with sufficient high brightness luminance to be simultaneously viewed with a very high brightness real world view through optics, while being at low power.

The backlight color can be selected to be any monochrome color, or can be white to support a full color microdisplay. Other backlight design elements can be included, such as other light sources, waveguides, diffusers, micro-optics, polarizers, birefringent components, optical coatings and reflectors for optimizing performance of the backlight, and which are compatible with overall size requirements of the active display, and the luminance, power and contrast needs.

FIGS. 16 and 17 depict representative examples of an integrated display system in a base that couples to a main body, showing a display, an optics system, and a mirror. The integrated system functions with an optics system housed in a main body of a viewing optic, which is depicted above the integrated display system.

Representative examples of micro displays that can be used include but are not limited to: Microoled, including MDP01 (series) DPYM, MDP02, and MDP05; Emagin such as the SVGA, micro-displays with pixel pitches are 9.9×9.9 micron and 7.8×7.8 micron, and Lightning Oled Microdisplay, such as those produced by Kopin Corporation. Micro LED displays can also be used including but not limited to those produced by VueReal and Lumiode.

In one embodiment, the electronics working with the active display can include the ability to generate display symbols, format output for the display, and include battery information, power conditioning circuitry, video interface, serial interface and control features. Other features can be included for additional or different functionality of the display overlay unit. The electronics can provide display functions, or can receive such functions from another device in communication therewith.

In one embodiment, the active display can generate images including but not limited to text, alpha-numeric, graphics, symbols, and/or video imagery, icons, etc., including active target reticles, range measurements and wind information, GPS and compass information, firearm inclination information, target finding, recognition and identification (ID) information, and/or external sensor information (sensor video and/or graphics), or images for situational awareness, for viewing through the eyepiece along with the images of the view seen through optics. The direct viewing optics can include or maintain an etched reticle and bore sight, and retain high resolution.

In one embodiment, the utilization of an active display allows for a programmable electronic aiming point to be displayed at any location in the field of view. This location could be determined by the user (as in the case of a rifle that fires both supersonic and subsonic ammo and thus has two different trajectories and "zeros"), or could be calculated based upon information received from a ballistic calculator. This would provide a "drop compensated" aiming point for long range shooting that could be updated on a shot to shot interval.

In one embodiment, the active display can be oriented to achieve maximum vertical compensation. In one embodiment, the active display is positioned to be taller than it is wide.

Figure 18:
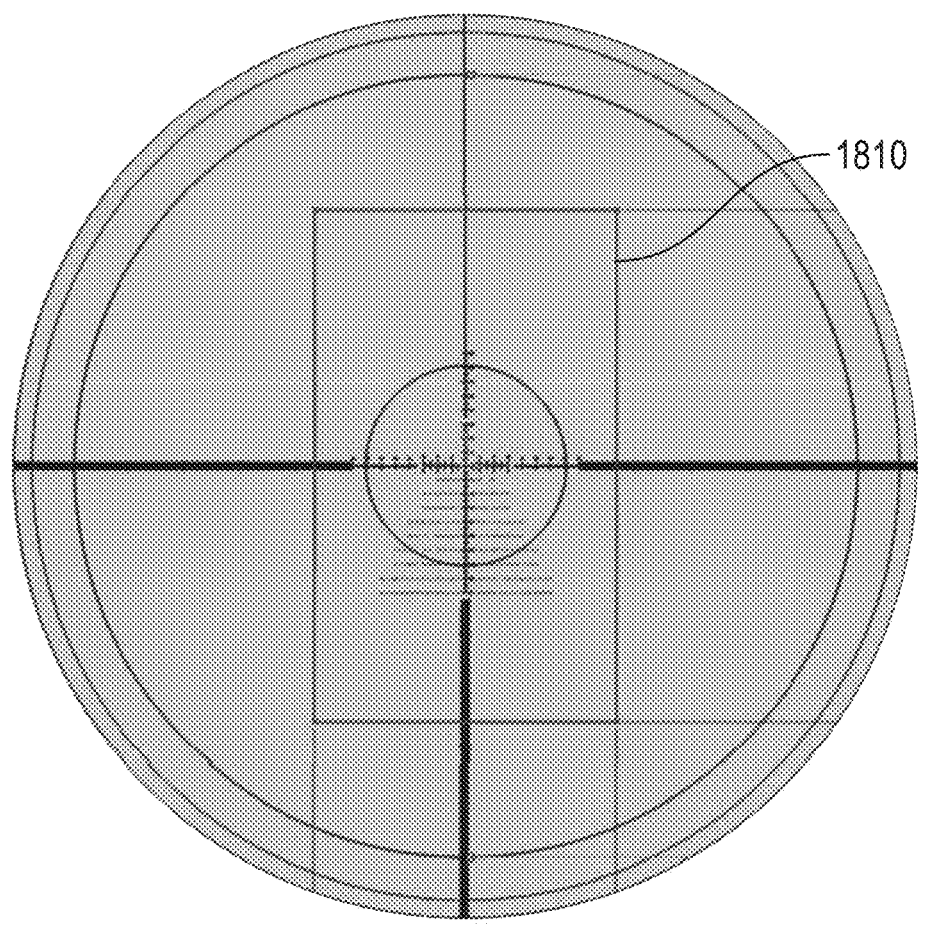
FIG. 18 is a representative schematic showing aspect ratio of a micro-display according to one embodiment of the disclosure.

In one embodiment, the active display is oriented as shown in FIG. 18, which allows for the maximized range of vertical adjustment 1810 of an active reticle within a riflescope. Maximized vertical adjustment is beneficial since it allows for the ballistic compensation of scenarios at longer range.

In one embodiment, the integrated display system further comprises a processor in electronic communication with the active display.

In another embodiment, the integrated display system may include memory, at least one sensor, and/or an electronic communication device in electronic communication with the processor.

Method of Use for Range Finding

In one embodiment, the active display can display range measurements obtained from a laser rangefinder. In one embodiment, a LRF can be coupled to a viewing optic. In one embodiment, the LRF is directly coupled to the outer scope body of the riflescope. In another embodiment, a portion of a LRF is directly coupled to the outer portion of the scope body of the riflescope.

In one embodiment, the LRF is indirectly coupled to the outer scope body of the riflescope. In another embodiment, a portion of a LRF is indirectly coupled to the outer portion of the scope body of the riflescope.

In yet another embodiment, a LRF is not coupled to the riflescope but communicates with the riflescope via either hard-wiring or wirelessly.

In general operation, a LRF provides a pulse of laser light that is projected into the scene via the projection optics. This laser light illuminates the object, and a portion of the laser light is reflected back toward the LRF. Part of the reflected laser light returning to the device is captured by the receiving optical system, and is directed to a detector. The device includes a timer starting when the laser light pulse is transmitted and stopping when the returning laser light is detected. A calculator portion of the device uses the elapsed time from transmission of the laser light pulse until detection of the returning reflected laser light to calculate the distance to the object.

In one embodiment, distance calculations are transmitted to the active display, and the generated images (distance measurements or calculations) are redirected from the display optical axis "B" onto the viewing optical axis A with a mirror and a beam combiner for simultaneously superimposing or overlaying the images (distance measurements or calculations) onto the images of the scene viewed by the viewer through the viewing optics.

Windage Range Bar

In another embodiment, the active display can generate a windage range. In one embodiment, a user can supply a range of wind values, and software can generate windage data, for example a windage range variance bar. In one embodiment, the windage data is transmitted to the active display, and the generated images, e.g., windage range variance bar, is redirected from the display optical axis "B" onto the viewing optical axis "A" with a mirror and a beam combiner for simultaneously superimposing or overlaying the images (windage range variance bar) onto the images of the scene viewed by the viewer through the viewing optics.

In one embodiment, the windage data includes the minimum wind hold point to the maximum wind hold point.

In one embodiment, the windage data is transmitted to the active display, and the active display can generate a digital reticle into the field of view at the appropriate wind hold.

Display Colors for Mental Cues

In one embodiment, the active display can generate a color display to convey an extra level of information to the user in a quick-to-comprehend format. In one embodiment, the active display can generate a series of color coded symbols to indicate a readiness to fire.

In one embodiment, the active display can generate a series of color coded symbols to color code objects in the target scene. In one embodiment, the active display can color code friendly forces from enemy forces. In another embodiment, the active display can color code targets of interest.

In one embodiment, the active display can generate a series of color coded symbols to indicate status of windage adjustment. In one embodiment, a red dot can indicate that windage adjustment has not been completed while a green symbol could indicate that windage adjustment has been completed.

In another embodiment, the active display can generate an aiming point with color. In one embodiment, the aiming point would be a red color if proper adjustments, including but not limited to windage, range, and elevation, have not been performed. In another embodiment, the aiming point would be a yellow color if some but not all shooting adjustments have been completed. In still another embodiment, the aiming point would be green if all the requisite shooting adjustments have been completed, and the aiming point is fully compensated.

In yet another embodiment, flashing and steady states of symbols may be utilized to convey similar status information regarding the adjustment of the aiming point.

In still another embodiment, the active display can generate text that is shown in colors to indicate status. In one embodiment, red text can indicate that in input parameter has not been entered or calculated, and green for text indicating a parameter which has been input or calculated.

Markers for Impact Zone in Range Finding

In one embodiment, an active display can generate circles, squares, or other shapes to allow the user to quickly encompass or encircle the impact zone of a projectile.

Hold-Over Estimation and Compensation

In another embodiment, the active display can generate an aiming point compensated for a moving target based on user input for the direction and rate of movement. For example, the user may input a rate of movement of 5 miles per hour to the left. This would be added to the windage value if the wind and movement are in the same direction, and subtracted from the windage value if the wind and movement are in opposite direction. Then, when the aiming point and/or windage value bar are plotted on the display, the aiming point will include the proper amount of hold-over to allow the user to place the aiming point dot on the desired impact zone and take the shot, rather than to have to place the aiming point ahead of the moving target to compensate for movement.

Team Operation Via Camera and Remote Display Manipulation

In one embodiment, the active display in conjunction with a network interface allow for an additional level of enhanced operation and usage. In one embodiment, the reticle images of a plurality of shooters over a network can be viewed. Each shooter's reticle camera image is shown on one or more consoles, and network processes and interfaces enable a group-level of coordination, training, and cooperation not before available in individual riflescopes.

Training and Coaching. In a training or coaching scenario, the coach can see how each shooter has aligned his or her reticle on his or her respective target. By being able to actually see the reticle alignment, the coach or trainer can then provide instructions on adjustments and repositioning, such as by verbal instructions (e.g. by radio or in person).

In another embodiment, the coach's console can be provided with a pointing means, such as a mouse or joystick, for which control data is transferred from the console to the rifle's integrated display system via the network. This coach's mouse or joystick then controls an additional dot or pointer in the display of the scope of each shooter, which allows the coach to visually show the shooter which target to use, which range marker bar to use, and where to position the reticle relative to the target. In one embodiment, each shooter can be provided with his or her own coach's dot so that the coach may provide individualized instruction to each shooter.

Fire Coordination. In another embodiment, the active display can be used in the coordination and implementation of a multi-shooter fire team. In one embodiment, the commander of the team operates a coach's console and uses the coach's dots to assist in assigning targets to each shooter, communicating changes in reticle placement, etc.

Snapshots for Remote Review and Approval. In another embodiment, the active display and network processes can allow the shooter, provided with a control means, to take a "snapshot" of his or her reticle view. This snapshot of the user's reticle view can include an image of a target of question. When the image is received by the commander or coach, the commander or coach review the image and approve or disapprove taking the shot. For example, in a coaching scenario, the user may take a snapshot of an animal he or she believes is a legal animal (age, species, gender, etc.) to take. If the coach agrees, the coach can so indicate by positioning or moving the coach's dot in the shooter's reticle.

Biometric Classification of Target. In another embodiment, the snapshot of the reticle image is received by a biometric recognition and/or classification process, such as a facial recognition system. The biometric recognition and/or classification process may be onboard the gun, such as being integrated into the display control logic, or may be remote to the gun interconnected via the network. The results of the recognition and/or classification process may be provided in the reticle by transmitting the results via the network to the control logic, and updating the display appropriately.

Side-by-Side Image Display. In another embodiment, an image is downloaded to the integrated display system via the network, and is displayed coincidentally in the reticle with the viewed images of target. A downloaded image can be used to make a side-by-side comparison by the user of the currently viewed target with a previously taken image or photo of a target similar to that which the shooter is instructed or desiring to take. For example, during doe season, a new shooter may be provided an image of a deer doe for reference in the reticle, which can be compared in real time to the actual animal being viewed through the scope. In a military or law enforcement application, an image of a sought enemy or fugitive can be displayed in the reticle for real-time comparison by a sniper to face of a person being viewed through the scope.

Representative Examples of Active Displays a. 530-570 nm

In one embodiment, the disclosure relates to an integrated display system that uses a 530-570 nm micro display.

Figure 19:
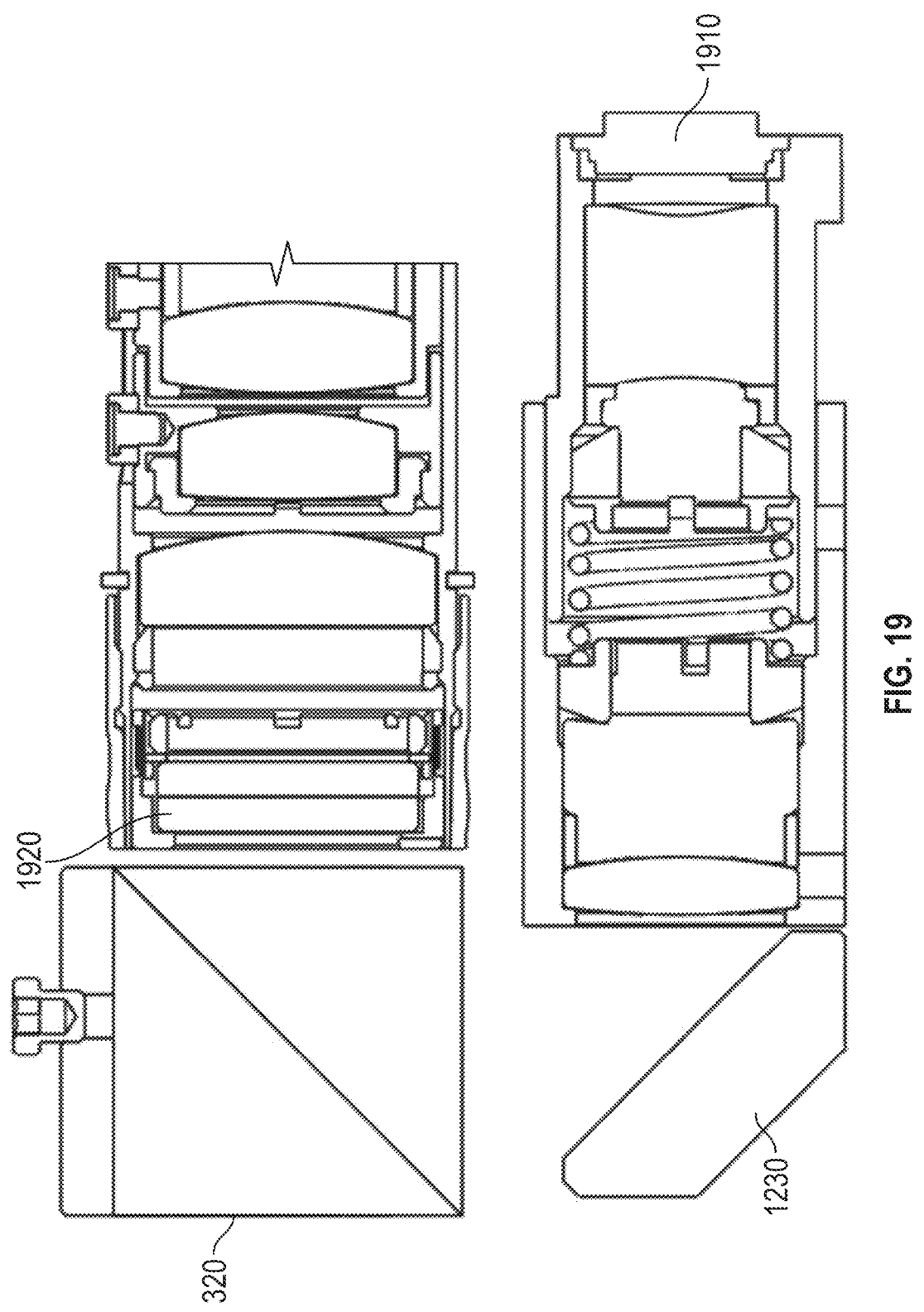
FIG. 19 depicts an integrated display system with a 530 nm-570 nm digital display according to one embodiment of the disclosure.

FIG. 19 depicts an integrated display system with a 530 nm-570 nm digital display 1910.

Figure 20:
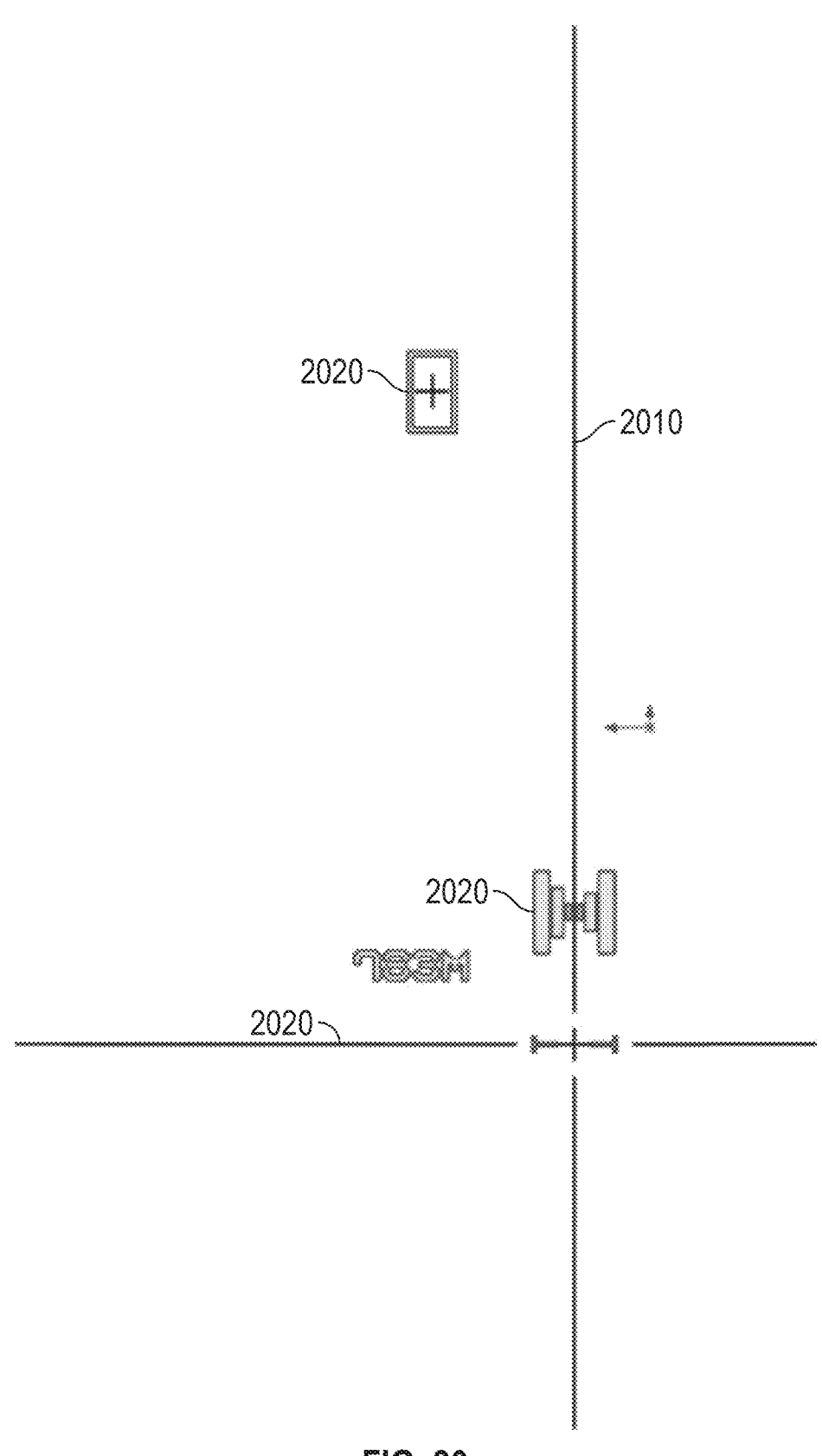
FIG. 20 is a schematic of exemplary images that can be displayed with a 530 nm-570 nm digital display according to one embodiment of the disclosure.

FIG. 20 is a schematic of exemplary images 2020 that can be displayed with a 530 nm-570 nm digital display 1910. As shown in FIG. 20, a glass etched reticle 2010 can be used with the apparatuses and systems disclosed herein. These images are examples only, and should not be construed to limit the amount or type of information that can be displayed with an active display.

In another embodiment, the integration of the 530 nm-570 nm digital display 1910 allows for relatively higher efficacy than any other color display, due to the sensitivity of the human eye. This allows for a smaller amount of power consumption, relative to powering a red or blue display to the same photometric brightness.

In yet another embodiment, the integration of the 530 nm-570 nm digital display 1910 gives the end user greater ability to discern digital overlays from the background created by the ambient light in a day sight.

b. AMOLED

In one embodiment, the disclosure relates to an integrated display system that includes an AMOLED micro display.

Figure 21:
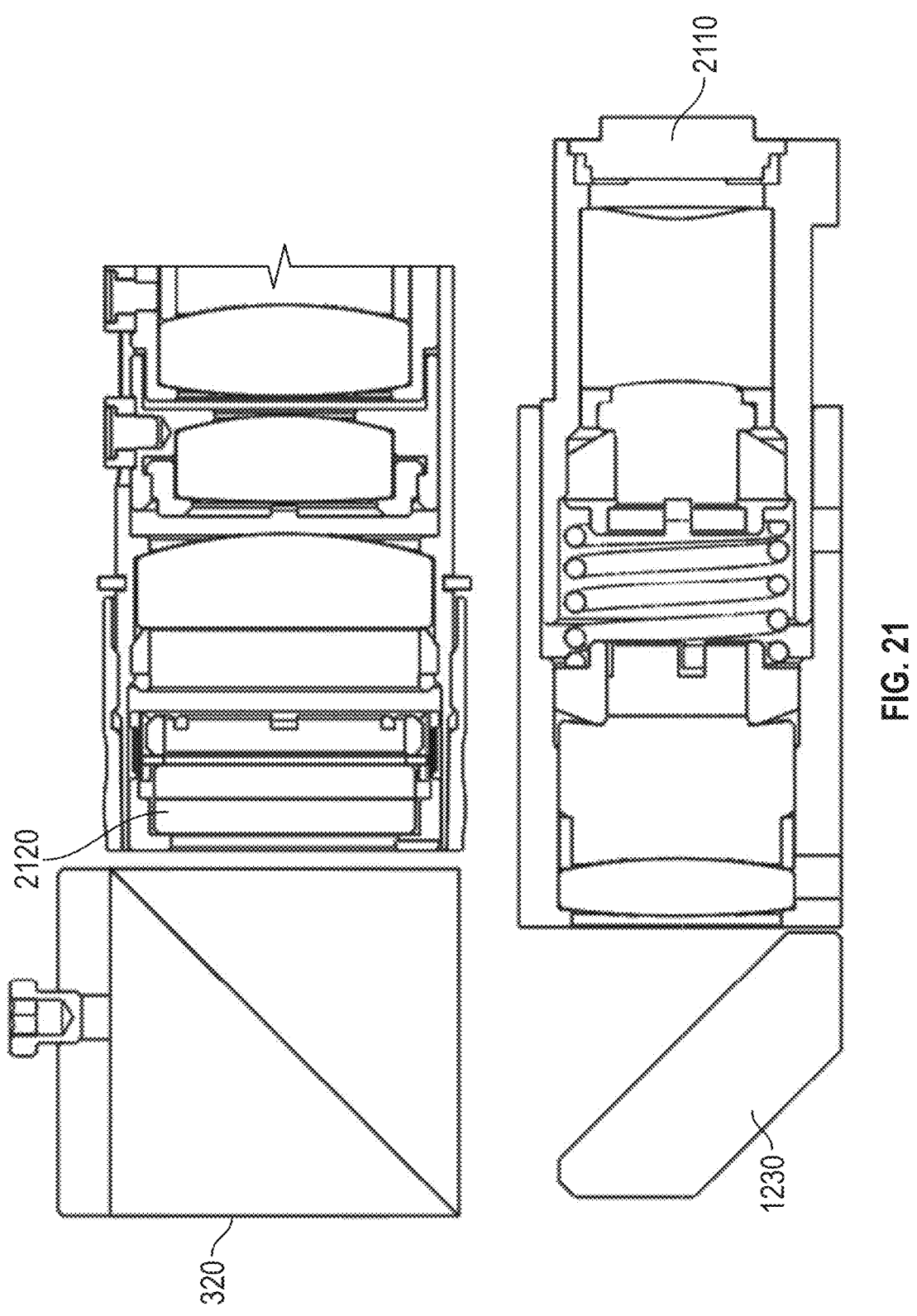
FIG. 21 depicts an integrated display system with an AMOLED digital display according to one embodiment of the disclosure.

FIG. 21 depicts an integrated display system with a AMOLED digital display 2110.

Figure 22:
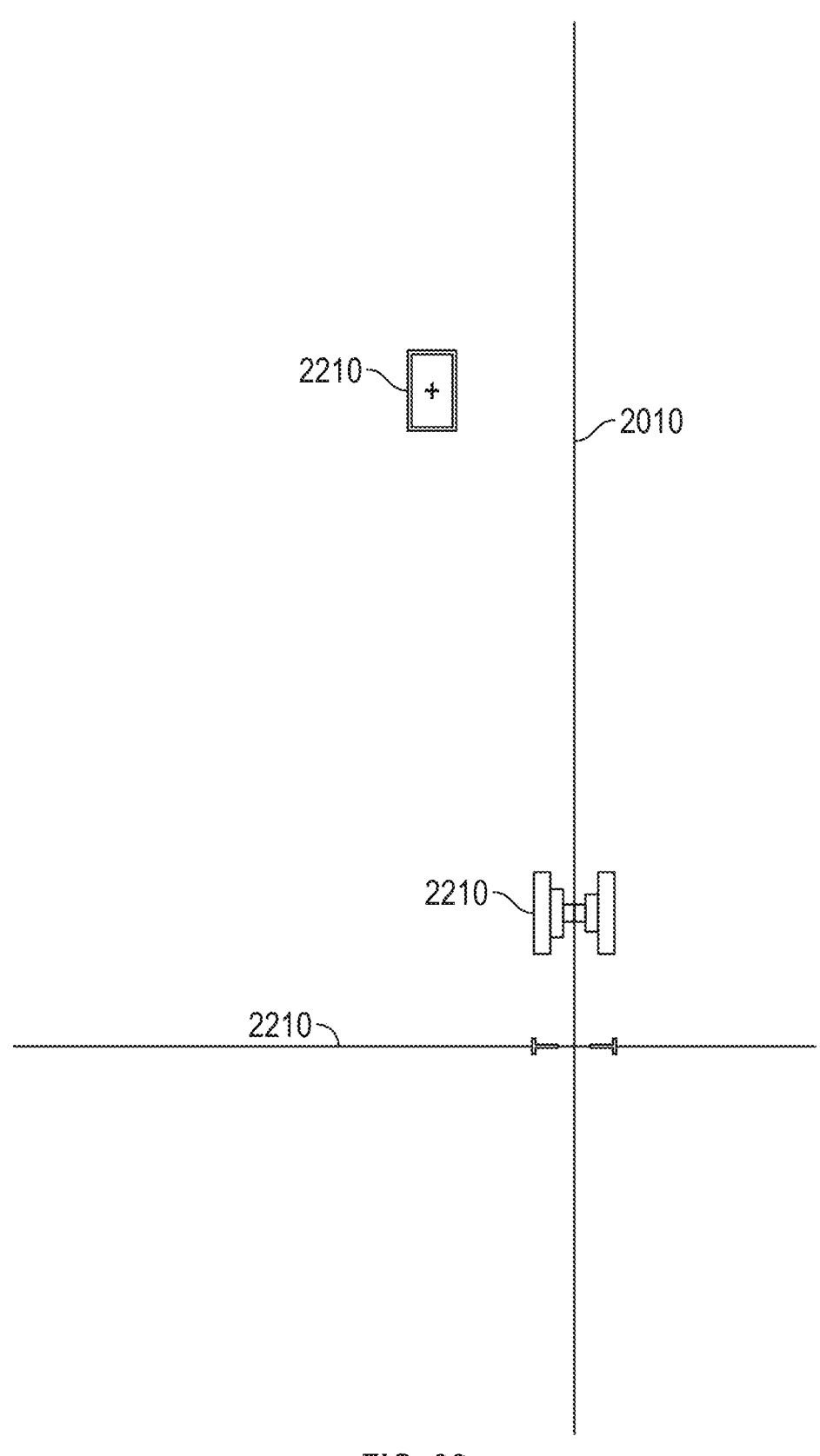
FIG. 22 is a schematic of exemplary images that can be displayed with an AMOLED digital display according to one embodiment of the disclosure.

FIG. 22 is a schematic of exemplary images 2210 that can be displayed with an AMOLED digital display. As shown in FIG. 22, a glass etched reticle 2010 can be used with the apparatuses and systems disclosed herein. These images are examples only, and should not be construed to limit the amount or type of information that can be displayed with an active display.

In one embodiment, the AMOLED 2110 generated image is integrated/imaged/focused in the first focal plane. In one embodiment, the use of an AMOLED display 2110 allows for increased contrast and greater complexity within data displayed into a riflescope.

In one embodiment, the integration of the AMOLED display 2110 allows for the selection of individual pixels to be illuminated, giving the ability for complex data configurations to be displayed with ease in the riflescope.

In another embodiment, the integration of the AMOLED display 2110 allows for a small, lightweight package size inside the riflescope, due to the decreased need for back lighting in the system.

In another embodiment, the integrated display system does not require a backlight display assembly.

In yet another embodiment, the integration of the AMO-LED display 2110 allows for decreased power consumption, as the ability to optimize power usage to individual pixels is now available.

In one embodiment, the integration of the AMOLED display 2110 gives a contrast ratio, which allows for a clean "heads up" style display within the scope. The contrast ratio allows each floating feature to be individually targeted and represented without a low glow around the pixels.

B. Collector Lens System

In one embodiment, integrated display system has an optical system based upon the use of optical lenses as a part of one or more lens cells, which include the lens itself and a lens cell body to which the lens is mounted. In one embodiment, the lens cell includes a precision formed body that is generally cylindrical or disc shaped. This body has a central aperture for mounting the lens in alignment with an optical axis of a larger optical system. The cell body can also be said to have its own alignment axis, which will ultimately be aligned with the optical axis for the larger system when the lens cell is mounted therein. In addition, the lens cell serves as a "holder" for the lens, serves as a mechanism by which the lens can be mounted to and in the larger optical system, and (finally) serves as a means by which the lens can be manipulated by and for the purposes of that system.

In one embodiment, the integrated display system comprises a collector lens system, also referred to as a lens system. In one embodiment, the collector lens system comprises an inner lens cell and an outer lens cell.

Figure 23:
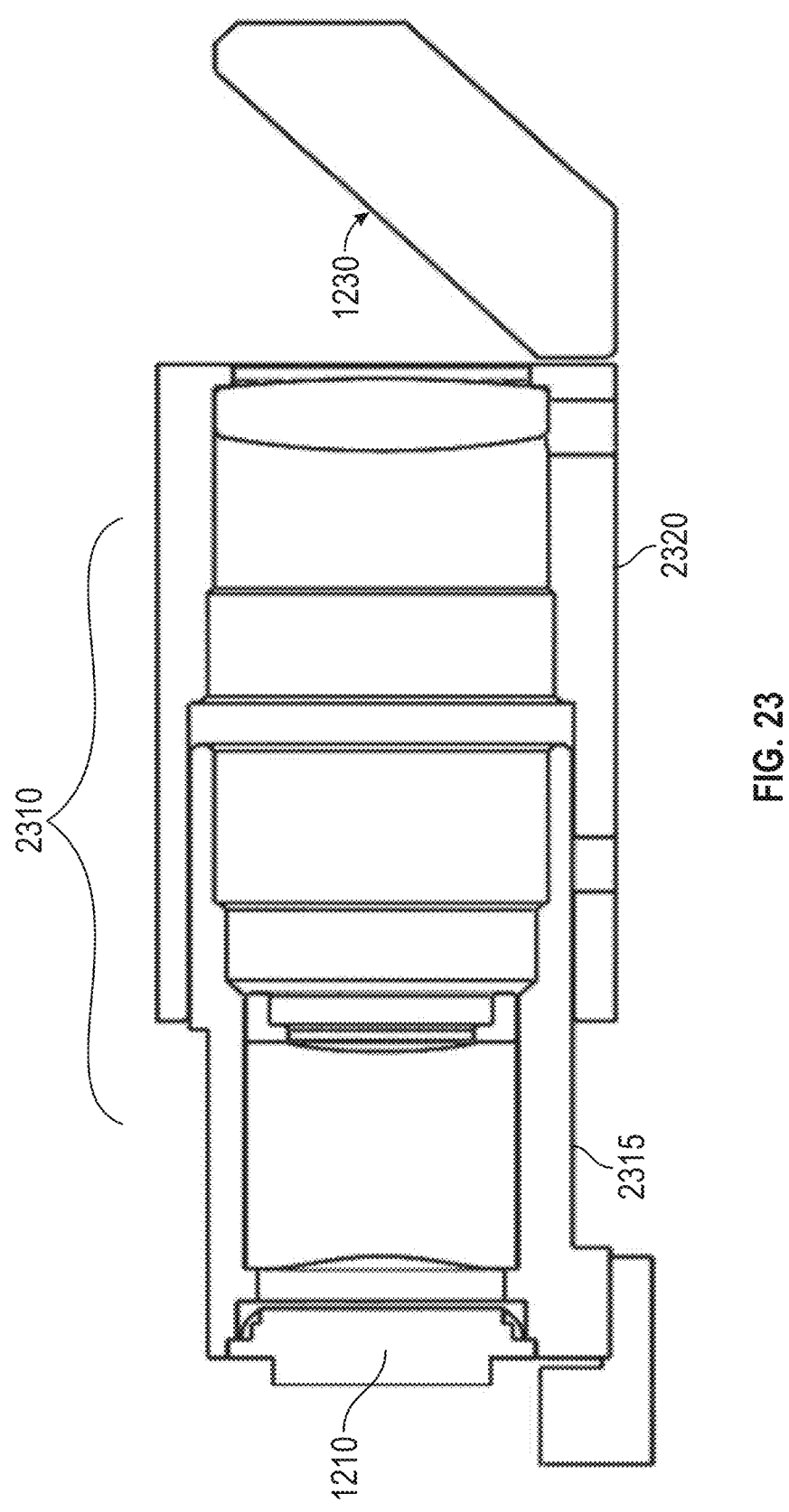
FIG. 23 is a representative schematic of a side cutaway view showing an active display and an optics system having an inner and an outer lens cell according to one embodiment of the disclosure.

FIG. 23 is a representative example of a collector lens system 2310, which has an inner lens cell 2315 and an outer lens cell 2320. In one embodiment, an outer lens cell 2320 contains at least one lens and an inner lens cell 2315 contains at least one lens. In one embodiment, the inner lens cell 2315 rotates on the inside surface of the outer lens cell 2320. As shown in FIG. 23, an active display 1210 is coupled to a flat machined surface at the back of the inner lens cell 2315. In one embodiment, the active display 1210 can be directly coupled to the inner lens cell 2315. In yet another embodiment, the active display 1210 can be indirectly coupled to the inner lens cell 2315.

One advantage of the collector optics system disclosed herein is that the inner lens cell being combined with the micro display mount provides a solid rotational mechanical axis to position the vertical axis of the micro display.

Figure 24:
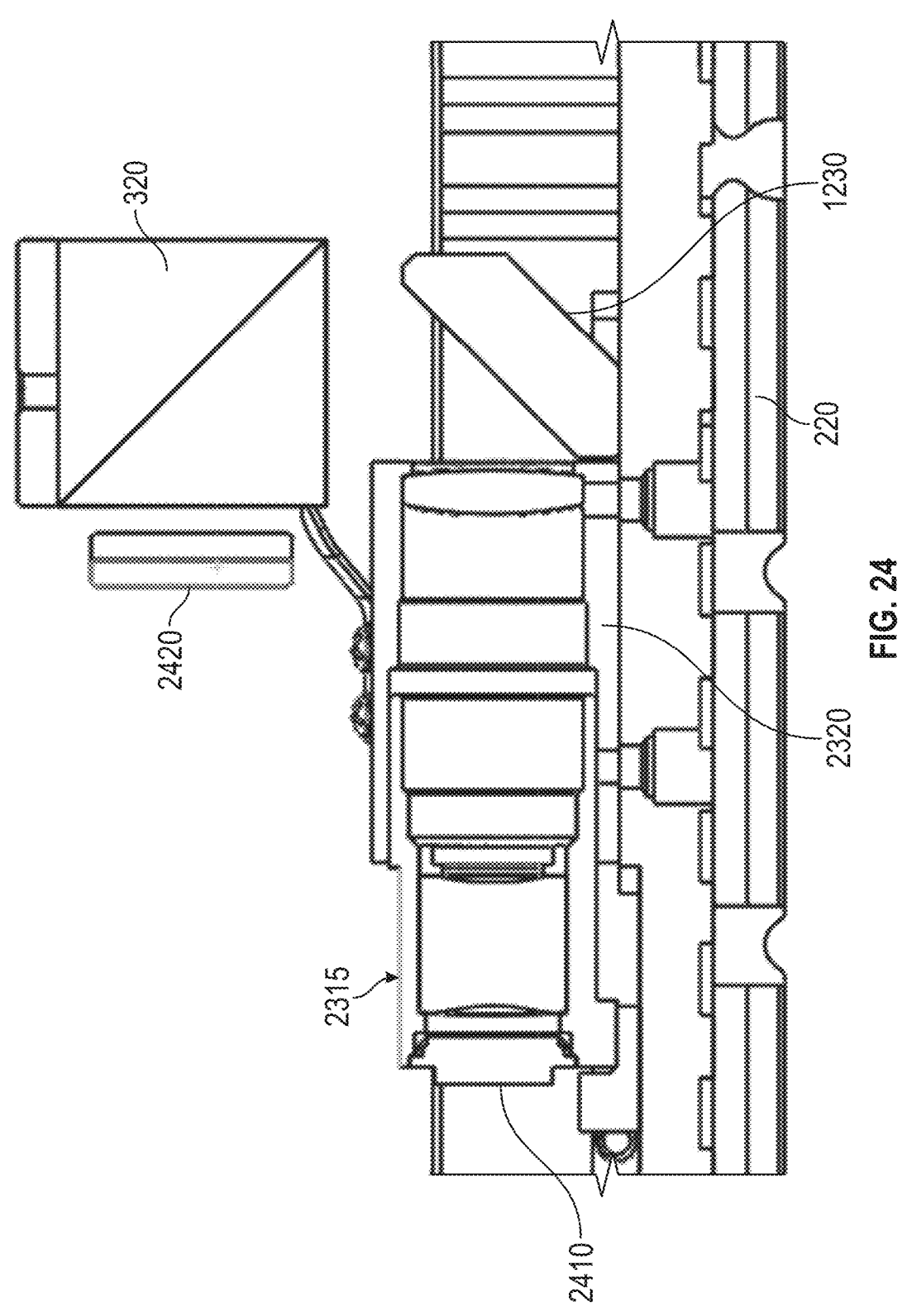
FIG. 24 is a side cutaway view of an integrated display system with a collector optics system installed into a viewing optic according to one embodiment of the disclosure.

FIG. 24 is a representative depiction of a base 220 that couples to a main body of a viewing optic, wherein the base has a collector optics system 2310 as part of an integrated display system. In FIG. 24, the main body is depicted by the beam combiner 320 and the viewing optic reticle 2420.

The outer lens cell 2320 is fixed in place in relation to the viewing optic system in the main body while the inner lens cell 2315 is allowed to rotationally float inside of the outer lens cell 2320. By placing pressure against a surface 2410 of the inner lens cell 2315 that is located below the axis of rotation of the lens cell, the vertical axis of an active display 1210 can be aligned with the vertical axis of the reticle 1610 of the viewing optic system.

Figure 25:
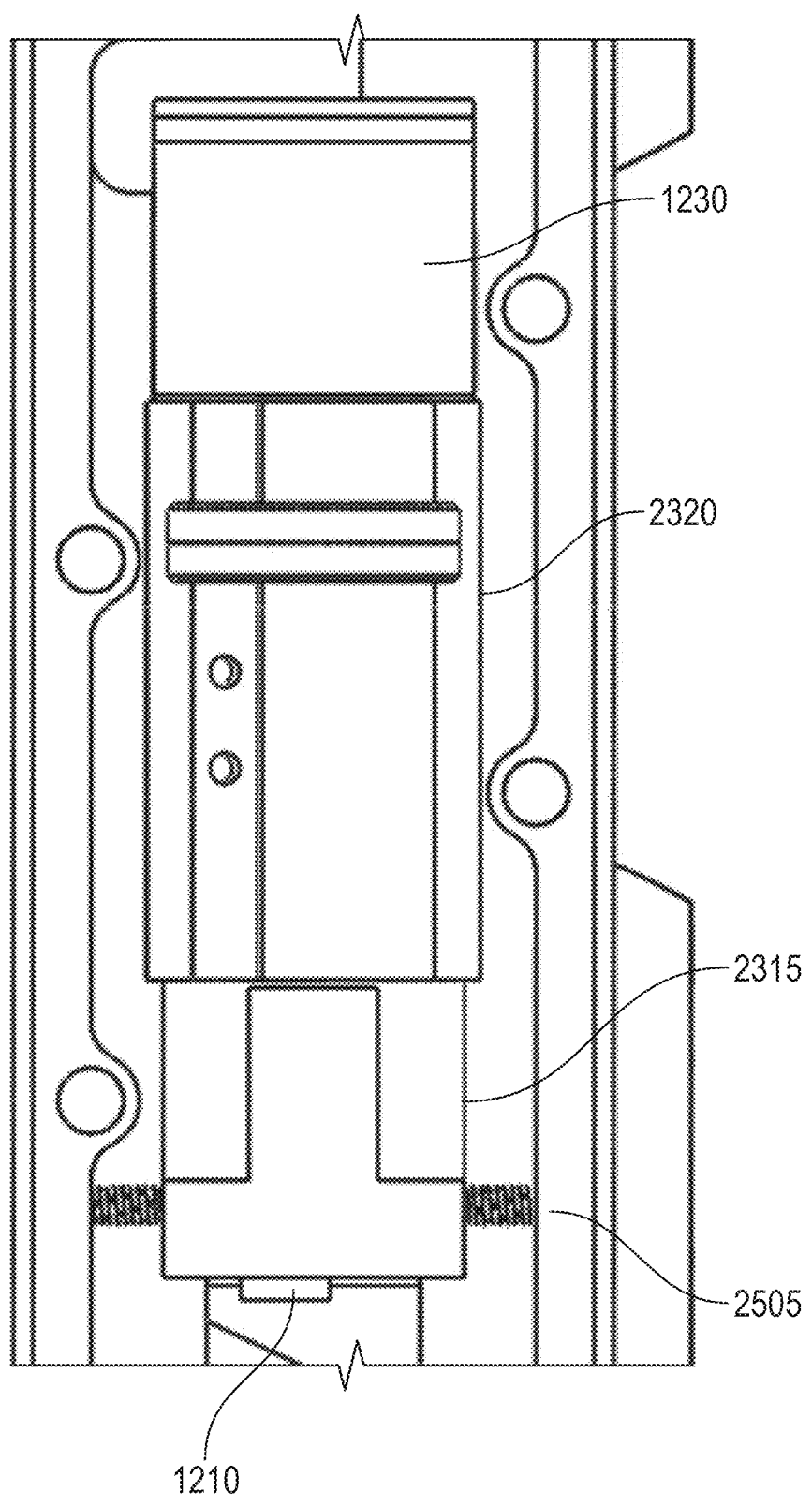
FIG. 25 is a representative schematic of a top view of an integrated display system with an active display, a collector optics system having an inner cell, and an outer cell, a mirror and a screw for adjusting tilt of a active display according to one embodiment of the disclosure.

FIG. 25 is a representative depiction of one embodiment for aligning the tilt of the vertical axis of the active display with the vertical axis of the reticle. As shown in FIG. 25, opposing set screws 2505 can be tightened against a surface of the inner lens cell 2315 that is located below the axis of rotation of the lens cell. The set screws 2505 can be used to align the vertical axis of the micro display 1210 with the vertical axis of a reticle in the optical system in a main body of a viewing optic. The rotation of the inner lens cell 2315 can be retained by tightening set screws 2505 securely against the lower surface of the inner lens cell 2315, thereby, rotationally locking the vertical axis of the micro display 1210 in place.

Figure 26:
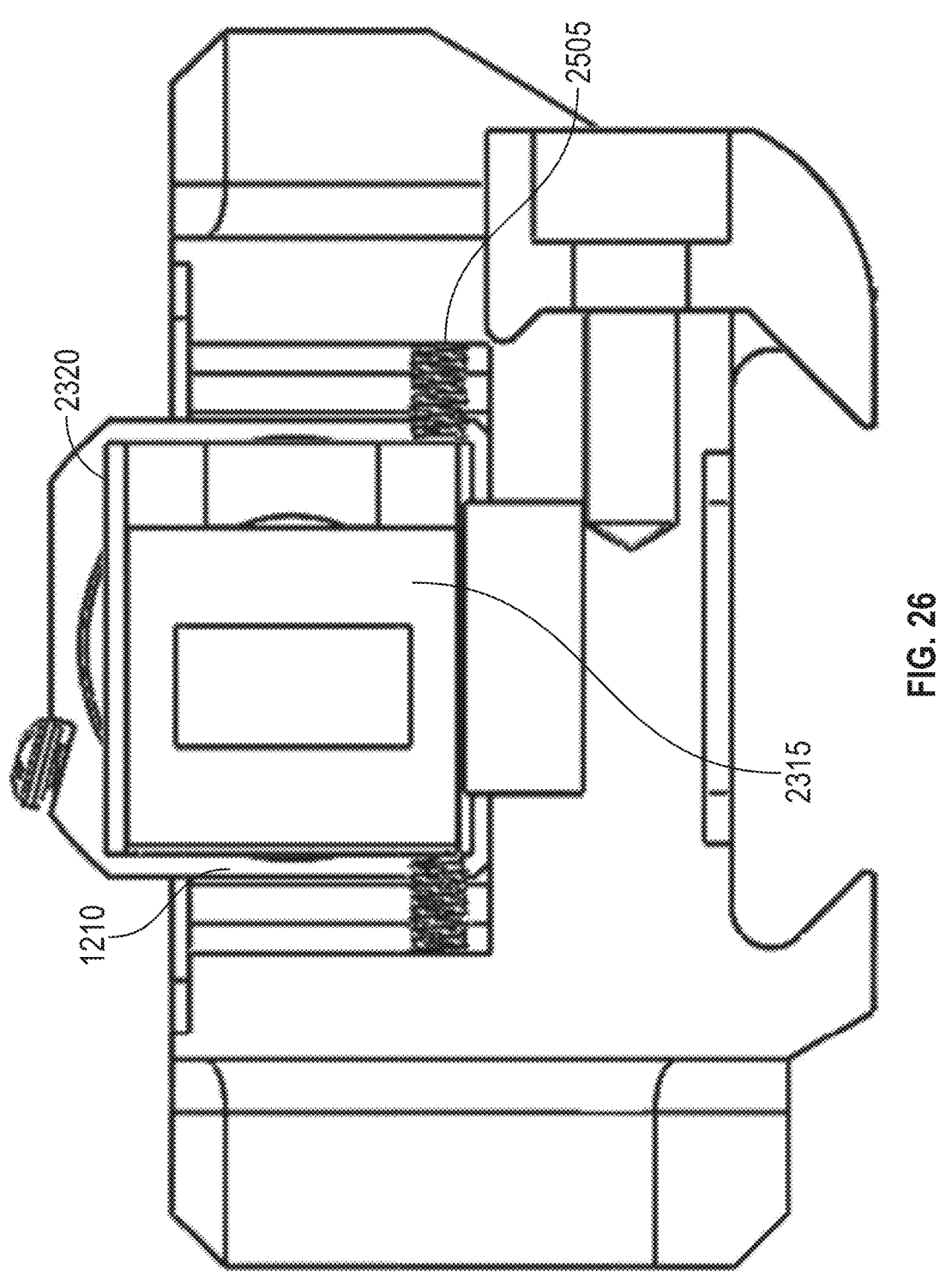
FIG. 26 is a representative schematic of a rear cutaway view of an integrated display system with an active display, a collector optics system having an inner cell, and an outer cell, a mirror and a screw for adjusting tilt of a active display according to one embodiment of the disclosure.

FIG. 26 is a representative depiction of a rear cut-away view of the collector lens system 2300 with a micro display 1210 or active display tilt adjustment mechanism. When a micro display is injected into the optical system of a viewing optic through the use of beam combiners or wave guides, an additional method of compensation is needed in order to eliminate tilt error between the reticle's vertical axis and the injected image of the micro display's vertical axis. Set screws 2505 can be tightened against a surface of the inner lens cell 2315 that is located below the axis of rotation of the lens cell, thereby aligning the vertical axis of the micro display 1210 with the vertical axis of a reticle in the optical system in a main body of a viewing optic.

Figure 27:
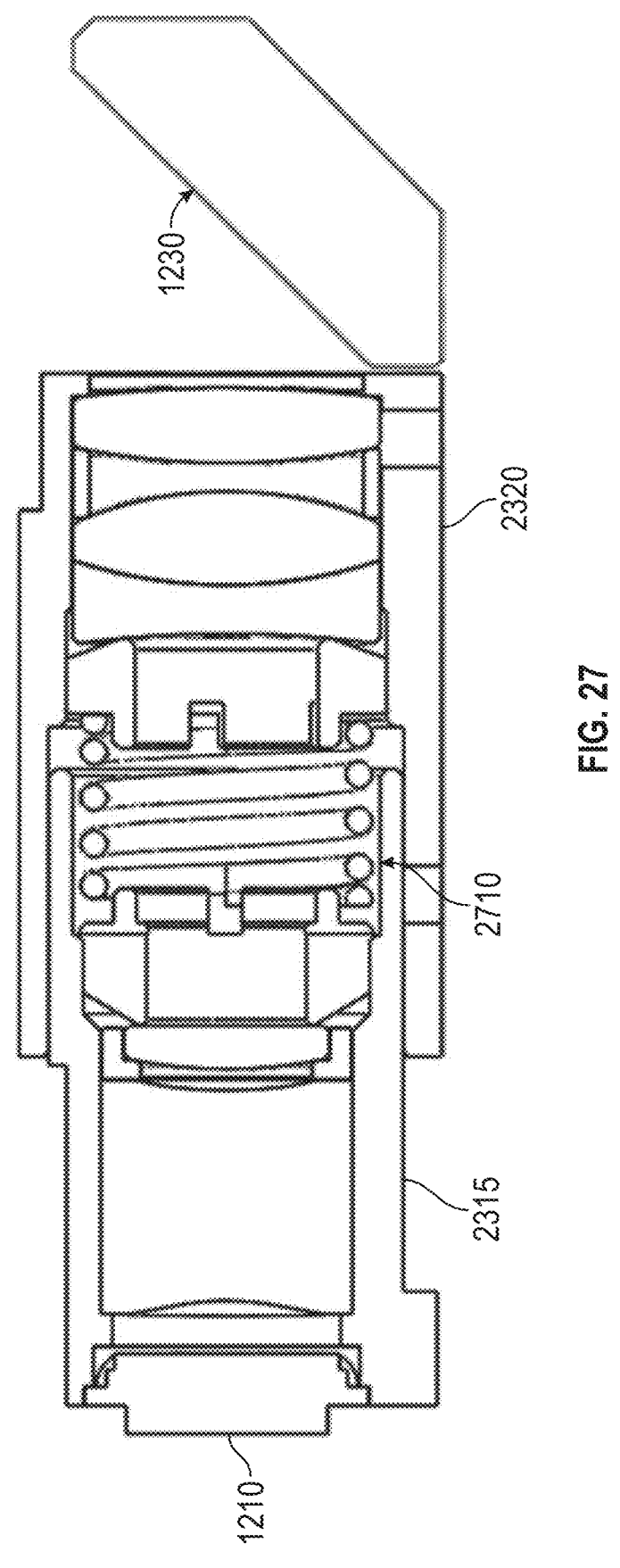
FIG. 27 is a representative depiction of a side cutaway view showing a micro display, inner and outer lens cells, and a spring located between the inner and outer cells according to one embodiment of the disclosure.

FIG. 27 is a representative depiction of a method and apparatus for eliminating parallax between a micro display and the reticle in an optical system in the main body of a viewing optic. An outer lens cell 2320 contains at least one lens on the right hand side of FIG. 27 and an inner lens cell 2315 contains at least one lens on the left hand side of FIG. 27. The inner lens cell 2315 slides along the optical axis on the inside surface of the outer lens cell 2320. A micro display 1210 is coupled to the inner lens cell 2315. A spring 2710 is installed between the outer lens cell 2320 and the inner lens cell 2315 to cause the cells to separate when not under a compression force.

Figure 28A:
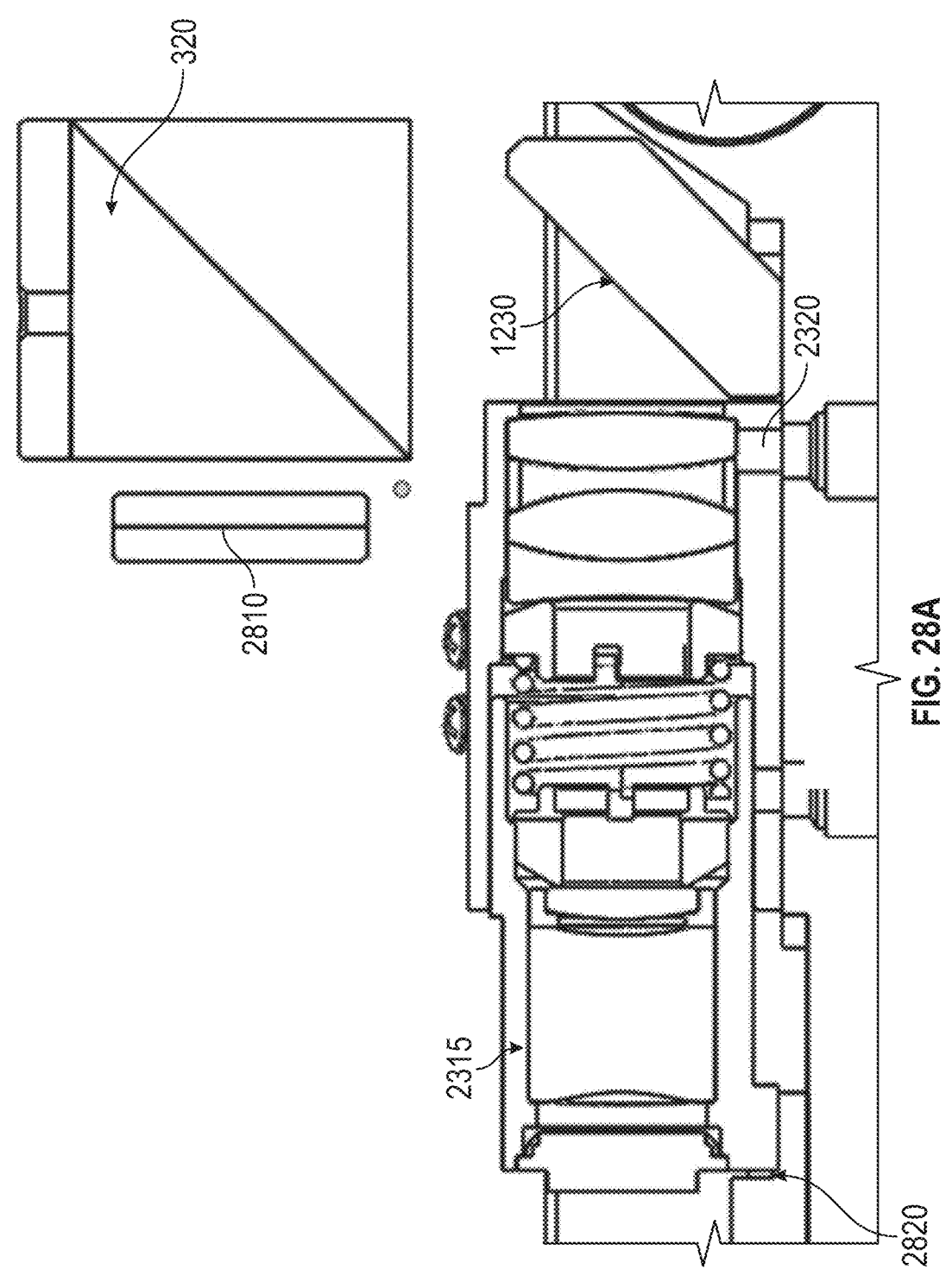
FIG. 28A is a representative depiction of an integrated display system showing a surface that can be used to adjust position of inner lens cell and eliminate parallax error according to one embodiment of the disclosure.

FIG. 28A is a representative depiction of a base, which has the collector optics system 2300, coupled to a main body of a viewing optic. In FIG. 28A, the main body is depicted by the beam combiner 320 and the viewing optical reticle 2810.

The outer lens cell 2320 is fixed in place in relation to the viewing optic and the inner lens cell 2315 is allowed to float inside of the outer lens cell 2320. By forcing the inner lens cell 2315 forward by use of a screw or a wedge 2820 that places force on the back of the inner lens cell/active display mount, the axial position of the image is changed so that the focal plane of the micro display image lies on the same plane as the viewing optic reticle in the main body of the viewing optic. Thus, parallax between the micro display and the reticle is eliminated.

The position of the inner lens cell is kept in place through the action of the spring pressing outwards against the screw or wedge. Parallax between the active display and the reticle can be eliminated without changing the amount of light that is collected from the active display and without degrading the image quality of the system.

By implementing the use of the spring between the inner and outer lens cell and the force on the back of the inner lens cell/micro display, the maximum amount of light can be collected from the micro display and provides a rapid, simple, and accurate method of adjustment.

In one embodiment, the inner lens cell 2315 and the outer lens cell 2320 can comprise two or more lenses. In yet another embodiment, the lens system can comprise 3, 4, 5, 6, 7, 8, 9, 10 or greater than 10 lenses. Lens can be obtained from a variety of commercial manufacturers including but not limited to LaCroix Optics (www.lacroixoptics.com) and Diverse Optics (www.diverseoptics.com). In one embodiment, the inner lens cell and the outer lens cell comprise a collector lens system.

In one embodiment, the lens system is composed of a five (5) lens system. In one embodiment, the five lens system is comprised of 5 singlet lenses. In another embodiment, the five lens system is comprised of two doublet lenses and a singlet lens. In yet another embodiment, the five lens system is comprised of 3 singlet lenses and 1 doublet lens. In one embodiment, at least one plastic aspheric is used as a first element.

In one embodiment, the lens system is a five lens system with the following order: an aspheric singlet closest to the active display, followed by a singlet lens, followed by a doublet lens, followed by the final singlet lens.

In one embodiment, the lens system is a five lens system with the following order: an aspheric singlet closest to the active display, followed by a singlet lens, followed by a singlet lens, followed by a doublet lens.

In one embodiment, the lens system is a five lens system having the following configuration: lens 1 closes to the active display is 11 mm in diameter and 9.3 mm thick; lens 2 is 9 mm in diameter and 1.9 mm thick, the doublet has one lens (lens 3) that is 13.5 mm in diameter and 2.1 mm thick, and another lens (lens 4) that is 13.5 mm in diameter and 4.1 mm thick, and lens 5 that is 13.5 mm in diameter and 3.3 mm thick.

In one embodiment, the air space between one lens to the next lens ranges from about 1 mm to about 20 mm. In one embodiment, the air space between one lens to a subsequent lens ranges from about 5 mm to about 20 mm. In one embodiment, the air space between one lens to a subsequent lens ranges from about 10 mm to about 20 mm.

In one embodiment, the distance between the active display and the first lens is minimized in order to collect the maximum amount of light from the display. In one embodiment, the distance between the active display and the first lens is less than 2 mm. In another embodiment, the distance between the active display and the first lens is selected from the group consisting of: less than 1.8 mm, less than 1.5 mm, less than 1.3 mm, less than 1.1 mm, less than 0.9 mm, less than 0.7 mm, less than 0.5 mm, and less than 0.3 mm.

In one embodiment, a five lens system is housed in an inner lens cell and an outer lens cell. In one embodiment, the inner lens cell is constructed by installing an asphere into the inner lens cell from the opposite end of where the display seat is; followed by a spacer; followed by lens 2, which can be a 9 mm singlet; followed by a lock ring, which holds both lenses in place.

In one embodiment, the outer lens cell is constructed by inserting lens 5, which can be the 13.5 mm singlet into the outer lens cell from the display end of the cell; followed by a spacer; followed by the doublet, which can be lens 3 and 4, followed by a lock ring.

Figure 28B:
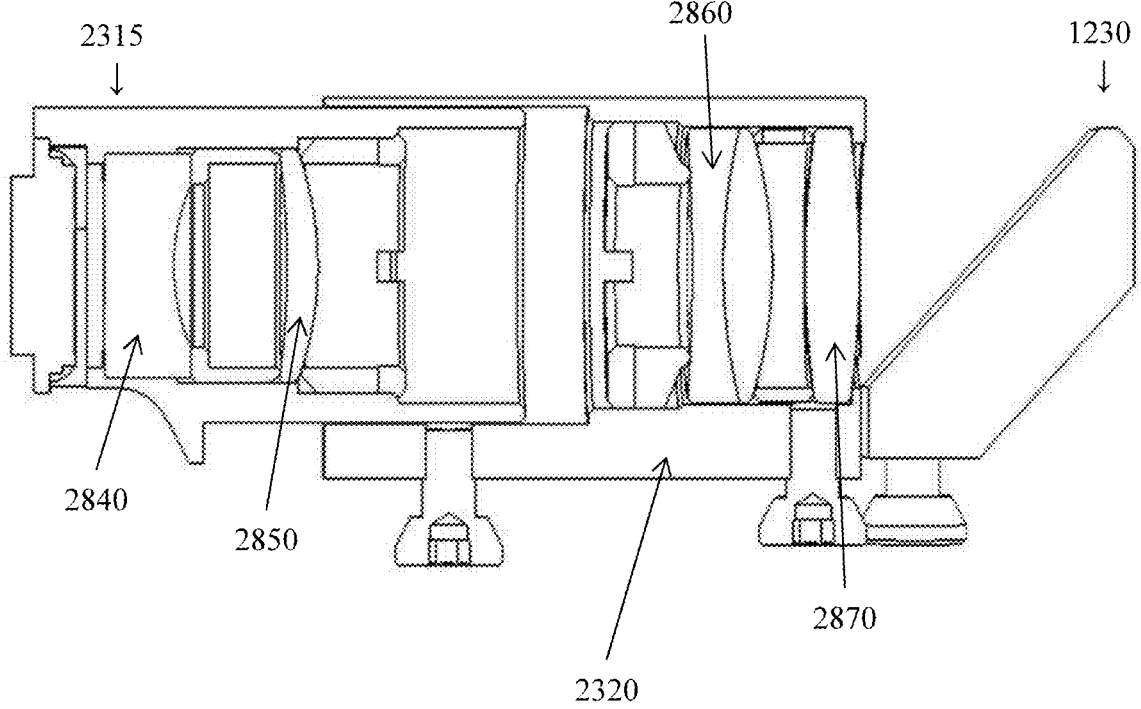
FIG. 28B is a representative depiction of an integrated display system showing a lens system in one embodiment of the disclosure.

FIG. 28B is a representative depiction of a base, which has the collector optics system or collector lens system. The inner lens cell 2315 is constructed by installing an asphere 2840 into the inner lens cell from the opposite end of where the display seat is; followed by a spacer; followed by a glass meniscus 2850. In one embodiment, the glass meniscus can be lens 2 as described above. The outer lens cell 2320 can be constructed by inserting a glass doublet 2860 followed by a glass singlet 2870.

In one embodiment, the collector lens system comprises a five lens system comprising 2840, 2850, 2860, and 2870, with 2840 being closest to the active display, and 2870 being farthest from the active display. In one embodiment, the inner lens cell 2315 comprises 2840 and 2850. In one embodiment, the outer lens cell 2320 comprises 2860 and 2870.

In one embodiment, the spacing between lens 2 in the inner cell and lens 3 in the outer cell is changed when the inner lens cell moves axially along the inner diameter of the outer lens cell. This causes the focal plane of the image of the display to shift and is used to null out parallax between the projected display image and the passive reticle in the main body of the viewing optic.

In one embodiment, the focusing of the display image onto the first focal plane of the optic system in the main body is accomplished by changing the air spacing between lens 2 and lens 3, of a 5-lens system, which is accomplished by varying the position of the inner lens cell with respect to the outer lens cell.

In one embodiment, lens assemblies may also be assembled together within a lens barrel, which is an integral mechanical structure holding a series of lenses. It is used to position the lenses axially and radially with respect to each other, and to provide a means of interfacing the lens assembly with the system of which it is a part. Lens elements are radially positioned by the inside diameter or ID of the barrel wall. The outside diameter or OD of the lens elements are ground to fit ID of the barrel wall. The axial position of the lens elements is accomplished by cutting lens seats during assembly. The lens elements can then be constrained on the scats by epoxy, retaining rings, etc.

C. Reflective Material

In one embodiment, the integrated display system comprises a reflective material 1230. In one embodiment, the reflective material 1230 is a mirror. In one embodiment, the integrated display system comprises one or more mirrors. In one embodiment, the integrated display system comprises two, three, four or more mirrors.

In one embodiment, the mirror is positioned at an angle from 30° to 60°, or from 30° to 55°, 30° to 50°, or from 30° to 45°, or from 30° to 40°, or from 30° to 35° relative to the emitted light of the display.

In one embodiment, the mirror is positioned at an angle from 30° to 60°, or from 35° to 60°, 40° to 60°, or from 45° to 60°, or from 50° to 60°, or from 55° to 60° relative to the emitted light of the display.

In one embodiment, the mirror is positioned at an angle of at least 40°. In one embodiment, the mirror is positioned at an angle of 45° relative to the emitted light of the display.

Figure 29:
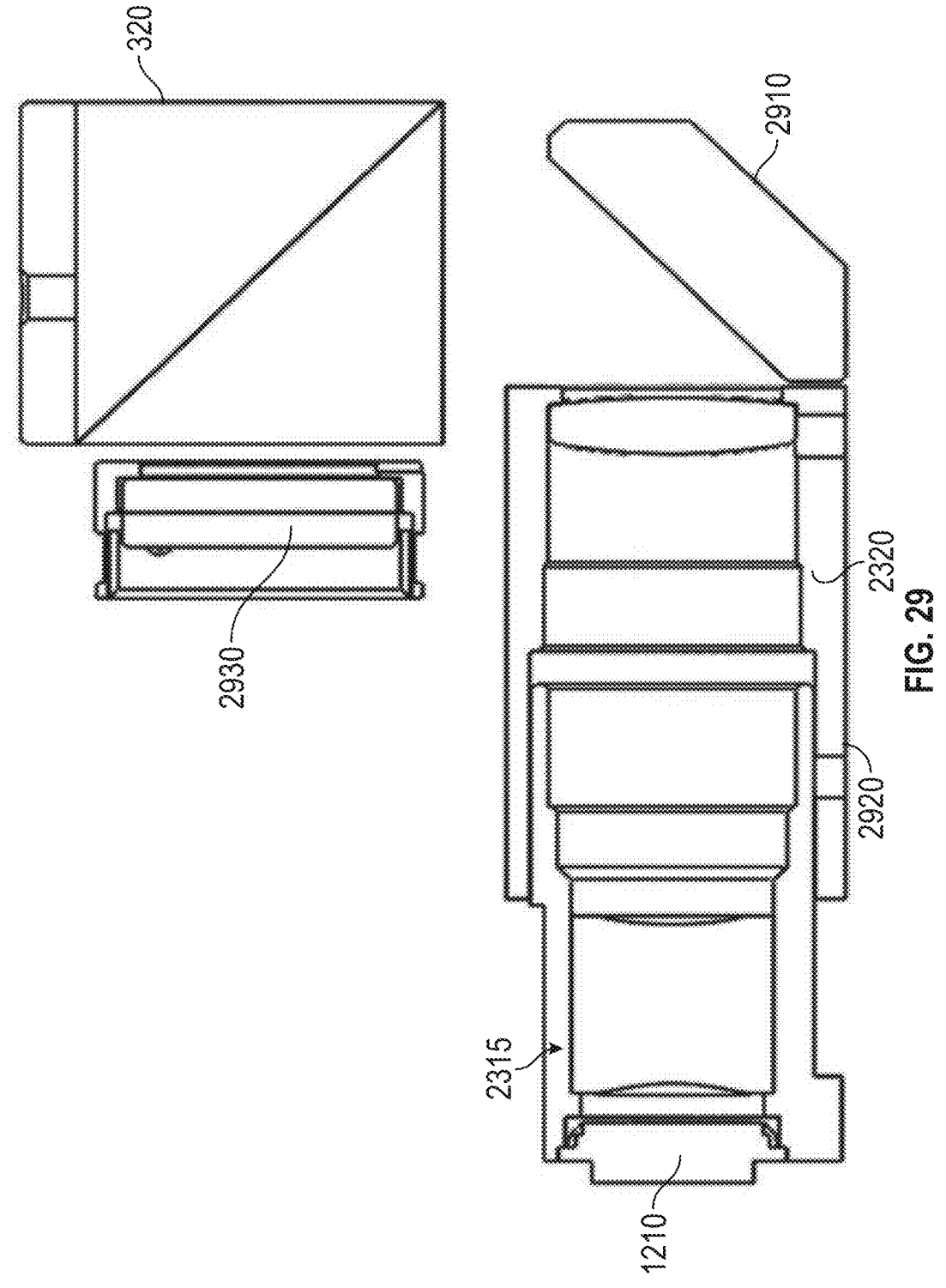
FIG. 29 is a representative depiction of a side cutaway view of an integrated display system with a microdisplay, optics system, and a mirror with tilt adjustment capabilities installed into a viewing optic according to one embodiment of the disclosure.

In one embodiment, and as shown in FIG. 29, the tilt of a mirror 2910 along the vertical axis is able to be adjusted by use of a screw or similar mechanism. By turning a screw in against the base or rear of the mirror 2910, the angle at which the image of the micro display is reflected into the beam combiner can be changed. This correspondingly changes the tilt of the focal plane at the viewing optic's reticle 2930 of the optical system in the main body of a viewing optic. Using this adjustment, parallax error can be eliminated between the micro display and the reticle along the vertical axis.

In one embodiment, the mirror is fastened to the base with one or more screws. In one embodiment, the mirror is fastened to the base using a chemical compound such as an epoxy, a resin, or a glue or combinations thereof.

In one embodiment, the position of the mirror can be adjusted in relation to the beam combiner to eliminate any errors, including but not limited to parallax error.

In one embodiment, the position of the mirror can be adjusted in relation to the active display to eliminate any errors, including but not limited to parallax error.

2. Power System

In one embodiment, the base that couples to the main body of the viewing optic has a power system. In another embodiment, the base of a viewing optic has a cavity. A battery cavity can be integrated into the base that couples to the main body of a viewing optic.

Figure 30:
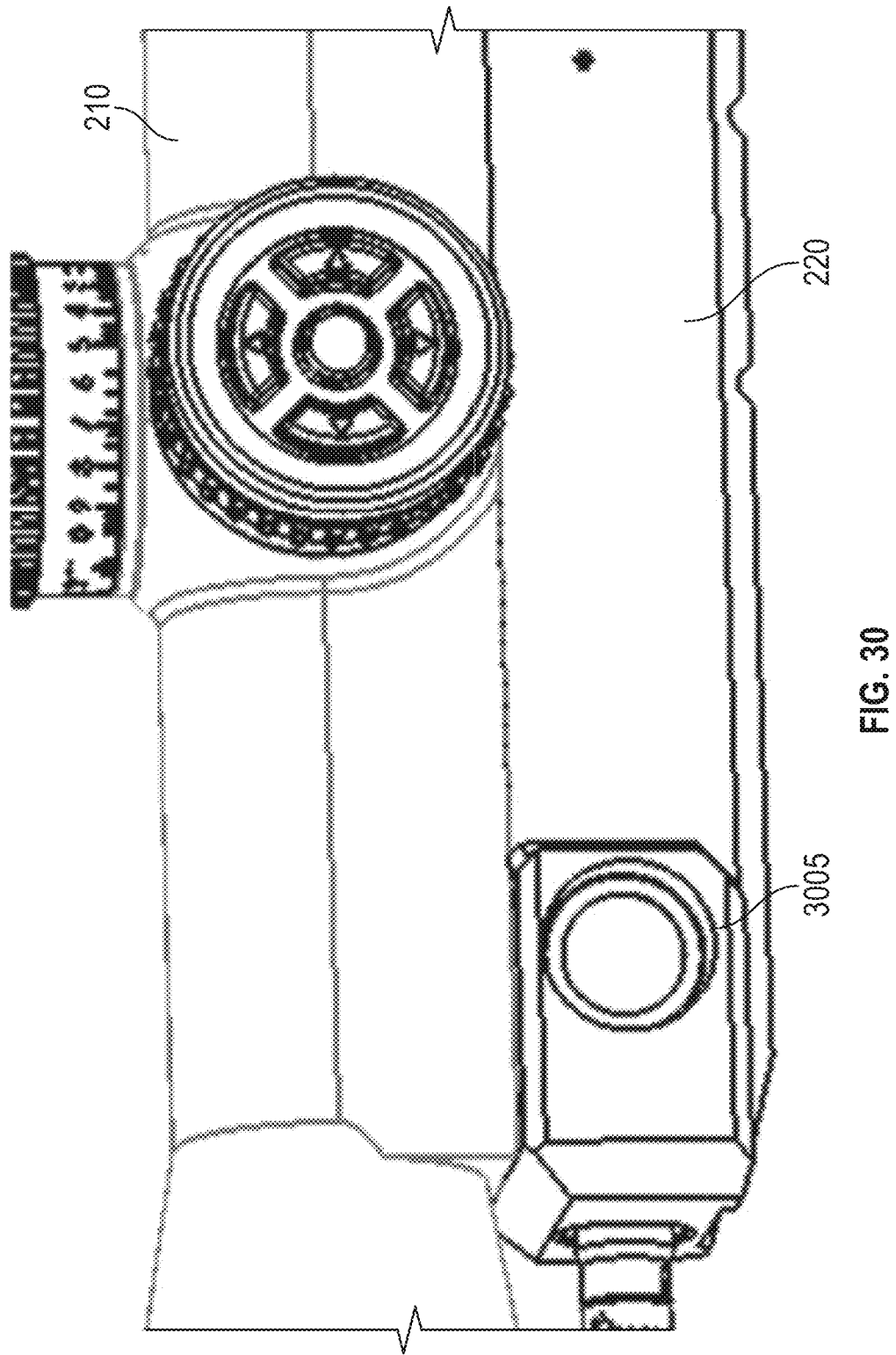
FIG. 30 is a representative schematic of a left side view of a battery compartment in a base that can couple to a main body of a riflescope according to one embodiment of the disclosure.
Figure 31:
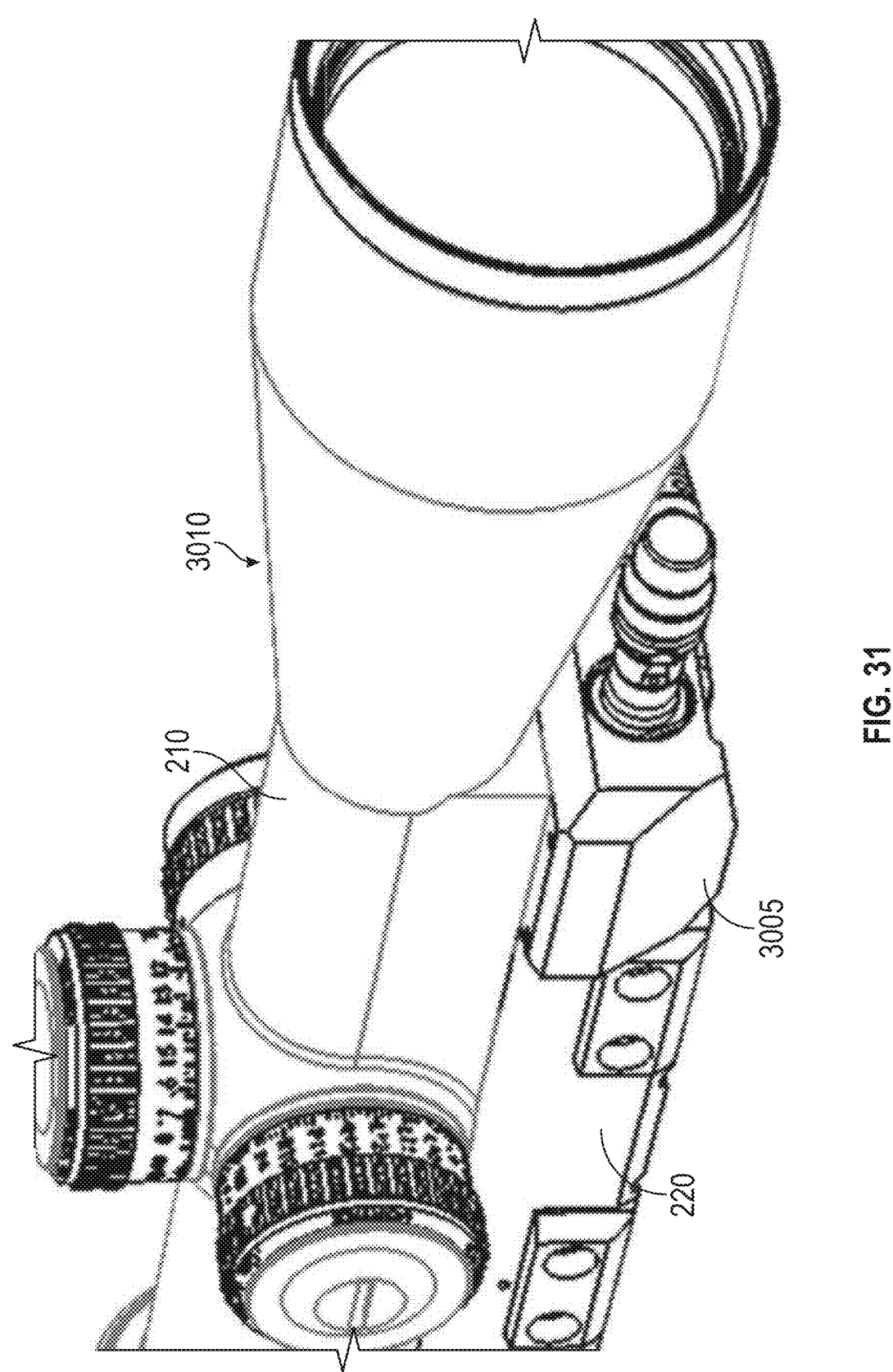
FIG. 31 is a representative schematic of a right side view of an integrated battery compartment in a base that can couple to a main body of a riflescope according to one embodiment of the disclosure.

FIG. 30 is a representative schematic of a base 220 with a battery compartment 3005, wherein the base 220 is coupled to the main body 210 of a riflescope 3000. As shown in FIGS. 30 and 31, the battery cavity 3005 extends from each side of the base to encase a battery, including but not limited to a CR123 battery. The CR123 battery has increased power capacity and discharge as compared to smaller batteries or coin style batteries.

In one embodiment, the battery cavity 3005 is integral to the base 220 so that only the battery cap is needed to protect the battery from the environment. No additional sealing is required.

In one embodiment, the battery cavity 3005 in the base 220 is located closer to the objective assembly 3010 of the main body 210 of a viewing optic as compared to the ocular assembly.

Figure 32:
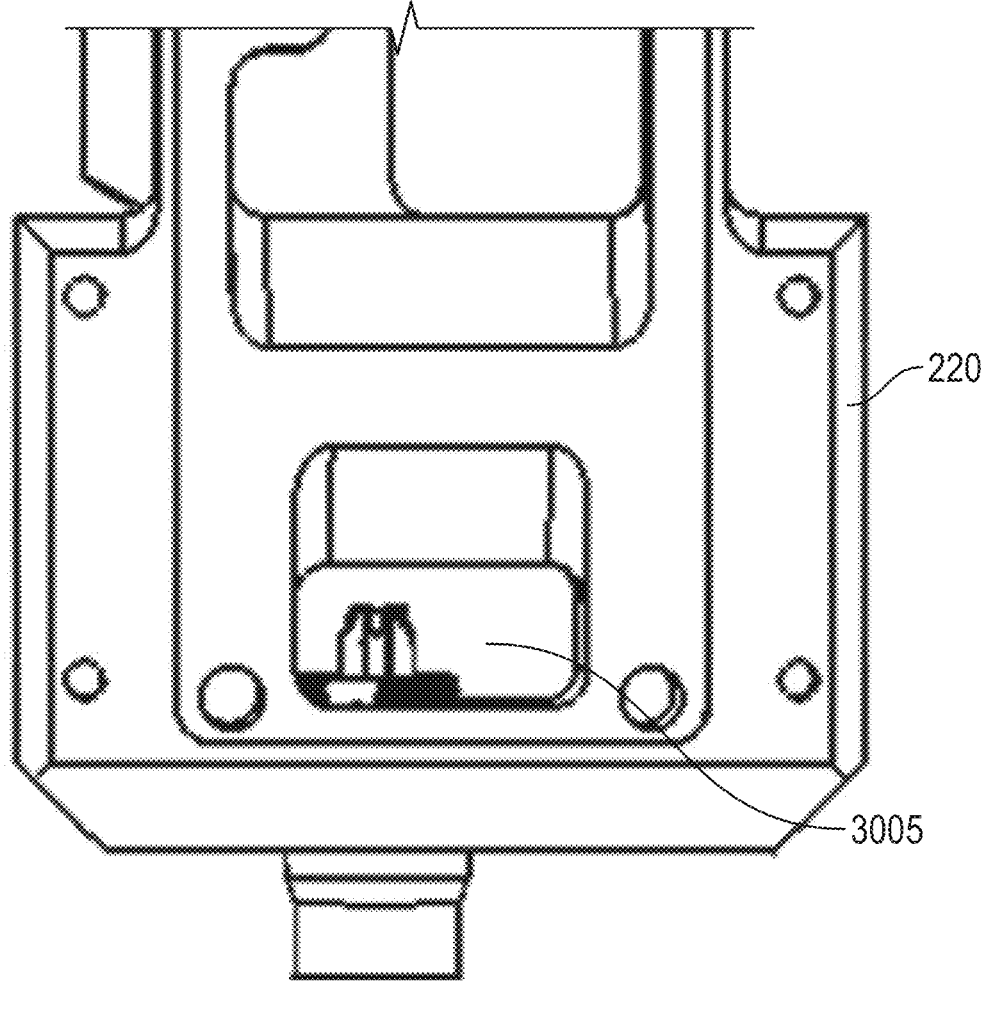
FIG. 32 is a representative schematic of a top view of an integrated battery compartment in base that can couple to a main body of a riflescope according to one embodiment of the disclosure.

FIG. 32 is a representative depiction of the battery compartment 3005 integrated into the base 220. In one embodiment, the cavity 3005 is designed to have the positive side of the battery inserted first with a mechanical stop at the bottom of the battery cavity to prevent improper installation and operation of the battery.

In one embodiment, the integrated battery cavity 3005 can use the same gasket as the base 220 uses to the main body 210 of the riflescope. This provides a more reliable seal and eliminates a mechanical device as a separate battery cavity is not required. Secondly, there is no mechanical device securing the battery cavity since it is integrated into the base. This reduces the need for any mechanical interface for securing the battery compartment. Because there is no need for mechanical locking of the battery cavity, the integrated battery compartment reduces the points of failure for a traditional battery compartment.

The integrated battery compartment eliminates any obstacles that are in the way of the user. The integrated battery compartment is located under the viewing optic out of the way of any of the adjustments and knobs found on traditional viewing optics. The integrated battery cavity is a significant advancement as it allows the necessary space to accommodate a larger battery.

In one embodiment, the viewing optic can be set-up in a manner to minimize battery drain and to maximize battery life. For example, the viewing optic with a laser rangefinder is activated when an operator presses a button or switch. A range finder designator is displayed on the screen. An external range finder's output laser will coincide with the designator through an initial calibration step when zeroing the viewing optic. When the external rangefinder is activated by the operator, information is sent to the viewing optic wirelessly or via the communication port signaling the device that information has been received and needs to be displayed.

If the viewing optic is turned on and no data is received from an external device, the viewing optic will power down after a user set time. After displaying received information from an external device, the power down timer is started and will power down the device if no further button presses are registered.

If more information is received from an external device, the screen will be cleared of the prior information and the updated information will be displayed and the power down timer will be started. This cycle can continue as many times as the operator chooses.

During the time when information is displayed on the screen, a cant indicator is displayed on the screen. This is refreshed from an accelerometer communicating with the microcontroller on a time interval. When the microcontroller is in sleep mode, the integral buttons on the viewing optic will control the brightness of LEDS illuminating a glass etched reticle. When the viewing optic is operating, control of these LEDS becomes suspended and the brightness of the screen will be altered during the corresponding buttons presses.

3. Picatinny Mount

In one embodiment, the disclosure relates to a viewing optic having a main body and a base with a battery compartment and a picatinny mount that can couple to the battery compartment. In one embodiment, a removable picatinny mount is attached to a protruded battery compartment that is incorporated into a base coupled to a main body of a riflescope.

Figure 33:
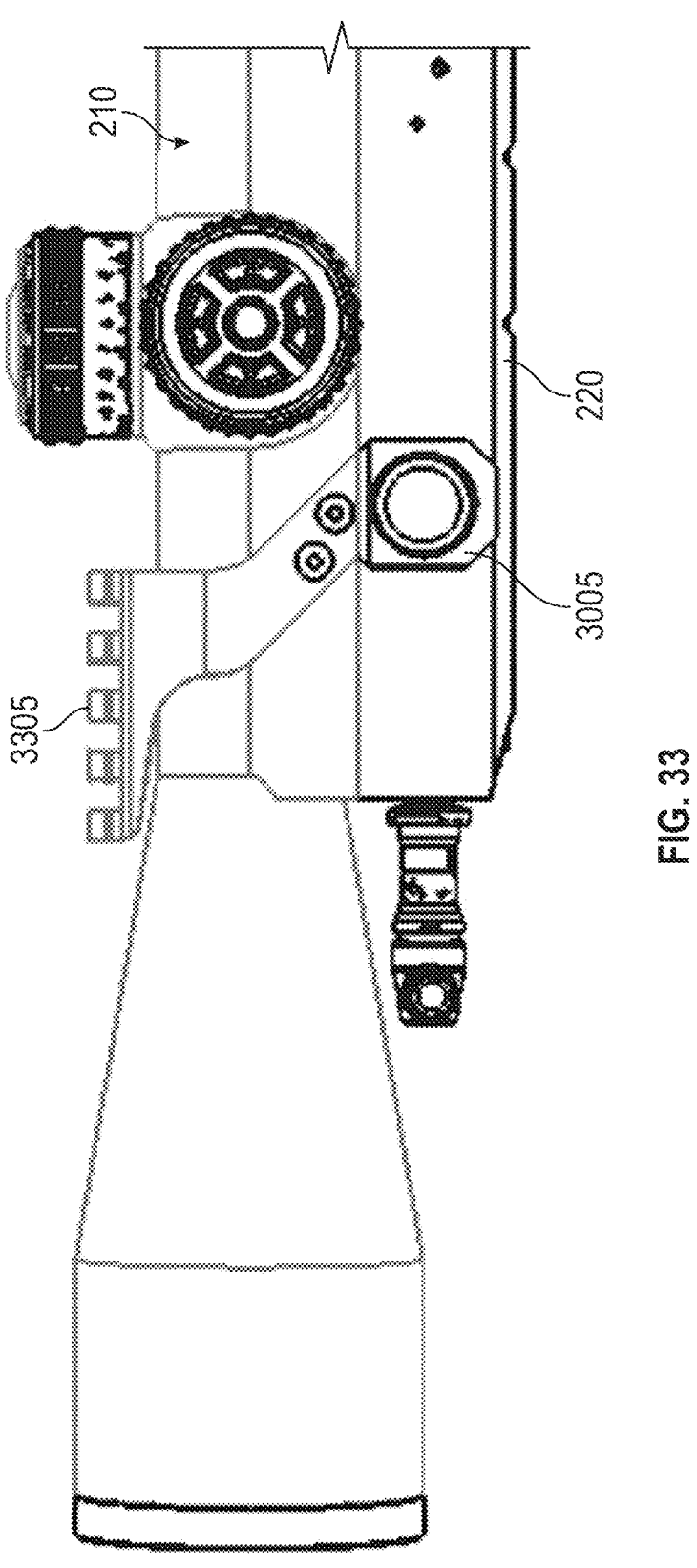
FIG. 33 is a representative schematic of a side view of a base with a battery compartment that can be used to couple to a picatinny mount according to one embodiment of the disclosure.
Figure 34:
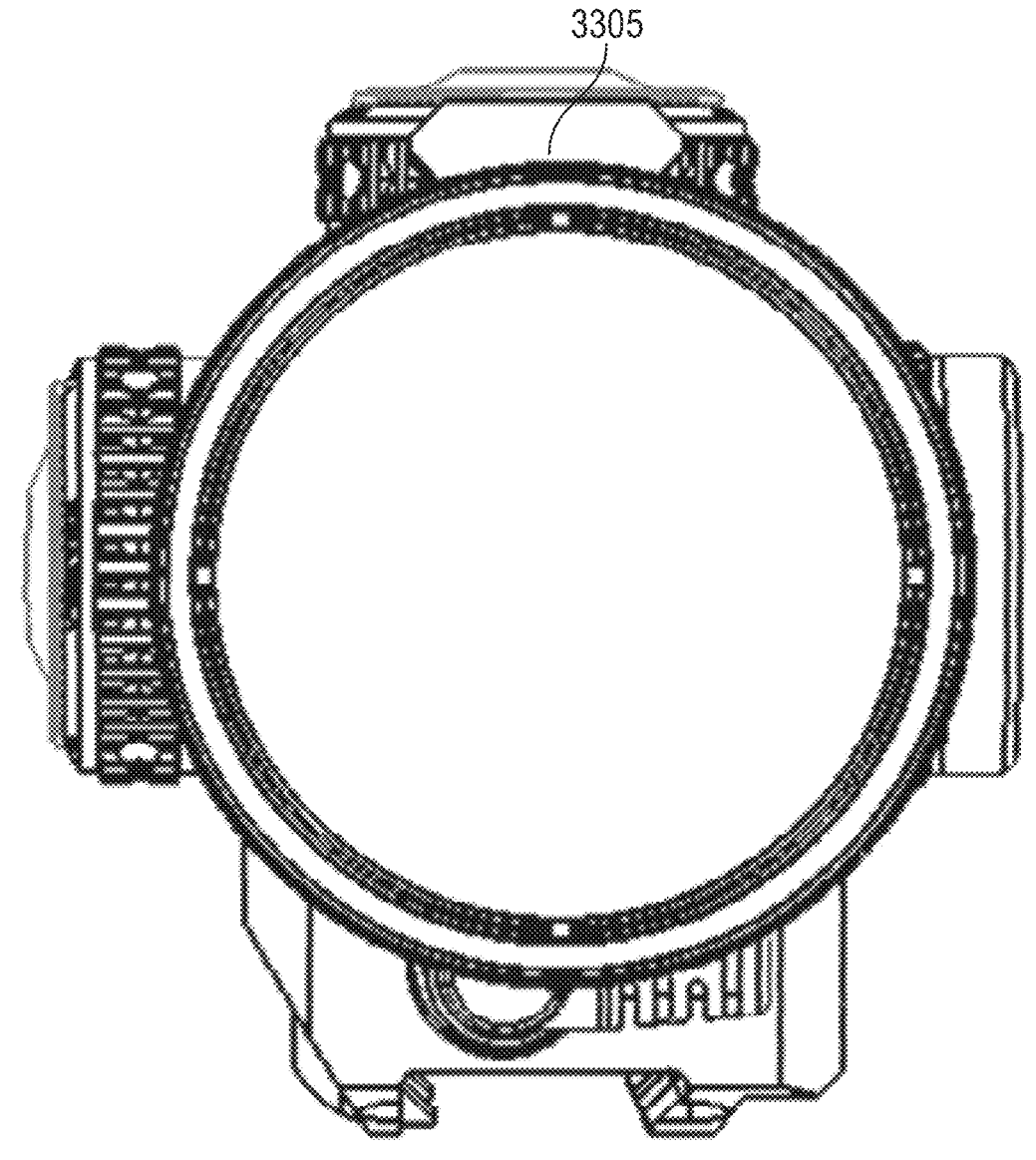
FIG. 34 is a representative schematic of a front view of cantilevered picatinny mount coupled to a battery compartment of a base according to one embodiment of the disclosure.
Figure 35:
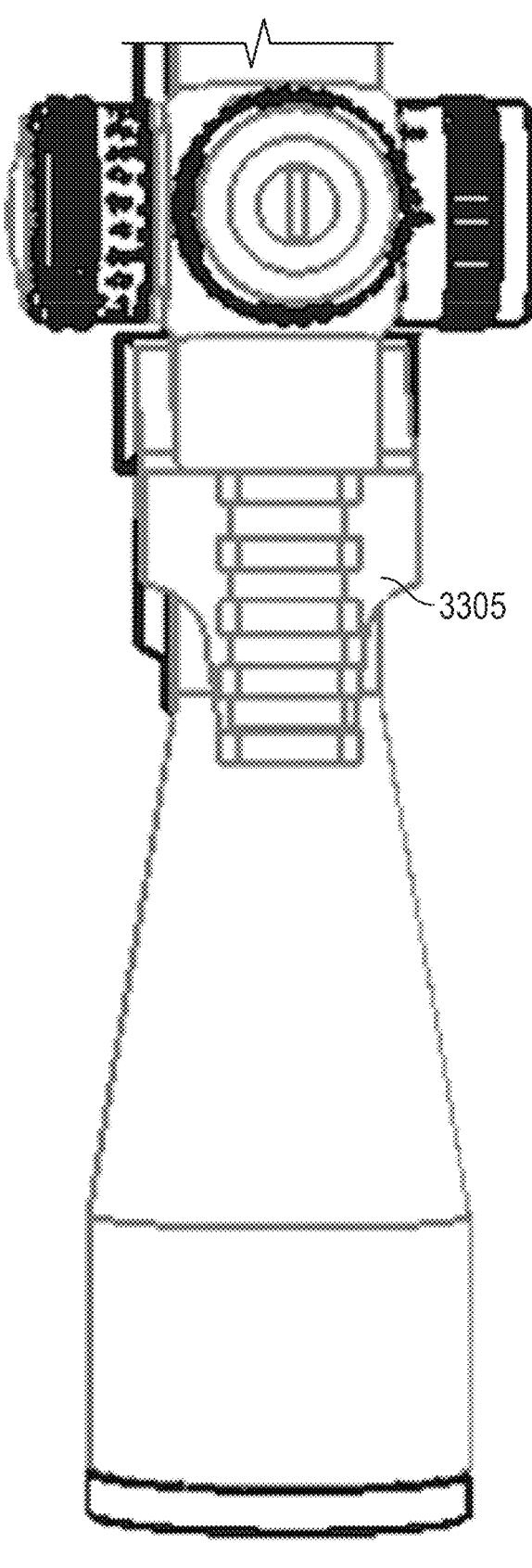
FIG. 35 is a representative schematic of a top view of cantilevered picatinny mount coupled to a battery compartment of a base according to one embodiment of the disclosure.

FIGS. 33-35 are representative schematics of a riflescope with a main body 210 and a base 220 coupled to the main body 210, with the base having a battery compartment 3005 that can attach to a picatinny mount 3305. In one embodiment, the picatinny mount 3305 is aligned with the battery compartment 3005 and secured with fasteners.

By attaching the mount 3305 to the battery compartment 3005 of the base 220, it utilizes the material needed to make the cavity 3005 for the battery. This eliminates the need for any additional material from the base, thereby making the viewing optic lighter and less invasive.

In one embodiment, the mount is located towards the objective of the turrets and parallax knob so as to not intrude on the user's ability to adjust the riflescope. Further, the top ring is removable allowing for easy attachment of an accessory device, such as a laser rangefinder. By utilizing the picatinny mount disclosed herein, no additional structural support from the top portion of the ring is needed since the integrated base secures the riflescope.

In one embodiment, the mount incorporates a cantilevered picatinny rail that extends forward towards the objective of the riflescope. This allows a weapons mounted laser range finder to sit directly over the bell of the riflescope. This style of mount allows for decreased shift of impact and increased accuracy of the ranging device. It decreases the potential for shift of impact since there are fewer variables that may affect the ranging device from acquiring the desired target.

4. Data Ports

In one embodiment, the disclosure relates to a viewing optic with a main body and a base with an active micro display for generating an image and combining the generated image into the image of the scene in the First Focal Plane of the main body of the viewing optic, wherein he base has axially orientated data ports for interfacing with ancillary devices including but not limited to remote control switches and laser rangefinders.

Figure 36:
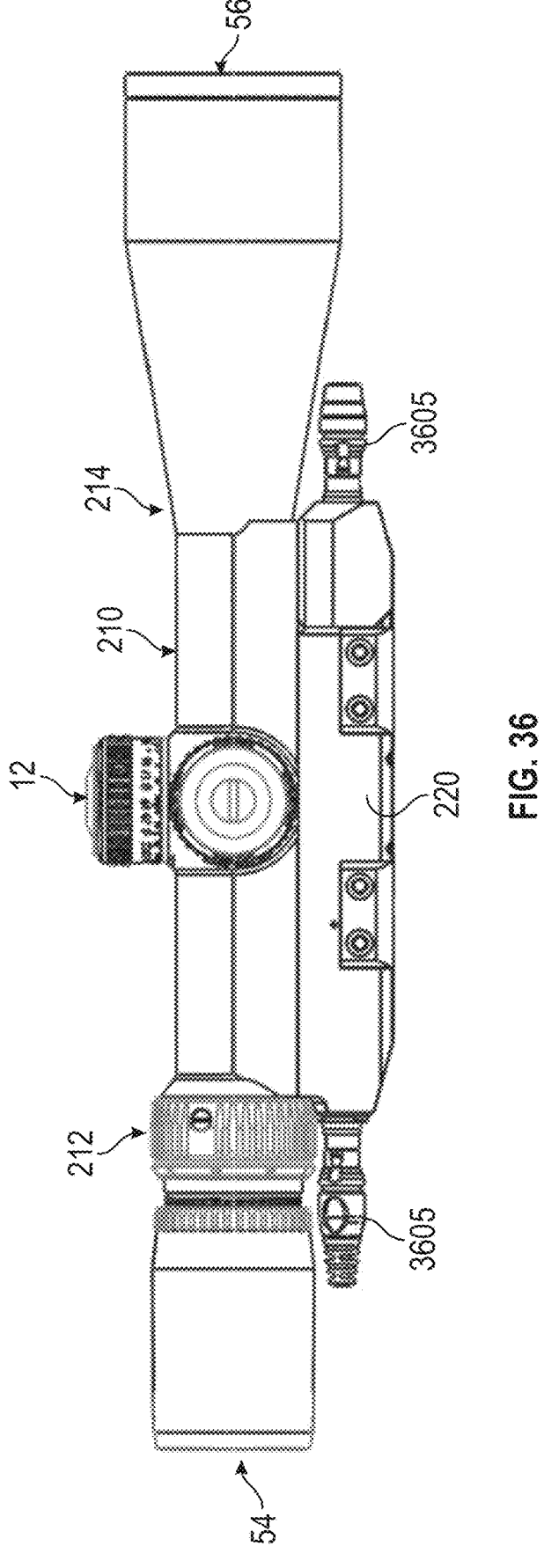
FIG. 36 is a representative schematic of a side profile view of the riflescope with a main body and a base having axially orientated data/communication connections according to one embodiment of the disclosure.

FIG. 36 is a representative schematic of a riflescope 3600 with a main body 210 and a base 220 with axially oriented data ports 3605. In one embodiment, the viewing optic can have one axially oriented data port. In another embodiment, the viewing optic can have two or more axially oriented data ports.

By utilizing an axially oriented data port 3605, the top down profile of the overall viewing optic is minimized, thereby increasing the robustness of the mounted system and its connections.

5. External Video Sources

In one embodiment, the active display in the base can be used as the optical train or optical system of a clip on device, including but not limited to a thermal imaging system and a night vision system.

Thermal imaging systems allow for various waves of the electromagnetic spectrum to be imaged and relayed to the user, which typically cannot be captured by the human eye. Traditional thermal weapon sights are composed of two systems paired together: an infrared optical system, which views the scene and a visible wavelength optical system consisting of a micro display and lenses to recreate the image in front of the riflescope. There are also instances of catalytic photon enhancement, creating what us known as "night vision" systems. However, clip-on devices are typically attached to the rifle rail in front of the main body of the riflescope. This setup blocks all of the ambient light typically imaged by the scope, and allows for use of the digital image only. In order to switch back to the traditional image, the user must remove the system from the rail. This can cause an impact shift due to the alignment setup that you go through each time the sight is changed. These clip-on units also tend to be large, due to the need for an eyepiece/imaging system behind the digital display in the units. In traditional systems, any live video feed would be a completely digital image, including the visible spectrum output.

Figure 37:
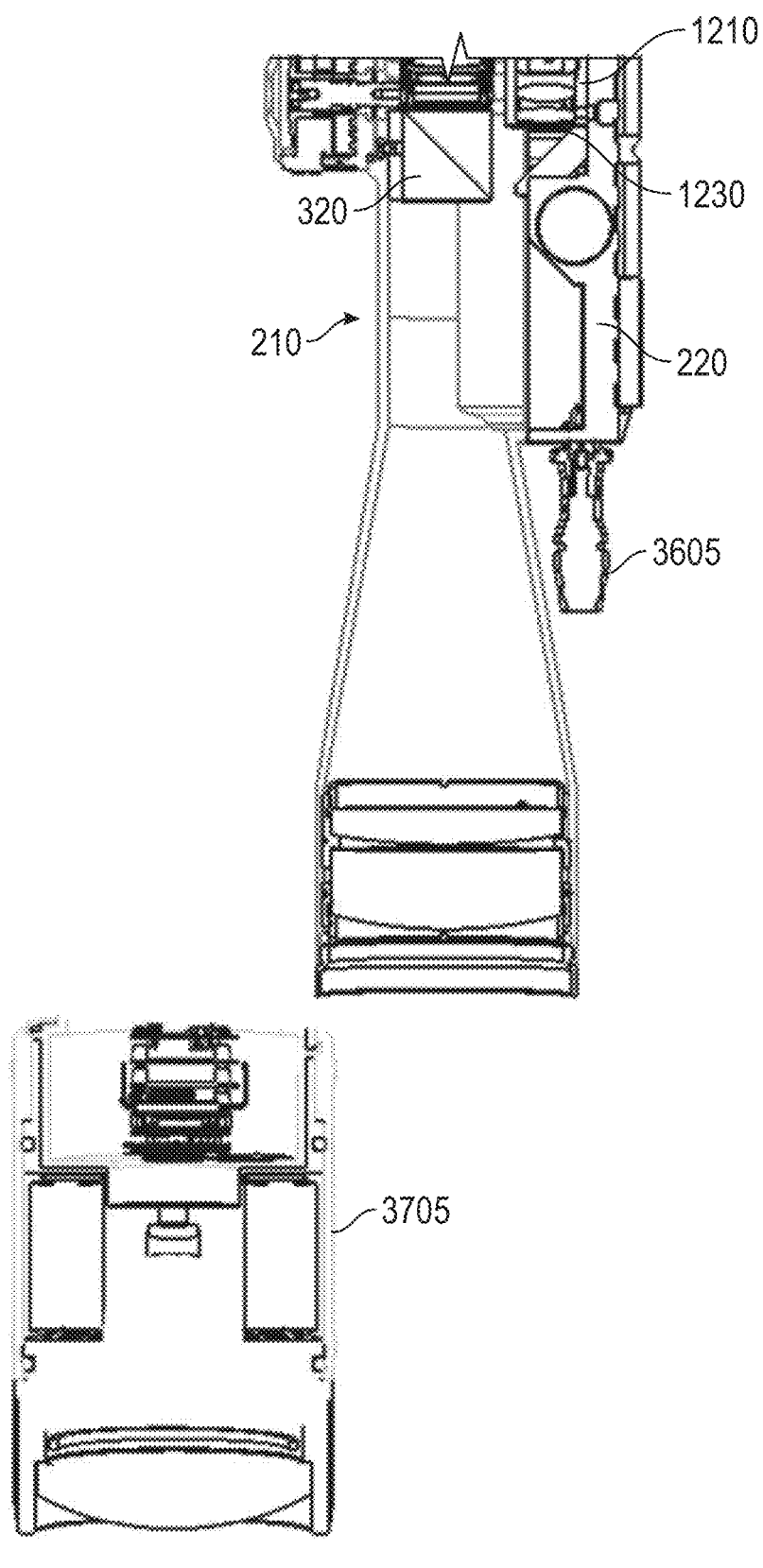
FIG. 37 a representative schematic of a riflescope with a main body and a base having one or more connection interface for communicating with a thermal imaging unit according to one embodiment of the disclosure.
Figure 38:
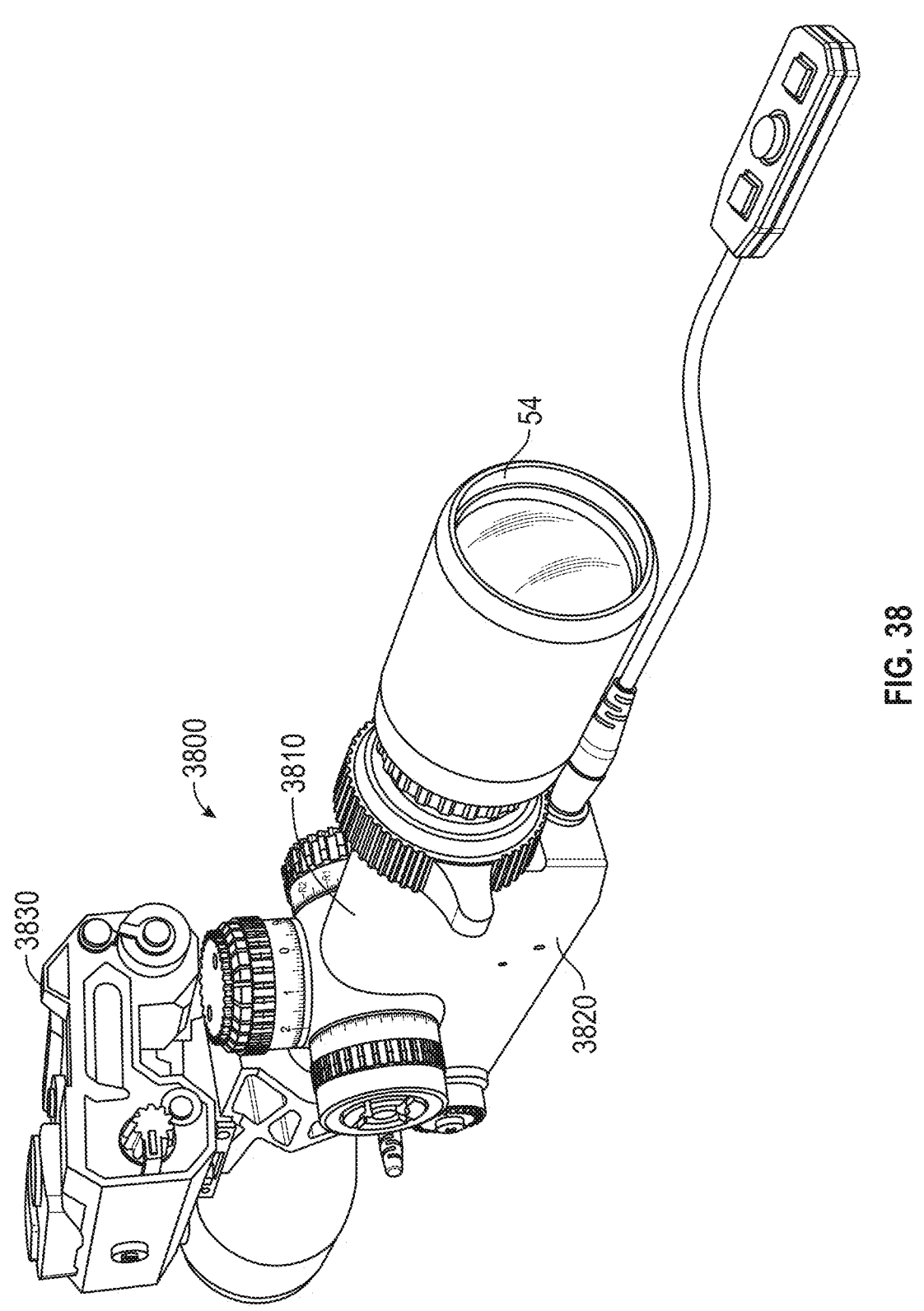
FIG. 38 is a back, left-side view of one embodiment of a riflescope with a laser rangefinder according to one embodiment of the disclosure.
Figure 39:
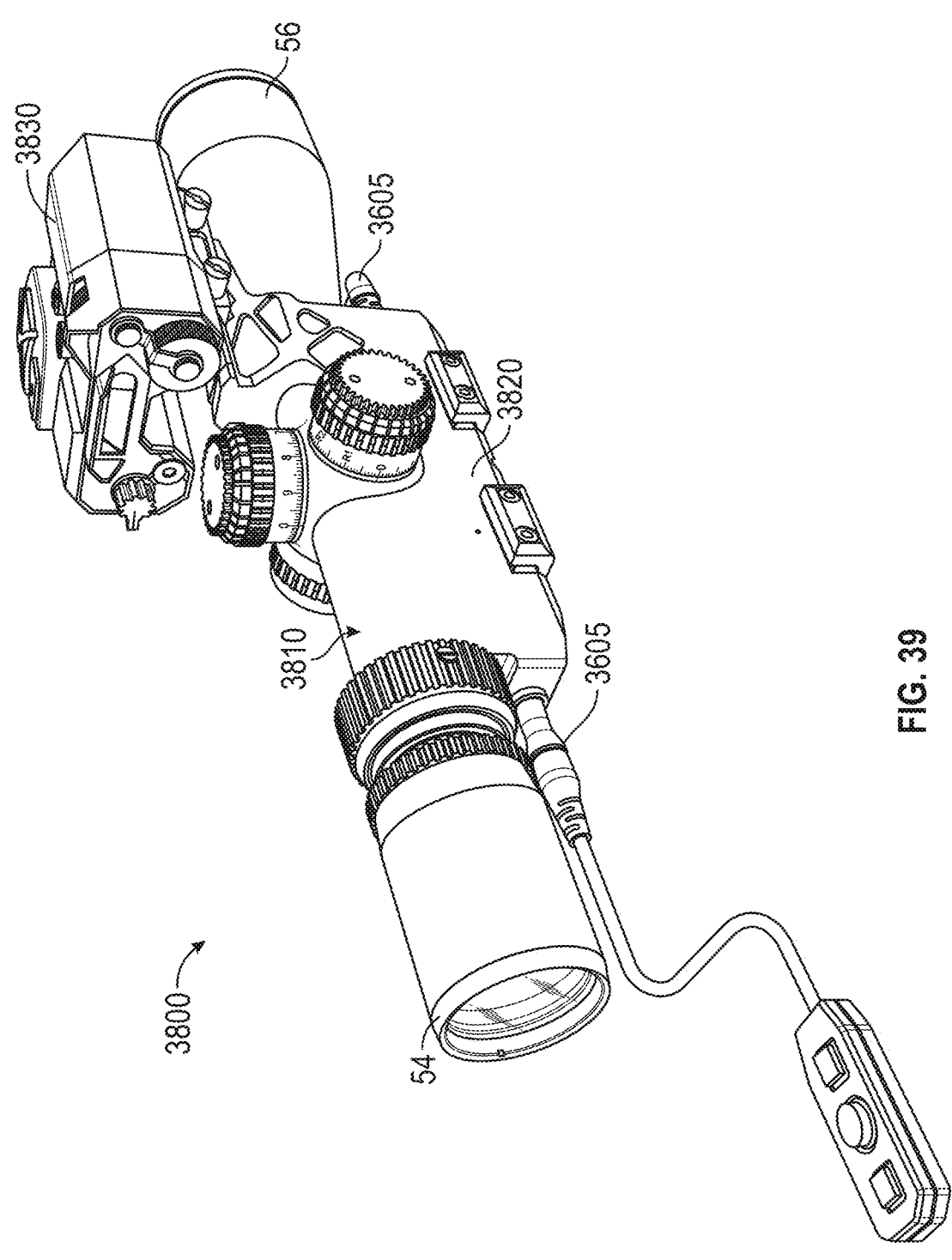
FIG. 39 is a back, right-side view of one embodiment of a riflescope with a laser rangefinder according to one embodiment of the disclosure.
Figure 40:
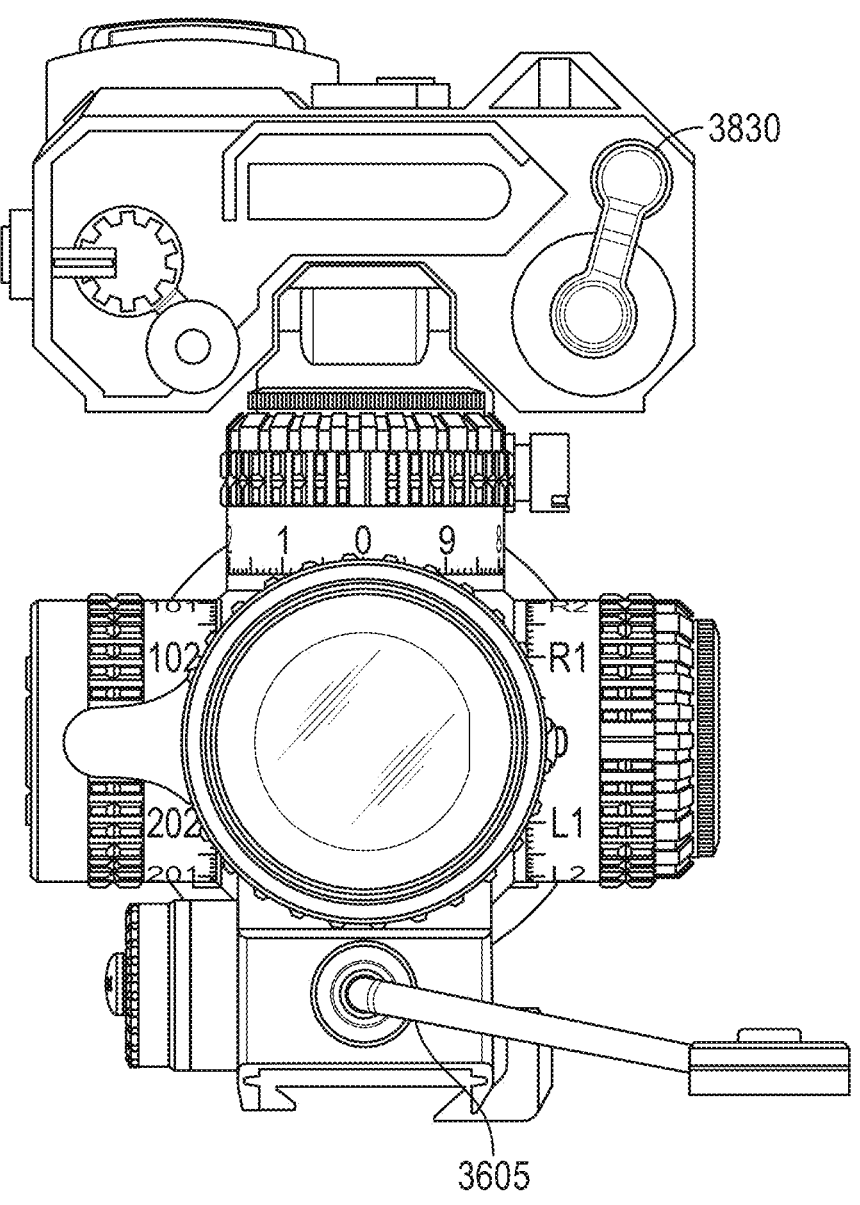
FIG. 40 is a back, right-side view of one embodiment of a riflescope with a laser rangefinder according to one embodiment of the disclosure.
Figure 41:
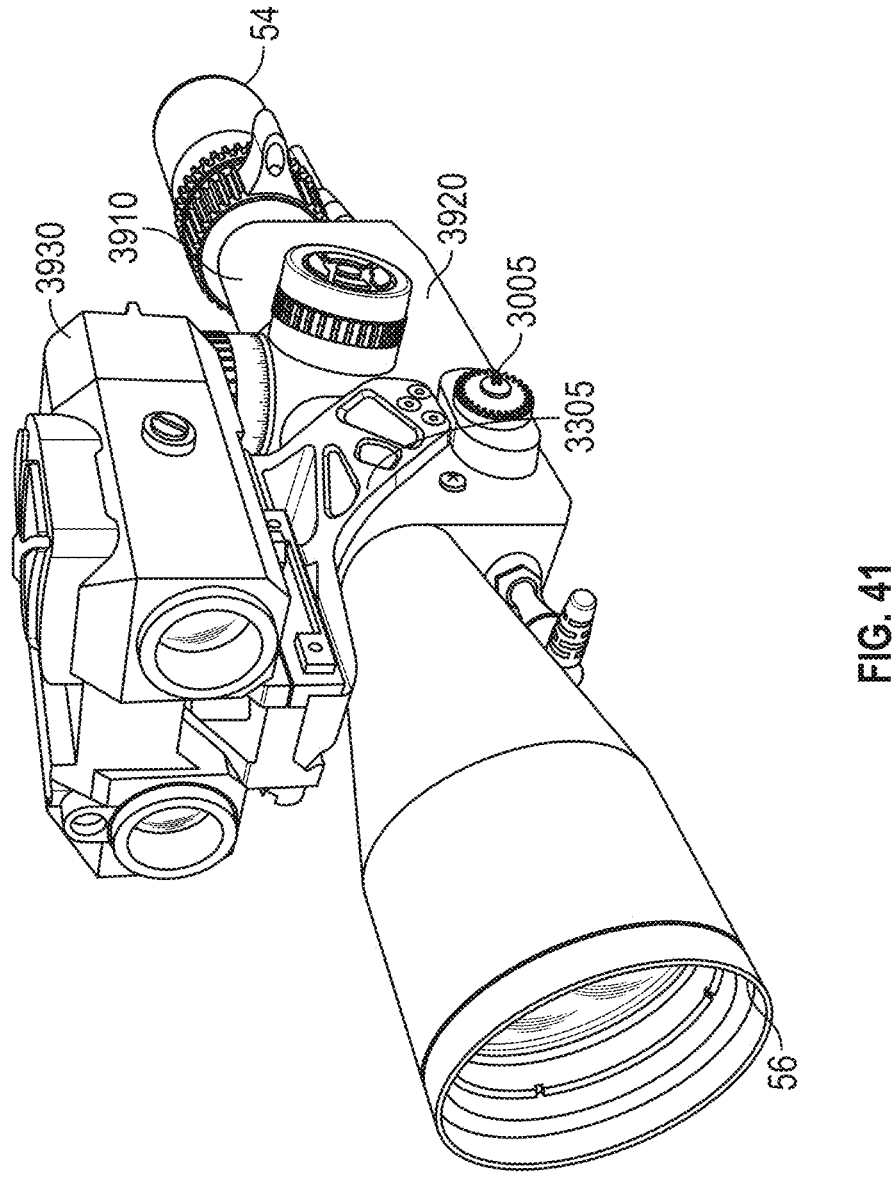
FIG. 41 is a front, left-side view of one embodiment of a riflescope with a laser rangefinder according to one embodiment of the disclosure.
Figure 42:
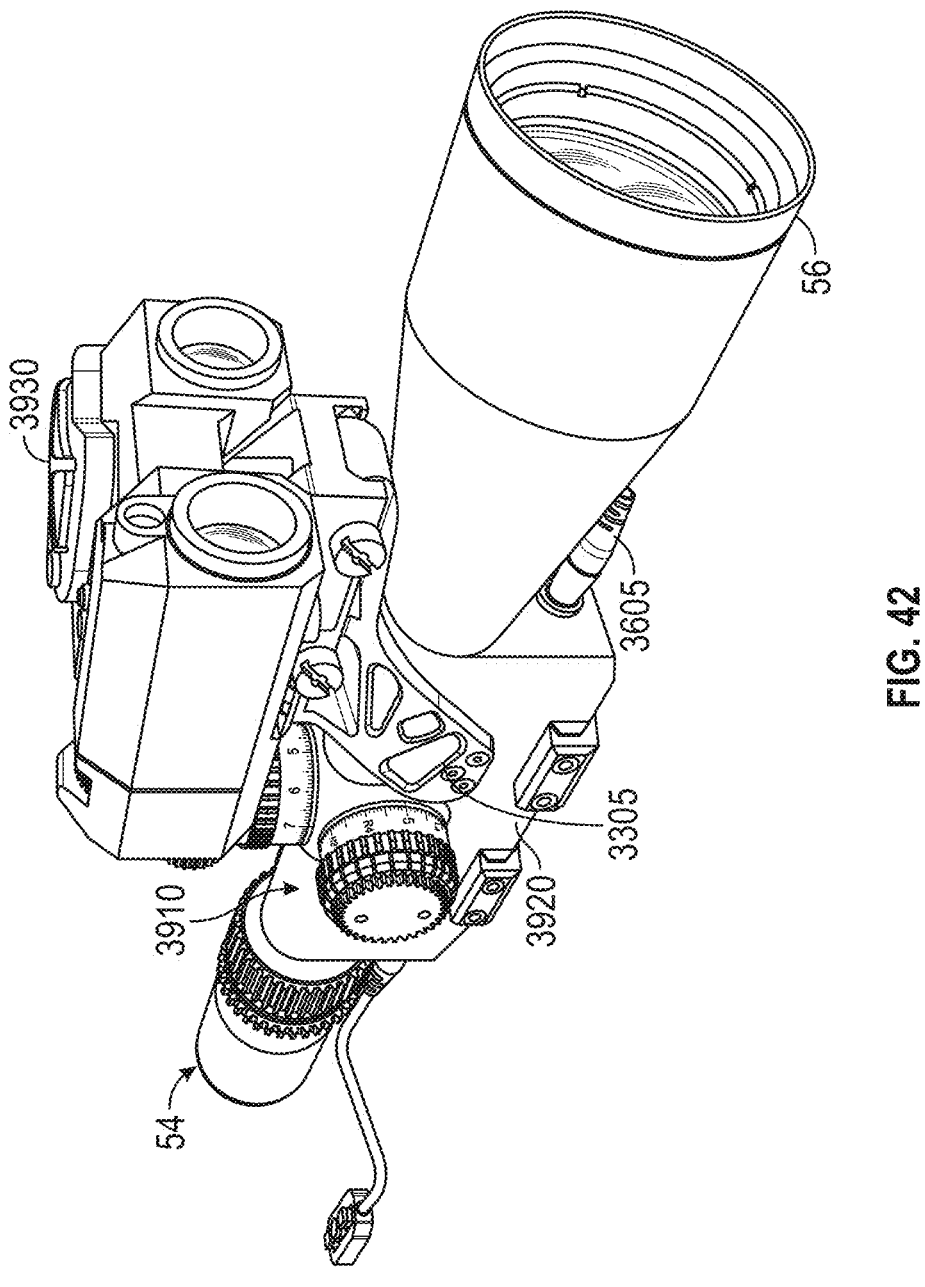
FIG. 42 is a front, right-side view of one embodiment of a riflescope with a laser rangefinder according to one embodiment of the disclosure.
Figure 43:
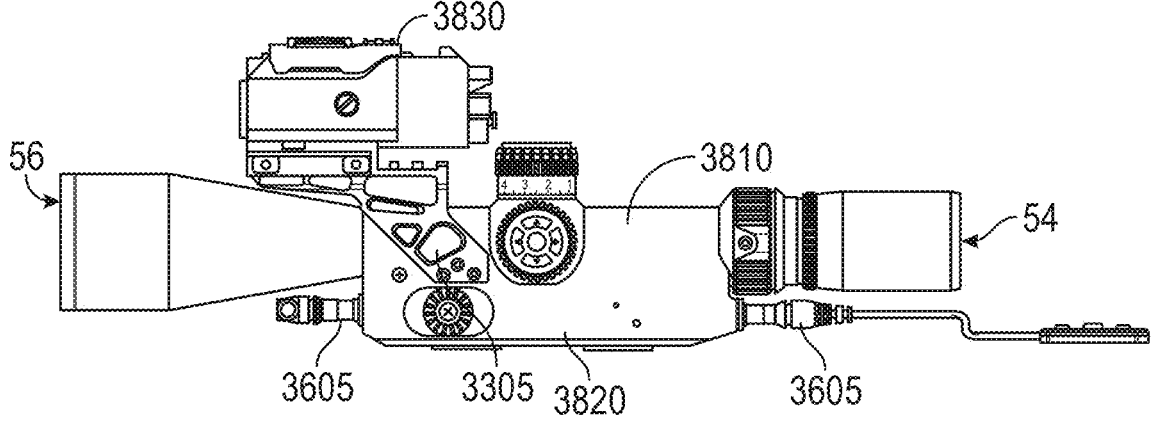
FIG. 43 is a left-side view of one embodiment of a riflescope with a laser rangefinder according to one embodiment of the disclosure.
Figure 44:
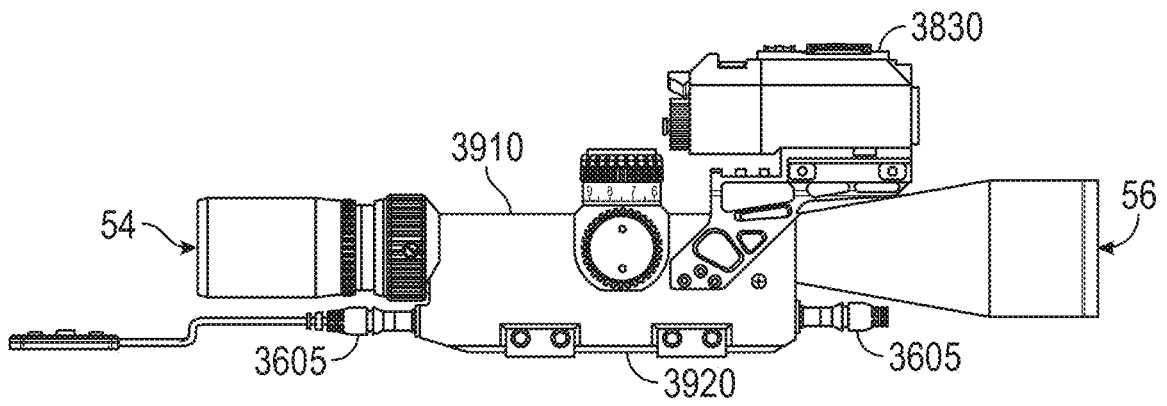
FIG. 44 is a right-side view of one embodiment a riflescope with a laser rangefinder according to one embodiment of the disclosure.

FIG. 37 is a representative schematic of a riflescope 3700 with a main body 210 and a base 220 with an active display 1210 and collector optics 1220 that can be used as the optical system of a thermal imaging unit 3705. The active display 1210 generates an image that is focused on a first focal plane of the main body of the scope, using a beam combiner to integrate the image into the traditional day optic. The integration of the digital display allows for the user to overlay the digital image onto the ambient day optic. With the digital display disclosed herein, the clip-on unit does not have to be removed from the front of the viewing optic to view the ambient day optic. Rather, the digital display can be turned on and off as needed.

The integration of the digital display allows for zero image shift when switching between day visible and digital optic. Since the system is fully integrated, there is no need to zero each time the digital optic is turned on. The system is synchronous, due to the alignment of the combiner optical system.

In one embodiment, the integration of the digital display makes up the optical train that would typically be the rear half of a clip-on unit. Because there is already a micro display in the base of the viewing optic, the thermal sight would only need the infrared optics; the image created by the thermal sensor can be transmitted to the active display, which is already incorporated into the base of the viewing optic. By integrating a thermal or NV sight in this manner, the thermal/NV device will be much shorter and lighter than current weapon sights on the market. This allows for the design of smaller lighter systems, since half of the optical train is now integrated directly into the base that couples to the main body of a viewing optic. There is no need for a rear optical system or display to be integrated into the clip-on unit that contains the sensing device.

Additionally, if the thermal weapon sight were to be mounted off to the side of the riflescope so that the thermal optics did not occlude the riflescope objective, then it would be possible to overlay a thermal image overtop of the visible image that the user would be viewing. This would have the benefit of being able to highlight humans, animals, or anything with a heat signature that stands out in an otherwise neutral daylight scene.

In one embodiment, the integration of the digital display disclosed herein creates the advantage of having live video feed into the focal plan of a viewing optic, without interruption of the day visible sight.

In one embodiment, the integration of the digital display allows for seamless integration of imaging overlays, such as live thermal imaging view, and hyperspectral overlay systems. The visible image is now analog, rather than another digital display.

In one embodiment, the integration of the digital display disclosed herein creates the advantage of continued image feed, even if power were to suddenly drain on the digital system. A true analog image would still be available, which would not be the case in traditional digital output systems.

In one embodiment, the integration of the digital display allows for multiple types of imaging systems to be mounted separate from the front of the viewing optic. A thermal imaging system can be aligned to the bottom or side of the viewing optic and still feed that image directly onto a focal plane within the main body of the viewing optic.

6. EMI Permeable Window

In one embodiment, the main body, the base or both the main body and the base of a viewing optic can have a window that is sealed with a material transparent to the electromagnetic waves used for the wireless communication. Transparent materials include but are not limited to plastics, resins or epoxies.

In one embodiment, the window allows EM waves to propagate from the communicating device with reduced interaction from the metallic body of the viewing optic. This increases the rate at which data can be transmitted. It also allows the wireless communication device to operate at a lower power level due to reduced signal losses.

III. Additional Sensors/Devices

In another embodiment, the disclosure relates to a viewing optic with a main body and a base with an integrated display system and one or more sensors. In one embodiment, the sensors include but are not limited to a Global Positioning System, accelerometers, a magnetometer, MEMS rate sensors, tilt sensors, laser rangefinder.

A. Pointing Angie, Target Location, and Communication

In one embodiment, the viewing optic can have inertial MEMS Rate Sensors to determine the pointing angle of the weapon in inertial space. Example products are the LCG-50 by Systron Donner and the SiRRS01 by Silicon Sensing. In another embodiment, accelerometers can be incorporated into the embedded electronics to determine absolute tilt angle of the viewing optic and track weapon accelerations due to general movement or a firing event.

To support targeting, in various embodiments, the viewing optic can have a GPS and/or digital compass. In one embodiment, the GPS and/or digital compass can be integrated into the viewing optic, for example, as board level modules. In another embodiment, the GPS and/or digital compass can be associated with a separate device that communicates with the viewing optic.

Several manufacturers offer custom of the shelf modules for GPS and digital compass functionality that are small form factor and have low power consumption characteristics. These devices are designed to be integrated into embedded components. For example, Ocean Server Technology makes a OS4000-T compass with 0.5 deg. accuracy and has a power consumption under 30 ma and is less than ¾" square. An example of a GPS device is the DeLorme GPS2058-10 Module that is 16 mm×16 mm and is available in a surface mount package offering 2 meter accuracy.

In one embodiment, the viewing optic can have a data interface that provides one or both of wired and wireless capabilities designed to interface to systems such as the BAE Personal Network Node and the emerging SRW radio. These interfaces provide various communications capabilities, such as range, sensor, and other tactical data (e.g. anti-fratricide detector, environmental sensors, etc.). This unique functionality is used in various embodiments to obtain and communicate environmental, target, and situational awareness information to the community of interest. Generally speaking, the various embodiments are designed to enable the war fighter to quickly acquire, reacquire, process, and otherwise integrate data from a variety of passive and active sources into a ballistic firing solution thereby increasing the shooter's effectiveness.

In another embodiment, the sensors provide information to the active display in order to generate real time position data of different targets onto the first focal plane of the main body of the viewing optic. In another embodiment, the sensors are part of an external device that communicates with the integrated display system.

By using these sensors in the viewing optic, or on an external device that is rigidly connected to the viewing optic, or on a weapon that the viewing optic is mounted to, the exact position of the viewing optic can be obtained, as well as the exact direction that the viewing optic is pointed, and external targets can be calculated in relation to the viewing optic position and aimed direction.

As the user moves the viewing optic around or as targets move in relation to the viewing optic, the position of the targets would be updated continuously and in real time by the sensors communicating with the integrated display system, so that by viewing through the viewing optic the user would be able to see where the targets are in relation to where they are looking.

This approach has strong utility in military applications where you may have personnel in different locations that are trying to communicate a specific target location to one another. For example, with Close Air Support (CAS), a pilot may be flying an aircraft and a unit on the ground may be relying on the aircraft to drop a bomb on a target. Often times, it is difficult for the unit on the ground to relay to the aircraft the exact location of the target. The process of relaying the target information between the ground unit and the aircraft is often referred to as "talking on to the target," and involves communicating what the unit or aircraft is seeing in their field of view, such as what landmarks might be visible near the target and so on.

This process often takes quite a bit of time and can cause confusion because things often look different from the air than they do on the ground. It is critical that each unit be sure that they are all looking at the same target, because if the aircraft mistakes the target they may drop a bomb on friendly units, or non-combatants.

By allowing location and position sensors to communicate with the active reticle display of the integrated display system, these issues are solved. The user of the viewing optic can designate a target in their scope, the scope knows the GPS location of the scope, the exact direction it is pointing and distance to the target and can calculate the exact GPS coordinate of the target. This information can be fed into a universal system, such as Link 16, that all friendly units are connected to. Now the aircraft can simply look at a display in their aircraft and the new target is displayed on their map as soon as another unit designates it.

This makes finding targets much quicker and the confirmation that both units are looking at the same target much easier. Accuracy is extremely important in determining target locations, thus, the active display generated images need to be displayed in the first focal plane of the main body of the viewing optic. If the generated image from the active display were put into the second focal plane of the viewing optic, then the target locations would only be accurate when the viewing optic reticle was at its "zeroed" location. If the user of the viewing optic had dialed anything on their turrets, for example to engage a long range target, then all of the target information in the display would be shifted the amount dialed in the turrets and not be accurate.

By using this with the active display images injected into the first focal plane, the displayed data is agnostic of any adjustments made to the reticle position and is automatically compensated for. This means that target data in the field of view is always accurate.

B. Environmental Sensors

In one embodiment, the viewing optic can have one or more pressure, humidity, and/or temperature sensors designed to collect and use environmental data for ballistic correction purposes. The sensors are available in miniature configurations suitable for integration into the viewing optic. An example of a miniature, low power, water proof, barometric pressure sensor is the MS55440 from Intersema. This component measures 6.2×6.4 mm.

In one embodiment, the sensors can be coupled to the main tube of the viewing optic or to the base of the viewing optic.

C. Uphill and Downhill

In one embodiment, the viewing optic can have a z-axis accelerometer that can be used to measure tilt angle of the scope with respect to vertical. This tilt angle can be integrated into a ballistic solution at the time of target selection. Once the target is selected, the system may be able to automatically integrate actual uphill or down tilt into the ballistic solution and display the solution into the first focal plane of the viewing optic so that the digital reticle or corrected aiming point is displayed correctly. This can provide for a very fast and effective means of aiming in long range uphill or downhill engagements.

IV. Viewing Optic with Display System and Laser Range Finder

In one embodiment, the disclosure relates to a viewing optic having a main body and a base with an integrated display system, and a laser rangefinder. In one embodiment, the laser rangefinder is coupled to the viewing optic. In another embodiment, the laser rangefinder is independent from the viewing optic and communicates with the viewing optic, either wirelessly or through a cable.

In one embodiment, the laser rangefinder couples to the viewing optic via a mounting rail that attaches to the base through the battery compartment.

In one embodiment, a laser rangefinder can be used to determine distance to target. In various embodiments, the laser transmits in the near IR for covertness. A typical wavelength used for laser rangefinder devices operating in the near infrared (NIR) is 905 nm.

In one embodiment, the specific laser power and spectral characteristics are selected to meet range and eye safety requirements of the viewing optic. The rangefinder is of sufficient power to produce accurate measurements out to, illustratively, 1500 meters, 2500 meters or whatever effective range is associated with the firearm or weapon intended to be used with the viewing optic. For rangefinder operation, in some embodiments a single button control is dedicated for making or executing a rangefinder measurement.

In one embodiment, the range to target may be communicated to the active display that generates an image of the range to target and superimposes the range to target onto the first focal plane of a viewing optic when viewing the target scene.

In one embodiment, the viewing optic has a computing device with ballistics calculator capabilities. In one embodiment, the main body of the viewing optic has a computing device with ballistics calculator capabilities.

In one embodiment, a laser rangefinder can be used to measure a target distance, calculate projectile ballistics and communicate the corrected aim point to an active display in an integrated display system, which then superimposes the image of the corrected aim point onto the first focal plane of a viewing optic with a reticle attached to a moveable erector lens system.

Importantly, because the active display generated image is combined with the image from the target in front of the first focal plane and then focused onto the first focal plane, the target image and display image never move in relation to one another. Therefore, any aiming reference created by the digital display will always be accurate, regardless of how the moveable erector system is adjusted.

When an external laser range finder feeds range information to the riflescope, an aiming reference or laser designator will need to be created by the digital display in order for the user to know where in the field of view the LRF is aiming in order to accurately hit the correct target with the laser. The digital display image and the target image of the objective lens system in the main body of the riflescope do not move in relation to one another. Therefore, the digital laser designator will accurately show the user the correct location of the LRF laser point of aim, no matter how the turrets have been adjusted to move the moveable erector lens system.

On the other hand, if the digital display image was integrated into the optic system anywhere behind the first focal plane then when the turrets are adjusted, and the erector lens system is moved/tilted, then the image of the digital display would move in relation to the target image and the digital LRF designator would move in relation to the actual laser point of aim. This could lead to an incorrect range measurement if the user dials any elevation or windage adjustment into the turrets and forgets to dial back to the original position the turrets were set to when the user aligned the digital reticle with the actual laser point of aim.

In addition, when a traditional riflescope is zeroed to the rifle, the user will typically select a "zero" range, often times 100 yards, which is used align the riflescope reticle with the point of impact of the rifle projectile. This is usually accomplished by adjusting the turrets of the riflescope, and thus the angle of tilt of the erector lens system, in order to align the reticle with the point of impact of the projectile. After the initial "zero" of the riflescope has been set, the turrets allow the user to further make adjustments to the riflescope reticle position in order to compensate for targets at different ranges or for changing wind drift variables that affect where the point of impact of the projectile may change from the initial "zero" position.

If the digital display were to be integrated into the riflescope system behind the first focal plane then the ballistically calculated correction factor to the point of aim would have the potential to be incorrect if the user had made any adjustments to the turrets from the initial "zero." For example, if a ballistic calculator determined that the correction required 10 milliradians of elevation adjustment to hit the target, the digital display would place an aim point 10 milliradians below the center of the crosshair. However, if the user had dialed 5 milliradians into the elevation turret from the initial "zero" position, the digital aim point would actually be aiming 15 milliradians below the initial "zero."

By injecting the digital display into the first focal plane of the optic system of the main body of a riflescope, it allows the digital display to be totally unaffected by any change in the turret adjustment or position of the erector system. This means that in the example above, the digital aim point would actually appear only 5 milliradians below the center of the reticle, for a total of, the correct, 10 milliradian ballistic drop (user had previously dialed 5 milliradians into the elevation turret from the initial "zero" position). In short, injecting the digital display image into the first focal plane of the optic system of the main body renders the digital display image completely agnostic to any change in the turret position and thus the erector lens system movement/tilt, which provides the needed accuracy.

In one embodiment, the laser range finder capability provides dynamically defined ballistic solutions based upon data acquired. The range to target may be used by the on-board computer when processing tracer trajectory to determine the best point along the measured trajectory path to use for determining the ballistic correction for the next shot.

In one embodiment, the laser rangefinder is integrated into the scope and has a dedicated outgoing laser transmission port. In one embodiment, the optical path of this dedicated laser axis is positioned in the corner of the housing so it is unobstructed by the main objective lens. The detection path for the incoming reflected laser signal is through the main objective of the scope where the light is directed to a photo detector by a near IR beamsplitter. This arrangement takes advantage of the relatively large aperture of the main objective lens to increase the signal to noise of the measurement.

FIGS. 38 through 44 provides photographs of a viewing optic 3800 having a main body 3810 with an optical system and a base 3820 coupled to the main body 3810 having an integrated display system, with a laser range finder 3830 coupled to the top of the main body 3810. The viewing optic 3800 can have two auxiliary ports 3805 for communication with an external source. The viewing optic 3800 can have a picatinny mount 3305 that couples to the outside of a battery cap for a battery cavity 3005 in the base 3820.

Figure 45:
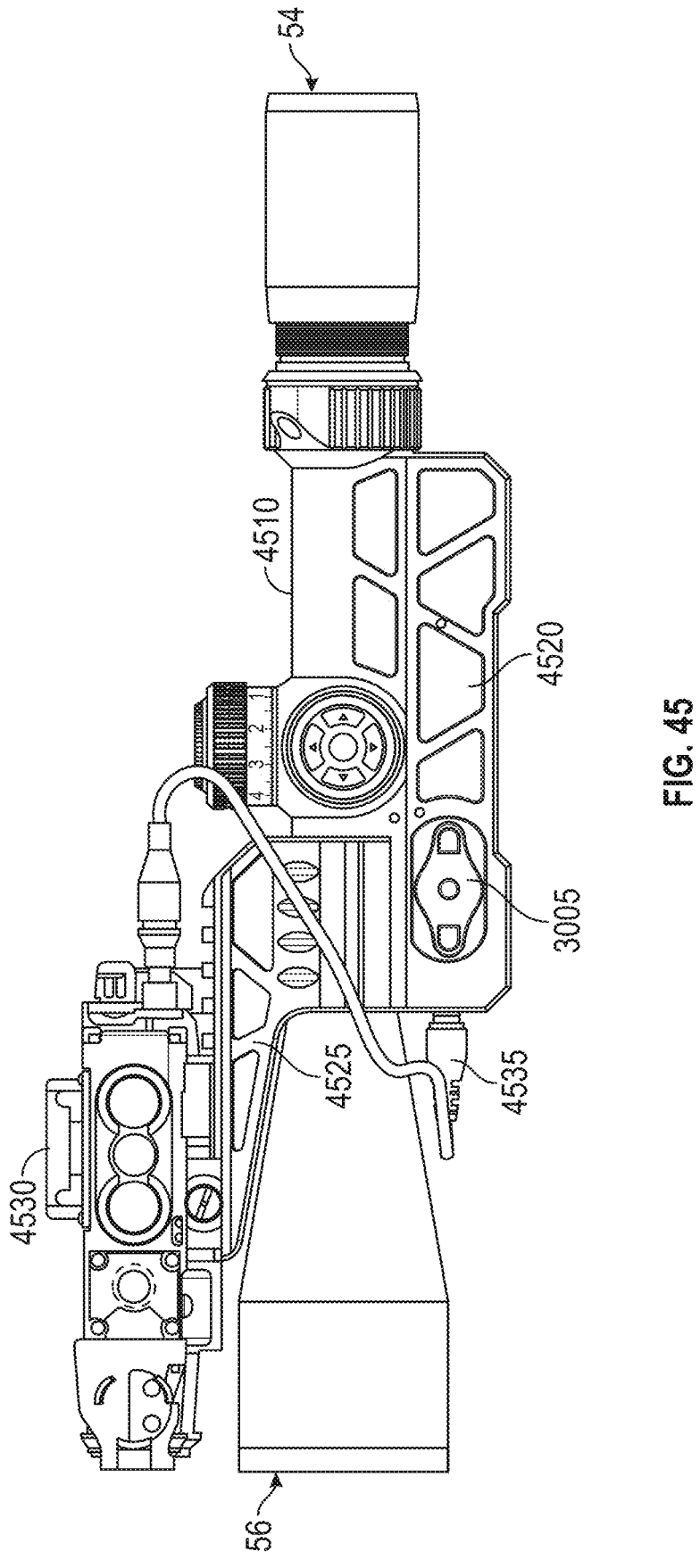
FIG. 45 is a right-side view of one embodiment of a riflescope according to one embodiment of the disclosure.
Figure 46:
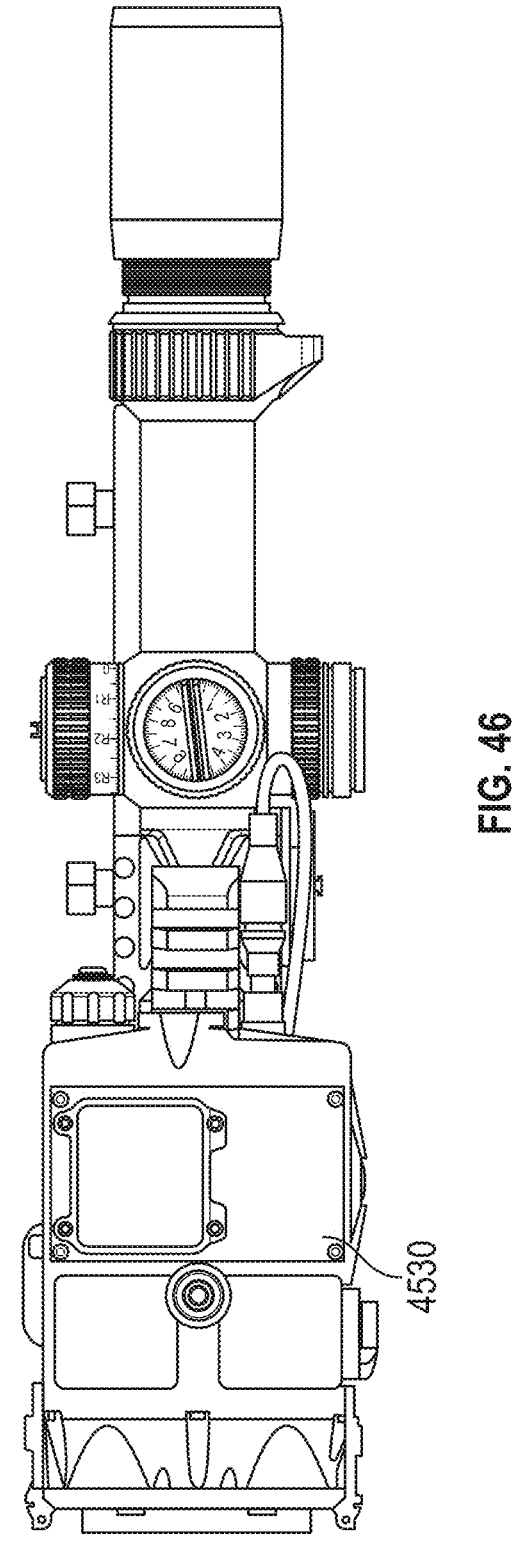
FIG. 46 is a top-side view of one embodiment of a riflescope according to one embodiment of the disclosure.

FIGS. 45 through 46 provide depictions of a viewing optic 4500 having a main body 4510 with an optical system and a base 4520 coupled to the main body 4510 having an integrated display system, with a laser range finder 4530 coupled to the top of the main body 4510. The viewing optic 4500 can have a single auxiliary port 4535 for communication with the laser range finder 4530.

Figure 47:
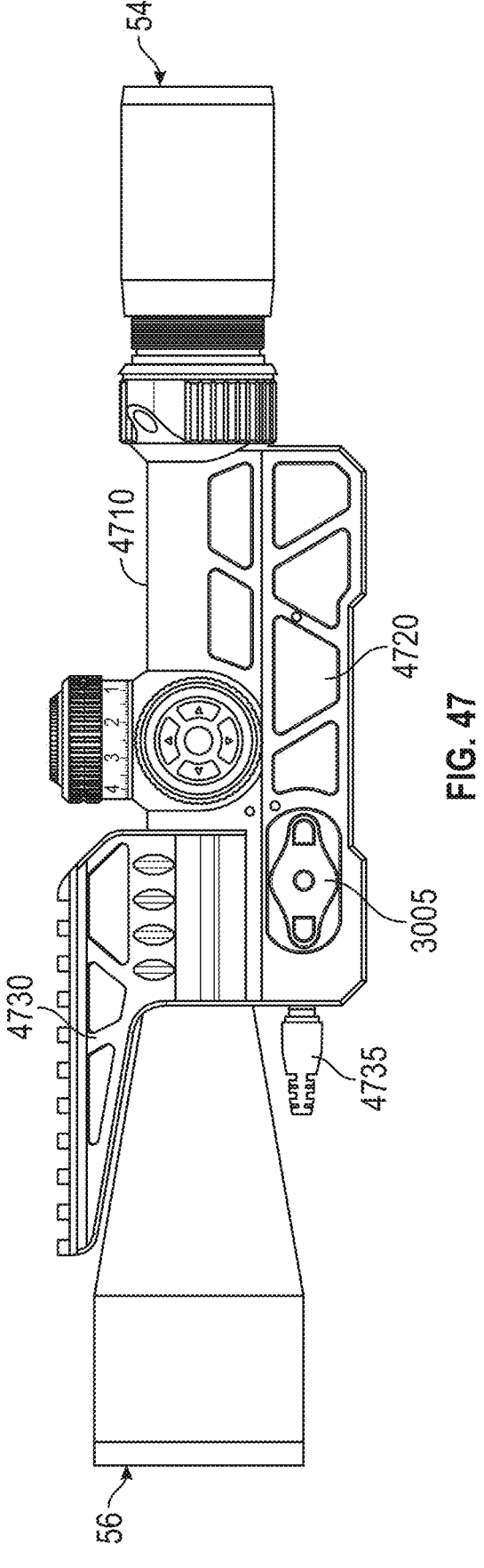
FIG. 47 is a right-side view of one embodiment of a riflescope with a laser rangefinder according to one embodiment of the disclosure.
Figure 48:
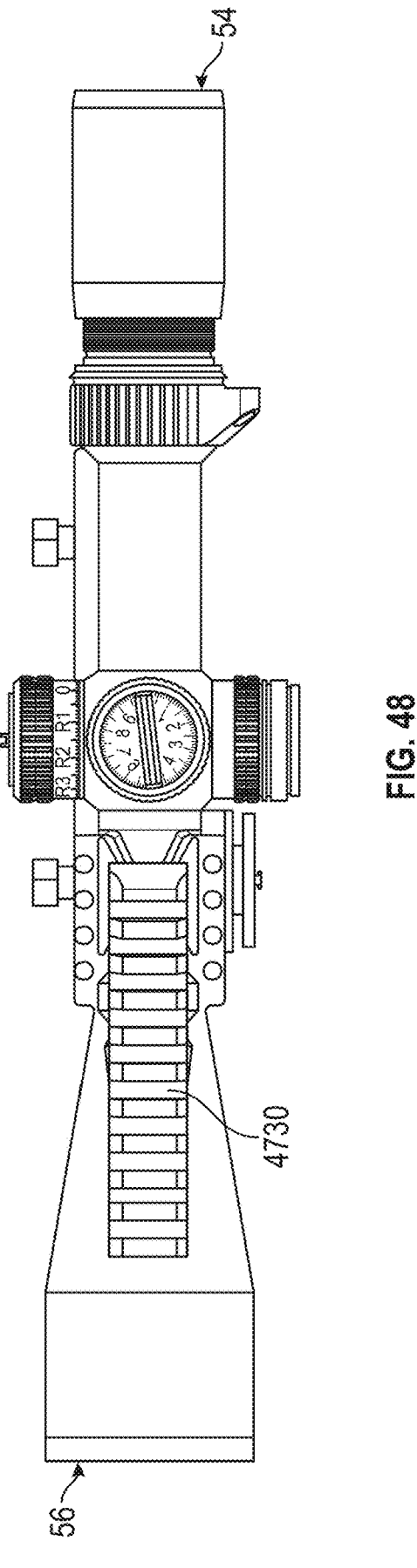
FIG. 48 is a top-side view of one embodiment of a riflescope with a laser rangefinder according to one embodiment of the disclosure.

FIGS. 47 and 48 provide depictions of a viewing optic 4700 having a main body 4710 with an optical system and a base 4720 coupled to the main body 4710 having an integrated display system. In certain embodiments, the viewing optic 4700 can have a picatinny mount 4730. In certain embodiments, the viewing optic can have an auxiliary port 4735.

V. Additional Embodiments

1. Digital Zeroing

In one embodiment, the disclosure relates to method for using a digital reticle for alignment and zeroing purposes. In one embodiment, the viewing optic has a physical reticle and a digital reticle, with the physical reticle being connected to the erector system. The user "zeros" the physical reticle by using turrets to move the reticle and erector system so that the center of the reticle coincides with the bullet point of impact.

After the physical reticle is zeroed, the digital reticle must also be zeroed. Since the digital reticle is formed by an active or digital display that is fixed in position, the only way to zero or align the digital reticle is by using a digital means. The digital reticle position can be moved by the user so that the center of the digital reticle coincides with the center of the physical reticle.

In another embodiment, digital zeroing can also be used with a laser designator. When used in conjunction with an external laser range finder, the viewing optic laser designator must be aligned with the direction that the laser range finder is pointing. Most external laser rangefinders have a visible laser and an infrared laser. The infrared laser is the laser that actually measures the range. The visible laser can be turned on an off and coincides with the aim of the infrared laser. The visible laser allows the user to see where the laser is aiming. Once the visible laser is turned on, the user can then digitally adjust the laser designator to coincide with the point of aim of the visible laser. Then the visible laser can be turned off and the user can use the laser designator in the viewing optic display to ensure accurate aiming of the laser rangefinder.

2. Holographic Waveguide

In one embodiment, the disclosure relates to a viewing optic having a main body with a first optical system and a base with active display and a holographic waveguide. In one embodiment, the integration of the holographic waveguide reduces the package size and weight of a traditional beam combining system. The integration of the holographic waveguide can increase the overall transmitted brightness ratio, such that a greater percentage of each optic system light gets to the end user.

Figure 49:
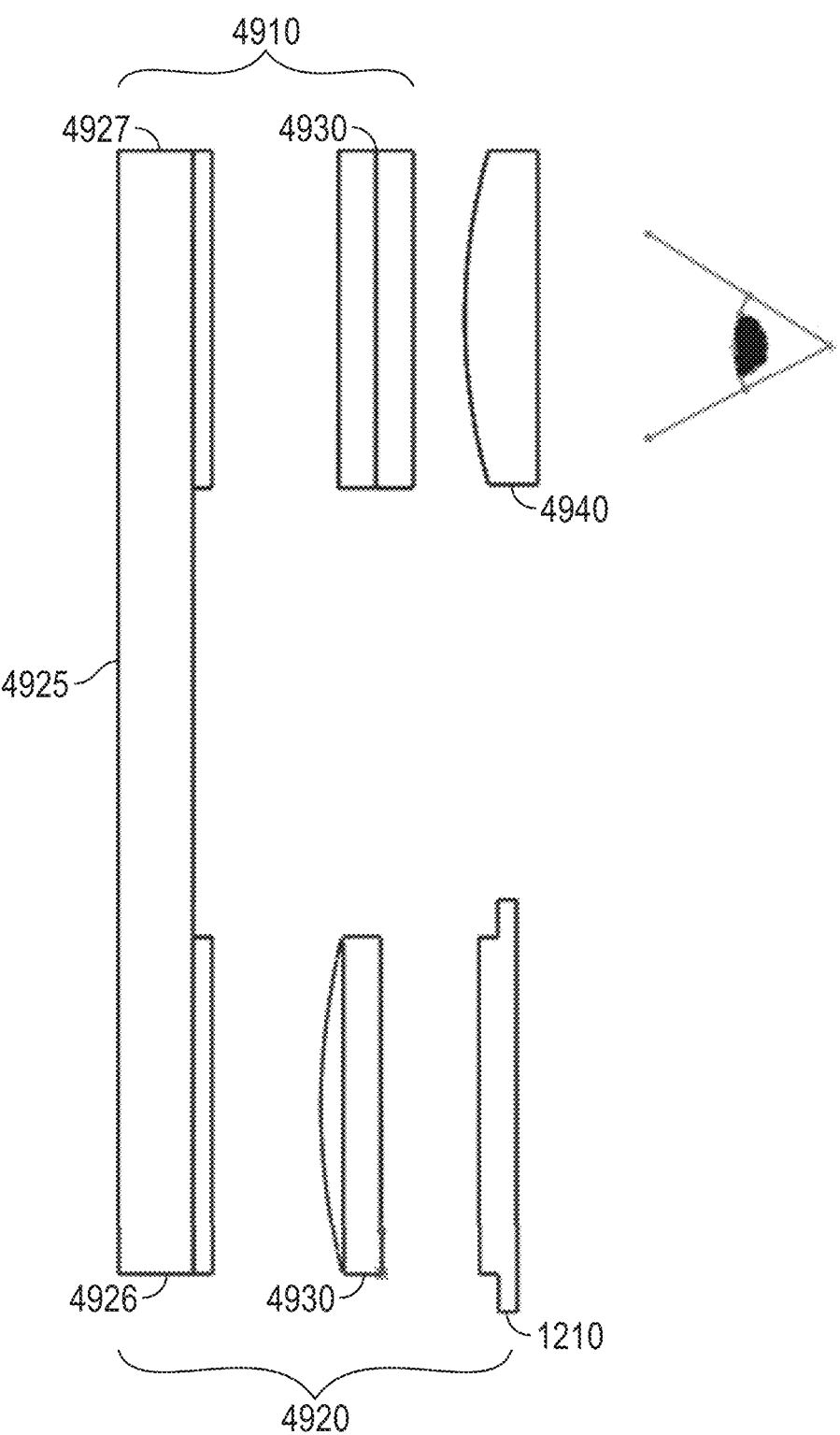
FIG. 49 is a representative schematic of a holographic waveguide setup with the digital display coupled into the waveguide and sent out of the second hologram which focuses the light onto a predetermined focal plane according to one embodiment of the disclosure.

FIG. 49 is a representative depiction of a viewing optic 4900 with an optical system in a main body 4910 and a base 49 having an active display 1210 and a holographic waveguide system 4925. The holographic waveguide system 4925 spans the main body 4910 as well as the base 4920. A digital or active display 1210 generates an image to the collimation optic 4930, which sends the image to the incoming hologram waveguide 4926. The image exits the waveguide via the output hologram 4927 and the image is injected into the first focal plane 4930 of the optical system 4940.

In one embodiment, the integration of the holographic waveguide reduces the need in specialized coatings made for beam combiners. In addition, the integration of the holographic waveguide disrupts the need for a mirror system, alleviating the need for complex mechanical alignment systems.

The integration of the holographic waveguide allows you to create a copy of the complex optical system needed to image a display, eliminating the need for a complex system to be put into every system.

The integration of the holographic waveguide allows for the use of LCOS, LCD and OLED systems to display information within an optical system. The nature of the system allows for various types of illumination systems in conjunction with the different types of displays used within the system.

The use of a holographic waveguide allows for the implementation of non-static illuminated reticles. The reticles can be changed just as images on a screen are changed. The holographic waveguide allows for daylight bright reticle systems without the need for traditional illumination methods.

The integration of the holographic waveguide creates the ability to create a non-static holographic sight. The out coupling hologram can send light as defined by the master optical system, allowing for changes in the sight picture of a holographic sight.

The integration of a holographic waveguide can be used with any monochromatic or polychromatic light source. The use of complex multiplexed Bragg gratings allow for the integration of multi-chromatic illumination systems.

3. Tracking Bullet Trajectory

One of the difficulties associated with long range engagements is the ability to determine the accuracy of an initial shot so that a timely correction can be made to improve the accuracy of the next shot. A traditional technique used to determine the round's point of impact is to attempt to detect bullet trace and/or actual splash point of bullet. This can be difficult in many long range engagements. In the case of a sniper team, the follow up shots also require feedback from the spotter to get the pertinent data back to the shooter. This can take several seconds using only verbal communications.

In one embodiment, the viewing optic can have an imaging sensor adapted to detect image frames associated with a bullet flight path and communicate said image frames to a computing device, which can then calculate bullet trajectory therefrom.

In one embodiment, the viewing optic with a main body and a base with an integrated display system can allow tracer rounds to be detected by on-board image processing capabilities so as to determine the bullet's trajectory just before it impacts the target area. In one embodiment, this data can be communicated back into a ballistics computer thereby quickly and efficiently creating a follow up firing solution for the second round, which can be communicated to the active display and the corrected aiming point superimposed into the first focal plane of the main body of the viewing optic.

Automating the feedback loop with trajectory and splash point detection by computer and combining this to the active display and superimposing an electronic aiming point correction in the first focal plane advantageously decreases the total time required to make an accurate second shot. This time reduction can be at a critical point in the engagement process. After the first shot is made, the window of opportunity to make a second shot can quickly narrow, especially if delay's extend past the point in time when the sonic boom of the initial shot reaches the intended target.

Environmental conditions and windage drifts can have substantial impact on the ballistic trajectory of the round over large distances. For instance a M193 bullet can drift about 4 feet in a modest 10 mph crosswind at 500 yards. Windage effects become even more exaggerated at greater distances since the speed of the bullet decreases as the range and total time of flight increases.

A variety of tracer round options are available. A standard tracer is used conventionally by the shooter to see the trajectory of the bullets in-flight path. A tracer round can emit light in the visible or IR spectrum depending on the composition of the tracer material. The latter is effective when the shooter is using night vision equipment. In addition some tracers can emit light dimly at first and then brighten as the round travels downrange. A fuse element can control when the tracer lights up after firing of the round in order to delay igniting the tracer material until the bullet is well downrange. The fuse delay mitigates the risk of the tracer revealing the shooter's firing location.

In one embodiment, a viewing optic with an integrated display system can use tracer rounds to detect, determine and/or display a bullet's trajectory just before it impacts the target area. In one embodiment, covert tracers that have long delay fuses and emit in the near IR region (700 nm to 1000 nm) of the electromagnetic spectrum can be used. Light emitted in the near IR region is invisible to the human eye, but can be detected by an imaging sensor using conventional glass optics. A tracer round of this type can be particularly effective in maintaining the shooter's covertness for Sniper operations while providing a significant automated bullet tracking capability for accurately determining next shot correction requirements. Thus, various embodiments are adapted to cooperate with one or more types of tracer rounds to implement the functions described herein.

Since the imaging sensor in the daylight embodiment is also sensitive to visible light, a standard daylight tracer can also be used for bullet tracking. In both the visible and near IR cases, the tracer rounds can take advantage of having long delay fuses to increase covertness as the system only needs to detect the bullas flight in the final moments before impact.

In one embodiment, a camera associated with a viewing optic can record the trajectory of the bullet and using the suite of sensors embedded into the viewing optic, it can calculate the exact geo-positional trajectory of the bullet, as well as the bullet's point of impact.

In another embodiment, the viewing optic may also use a stabilized camera to compensate for recoil from the firearm. The viewing optic would accurately track the movement of the stabilized camera, and compensate for that movement to accurately calculate the geo-positional trajectory of the bullet. This embodiment would allow the shooter to track their own trajectory and compensate for any misses more accurately.

In both embodiments, the geo-positional trajectory of the bullet could then be shared to other users who also active displays in devices they are using, such as another riflescope, spotting scope, or goggles using a microdisplay or holographic technology to display the trajectory into their field of view.

In one embodiment, the tracking of the bullet's trajectory incorporates capturing video frame images of the glowing tracer bullet in flight. The spatial location of the bullet in selected image frames is extracted through image processing techniques and then correlated with data from other video frames to establish the bullet's trajectory.

Image frames are selected for processing, based on correlation with the firing event. When the round is fired from the weapon, the time of muzzle exit is immediately determined by processing accelerometer data obtained from an on-board weapon axis accelerometer included in various embodiments. A correlation window from the time of muzzle exit is then started where various embodiments begin frame by frame processing of video images to identify therein a small cluster of pixels associated with the tracer round at a particular X-Y position in space. The frame images may be taken with an exposure time that is optimized to capture the bullet as it transmits a small number of individual pixels in the X-Y frame. Since the frame rate of the camera and time of muzzle exit is known, the bullet's distance from the weapon in each frame can be established using the known flight characteristic of the bullet. This data is contained in the onboard tables pertinent to each weapon and its associated rounds or, alternatively, received from a tactical network communication with the weapon sight.

If an absolute range to target is known from a laser rangefinder measurement, the position of the round at the target range can be calculated by determining the point in the trajectory that corresponds to the target range. The elegance of this technique is that the measurement is done from in-flight data and does not rely on bullet impact with a physical surface. The position calculated would correspond to an angular elevation and azimuth relative to the weapon's position and can be used to determine the ballistic pointing correction needed for increased accuracy. As part of this next shot ballistic correction calculation, various embodiments use inertial pointing angle data to calculate the relative reference point between inertial pointing angle of the gun at muzzle exit and the pointing angle at the time of splash. This allows the calculation to take into account any angular movement of the gun that occurred during the bullet's time of flight to target range.

4. Additional Configurations

Figures 50, 51, 52:
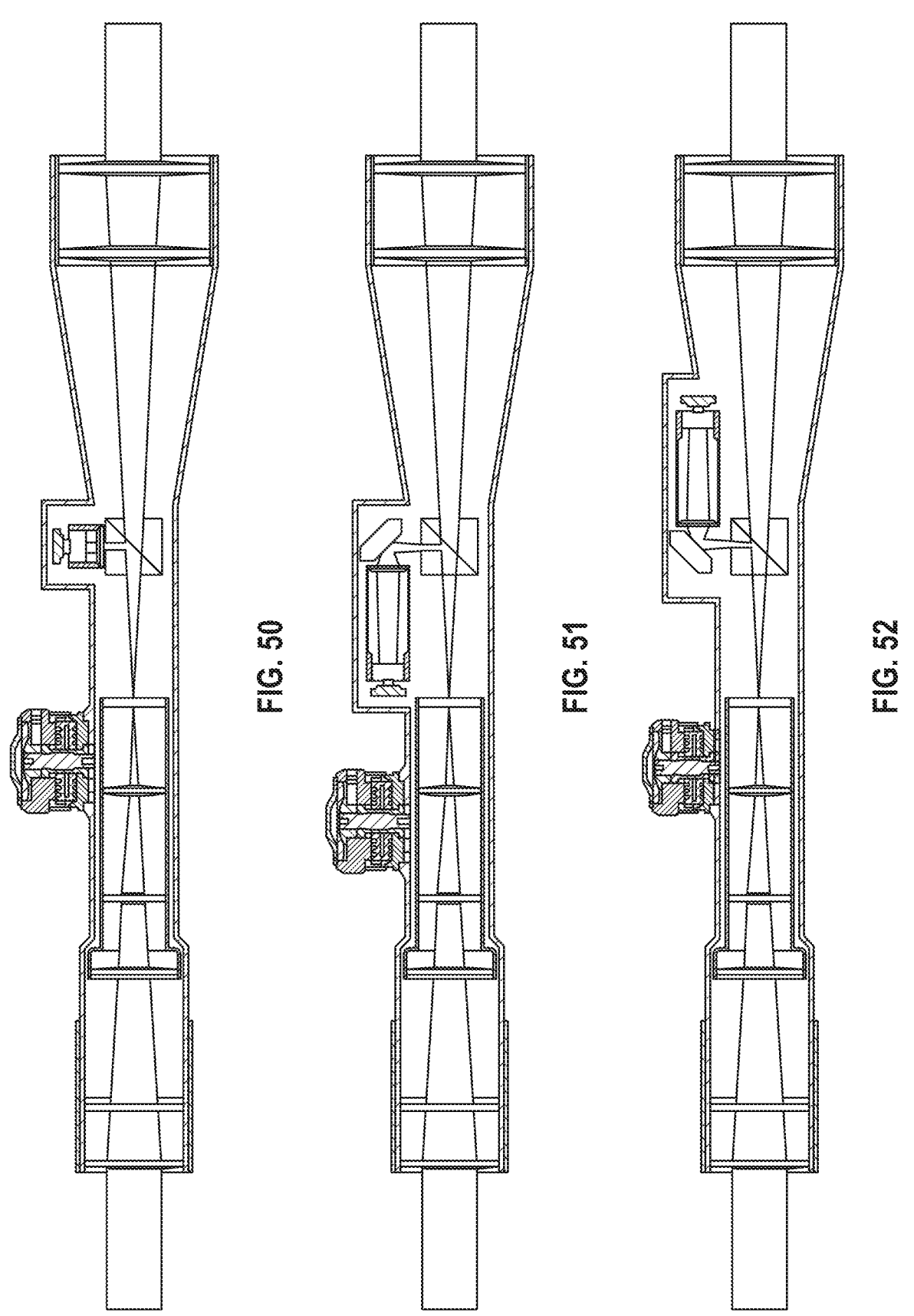
FIG. 50 is a representative schematic of an alternative configuration of a viewing optic according to one embodiment of the disclosure.
FIG. 51 is a representative schematic of an alternative configuration of a viewing optic according to one embodiment of the disclosure.
FIG. 52 is a representative schematic of an alternative configuration of a viewing optic according to one embodiment of the disclosure.

FIG. 50 depicts an alternative embodiment of a riflescope 5000 having a scope body 5005 and a compartment or notch 5010 on the top of the scope body 5005. The compartment 5010 has an integrated display system comprising an active display 5015, and collector optics 5020. The integrated display system is oriented such the display 5015 and the collector optics 5020 are parallel with the beam combiner 5025. In this embodiment, no reflective surface, such as a mirror, is needed.

FIG. 51 depicts an alternative embodiment of a viewing optic 5000 having a scope body 5005 and a compartment or notch 5010 on the top of the scope body 5005. The compartment 5010 has an integrated display system comprising an active display 5105, collector optics 5110, and a mirror 5115. The integrated display system is oriented such the display 5115 and the collector optics 5110 are perpendicular with the beam combiner 5025. In FIG. 51, the active display 5105 is closer to the ocular system as compared to the objective system of the viewing optic.

FIG. 52 depicts an alternative embodiment of a viewing optic 5000 having a scope body 5005 and a compartment or notch 5010 on the top of the scope body 5005. The compartment 5010 has an integrated display system comprising an active display 5105, collector optics 5110, and a mirror 5115. The integrated display system is oriented such the display 5105 and the collector optics 5110 are perpendicular with the beam combiner 5025. In FIG. 52, the active display 5105 is closer to the objective system as compared to the ocular system of the viewing optic.

The images generated from the active display 5105 can be directed to the mirror 5115 combined with the images of the scene viewed by the viewer through the viewing optics with a beam combiner 5025 in the scope body 5005 for simultaneously superimposing or overlaying the generated images and the viewed images, wherein the combined image is injected into the first focal plane. Because the beam combiner 5025 is positioned before the first focal plane, and the combined image is focused on the first focal plane, the displayed image and the viewed image do not move in relation to one another. This is a major advancement compared to devices that inject the image into the second focal plane.

In yet another alternative embodiment, the viewing optic has a scope body and a separable base having an active display and collector optics, with the active display and the collector optics being parallel with the beam combiner. In this embodiment, no reflective surface, such as a mirror, is needed. The base couples to the bottom of the main body of the viewing optic.

The images generated from the micro display can be combined with the images of the scene viewed by the viewer through the viewing optics with a beam combiner in the scope body for simultaneously superimposing or overlaying the generated images and the viewed images, wherein the combined image is injected into the first focal plane. Because the beam combiner is positioned before the first focal plane, and the combined image is focused on the first focal plane, the displayed image and the viewed image do not move in relation to one another. This is a major advancement compared to devices that inject the image into the second focal plane.

The optic sight and methods disclosed herein can be a display or viewing apparatus, device, sight, or scope, which can be for or on, or part of a weapon, gun, rifle, laser target locater, range finder, or as an add-on accessory thereto. Embodiments can be mounted on a weapon, or apparatus, or can be hand held or helmet mounted.

V. Viewing Optic with Advanced Reticle Features

A. Active Display Pattern Based on Magnification Setting

In one embodiment, the disclosure relates to a viewing optic having a main body and a base with an integrated display system, wherein the active display of the integrated display system generates multiple reticle patterns that are projected into the first focal plane of the field of view.

In one embodiment, the disclosure relates to a viewing optic having a main body and a base with an integrated display system, wherein an active display of the integrated display system generates a reticle pattern based on magnification level.

In one embodiment, the disclosure relates to a viewing optic having a main body with one or more sensors that can track or monitor the magnification level of the optic and a base with an integrated display system, wherein an active display of the integrated display system generates a reticle pattern based on magnification level. Depending on the magnification level, the active display system can generate different reticle patterns that are optimized for different optical magnification levels. In one embodiment, the active display of the integrated display system can automatically switch between reticle patterns based on the magnificent level.

In one embodiment, the viewing optic with an integrated display system can project digital features or aim points that are optimized for the specific magnification setting being used.

In one embodiment, the main body of the viewing optic has a sensor associated with a magnification adjustment mechanism of the sighting device to produce a signal indicative of an adjustment of the optical magnification of the viewing optic. The viewing optic further includes an electronic controller in communication with the sensor and the active display of the integrated display system. The electronic controller in response to the signal produced by the sensor, communicates to the active display to generate a reticle pattern, which is viewable through an eyepiece in a field of view thereof superimposed upon an image of a distant object.

In some embodiments, the electronic controller and active display are configured to produce a first reticle pattern, such as a close-quarters reticle pattern, in response to the signal indicating a first magnification setting; and, in response to the signal indicating a second magnification setting greater than the first magnification setting, the electronic controller and active display may produce a second reticle pattern that is distinct from the first reticle pattern. For example, the second reticle pattern may be a long-range reticle pattern, such as a sniper reticle.

In some embodiments, the sensor may include an electro-mechanical or optical digital encoder (which may be rotational or linear), a potentiometer, a combination of one or more magnets and one or more hall effect sensors, or other suitable device operable for sensing the position or movement of the magnification adjustment mechanism and producing a corresponding electrical signal. In one embodiment, the sensor and described in FIGS. 69 and 70.

In one embodiment, the active display is not in the main body of the viewing optic.

In one embodiment, one or more reticle patterns can be selected from including but not limited to 2, 3, 4, 5, 6, 7, 8, 9, 10, 11, 12, 13, 14, 15, 16, 17, 18, 19, 20, and greater than 20. In one embodiment, the viewing optic with an integrated display system can chose between at least 10, or at least 20, or at least 30, or at least 40 or at least 50 reticle patterns.

In one embodiment, the active display of the integrated display system projects reticle patterns into the first focal plane of the field of view that are based on specific magnification settings. Upon a change in magnification setting, the reticle pattern generated from the active display switches so that the aim point is immediately useful for the operator. The switching of the reticle can be based on the magnification setting.

As way of example, and not to be limited, at a 1× magnification setting, the active display can generate a small center dot that is projected into the first focal plane. Upon a magnification change to 8×, the active display generates a cross hair pattern with long range hold over dots that are projected into the first focal plane. The sensor determines a change in magnification, which is communicated to a controller, which changes the reticle pattern of the active display.

In one embodiment, the viewing optic with an integrated display system projects information and aim points that are designed to aid the operator in engaging targets at short and long ranges. In one embodiment, multiple "pages" of information or reticle patterns can be designed and loaded into the system and different pages can be displayed depending upon the magnification setting.

In one embodiment, the reticle pattern from the active display is projected onto an etched reticle of the first focal plane. Projecting the digital reticle onto an etched or fixed reticle provides necessary protection in the event of a system failure.

Figure 53:
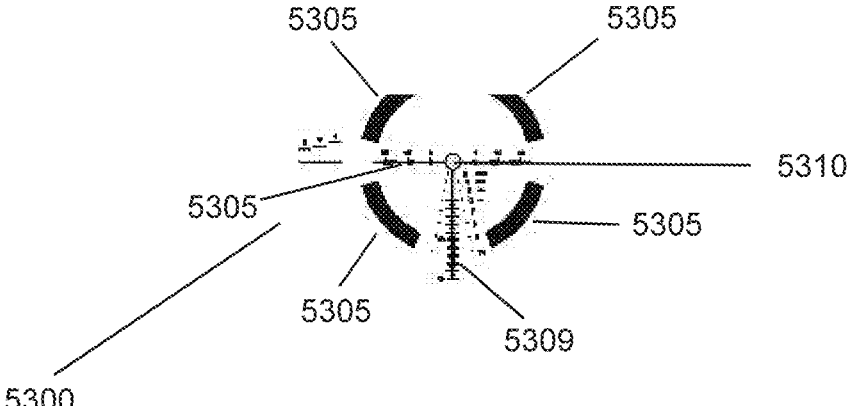
FIG. 53 is a representative depiction of a reticle at 1X showing both passive (fixed or etched) reticle features and marks or features from an active display.

FIG. 53 is a representative depiction of a Close Quarter Battle reticle 5300 at 1× magnification. The thick arched lines 5305, the primary horizontal line 5307, the primary vertical line 5309, numbers and arrows are components of an etched reticle. The center dot 5310 is generated from an active display of an integrated display system. This type of reticle is used for close quarter battle; the center dot represents a fast target acquisition aim point.

Figure 54:
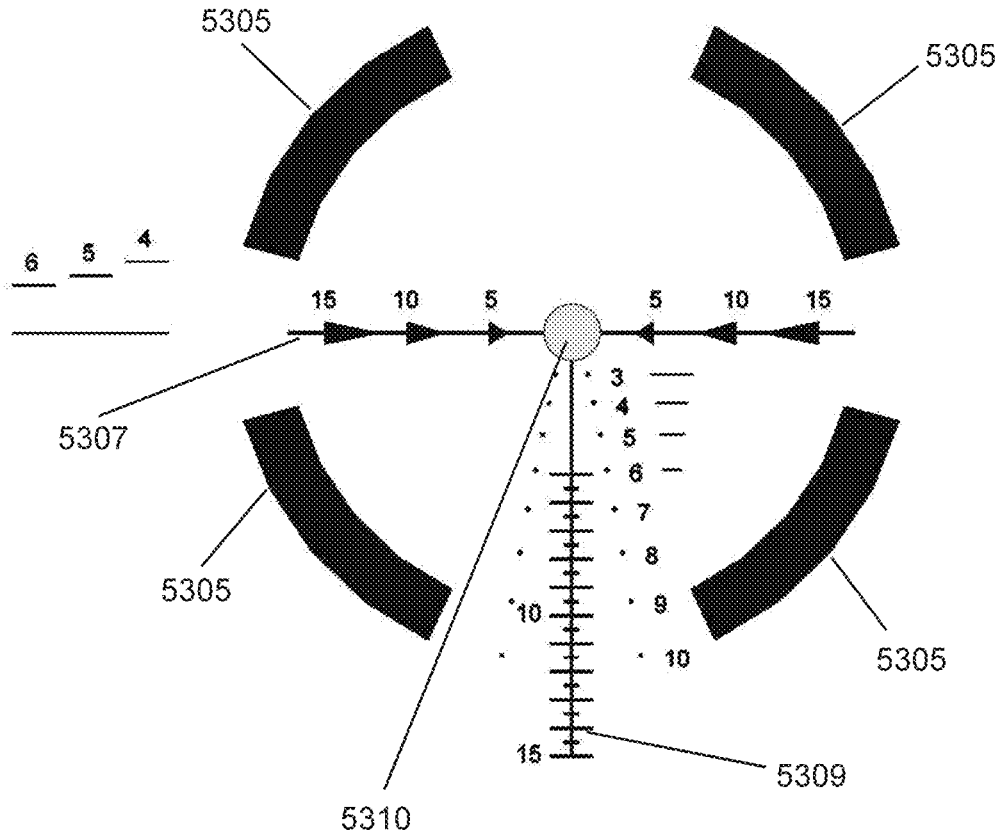
FIG. 54 is a representative depiction of a reticle at 8X showing both passive (fixed or etched) reticle features and marks or features from an active display.

FIG. 54 is a schematic representation of the reticle from FIG. 53 but with the magnification setting of the viewing optic at 8x. As can be seen, the center dot 5310 being projected from the active display has become obtrusively large under 8× magnification.

Figure 55:
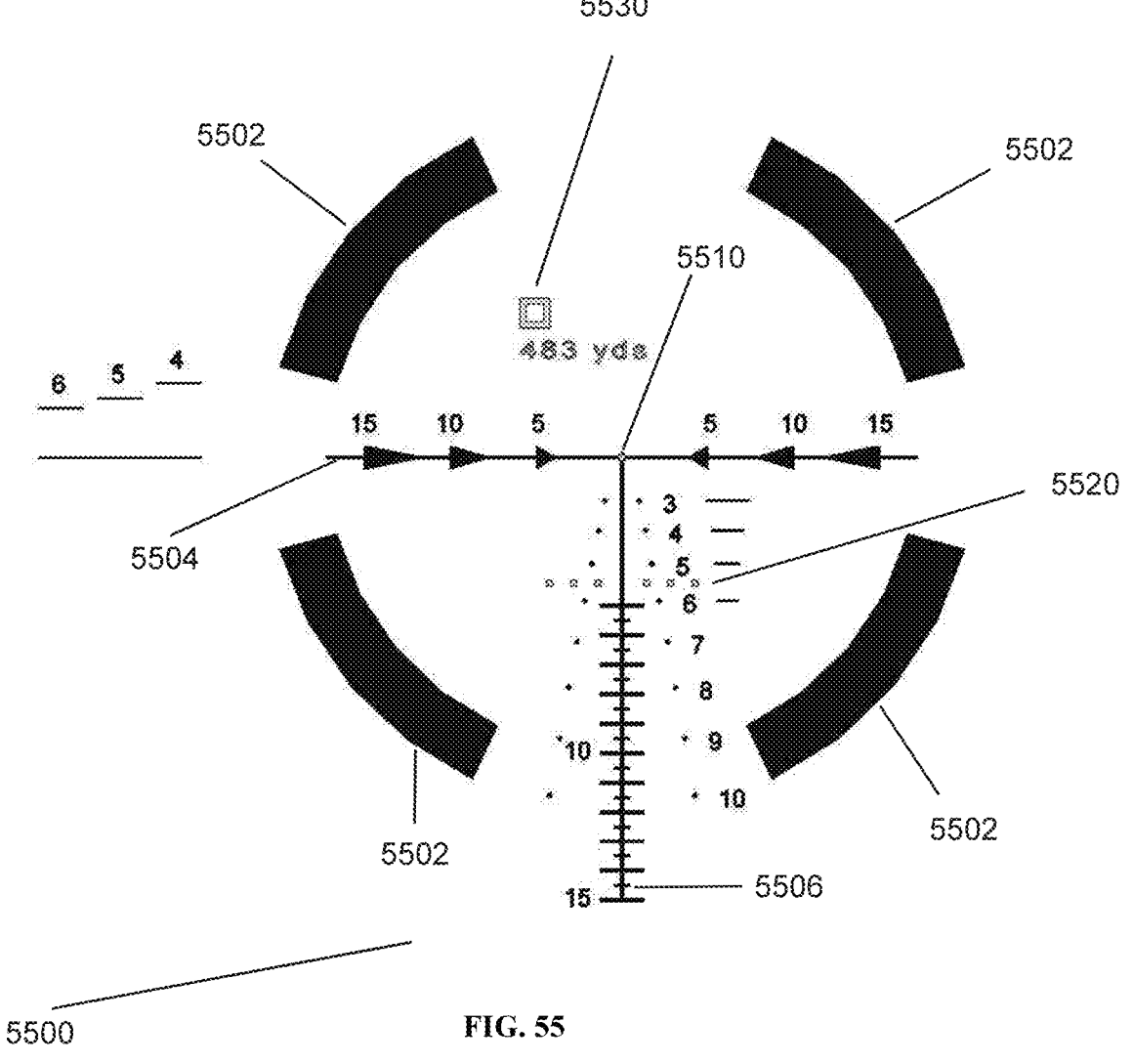
FIG. 55 is a representative depiction of a reticle at 8X showing both passive (fixed or etched) reticle features and marks or features from an active display including a range measurement and wind holdover marks.

FIG. 55 is a representative depiction of a reticle pattern 5500 that provides useful information when the viewing optic is set at a magnification setting of 8X. The thick arched lines 5502, the primary horizontal line 5504, the primary vertical line 5506, numbers and arrows represent the etched reticle. The center aim point 5510, the 6 ballistically compensated windage dots 5520, and the square in the upper left 5530, which represents a rangefinder designator displaying a hypothetical range to target are components generated by the active display.

Figure 56:
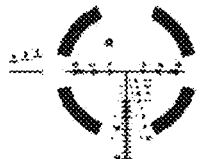
FIG. 56 is a representative depiction of a reticle at 8X showing both passive (fixed or etched) reticle features and marks or features from an active display including a range measurement and wind holdover marks.

FIG. 56 is a representative depiction of the reticle pattern 5500 at a low magnification setting.

With references to FIGS. 53-56, when the optical magnification setting is at 1X, the reticle pattern 5300 includes etched reticle features 5305, 5307, and 5309 as well as a first set of multiple marks 5310 (such as a circle and/or an aiming dot) generated from the active display and projected onto the first focal plane reticle. Preferably, the reticle pattern 5300 formed at least in part by the first set of marks 5310, is a type of close-quarters reticle (COB reticle) having minimal marks to provide a less cluttered viewable area, such as illustrated in FIG. 53.

When the optical magnification setting is increased, an electronic controller and the active display (in response to a signal received from a sensor, including but not limited to the sensor described in FIGS. 69 and 70) replace/alter/change the first reticle pattern with a second set of multiple marks, which form (at least in part) a second reticle pattern 5500 that is distinct from the first reticle pattern 5300 and which typically includes at least some different functionality.

For instance, the second reticle pattern may include different aiming features and additional marks, such as relating to estimating distance, calculating windage and elevation adjustments, or other suitable marks commonly used in ranging reticles such as shown in FIG. 55.

It can be seen therefore, that creating multiple "pages" of features and reticle patterns for the active display, storing them in a memory system, and automatically switching between the reticle patter s as the operator changes magnification settings on the viewing optic will be extremely useful.

B. Active BDC Reticle

Ballistic Drop Compensating (BDC) reticles are designed to have hash marks located on the portion of the vertical cross hair that is located below the horizontal cross hair. These hash marks are designed at specific distances to try and closely match a specific or set of specific ballistic profiles.

However, the current BDC reticle designs are fixed designs. This is because the reticles are made using wire, metal, or etched on glass. Once the reticle is made and installed in the riflescope it can't be changed without taking the reticle out and installing a new one, which can only be practically accomplished by sending the scope back to the manufacturer.

In one embodiment, the disclosure relates to a viewing optic having a main body with an optical system and a base having an integrated display system with an active display that can generate a BDC reticle that can be changed manually by the user at any time, or even automatically by the software and sensors of the viewing optic in real time.

To generate the BDC reticle for the viewing optic disclosed herein, the riflescope can be programmed for the specific ballistic profile of the rifle and the to be fired cartridge. Second, the viewing optic has sensors, as described above, such as temperature, pressure, humidity, cant angle, inclination angle, which can aid in giving real time updates to the BDC reticle so that it is as accurate as possible for all conditions. This allows the BDC reticle to be custom tailored to each rifle and the specific shooting conditions.

The BDC reticle generated in real-time by the active display allows the shooter to have an accurate system for shooting at various distances accurately and quickly.

Figure 57:
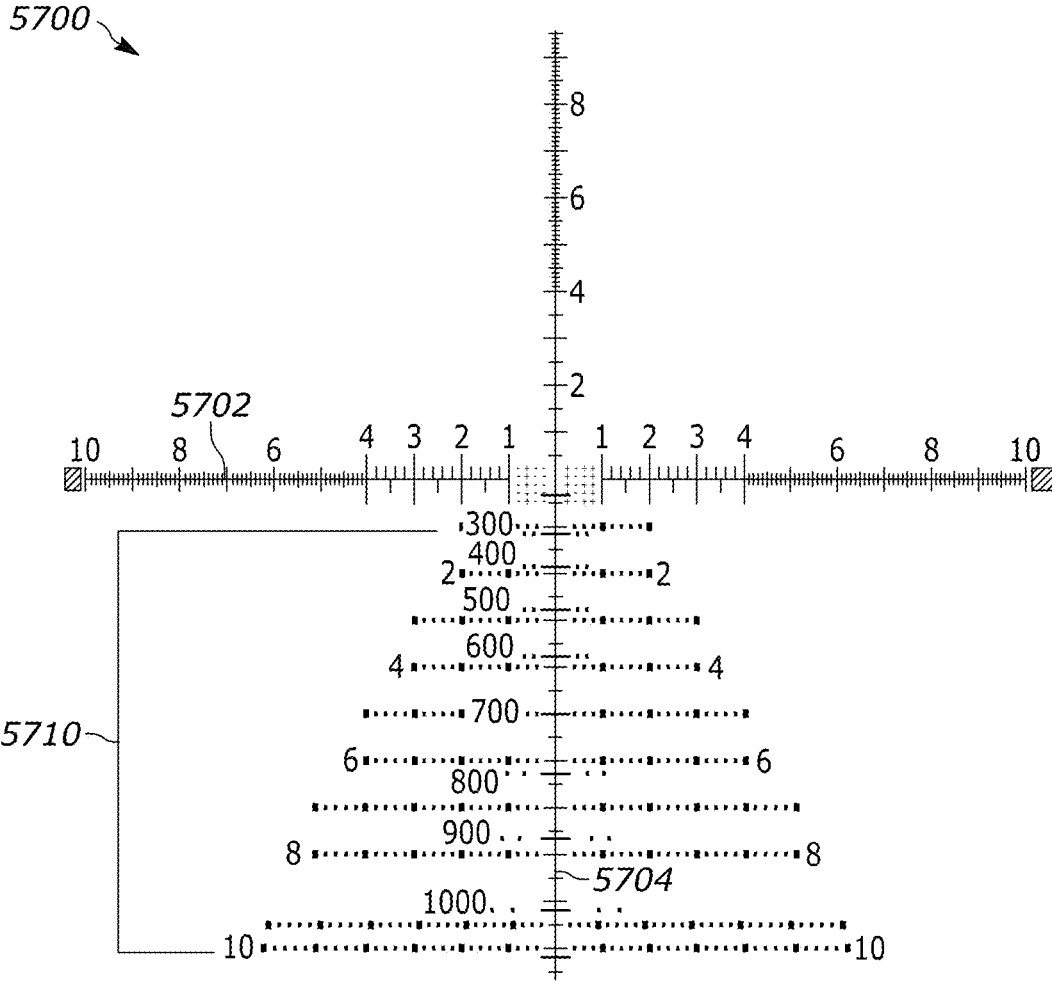
FIG. 57 is a representative depiction of a reticle with standard etch and fill portions as well as images generated from a digital display.

As shown in FIG. 57, the reticle 5700 has standard etch and fill portions including a primary horizontal line 5702, a primary vertical line 5704, and numerical markings and hash marks along the primary and vertical crosshairs. Reticle 5700 also has patterns and marks generated by the active display and projected onto the first focal plane reticle. The active display marks in the form of a BDC reticle include the numerical markings 5710 (100-900 on the vertical axis in quadrants 3 and 4). As this portion is projected from the digital display, it can be updated in real time.

In addition to an active BDC reticle, there are times where a user/shooter might find themselves in a position where they are providing cover for other individuals in an area where targets may present themselves quickly and at varying ranges. An example might be a sniper who is on top of a building looking down an alley or a road that has cross streets or doorways. The active display can be used in conjunction with a variety of sensors embedded into the riflescope, such as compass, cant angle, inclination angle, GPS, etc. to be able to accurately determine the direction the riflescope is pointed.

Using a viewing optic having environmental sensors, an integrated display system having an active display for generating and projecting a BDC reticle into the first focal plane, and a rangefinder, a user will be able to range known landmarks, such as doors, windows, cars, etc. and use the controller and active display to place a range marker on those landmarks. These range markers are projected into the first focal plane and visible through the viewing optic. The environmental sensors allow the user to move the viewing optic around to view other targets, but the range markers would remain on the targets.

Figure 58:
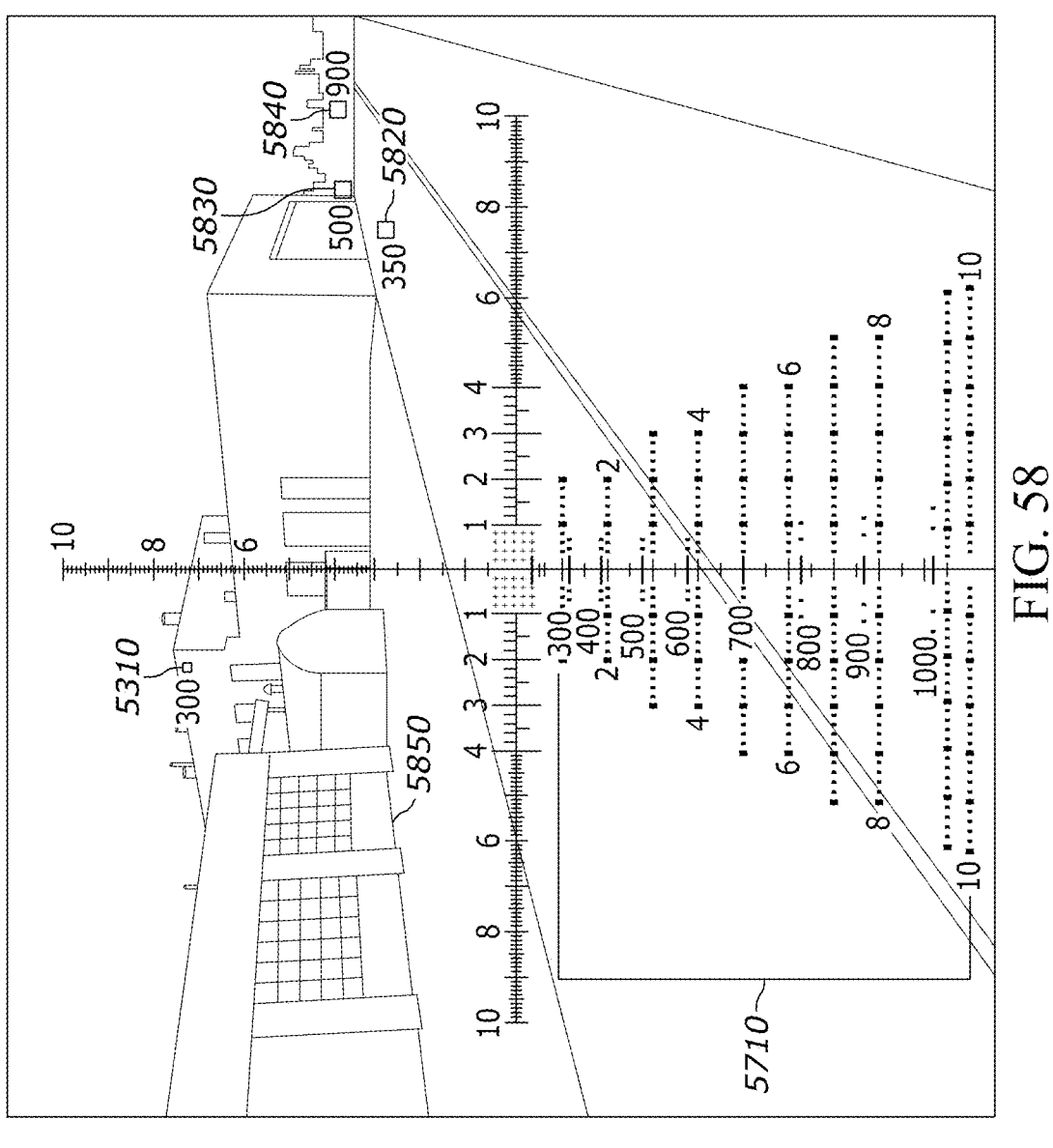
FIG. 58 is a representative depiction of a BDC reticle with range markers.

FIG. 58 is a representative image of a BDC reticle generated by the active display and projected onto a first focal plane reticle, with range to potential targets indicated. A viewing optic having a main body with environmental sensors and a base having an integrated display system with an active display for generating a BDC reticle will allow the user to mark multiple targets in one or more areas with distance indications on the target markers. Then, if a target were to present itself near a target marker, the user would be able to quickly identify the range to the target without having to range the target. The user can then employ the active BDC reticle to quickly hold in the correct location to engage the target.

C. Reticle Compensated for Firearm Cant

In a traditional riflescope, when shooting long range, it is important that the firearm and scope are level when taking a shot. When a bullet travels over a long distance, the bullet is affected by gravity to a degree that the shooter must take into account. Gravity pulls the bullet towards the ground in a consistent direction creating "bullet drop." Shooters compensate for this bullet drop by aiming higher than their target so that by the time the bullet reaches the target, it has dropped to the appropriate height, such that it hits the target.

Figure 59:
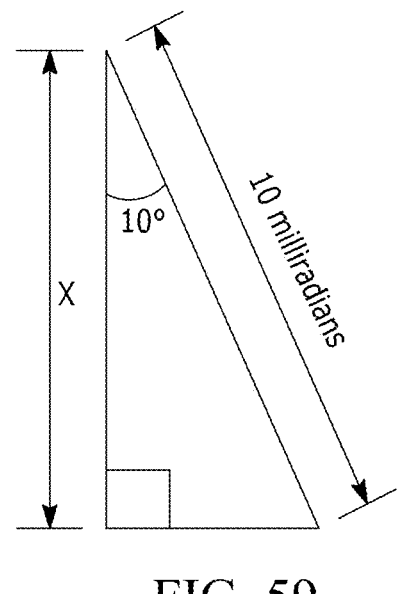
FIG. 59 is a representative schematic depicting the effect of cant on a shot.

FIG. 59 is a representative depiction of cant angle. It can be clearly seen that the triangle is a right triangle with the 10° angle at the top and the right angle at the bottom. The 10 milliradian leg has become the side of the triangle that is the hypotenuse and represents a canted vertical section of crosshair. However, gravity is acting on the vertical leg of the triangle.

Using trigonometry, the length of the vertical leg can be solved with the following equation: Cos 10°=x/10 milliradians. Solving for x results in a value of 9.85 milliradians. So, in this example, while the user/shooter may have held or dialed 10 milliradians, they only compensated for a 9.85 milliradian shot. At long range, this is easily enough to miss the target.

In one embodiment, the disclosure relates to a viewing optic with an integrated display system that uses an active display to generate a reticle that can compensates for cant of the firearm. The user can seamlessly shoot at distance without having to worry about cant angle.

In a traditional riflescope the reticle is a physical cross hair that is either metal, wire, or a pattern that is permanently etched on glass. This means that the cant of the reticle is always fixed. However, with the active display technology for generating a real-time reticle, by overlaying a digital reticle onto the passive image, the digital reticle can be changed at any time. In one embodiment, the viewing optic has an internal cant sensor that can instantly orient the reticle generated by the active display to compensate for cant angle.

Figure 60:
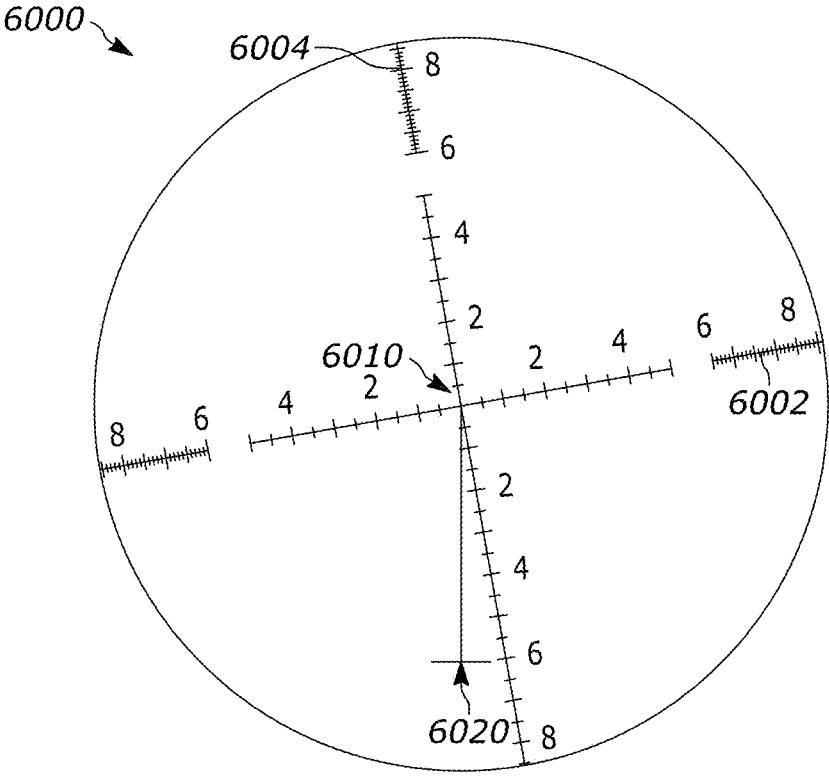
FIG. 60 is a representative schematic of a digital or active display that can compensate for cant.

FIG. 60 is a representative depiction of a reticle 6000 with marks and patterns oriented for cant and generated by an active display of an integrated display system. The primary horizontal line 6002 and the primary vertical line 6004 are provided by the passive or etched or fixed reticle. The aiming point generated by the active reticle 6020 compensates for cant and is projected or overlaid onto the passive reticle. The pivot point 6010 is at the center of the reticle. In this case, an electronic controller/micro-controller would use the information gathered from cant angle and inclination angle sensors and apply software logic and communicate with the active display to adjust the generated image aiming point 6020 to reflect the new zero position, associated geometry and hold points that correspond to the orientation of the firearm at that point in time. The user would shoot off the digital reticle generated by the active display, instead of the passive or fixed reticle.

In another embodiment, the active display of the integrated display system can generate a digital reticle that compensates for cant, as well as for shooting at an inclined or decline angle, by adjusting the aim point up or down on the digital reticle. This would eliminate the need for a cosine indicator, which is often used to compensate for shooting in these types of situations.

D. Digital Reticle with Wind Drift Indicators

In a traditional riflescope, reticles that have wind indicators are usually a glass etched reticle. Often these reticles will have a grid pattern or rows of dots to allow the user to have a reference point to use to aim with and compensate for wind speed. The problem with these reticles is that they are fixed in shape and size, since they are physically and permanently etched onto a piece of glass.

In one embodiment, the disclosure relates to a viewing optic having a main body and a base with an integrated display system having an active display for generating a digital reticle that uses wind drift indicators that compensate for the range to target. In one embodiment, the digital reticle is overlaid onto a passive reticle. By using a digital reticle that is overlaid on a passive reticle, the viewing optic can have a reticle that can adapt real-time wind holds to the ballistics, range, and environment of the specific situation.

Typically, the longer the range, the more effect a cross-wind has on a bullet. By using a digital reticle, the wind holds can be spread out more as the distance increases to compensate for wind values at the specific range for the target.

Figure 61:
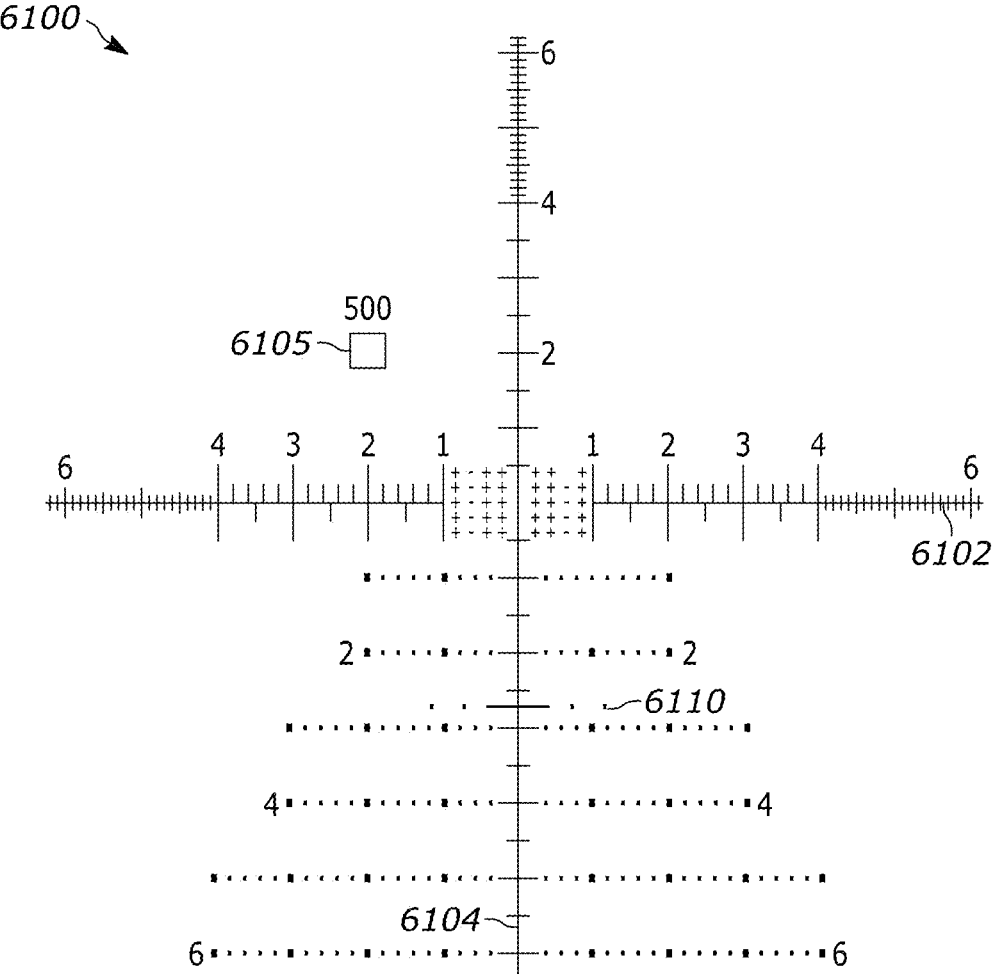
FIG. 61 is a representative depiction of a reticle with a target that was ranged at 500 yards displaying the real-time location of the drop and wind holds for 500 yards.

FIG. 61 is a representative depiction of a reticle 6100. Multiple components or markers are provided by the passive reticle including the primary horizontal crosshair 6102 and the primary vertical crosshair 6104. The active display of the integrated display system generated and projects a target that was ranged at 500 yards 6105 and wind holds 6110 for the specific conditions. The end of the secondary horizontal line (across the main vertical line) would equal a 5 mph wind drift, the next dot would be 10 mph, and the outer most dot would be 15 mph. The images generated from the active display 6105 and 6110 are overlaid onto the passive reticle.

Figure 62:
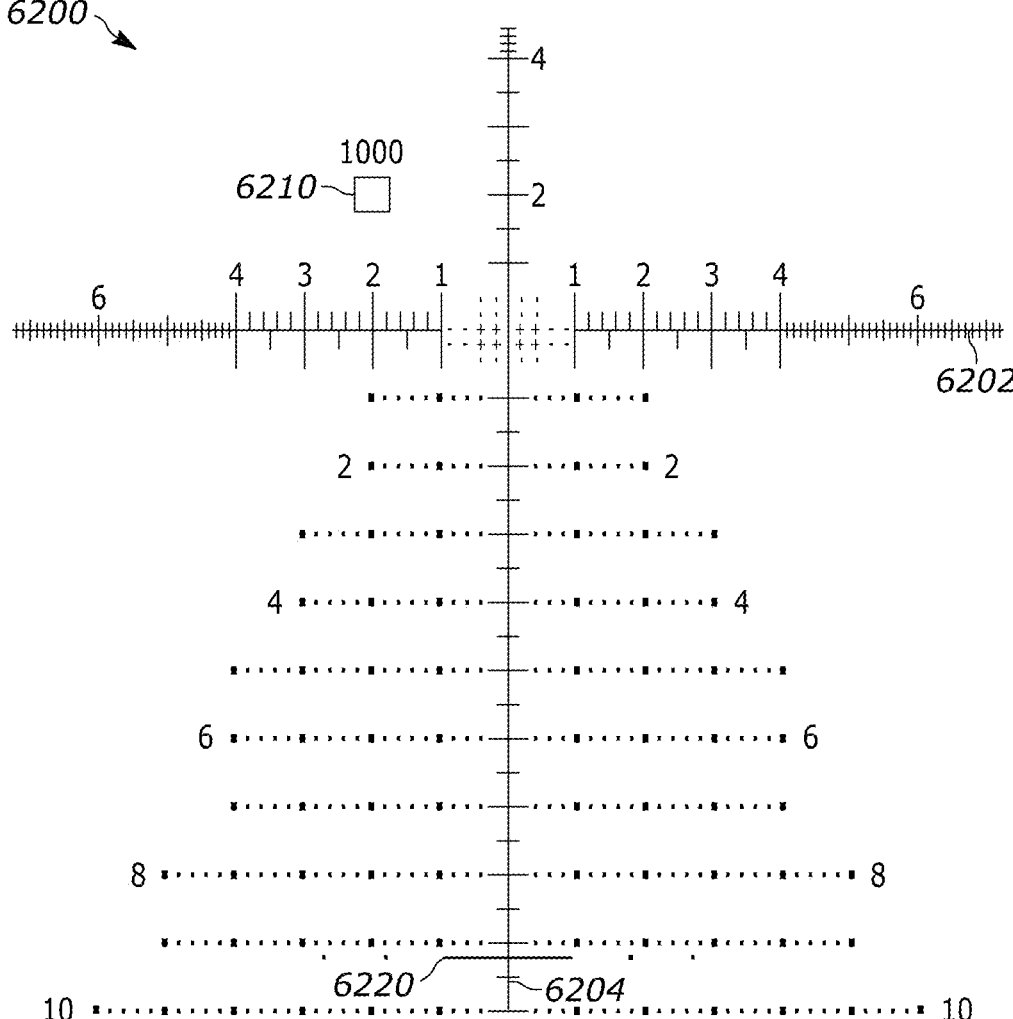
FIG. 62 is a representative depiction of a reticle with a target ranged at 1000 yards displaying the real-time drop and wind holds for 1000 yards.

FIG. 62 is a representative depiction of a reticle 6200. Multiple components or markers are provided by the passive reticle including the primary horizontal crosshair 6202 and the primary vertical crosshair 6204. The active display of the integrated display system generated and projects a target that was ranged at 1000 yards 6210 and wind holds 6220 for the specific conditions. The end of the horizontal line (across the main vertical line) would equal a 5 mph wind drift, the next dot would be 10 mph, and the outer most dot would be 15 mph. The images generated from the active display 6210 and 6220 are overlaid onto the passive reticle. It can be seen that the secondary horizontal line 6220 extends wider, and the wind dots are spread further to the sides compared to the 500 yard (FIG. 61) solution to compensate for additional wind drift induced when the bullet travels a longer distance.

E. Reticle with Center Grid for Second Shot Correction

In the past, passive reticles have been designed to allow the shooter to have many reference points for shooting in varying conditions and varying ballistics. However, since the variety of conditions and ballistics vary so widely, these reticles have tended to have many features on them, such as grids of lines or dots, which cause the reticle to appear cluttered, or busy to the user.

In one embodiment, the disclosure relates to a reticle system comprising a digital reticle generated with an active display overlaid a passive reticle. The use of the digital reticle allows information to be shown as needed and as appropriate, which eliminates the need for certain information to be displayed on the passive reticle, thereby providing a cleaner or more easily discerned passive reticle.

In one embodiment, the disclosure relates to a viewing optic having a passive or analog reticle that is designed to work most efficiently in conjunction with an active reticle. The active reticle technology allows the viewing optic to do the complicated calculations and display a ballistic solution for the user. Typically, the ballistic solution will not be in the center of the field of view or the center of the passive reticle cross hair. This gives the user the option to either hold over center on the ballistic solution, or to dial the turrets until the ballistic solution is in the center of the field of view and in the center of the passive cross hair to take the shot.

In one embodiment, the disclosure relates to a viewing optic with an analog and digital reticle that will allow the shooter to most effectively and efficiently make a second shot correction, while minimally obstructing their field of view like previous passive reticles have done, which use extensive grids of lines and dots.

Figure 63:
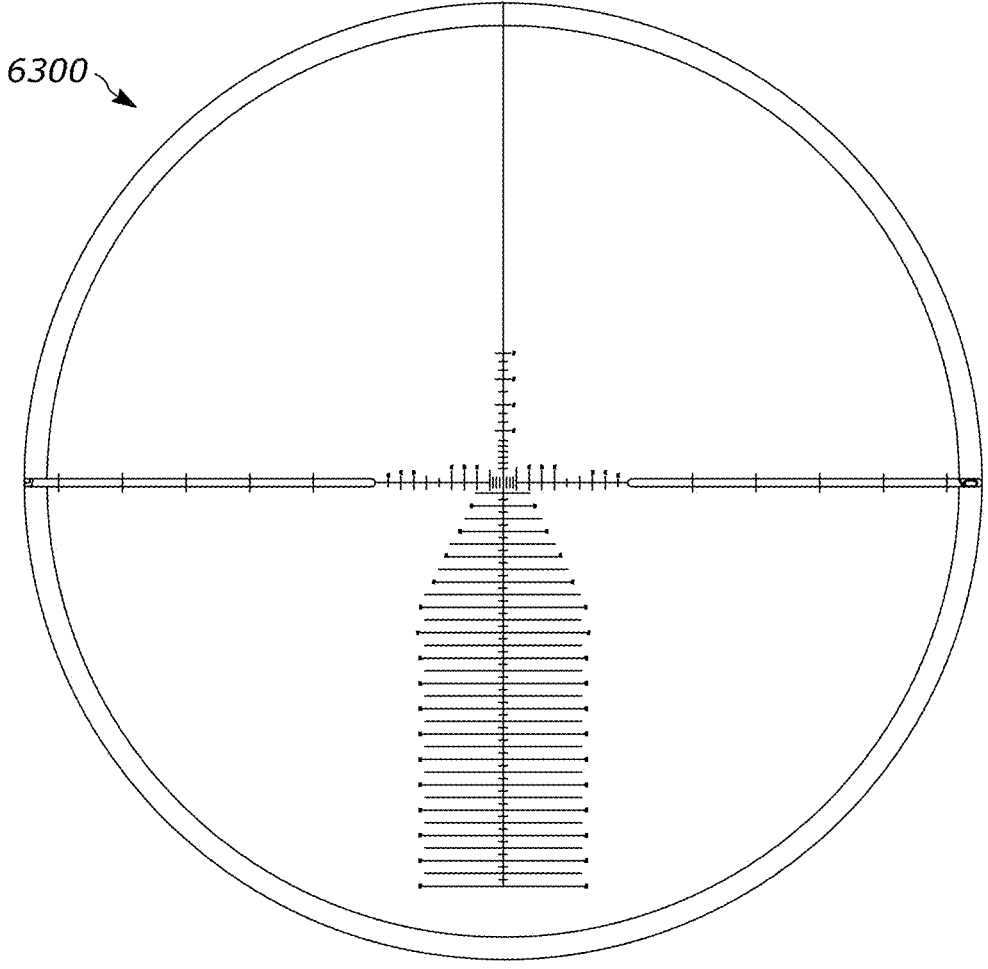
FIG. 63 is a representative depiction of a wide angle view of a reticle at low magnification with fewer rows of dots below the horizontal cross hair.

FIG. 63 is a representative depiction of a wide angle view of a reticle 6300 at low magnification. A less obtrusive row of dots is used below the horizontal cross hair. This passive reticle can be used as a backup, in the event the active display cannot be generated because the battery power or electronics of the viewing optic fail.

Figure 64:
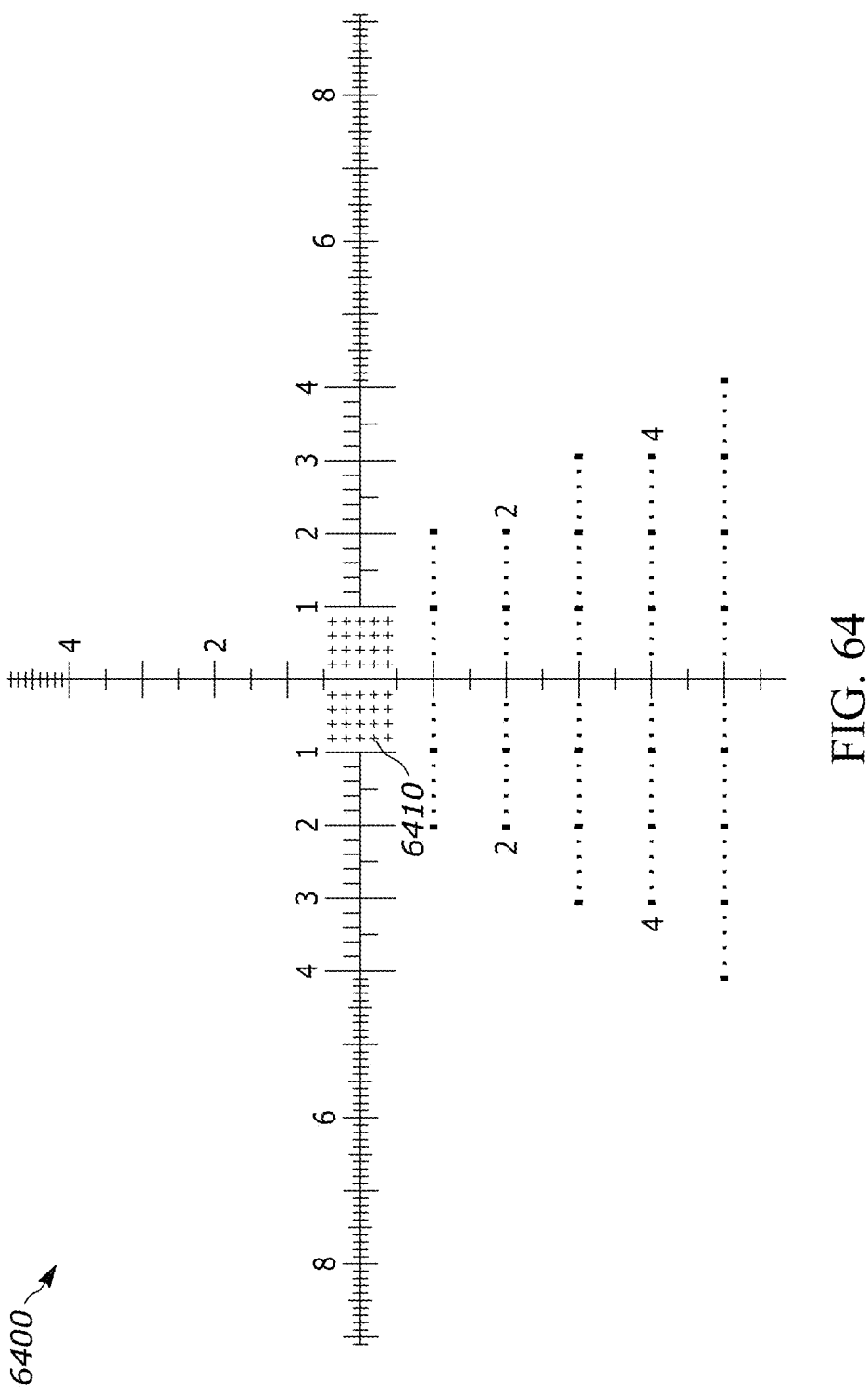
FIG. 64 is a representative depiction of a center portion of a reticle at higher magnification with a smaller center grid.

FIG. 64 is a representative depiction of a close-up view of the center portion of the reticle 6400. FIG. 64 provides a view at higher magnification. This image shows a small grid 6410 generated by the active display of the integrated display system, which is located at the center of the reticle. This will allow the user to make accurate measurements of first shot impact location to make accurate second shot corrections.

In one embodiment, the grid 6410 generated by the active display is wider than it is tall. This is specifically designed since calculating elevation of an impact is more accurate than estimating wind drift of a first shot. In this embodiment, the small plus features of the small grid are not illuminated but are very fine features, which allow very precise measurement.

The active or digital reticle should get the first shot very close, therefore, the center grid can be much smaller than a typical passive reticle, which requires an extensive grid that covers a significant portion of the field of view below the horizontal cross hair.

VI. Auto Brightness Adjustment

As discussed throughout the application, the integrated display system allows digital images generated by an active display to be overlaid on top an image of an outward scene. This active display is injected into the image of the outward scene using illuminated portions of the display. For the display to be most usable it is desirable to have a high contrast ratio between the brightness of the passive scene and the illuminated display such that both can be easily seen. If the display is too dim the user will not be able to see it. If the display is too bright the display will overpower the passive scene.

In one embodiment, the disclosure relates to viewing optic having a main body with an integrated display system and a light sensor that can detect the specific target brightness and compensate for it.

Figure 71:
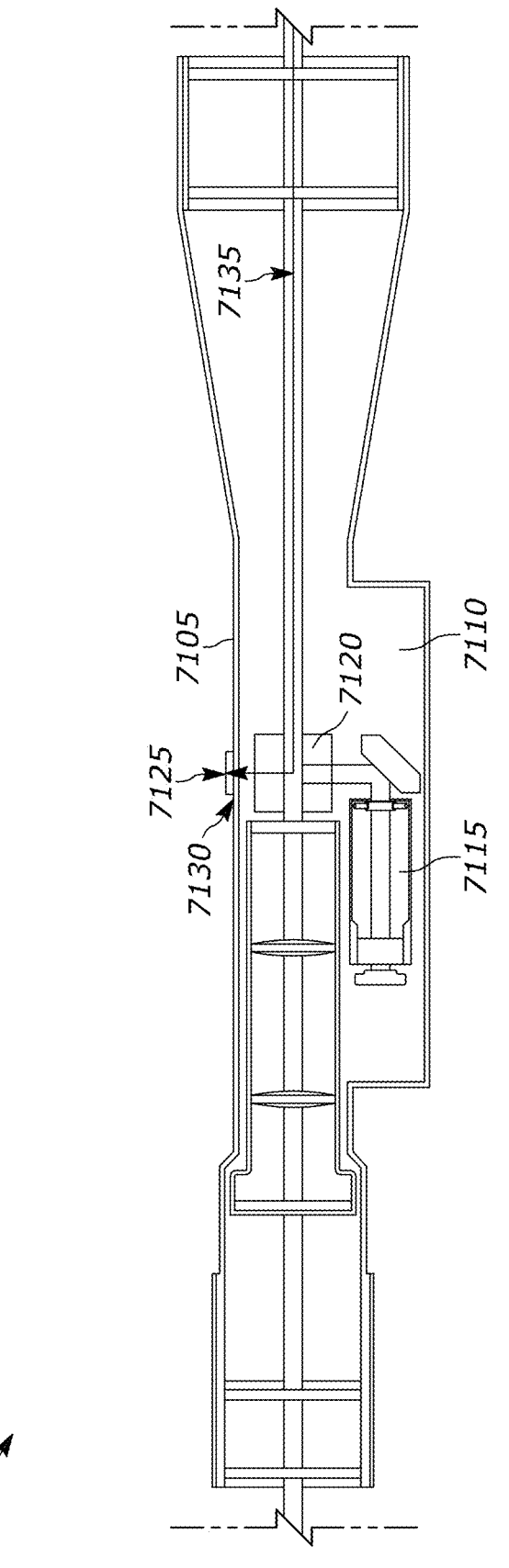
FIG. 71 is a representative schematic of a viewing optic with a beam combiner in the main body and having a photosensor and light filtered coupled to the beam combiner.

FIG. 71 provides a representative schematic of a viewing optic 7100 with a main body 7105 and a base 7110 coupled to the main body. The main body 7105 has an optical system for viewing an image of an outward scene and a beam combiner 7120 with a photo sensor 7125 and a light filter 7130 located above the beam combiner 7120. This allows the photo sensor to look directly at the target scene, without creating an obstruction in the field of view. The base 7110 has an integrated display system 7115 having an active display for generating an image that is projected into the first focal plane of the viewing optic.

The photo sensor 7125 and light filter 7130 generate a high contrast ratio between the brightness of the image of the outward scene 7135 and the generated image from the active display.

In one embodiment, the transmission band of the filter in front of the photo sensor can be tuned to be narrow enough so that only the brightness of the target will be measured and the additional light from the display system will not be measured, which would distort the measurement.

VII. Viewing Optic with Auto-Ranging Capabilities

In one embodiment, the disclosure relates to a viewing optic with an integrated display system that incorporates the use of a camera to aid in an auto-ranging. In one embodiment, the disclosure relates to a system comprising a viewing optic with an integrated display system, a camera to aid in an auto-ranging, and a laser range finder.

In one embodiment, the disclosure relates to a viewing optic having an integrated display system and a camera that incorporates image recognition technology. The systems and methods disclosed herein greatly increase the speed of acquiring a target solution, and eliminate the need of a button press that may affect point of aim. In addition, the systems and methods disclosed herein integrate artificial intelligence into the system to determine the quality of the ranged target solution.

In one embodiment, the viewing optic has a camera that incorporates image recognition technology. In one embodiment, the camera can be attached to either the viewing optic having an integrated display system or a firearm and would point towards the point of aim of the riflescope.

In one embodiment, the camera has artificial intelligence to detect a target and communicate with an active display of the integrated display system to highlight the target. In another embodiment, the artificial intelligence system can be incorporated into the viewing optic. In one embodiment, the artificial intelligence system can be located in the base coupled to the main body of the viewing optic.

In another embodiment, a thermal imaging camera lacking image recognition technology can be used. This would allow the thermal image to be communicated to the active display and overlaid onto the image of an outward scene in the viewing optic. The viewing optic could be programmed to only display "hot spots" of interest. For example, hot spots that indicate human heat, or vehicle heat, etc. Eliminating artificial intelligence will greatly reduce the power consumed by the system. In addition, all appropriate hot spots would appear in the field of view of the viewing optic, allowing the user to evaluate each one to determine if the target was valid or not.

After identifying a valid target, the user would simply move the viewing optic so that the LRF designator in the FOV was over top of the desired hot spot. Once the LRF designator was aligned with the hot spot, the system would automatically trigger the LRF to take a range at that hot spot. After taking a range, the viewing optic could either display a hold point for the range of the target or could simply show the range and the user could use the Active BDC mode and hold on the active BDC reticle for the appropriate measured range to the target.

An additional capability to the system is that it could automatically detect if the hot spot remained within the LRF designator long enough to get a valid range. If not, it would wait to display a range until the hot spot remained within the LRF designator the appropriate length of time to achieve a valid target acquisition before displaying a solution. This would eliminate the second problem with pressing a button.

In one embodiment, the disclosure relates to the technology and method of using an overlaid camera image projected into the first focal plane of a viewing optic, and using that image in conjunction with a LRF designator to automatically range a target.

VIII. Viewing Optic with a Photosensor to Conserve Power

In one embodiment, the disclosure relates to a viewing optic with an integrated display system and a power saving system. In one embodiment, the power saving system is located in a base coupled to the main body of the viewing optic. In one embodiment, the power saving system comprises a proximity sensor. In one embodiment, the proximity sensor is in communication with a microcontroller.

In one embodiment, the power saving system can be used to place the viewing optic in a sleep or standby mode when a user/operator is not looking through the optic. In one embodiment, the systems and mechanisms can wake or activate the viewing optic when a user/operator is detected behind the eyepiece of the optic.

Current methods of putting the electronics to sleep or into standby are by using a "time out" feature, which is disadvantageous if the optic is being used for Close Quarter Battle work since the optic must stay on for an indeterminate amount of time as long as there is an operator looking through it. An accelerometer can also be used to detect motion and thus turn the system on. The disadvantage of that method is that if an operator is doing observation then the gun may have very little movement for long periods of time and thus go to sleep, even though the operator is still looking through the optic.

In one embodiment, the disclosure relates to a system to conserve battery power by turning on the viewing optic when there is an operator detected behind an eyepiece of the optic.

In one embodiment, the power saving system can be used in any electro-optics compatible with implementing a proximity sensor that is within a few inches of where the operator's face will be when using the optic.

In one embodiment, the disclosure relates to a viewing optic having a main body and a base coupled to the main body, wherein the base has a window in the back of the base toward eyepiece.

In one embodiment, the base has a proximity sensor installed into a carrier and the carrier is installed into the window located at the end of the base toward the eyepiece. The proximity sensor can communicate a signal to a microcontroller in the base or main body when the proximity sensor detects a reflection that is within a few inches of the window. The distance at which an object will activate the sensor can be adjusted either at the factory or a software option can be built into the user interface to allow the operator to either adjust the sensitivity of the sensor or disable/enable the auto sleep/standby feature.

Figure 72:
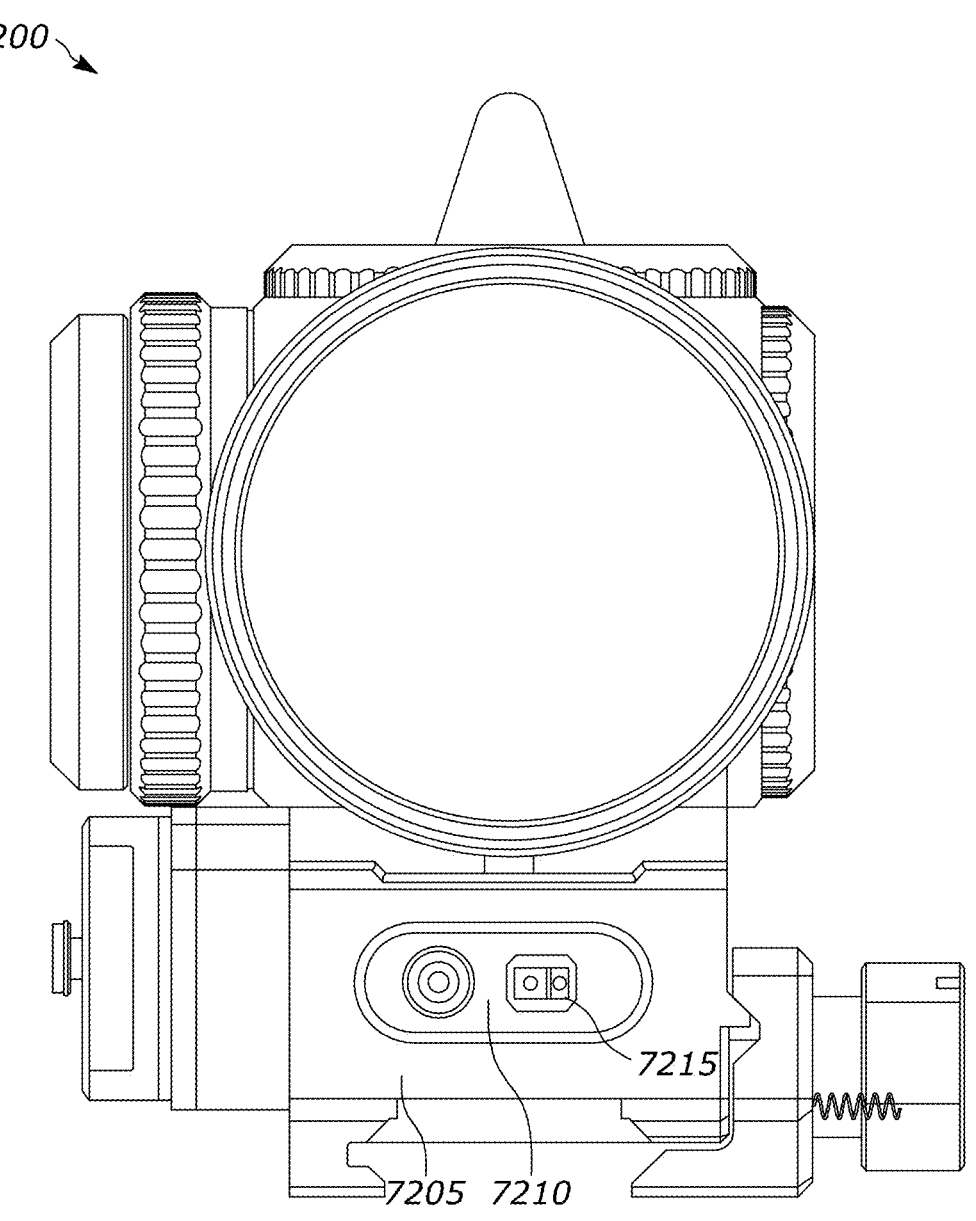
FIG. 72 is a representative depiction of the rear of the viewing optic showing a window milled into a base coupled to the main body of a viewing optic, the proximity sensor, and the carrier, which are all located below the eyepiece.

FIG. 72 is a representative depiction of a viewing optic 7200 having a base 7205. The base 7205 has a window 7210 located toward the eyepiece of the main body of the viewing optic. A proximity sensor and carrier 7215 are located in the window 7210, which is located below the eyepiece.

Figure 73:
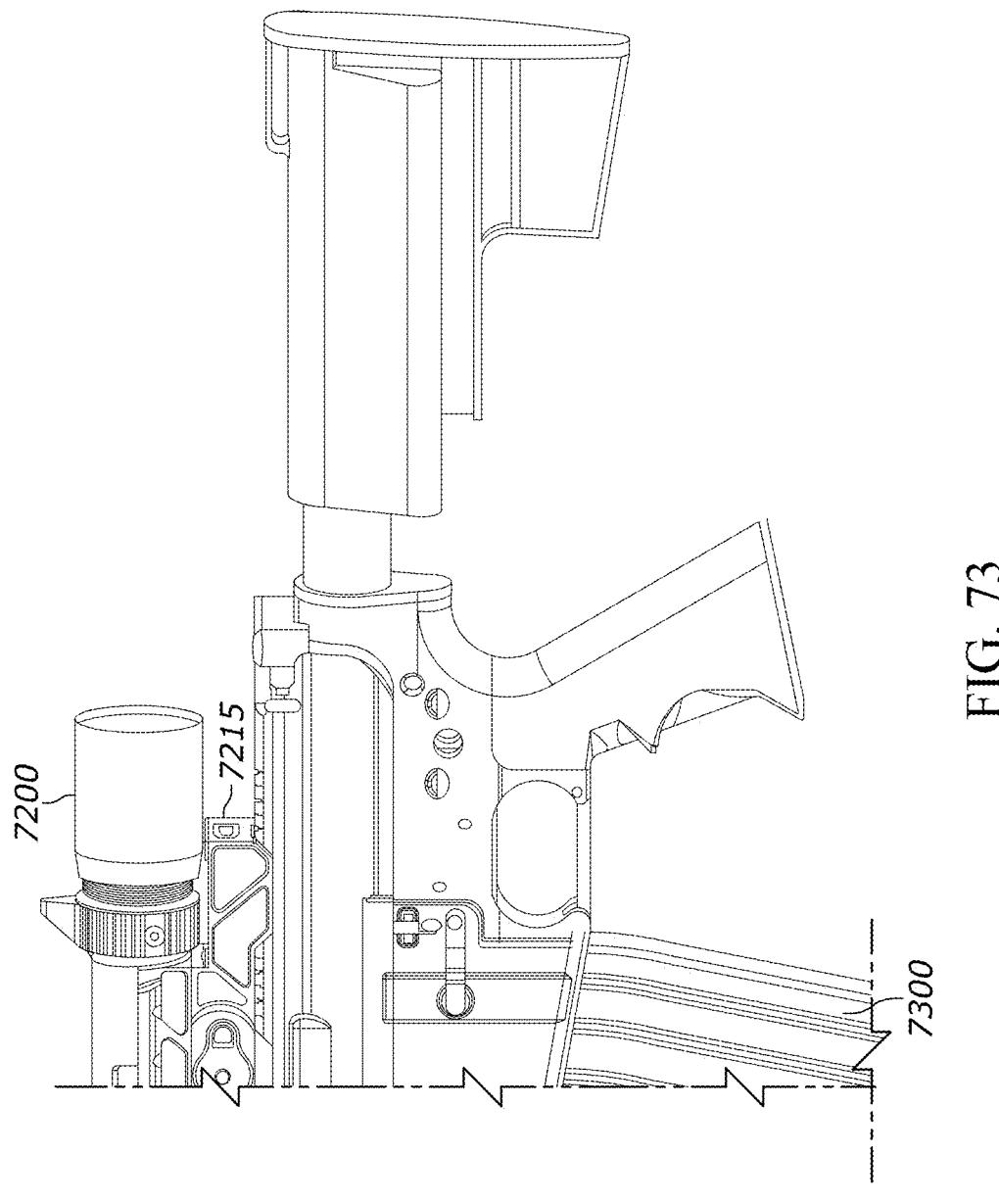
FIGS. 73 and 74 are representative illustrations of a viewing optic with a base having a power saving system, with the viewing optic mounted on a rifle.
Figure 74:
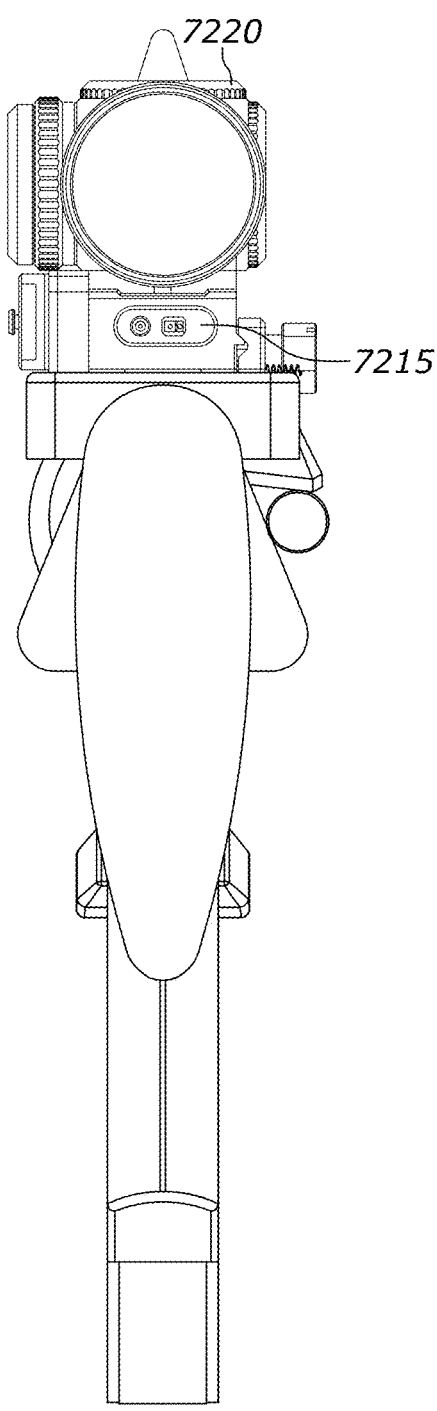

FIGS. 73 and 74 are representative depictions of a viewing optic 7200 having a base with with a power saving system, with the viewing optic mounted on a rifle. It can be seen that an operators face will be within a few inches of the back of the optic. The sensor 7215 in the base 7205 of the viewing optic 7200 will detect a reflection from the operator's face, thus waking the optic up from a sleep mode. When the operator removes his/her head from the view position, the sensor will no longer see a reflection and will put the viewing optic into a sleep or standby mode.

IX. Viewing Optic with Power Rail

In one embodiment, the disclosure relates to a viewing optic having a main body and a base with an integrated display system, wherein the viewing optic can be powered by an external power source that is housed in the host firearm. In one embodiment, the viewing optic has a main body and a base coupled to the main body, wherein electrical pins are built into the base to provide power from the firearm to the viewing optic. In another embodiment, the viewing optic can be powered by the firearm using electrical pins that are built into the remote keypad assembly.

In one embodiment, the disclosure relates to methods and systems to provide additional power for extended periods of time to the viewing optic.

In one embodiment, the disclosure relates to a viewing optic with a main body and a base coupled to the main body, wherein the base has PCBs that are being used to control a display, sensors, and user interface of the viewing optic. In one embodiment, the base has power input pins that protrude through the base and contact a power pad. In one embodiment, the power pad is built into a Picatinny rail.

In one embodiment, the PCBs are located in a position that allows interaction with the input pins. In one embodiment, the pins are sealed against the base of the riflescope to keep the interior of the riflescope protected from the environment.

Figure 75:
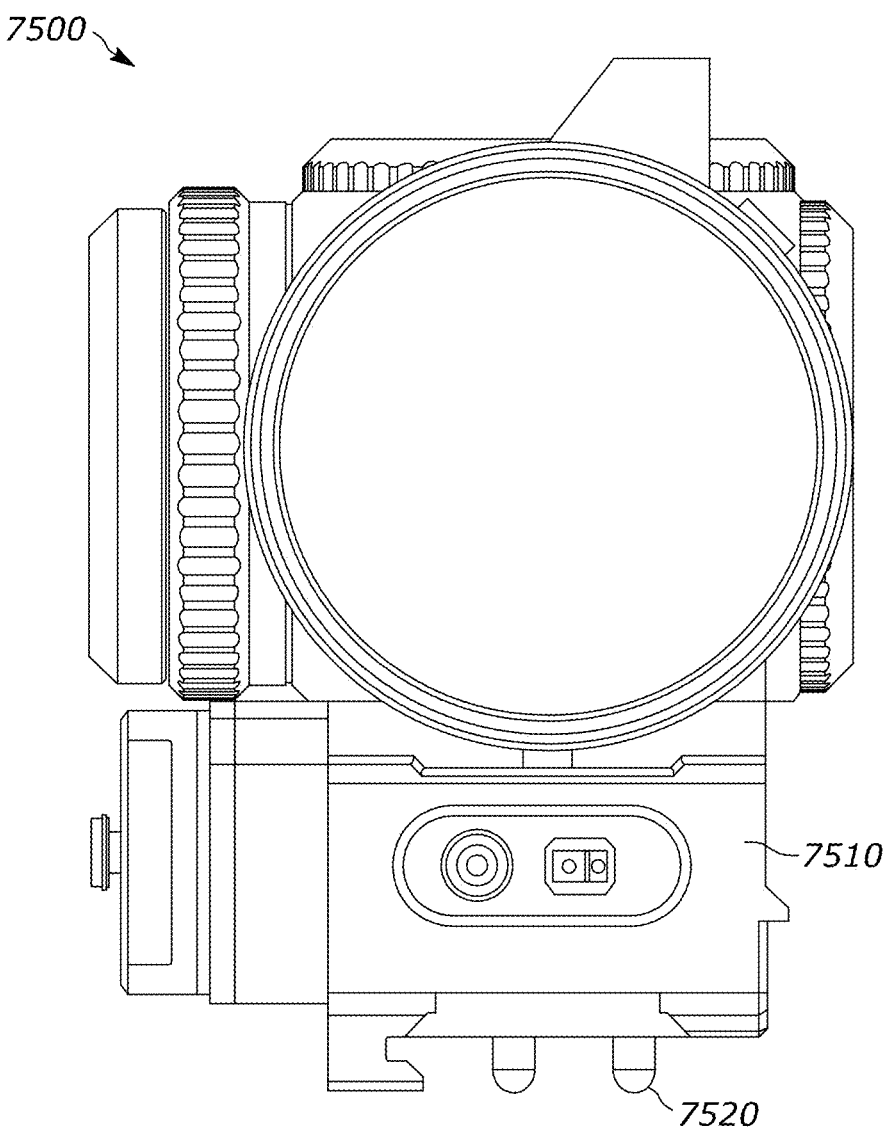
FIGS. 75 and 76 are representative schematics of a viewing optic with power pins protruding through a base coupled to a main body of a viewing optic.
Figure 76:
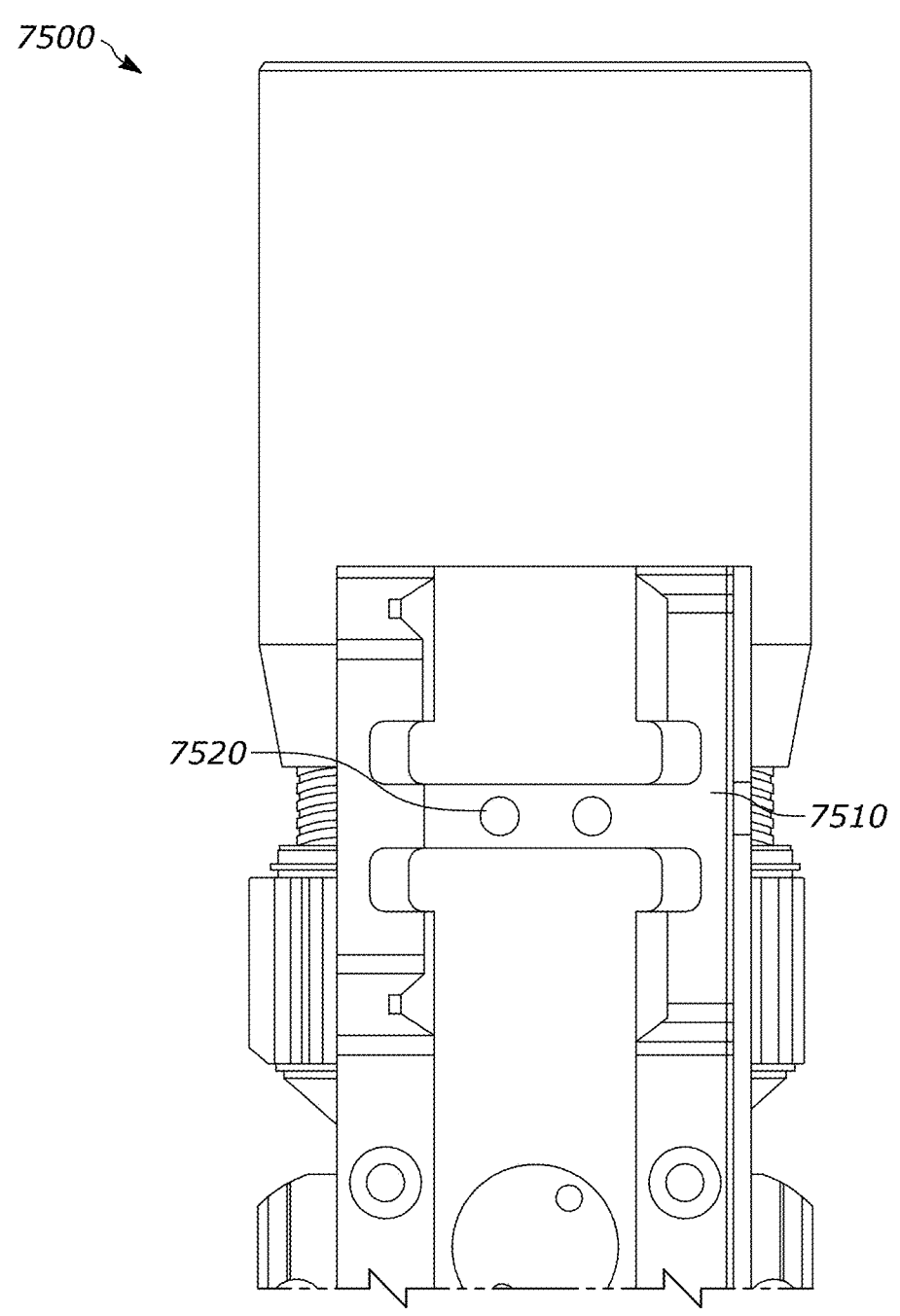

FIGS. 75 and 76 are representative depictions of a viewing optic 7500 having a main body and a base 7510 with power pins 7520 protruding through the base 7510 of the viewing optic 7500.

Figure 77:
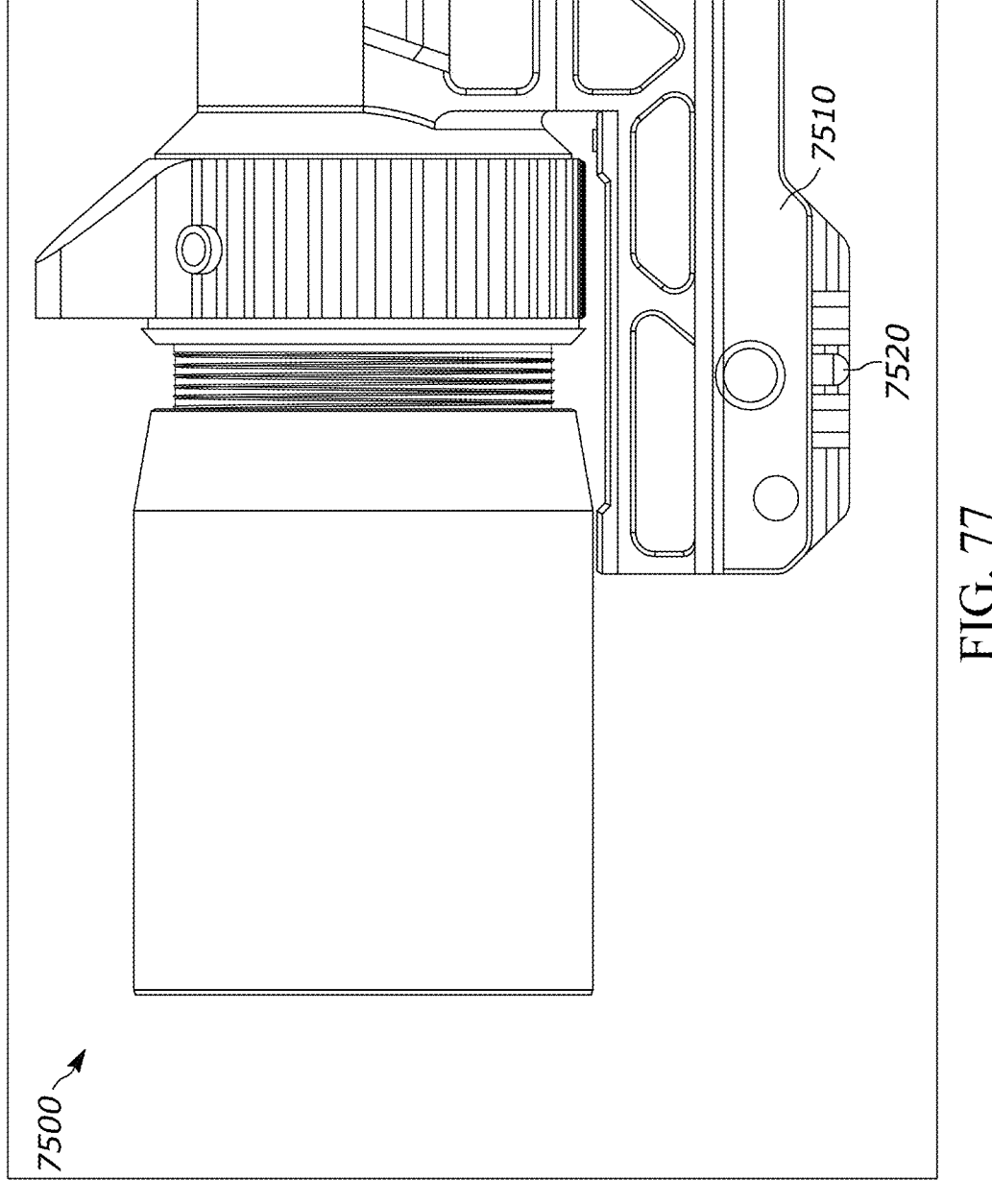
FIG. 77 is a representative side profile of the base showing the power pins protruding through the base of the viewing optic.

FIG. 77 is a representative side profile of viewing optic 7500 showing the power pins 7520 protruding through the base 7510 of the viewing optic 7500.

Figure 78:
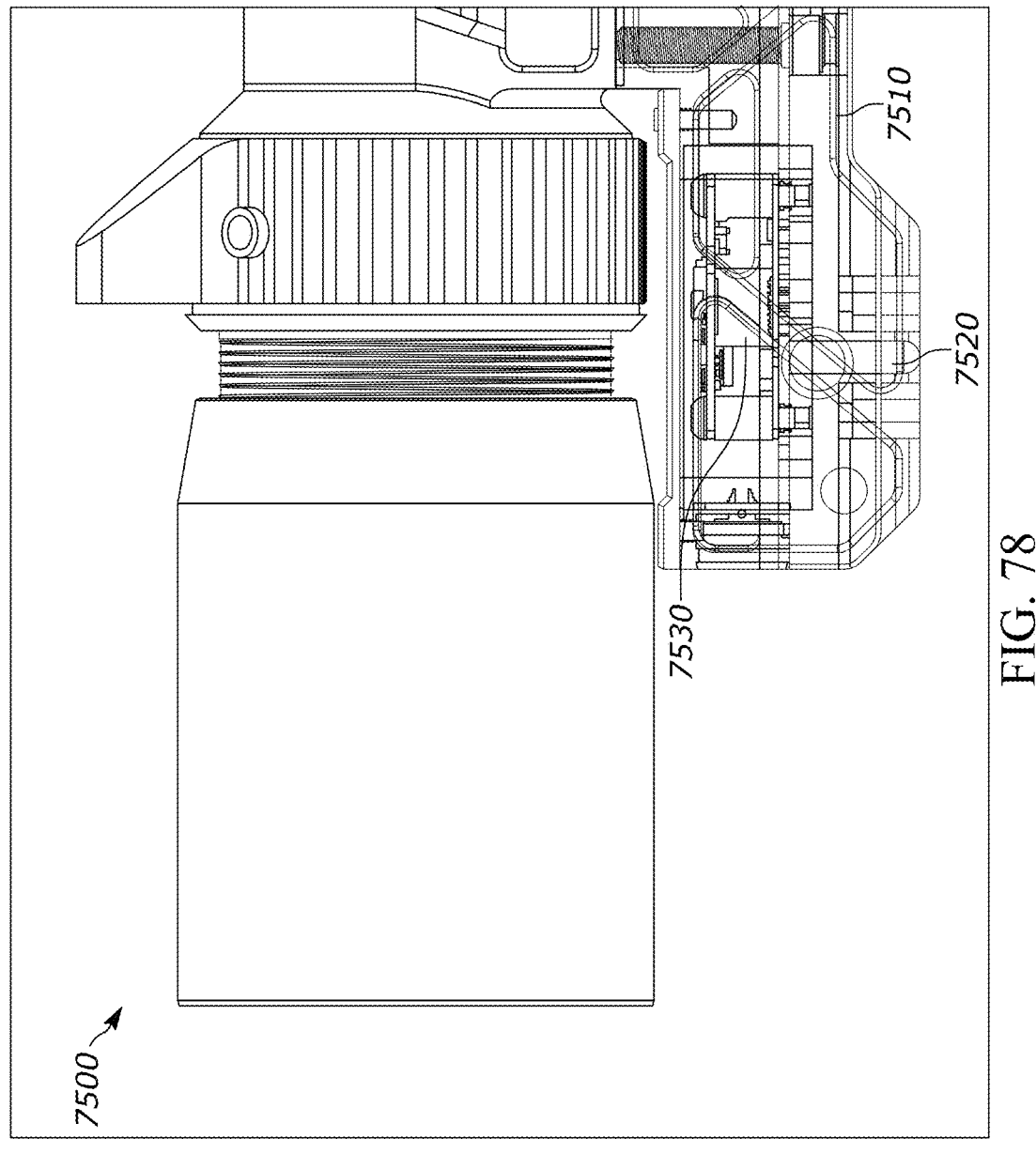
FIG. 78 is a representative view of the side profile with the base of the viewing optic made transparent to show the power pins, which are attached to the PCBs.

FIG. 78 is a representative view of the side profile of viewing optic 7500 with the base of the viewing optic made transparent to show the power pins 7520 which that are attached to the built in PCBs 7530.

In another embodiment, power supplied by the picatinny rail on the firearm could be delivered to the viewing optic through a remote keypad, which is used to control the viewing optic. In this scenario, the power pins are connected to the PCB that is in the remote keypad and they protrude through the built in recoil lug in the remote keypad housing. Power is then sent through two dedicated lines in the cable into the base of the riflescope.

Figure 79:
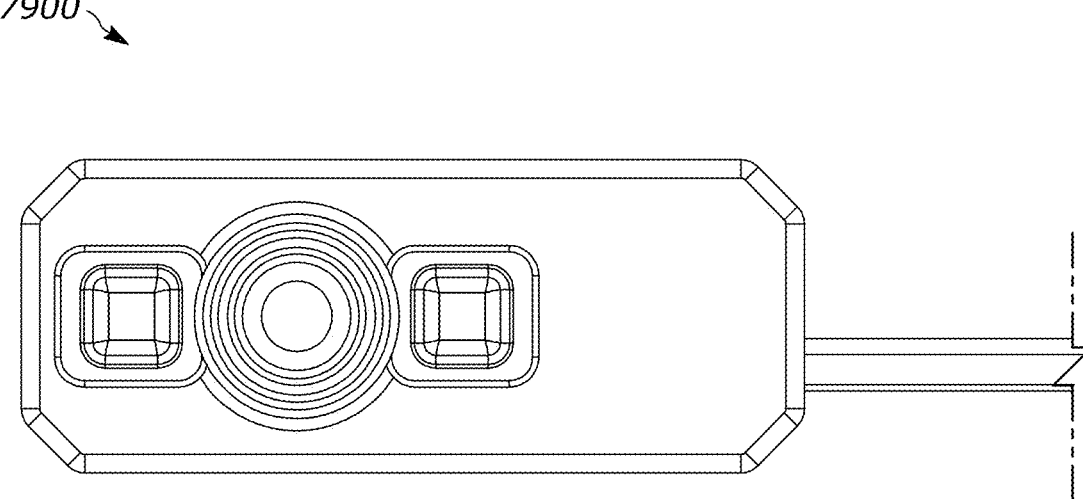
FIG. 79 is a representative image of the top of a remote keypad for communicating with a viewing optic.

FIG. 79 is a representative image of the top of the remote keypad 7900.

Figure 80:
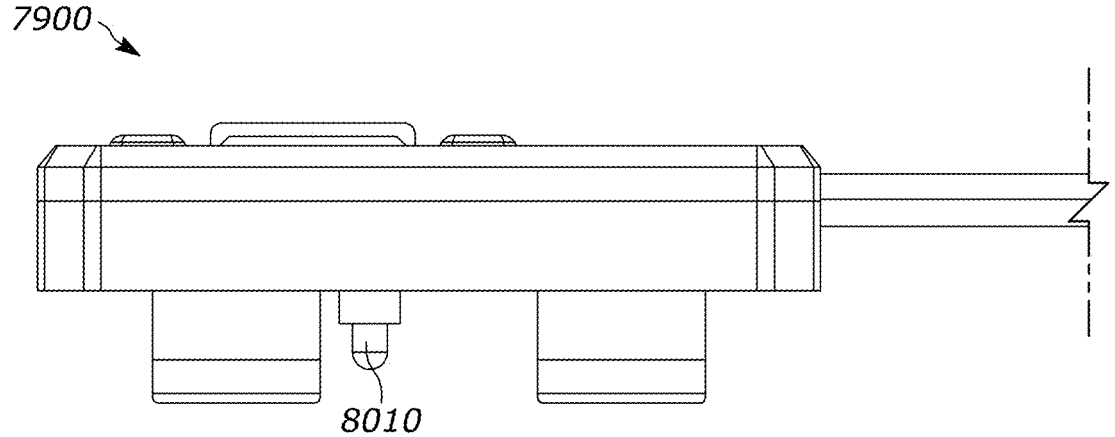
FIG. 80 is a representative side profile of the remote keypad showing power pins protruding through the built in recoil lug.

FIG. 80 is a representative side profile of the remote keypad 7900 showing power pins 8010 protruding through the built in recoil lug.

Figure 81:
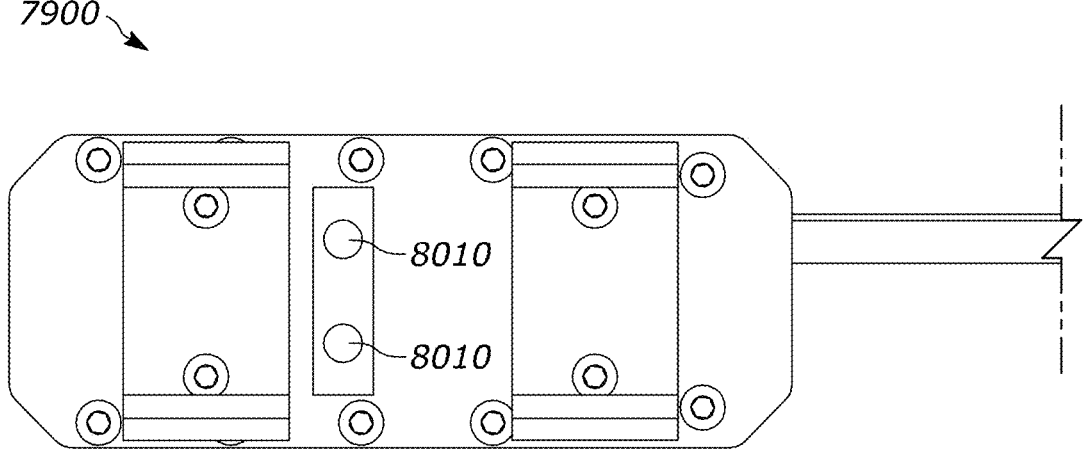
FIG. 81 is a representative bottom view showing the two power pins protruding through the remote recoil lug.

FIG. 81 is a representative bottom view of the remote keypad 7900 showing the 2 power pins 8010 protruding out of the remote recoil lug.

Figure 82:
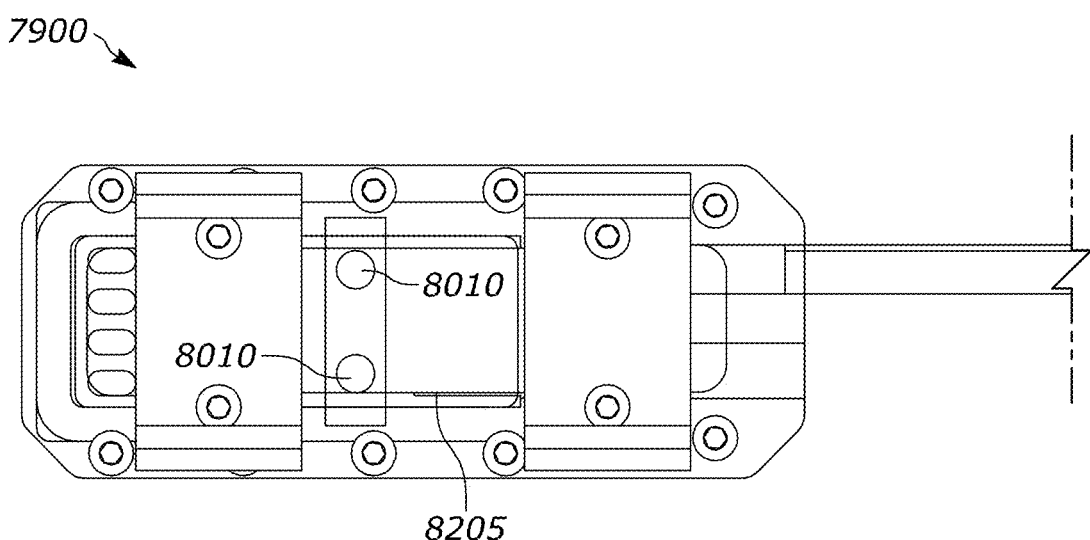
FIG. 82 is a representative bottom view with the cover made transparent to show the PCB inside of the remote body.

FIG. 82 is a representative bottom view of the remote keypad 7900 with the cover made transparent to show the PCB 8205 inside of the remote body.

X. Viewing Optic with a Single Keypad with Multiple Functions

In one embodiment, the disclosure relates to a system comprising a viewing optic having an integrated display system and a remote keypad system with more than one function per keypad button. In one embodiment, the remote keypad can control more than one aspect of functionality of the viewing optic, i.e. more than one function per button. In one embodiment, the function of the button depends on the state of either a control signal or software bit.

In one embodiment, the disclosure relates to a remote keypad that expands the control that a user/operator has over a viewing optic and/or auxiliary devices that are used with the viewing optic.

In one embodiment, the disclosure relates to a keypad for a viewing optic and/or one or more auxiliary devices that are used with the viewing optic. In one embodiment, more than one function is assigned to a single button of the keypad, wherein the desired function can be determined with a software bit or a separate mechanical switch. This can significantly increase the functionality of the viewing optic.

In one representative embodiment, in a first mode, a button can change the brightness of the display and in a second mode, the same button can activate an infrared pointer on the system. Using the same button for more than one function keeps the remote keypad small and simple with the minimal number of buttons required.

Figure 83:
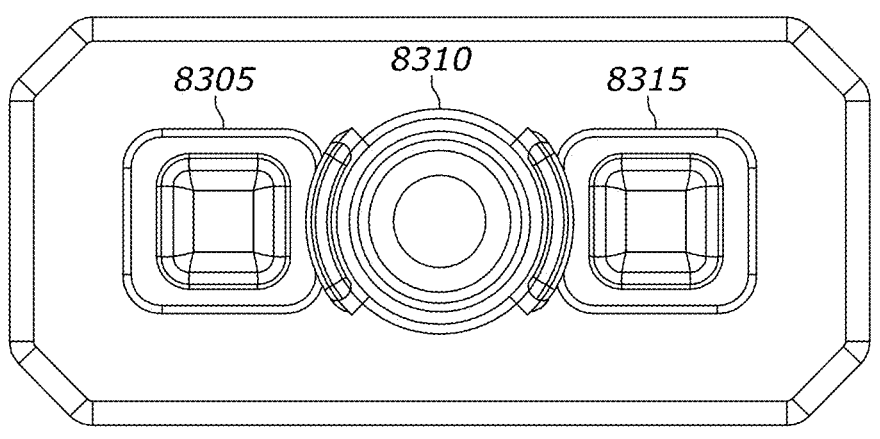
FIG. 83 is a representative depiction of a keypad with three buttons for communicating with a viewing optic disclosed herein.

FIG. 83 is a representative depiction of a keypad with three buttons. A remote keypad associated with a viewing optic has 3 buttons. The top button 8305 is used to increase the brightness of the display, the middle button 8310 is used to fire the laser rangefinder to range a target and the bottom button 8315 is used to decrease the brightness of the display. The functionality of each button depends on the mode of operation.

In one embodiment, the keypad can have 2, 3, 4, 5, 6, 7, 8, 9, 10, or more than 10 modes of operation. In one embodiment, the keypad can be in communication with a processor setting from 10 to 50 modes of operation for the keypad. By way of example, a keypad in communication with a processor having 10 modes of operation for the keypad, would provide 10 functions for each button, with the functionality determined by the mode of operation.

Several methods can be used to change the functionality of the buttons. In one embodiment, when a user/operator presses and holds a button on the remote for a period of time, the micro controller changes the function of one or more buttons. In one embodiment, an operator can press and hold one of the 3 buttons for a prolonged period of time, for example, 1 second, and this will signal the micro controller inside of the viewing optic to change a bit that assigns new functions to the buttons. In one embodiment, pressing and holding the top button 8305 for a period of time can set mode A, pressing and holding the middle button 8310 for a period of time can set mode B, and pressing and holding the bottom button 8315 for a period of time can set mode C. Varying the time each button is engaged can activate further modes of operation. For example, holding button 8305 for five seconds can active mode A, engaging button 8305 five quick taps can active mode F.

In another embodiment, the functionality of the remote keypad buttons can be changed is through a separate mechanical switch on the viewing optic. In one embodiment, a mechanical switch can have 3 distinct positions, which are in communication with 3 separate bits or programs in the micro controller. These bits or programs can be used to assign various functions to the remote keypad buttons.

Figure 84:
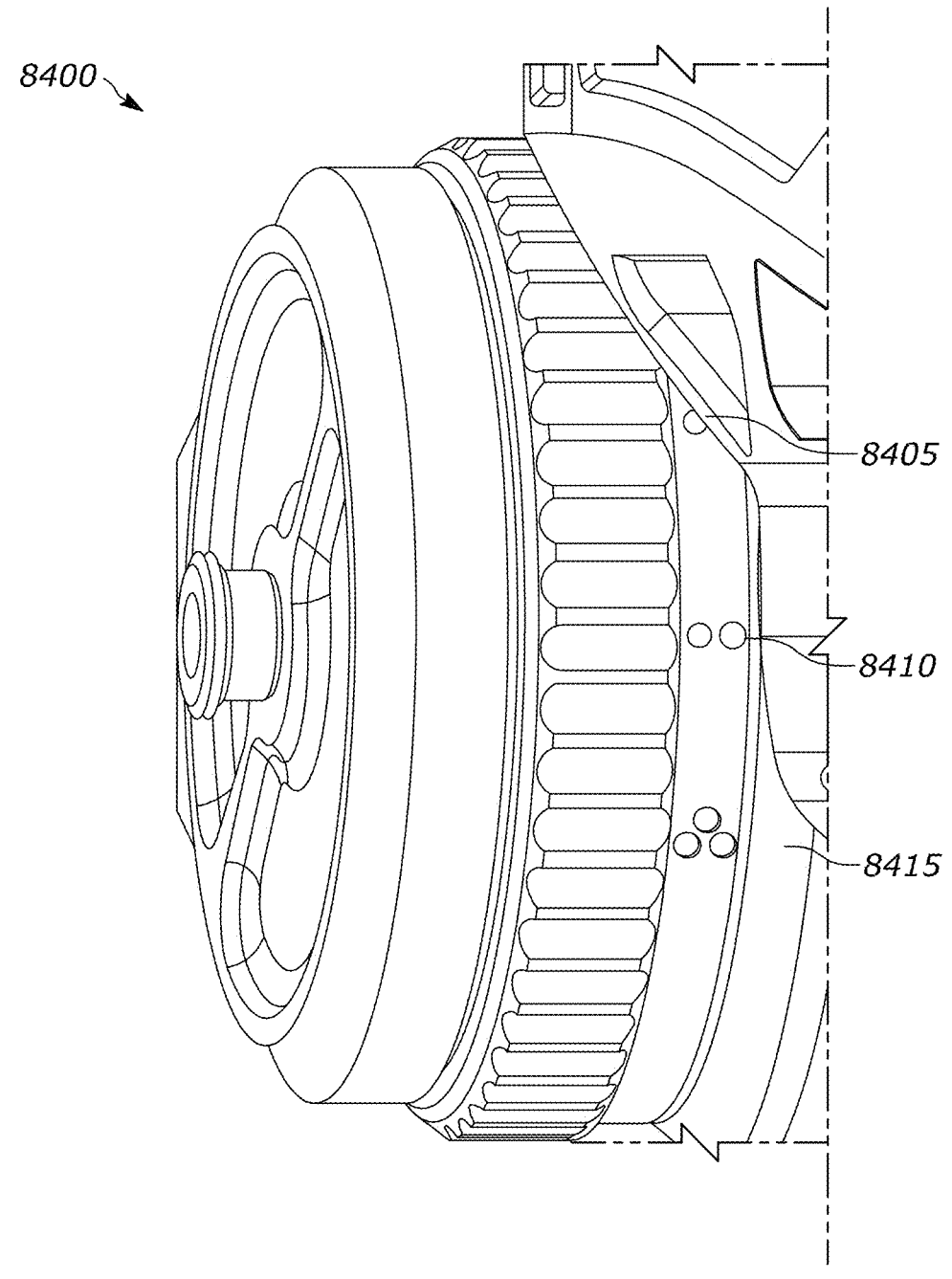
FIG. 84 is a representative depiction of a viewing optic with a mechanical switch for altering functionality of a remote keypad for communicating with the viewing optic.

A representative example is shown in FIG. 84. The viewing optic has a switch 8400 in communication with a remote keypad 8300. A first setting 8405 can assign the top button 8305 of a remote keypad 8300 the function to increase display brightness, the middle button 8310 could fire the laser rangefinder, and the bottom button 8315 could decrease display brightness. When the mechanical switch 8400 is set to a second setting 8410, the function of the top 8305 and bottom buttons 8315 can be programmed to turn on and off auxiliary pointing lasers on the viewing optic and the middle button 8310 can still be programmed to fire the laser rangefinder. When the mechanical switch 8400 is set to a third setting 8415, the functions of the 3 buttons could be altered again. For instance, if the viewing optic is equipped with a digital magnetic compass and location and landmark data was saved to the memory of a micro controller then information about the position of objects could be displayed inside of the field of view of the viewing optic (augmented reality data).

In one embodiment, the keypad is in communication with a processor of the viewing optic that allows varying modes of operation to be assigned to each button or switch of the keypad. For example, in one mode of operation, the buttons of the keypad have specific functions for marking a target of interest. The operator can use the laser rangefinder to range a target and, use the heading data from a digital magnetic compass to "mark" a target of interest inside the field of view. The buttons on the keypad could be assigned functions that are specifically suited for this task.

The center button on the keypad could be used to fire the laser rangefinder to range the target. Once the target is ranged, the top and bottom buttons could be used to select from a predefined list of descriptors to label the target, e.g. "landmark," "friendly," "hostile," "unknown" etc. Once the operator is done with this action, the mechanical switch can be changed to quickly assign functions back to the remote keypad buttons that allow the operator to change brightness settings, activate an infrared laser, or obtain a ballistic solution for a target downrange.

XII. Viewing Optic with a Relative Coordinate Mapping System

In one embodiment, the disclosure relates to technology and a method of using a viewing optic with an integrated display system to accurately tag and track targets using a relative coordinate mapping system, and/or drone technology.

Soldiers need to be able to accurately identify the location of enemy targets and to share that location with other soldiers, close air support, etc, and to be able to see those targets easily by having them overlaid into the field of view of their primary optic. The most obvious way to achieve this is using a combination of GPS, compass heading, altitude, inclination, and range finding sensors. However, there are disadvantages in relying on GPS, such as GPS signals require direct line of sight to the GPS satellite, which may not always be possible. Using relative coordinate technology and/or the use of drones, the need for GPS can be diminished. Relative Coordinate Technology becomes feasible when used in conjunction with a viewing optic having an integrated display system.

In one embodiment, a user would be able to point the viewing optic with an integrated display system at a landmark or target and "tag" it. If the user "tagged" several targets, then a relative location map could be created from the tagged targets. These tagged targets could be transmitted to a viewing optic of other users, who would see those tagged targets displayed in the field of view. All this target data would then be stored locally in one or memory devices in the viewing optic.

In one embodiment, the user could also use drones either as an alternative to tagging targets, or as a supplement to tagging targets. This would work by launching a "cloud" of many small or micro drones that would contain cameras and the appropriate sensors to fly over a battlefield and begin tagging and marking landmarks. The drones could share that information with each other and back to the users who would have it displayed in the active display of their viewing optic.

By using relative coordinate technology and/or a cloud of drones, the disadvantages of GPS can be overcome:

With multiple users and multiple viewing optics, there becomes an inherent redundancy in the stored target data. When using a cloud of drones, that redundancy can be increased even further. With redundancy, it becomes much less likely that a signal or data would be lost.

GPS requires sending and receiving data over very long distances to and from satellites in orbit. By using other users who are in the same battle space, or a cloud of drones in the same battle space, the network is much closer to the users and target, which increases the accuracy of the user and target coordinates.

GPS is much easier to block, since there are a limited number of GPS satellites. With a cloud of users and/or drones, it becomes much harder to block all the signals and creates more redundancy.

Eliminating the need for a GPS module makes the viewing optic less bulky.

XIII. Smart Optic Remote with Flood Capability

Figure 85:
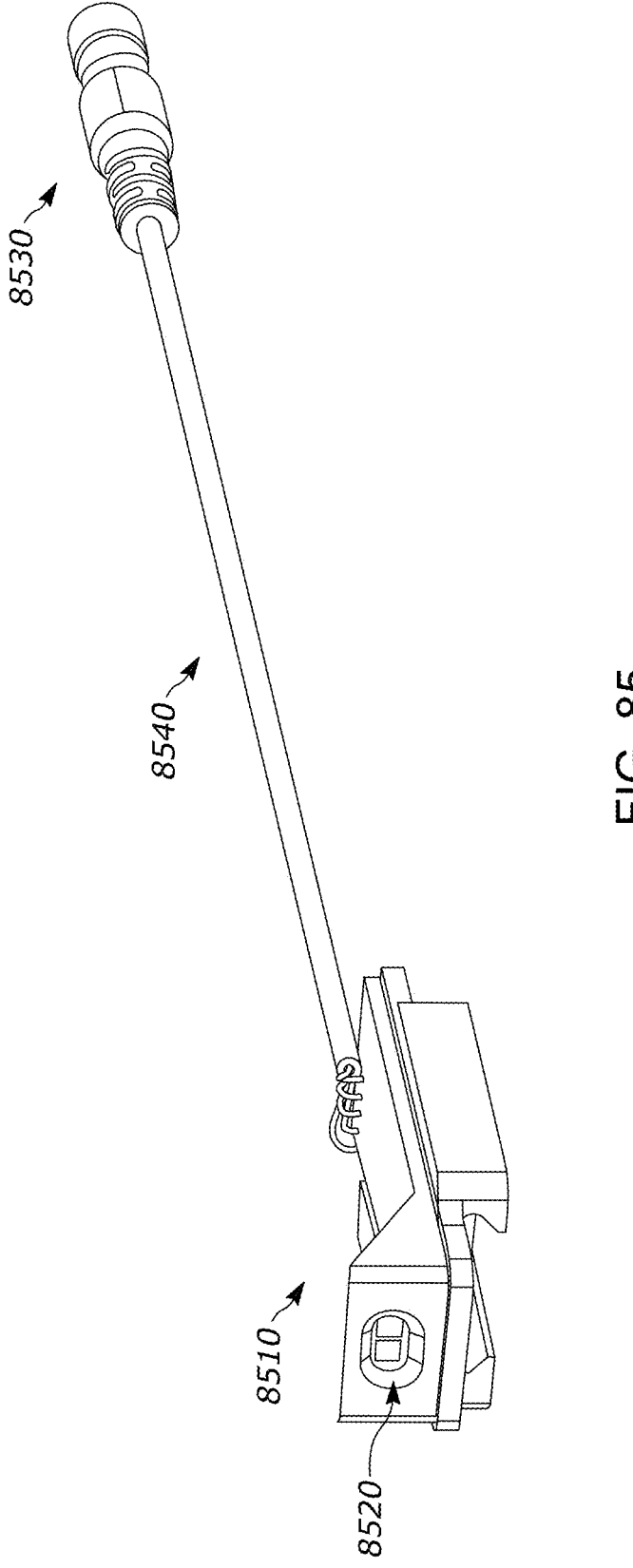
FIG. 85 is a representative depiction of a remote for a viewing optic with flood light capability.

In one embodiment, flood light capability can be integrated into the remote of a viewing optic disclosed herein. FIG. 85 details the basics of the design.

The smart remote body (1) contains an illumination source (2) (in this case LEDs). The remote is connected to the smart optic via a cable (4) and connector (3).

In one embodiment, the light of the flood could be any wavelength to include visible lights, Near IR (NIR), SWIR, or any other desired wavelength.

In one embodiment, a single flood is used with a fixed output and is not adjustable in beam divergence, elevation, or azimuth.

In one embodiment, the remote with flood light capability has an adjustable beam angle, allowing the user to select the size. The beams could be infinitely adjustable via a bezel, have fixed adjustments controlled via remotes, or adjusted via another means.

In one embodiment, the remote with flood light capability has an adjustable intensity. The intensity/power could be adjusted by a menu setting in the smart remote, via a button or switch setting, rotary knob, a wheel or sliding power bar that allows for infinite adjustment, or via another means.

In one embodiment, the remote with flood light capability can be adjustable for the emitted wavelength. For example, the wavelength could be adjusted in color or visibility spectrum. The wavelength could be adjusted by a menu setting in the smart remote, via a button or switch setting, via a sliding power bar that allows for infinite adjustment, or via another means.

In one embodiment, the remote with flood light capability has azimuth and elevation adjustment that allow it to be coaligned with an aiming laser. The adjustment mechanism could mimic a riflescope or weapon mounted aiming laser. The adjustment mechanism could also use a pivoting head and be secured via a locking collar the user tightens down. The flood could also be adjusted by any other mechanism that would precisely or generally hold a direction under weapon recoil, impact, and other disturbances.

In one embodiment, the remote with flood light capability could have a flood paired with an aiming laser. The flood/s and the laser could be slaved together or have separate adjustments.

In one embodiment, the remote with flood light capability could have multiple flood types integrated into a single remote, such as IR and white light, a wide and narrow beam IR flood, a white light, IR and a SWIR flood, or any other combination of illuminators. The illuminators could be slaved together or could be independently adjustable.

In one embodiment, the remote has a physical interface to attach the flood. The flood module could then be removed and used as needed on the remote. The flood module could have its own buttons/controls or be controlled by buttons/controls already on the remote or viewing optic. The flood module could have its own battery or could use power that is already supplied to the remote.

In one embodiment, the flood could have exchangeable heads/illumination sources. The exchangeable head could allow for upgrades, repair/replacement, or the altering of emission wavelength.

In one embodiment, the remote with flood light capability has an additional onboard battery. In another embodiment, the flood draws power only from the viewing optic. In another embodiment, the flood remote draws power from a powered rail or other mechanism.

In one embodiment, the remote with flood light capability could mounted to a picatinny rail on the handguard. In another embodiment the remote could be mounted to an M-LOK or Key-Mod slot. In another embodiment the remote is secured to the weapon via another mounting mechanism.

In one embodiment, the remote with flood light capability could be mounted in any orientation on the weapon (12 O'clock, 9 O'clock, 6 O'clock, 3 O'clock, etc).

In one embodiment, the remote with flood light capability could be wireless and not connect to the viewing optic via a cable. The remote could be connected via Bluetooth, ISW, or another wireless interface. In another embodiment, the remote is connected to the scope via data from a smart rail or similar system.

In one embodiment, the remote with flood light capability has light created by LEDs. In another, the floods are created via a laser. In another the flood is created through an incandescent bulb, or any other illumination source/method. In systems with multiple wavelengths, beam patterns, or power outputs the illumination sources can be mixed and matched if so desired. For example, the flood could use LEDs for light spill and lasers for increased light throw. They could be turned on independently or powered at the same time through the same controls.

The remote cable could be any length. The remote does not need to be perfectly positioned on the end of a handguard.

XIV. Flood Illuminator Controlled by Magnification Setting of a Viewing Optic Illuminators, also known as flashlights or weapon lights, serve an important tool in tactical environments. They allow the user to positively identify threats no matter the lighting system. They are even important for use with night vision goggles (NVG).

Traditional night vision gathers IR light to form an image. In environments where there is little to no ambient light—like inside a blacked-out building or a cave, there isn't enough IR light for the user to see even under night optical/observation device (NODs). To counter this, users employ IR illuminators to light up their environment. However, like white light flashlights, there is a tradeoff between spill (the amount of area illuminated) and throw (distance).

Each beam profile has its own place. Beams with high throw are great for illuminating targets at distance and penetrating photonic barriers (other environmental light that washes out the user's light source). Beams with high spill are useful for room clearing operations. In that Close Quarter Battle (CQB) environment, users don't need to see very far, but they need maximum situational awareness, so they want a very wide area to be illuminated.

To address the most possible scenarios, many IR illuminators often have an adjustable focus, or have multiple settings so that the user can choose the beam profile that is best suited for their needs. The PEQ-15 family of lasers uses a focusing dial that tightens or widens the beam profile. It also comes with a flip cap that, when employed, acts as a diffusor creating maximum spill. The MAWL by B. E. Myers has two buttons with 3 different settings, providing the user with 6 different beam profiles that switch between very wide spill, long throw, and combination/hybrid profiles for mid distance ranges. The disadvantage of these legacy systems is that they are slow to employ, or they add substantial complication to the user interface by increasing complexity of button operation.

There exists a need for an illumination and aiming apparatus that will allow a user to rapidly adjust the settings of the illumination and aiming functions in response to target position and environmental conditions for a particular engagement, without requiring the user to alter or adjust firing grip, or spend unnecessary time adjusting and changing illumination and aiming settings. There is also a need for an illumination and aiming apparatus that is modular and highly adaptable to a user's specific mission and environmental requirements. Further, there is a need for a compact and accurate apparatus for adjusting the illumination direction that does not change during use.

Thus, a need exists for systems and methods that offer the user the ability to adjust their illuminator beam divergence quickly and easily.

In one embodiment, the disclosure relates to a viewing optic that has a magnification sensor that controls the beam of an illuminator device that communicates with the viewing optic.

In one embodiment, the light of the illuminator could be any wavelength including but not limited to visible lights, Near IR (NIR), SWIR, or any other desired wavelength. There could be multiple illuminators integrated, or it could a single illuminator that is adjusted.

In one embodiment, the illuminator may be integrated into a remote of the viewing optic, or a ranging module, or into the viewing optic or into the weapon or firearm. The illuminator could reside anywhere on the viewing optic, weapon, or even the user if desired.

In one embodiment, the viewing optic can communicate with the illuminator via a physical connection like a cable or pogo pin connection, indirectly via a power and data rail or similar source, wirelessly via Bluetooth or Intra Soldier Wireless (ISW) or any other wireless interface, or any other method or interface that would allow adequate communication between the two devices.

In one embodiment, the illuminator could have additional controls beyond the viewing optic, provided by any manner of buttons or other controls. Alternatively, the viewing optic could be the only means of control for the illuminator or the controls could be duplicated on the illuminator itself.

In one embodiment, the illumination device has 2 IR illuminators—both a wide-angle high spill illuminator and a narrow angle illuminator with greater throw. The system will default to the narrow angle illuminator. When the magnification setting of the viewing optic is turned down to a preset setting, such as the lowest magnification, or the lower half of the magnification, or some other increment, the wide-angle illuminator is activated. The user could select whether the narrow angle illuminator would stay on or if it would turn off once the wide-angle flood was turned on.

The logic of this embodiment is that with viewing optic with an integrated display system the lowest magnification setting is used for Close Quarters Battle (CQB)— where engagement distances are not very long. Putting the scope to 1× the lowest magnification would match how the user would use the direct view optic in a daytime environment.

Having the wide-angle illuminator correspond to the lowest magnification setting means that the viewing optic with an integrated display system is completely optimized for close engagements when at 1×. This would allow for consistent Tactics, Techniques and Procedures (TTPs) no matter if the user was looking through the viewing optic or looking through NVGs and using the illuminator to help see.

In one embodiment the illumination device has an electronically adjustable lens that is directed by magnification adjustment of the viewing optic. By way of non-limiting example, see FIGS. 65-70 and associated description for one representative embodiment. When the user is on a low magnification, the illuminator has a very wide angle. As the user increases the magnification, the illuminator beam is focused, reducing the spill and increasing the throw.

This has the advantage of also being extremely intuitive to the user. Just as the field of view would decrease as the magnification increased within the viewing optic, the illuminator would go through a similar phenomenon. The illuminated area would shrink as the magnification would increase, but the ability to see further would be increased due to the increased throw of the light.

In one embodiment, the illumination device could be optimized so that the illuminated area matched the field of view through the viewing optic. Even if the user was not looking through the viewing optic, light output would match or generally correspond to what they were seeing in the scope. There would also be minimal unused illumination for the user (lots of spill if they were trying to see long range for example), which could be useful in a tactical environment.

In one embodiment, the illumination device could offer infinite adjustment within the focusing range, and has the potential to be much faster to adjust than a system like the PEQ-15.

In another embodiment, the illumination device can have stepped illumination adjustments, of whatever increment, rather than an infinitely adjustable beam.

In one embodiment, the magnification throw lever could correspond to the power of the illumination device. The lowest magnification could correspond to the lowest illuminator output and the highest magnification could correspond to the highest illuminator output.

In one embodiment, the illumination device could stand alone or be used in conjunction with adjustable flood angles. In another embodiment a button or buttons, knobs, or other control mechanisms could be added to the magnification throw lever to turn the illuminator on or off, or otherwise control the illuminator.

The illumination device and viewing optic described herein are desirable because it allows users to adjust a flood using Tactics Techniques and Procedures (TTP) that are already in place. Additionally, by using hardware that already exists, the illuminator can be smaller, lighter, and cheaper.

The illumination device and viewing optic described herein are a superior solution for adding illuminators to a weapon system having a viewing optic with an integrated display system because it uses existing hardware to control the illuminator. This allows the illuminator to be lighter, cheaper, and smaller. It also prevents having to train users on the use of a complicated remote with lots of button combinations.

XV. Illumination Enabler for Use with a Viewing Optic

In one embodiment, the disclosure relates to an enabler having illumination capability connected to a remote for a viewing optic. In one embodiment, the viewing optic has an integrated display system. By connecting the illumination enabler to the remote, the illuminator is positioned in an ideal location towards the front of the handguard, thereby reducing the amount of glare off the handguard of the weapon or firearm.

In one embodiment, connecting the illuminator to the remote is a cost-efficient method of providing illumination capability since it does not require any previously purchased equipment to be replaced. It also provides modularity to the end user, allowing them to exchange or purchase the capability as needed.

The illumination enabler disclosed herein is also significantly smaller and lighter than the current traditional offerings. As aiming lasers are integrated into the viewing optic with an integrated display system, and power can be drawn from the viewing optic, the illumination enabler disclosed herein is of minimal size.

In one embodiment, the disclosure relates to an illumination enabler that can connect to a remote of a viewing optic with an integrated display system, or to the viewing optic itself.

Figure 86:
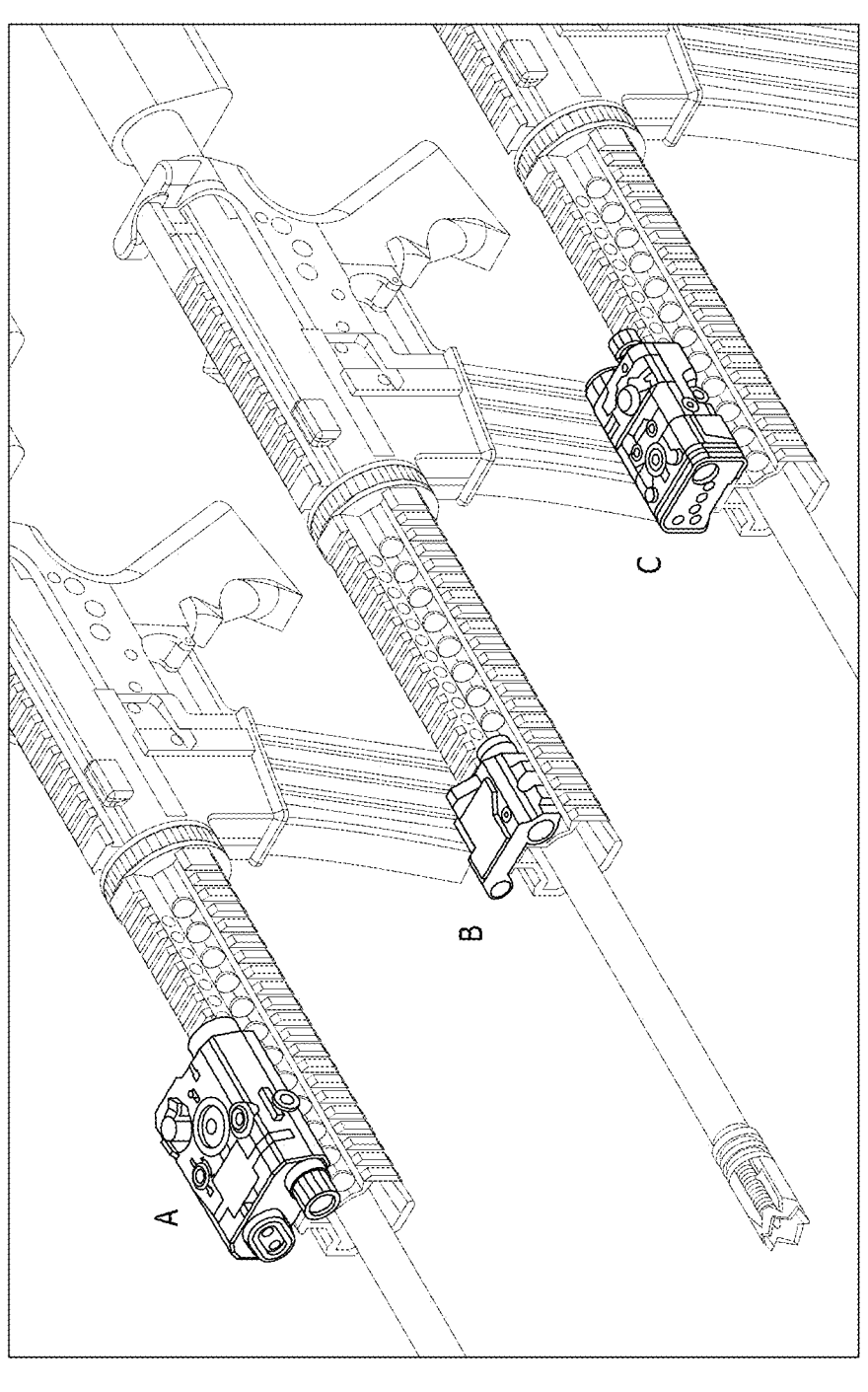
FIG. 86 provides pictures of the PEQ15 by L3 Harris mounted to a weapon (A); the enabler of the current disclosure mounted to a weapon (B); and the NGAL (Next Generation Aiming Laser) by L3 Harris mounted to a weapon (C).

FIG. 86 provides a representative image of the PEQ15 by L3 Harris mounted to a weapon (A). FIG. 86 also shows a representative image of an enabler disclosed herein mounted to a weapon (B). Finally, FIG. 86 shows a representative image of the NGAL (Next Generation Aiming Laser) by L3 Harris mounted to a weapon (C).

Figure 87:
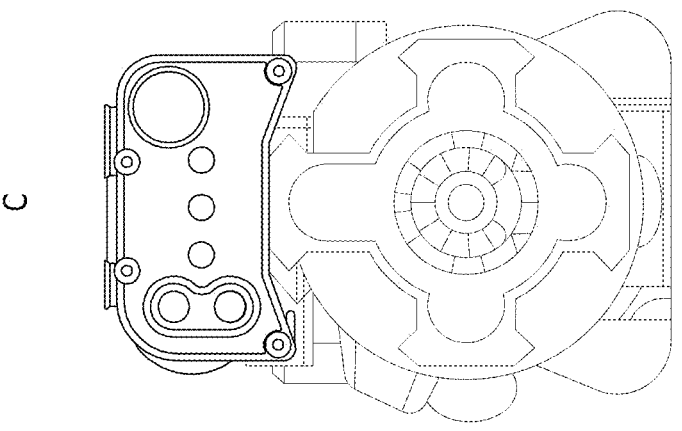
FIG. 87 provides pictures of the PEQ15 by L3 Harris mounted to a weapon (A) and showing the light sources; the enabler of the current disclosure mounted to a weapon (B) and showing the front of the enabler with the light sources; and the NGAL (Next Generation Aiming Laser) by L3 Harris mounted to a weapon (C) showing the light sources.
Figure 87:
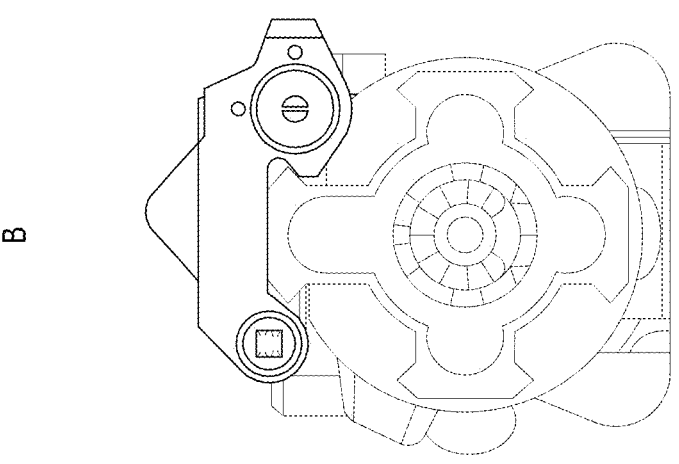
Figure 87:
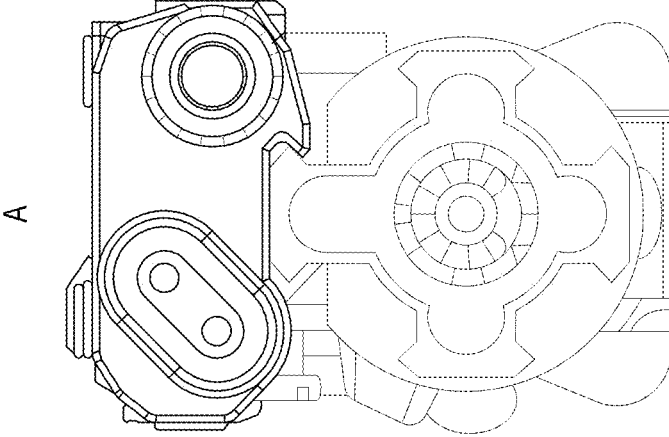

FIG. 87 provides representative images of the PEQ15 by L3 Harris mounted to a weapon and showing the light sources (A). FIG. 87 also provides a representative image of an enabler of the current disclosure mounted to a weapon and showing the front of the enabler with light sources (B). Finally, FIG. 87 provides a representative image of the NGAL (Next Generation Aiming Laser) by L3 Harris mounted to a weapon showing the light sources (C).

Figure 88:
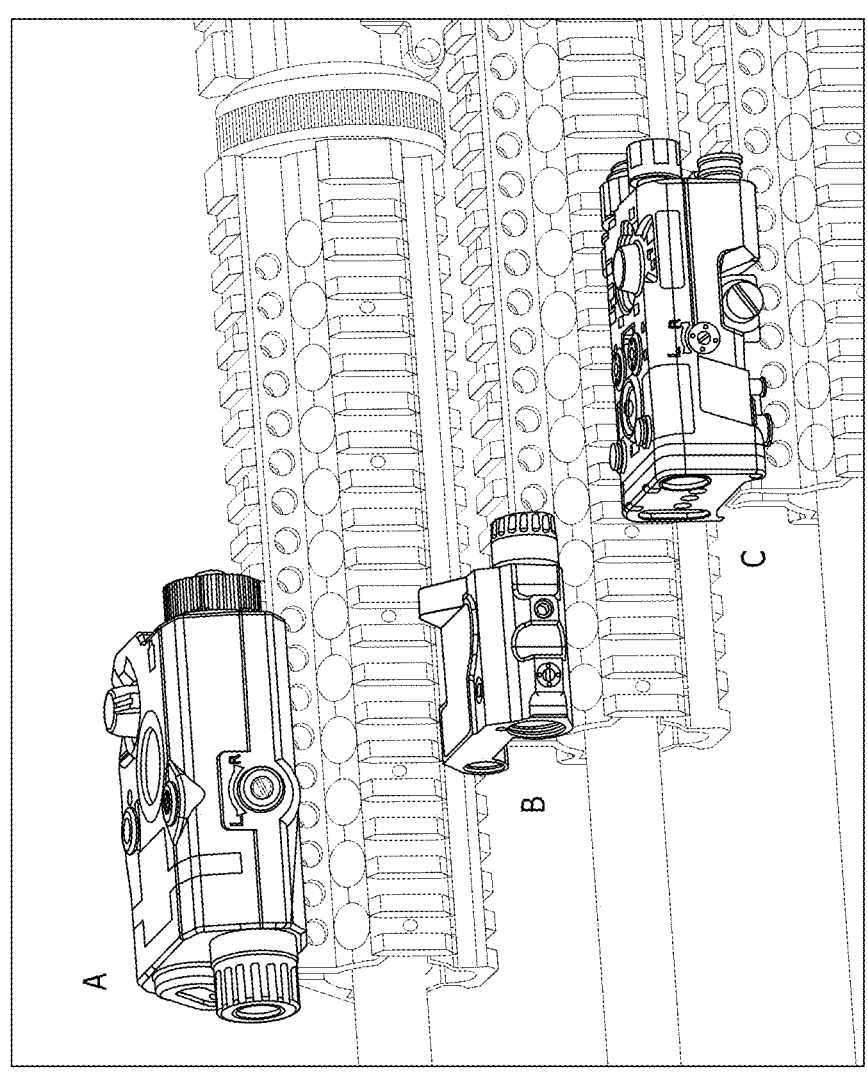
FIG. 88 provides side views of the PEQ15 by L3 Harris mounted to a weapon (A); side views of the enabler of the current disclosure mounted to a weapon (B); and side views of the NGAL (Next Generation Aiming Laser) by L3 Harris mounted to a weapon (C) showing the light sources.

FIG. 88 provides a representative side view of the PEQ15 by L3 Harris mounted to a weapon (A). FIG. 88 also provides a representative side view of the enabler disclosed herein and mounted to a weapon (B). Finally, FIG. 88 provides a representative side view of the NGAL (Next Generation Aiming Laser) by L3 Harris mounted to a weapon (C).

Figure 89:
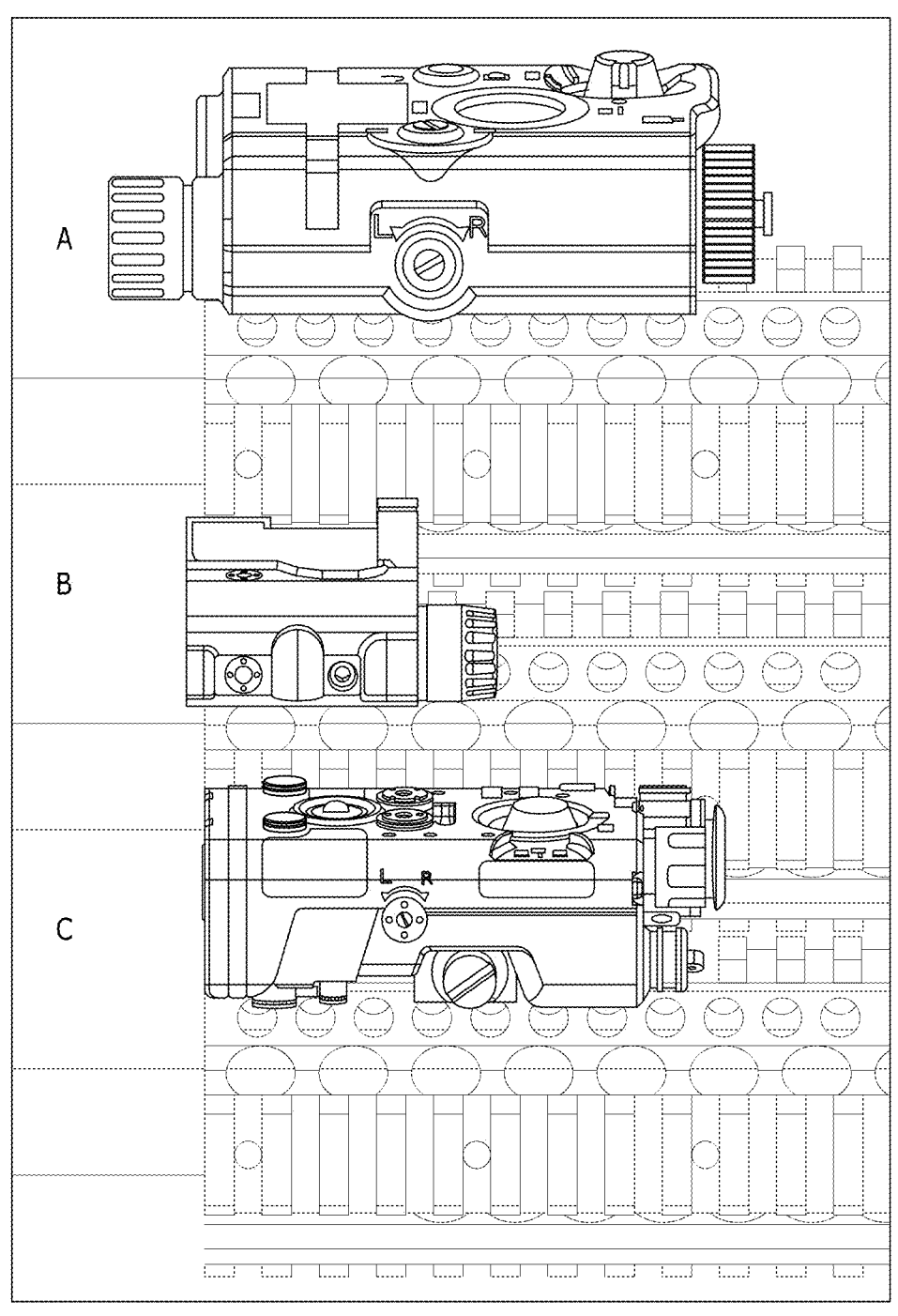
FIG. 89 provides top views of the PEQ15 by L3 Harris mounted to a weapon (A); top views of the enabler of the current disclosure mounted to a weapon (B); and top views of the NGAL (Next Generation Aiming Laser) by L3 Harris mounted to a weapon (C) showing the light sources.

FIG. 89 provides a representative top view of the PEQ15 by L3 Harris mounted to a weapon (A). FIG. 89 also provides a representative top view of an enabler disclosed herein mounted to a weapon (B). Finally, FIG. 89 provides a representative top view of the NGAL (Next Generation Aiming Laser) by L3 Harris mounted to a weapon (C).

FIGS. 86-89 depict the illumination device on the 12 O'clock rail, but the illumination device can be mounted on any orientation of the picatinny rail (3, 6, 9 O'clock or another orientation). In another embodiment, the illumination device could have an M-LOK or another mounting mechanism instead of a 1913 rail mount.

Figure 90:
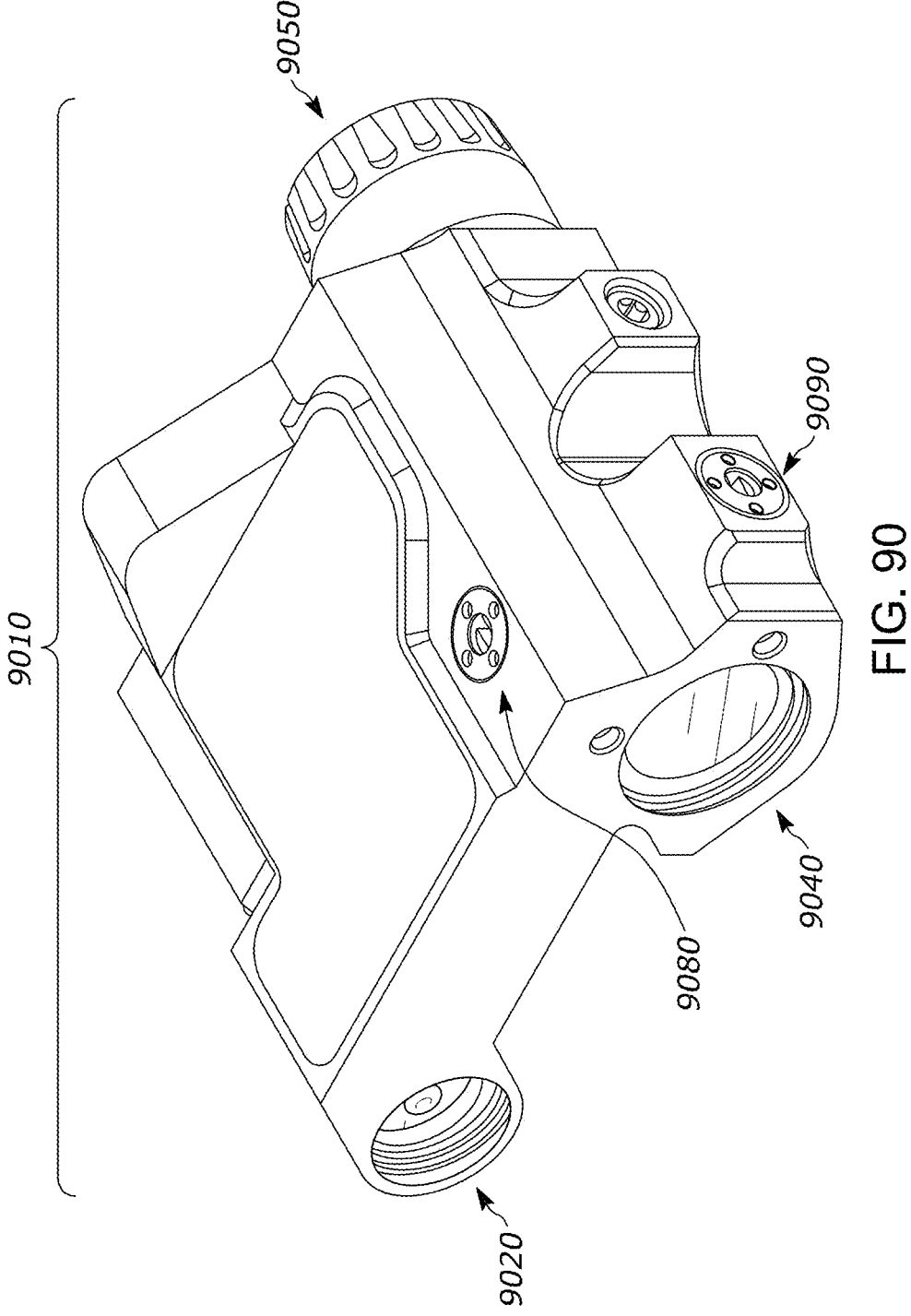
FIG. 90 is a representative depiction of an illumination enabler having a wide beam Illuminator on one side and a narrow beam illuminator on the other side.

FIG. 90 is a representative depiction of an illumination enabler having two light sources with different types of beams of light. The illumination enabler (9010) has a wide beam illuminator or light source (9020) on one side and a narrow beam illuminator or light source (9040) on the other side.

The narrow beam illuminator (9040) can be zeroed to the aiming laser using the narrow beam elevation adjustment (9080) and the narrow beam windage adjustment (9090). Because of the wide throw, the wide beam illuminator (9020) is fixed as it offers little benefit to zero. This allows the unit to be lighter and cheaper.

In one embodiment, the narrow beam illuminator (9040) is a laser and has an adjustable illumination beam that is controlled by the narrow beam focus knob (9050). This allows the user to infinitely adjust the beam pattern from a long-range illumination beam with a 5 mRad (0.3 degrees) spill and a long throw to a mid-range illumination beam with a 110 mRad (6.3 degrees) spill and moderate throw.

The wide beam illuminator (9020), in this iteration, is an LED illuminator with a fixed focused, close-range illumination beam that offers tremendous spill but reduced throw for maximum situational awareness for use in close quarters, like room clearing.

Figure 91:
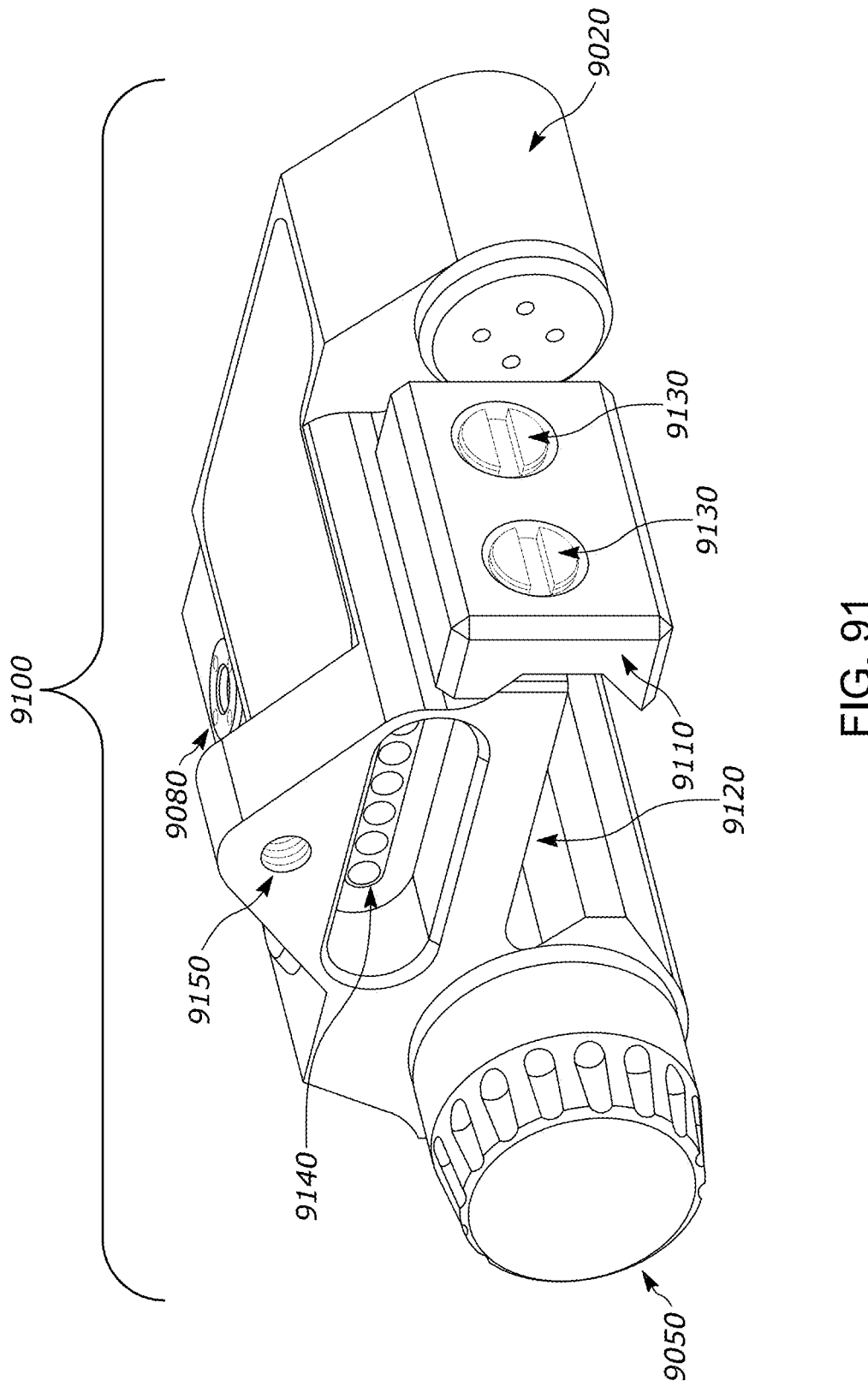
FIG. 91 is a representative depiction of an illumination enabler that connects to the picatinny rail (1913 rail) of a weapon.

FIG. 91 is a representative depiction of an illumination enabler that connects to the picatinny rail (1913 rail) of a weapon. This iteration of the illumination enabler (9100) connects to the 1913 rail of a weapon. A rail clamp grabber (9110) is tensioned against the 1913 rail by a pair of rail clamp cross bolts (9130). Opposite the rail clamp grabber (9110), the illumination enabler (9100) has a 1913 rail cut (9120) to fully grip the 1913 rail from both sides.

Figure 92:
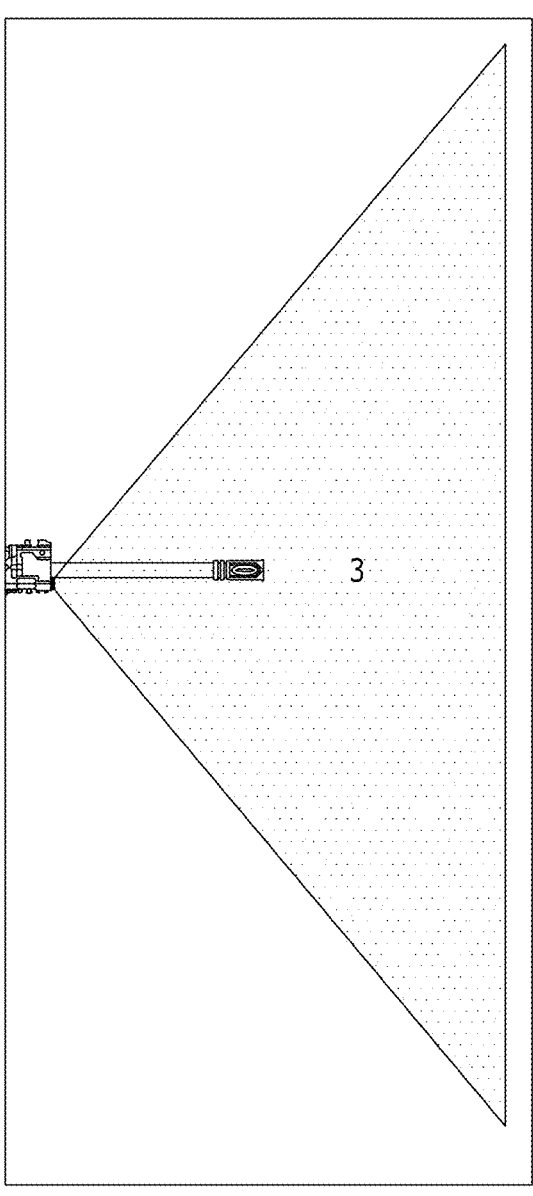
FIG. 92 is a representative depiction of a close-range illumination beam (3) that offers lots of spill but reduced throw for maximum situational awareness for use in close quarters.

FIG. 92 is a representative depiction of a close-range illumination beam (3) from a wide beam illuminator (broad light beam) that offers a tremendous amount of spill but reduced throw for maximum situational awareness for use in close quarters or CQB.

Figure 93A:
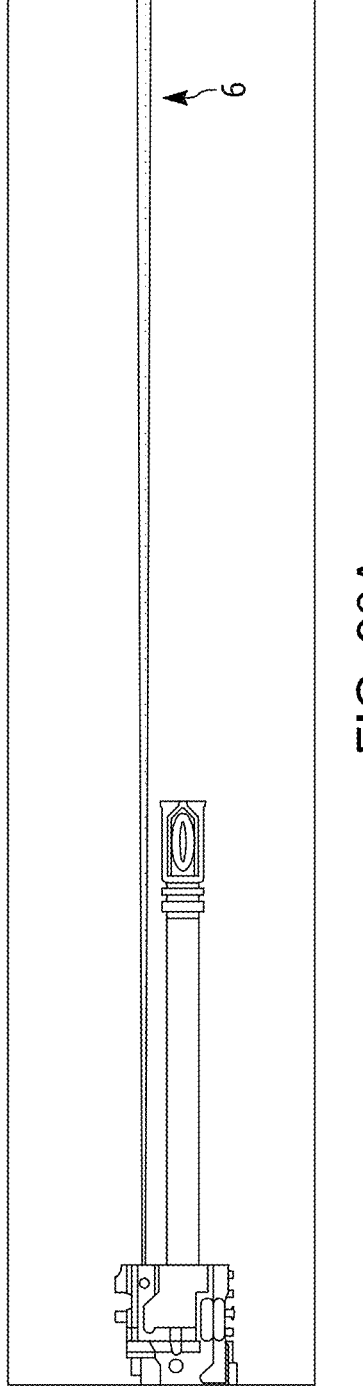
FIG. 93A is a representative depiction of a beam pattern from a long-range illumination beam with a 5 mRad (0.3 degrees) spill.

FIG. 93A is a representative depiction of a beam pattern from a long-range illumination beam (6) (focused light beam) with a 5 mRad (0.3 degrees) spill.

Figure 93B:
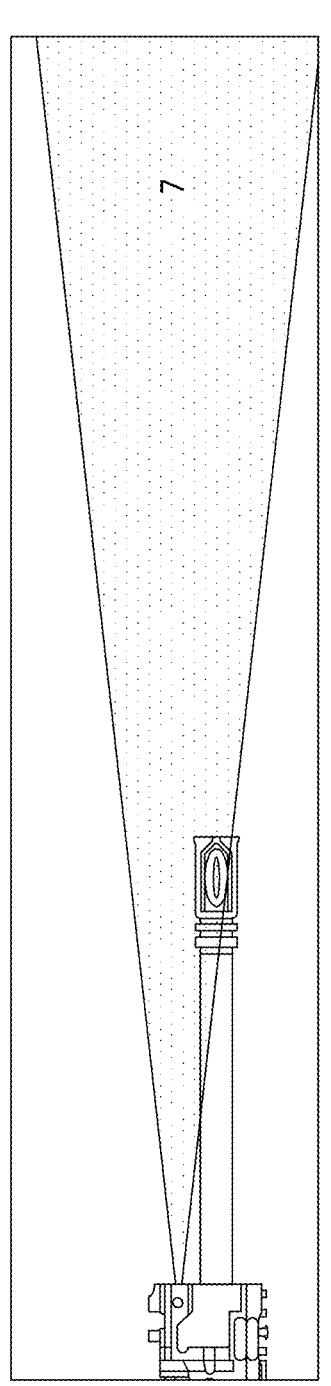
FIG. 93B is a representative depiction of a long throw to a mid-range illumination beam with a 110 mRad (6.3 degrees) spill and moderate throw.

FIG. 93B is a representative depiction of a long throw to a mid-range illumination beam (7) with a 110 mRad (6.3 degrees) spill and moderate throw.

Figure 94:
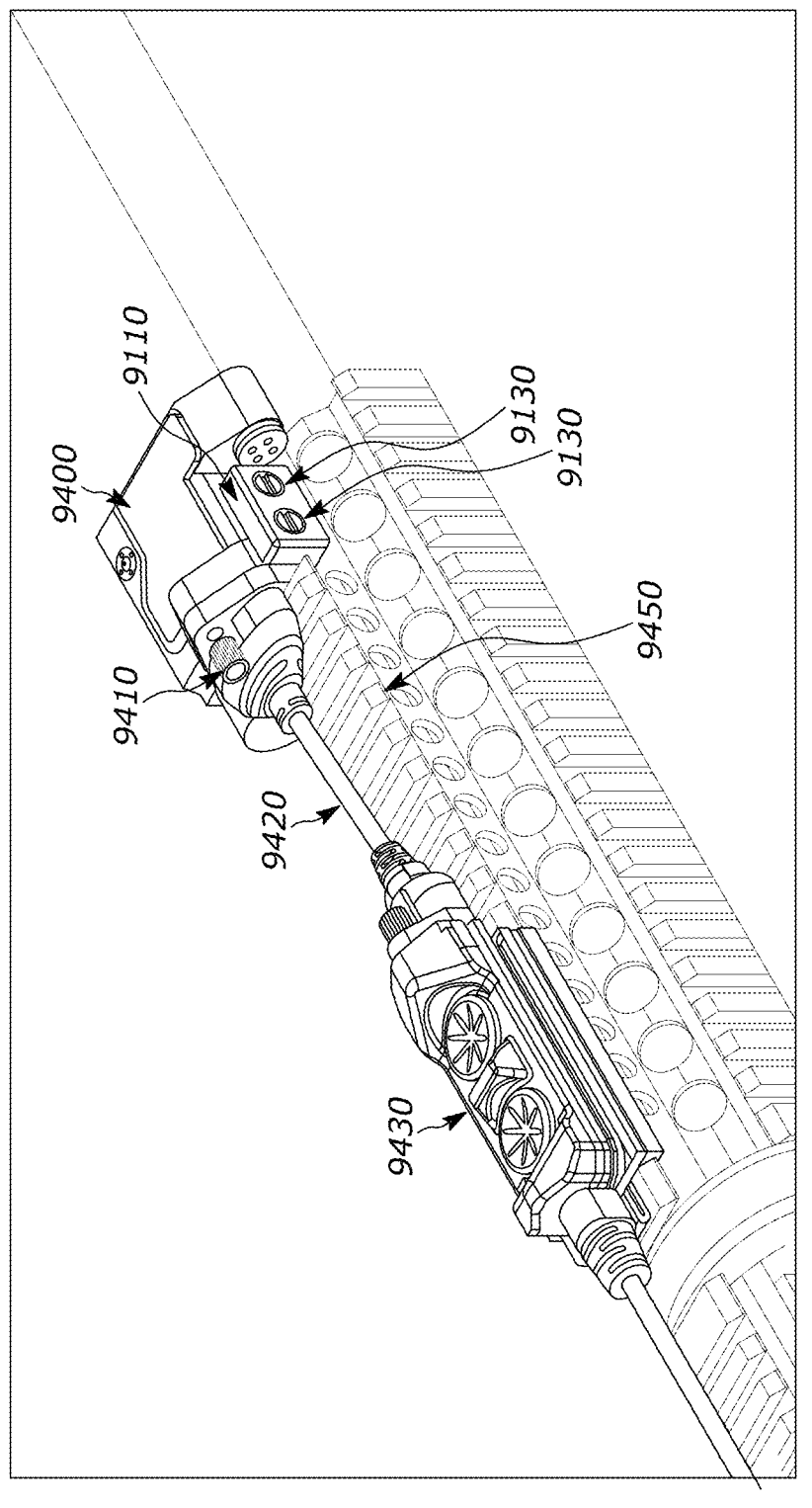
FIG. 94 is a representative depiction of an illumination enabler connected to the picatinny rail and connected to a remote for a viewing optic with an integrated display system.

FIG. 94 is a representative depiction of an illumination enabler connected to the picatinny rail and connected to a remote for a viewing optic with an integrated display system.

Figure 95:
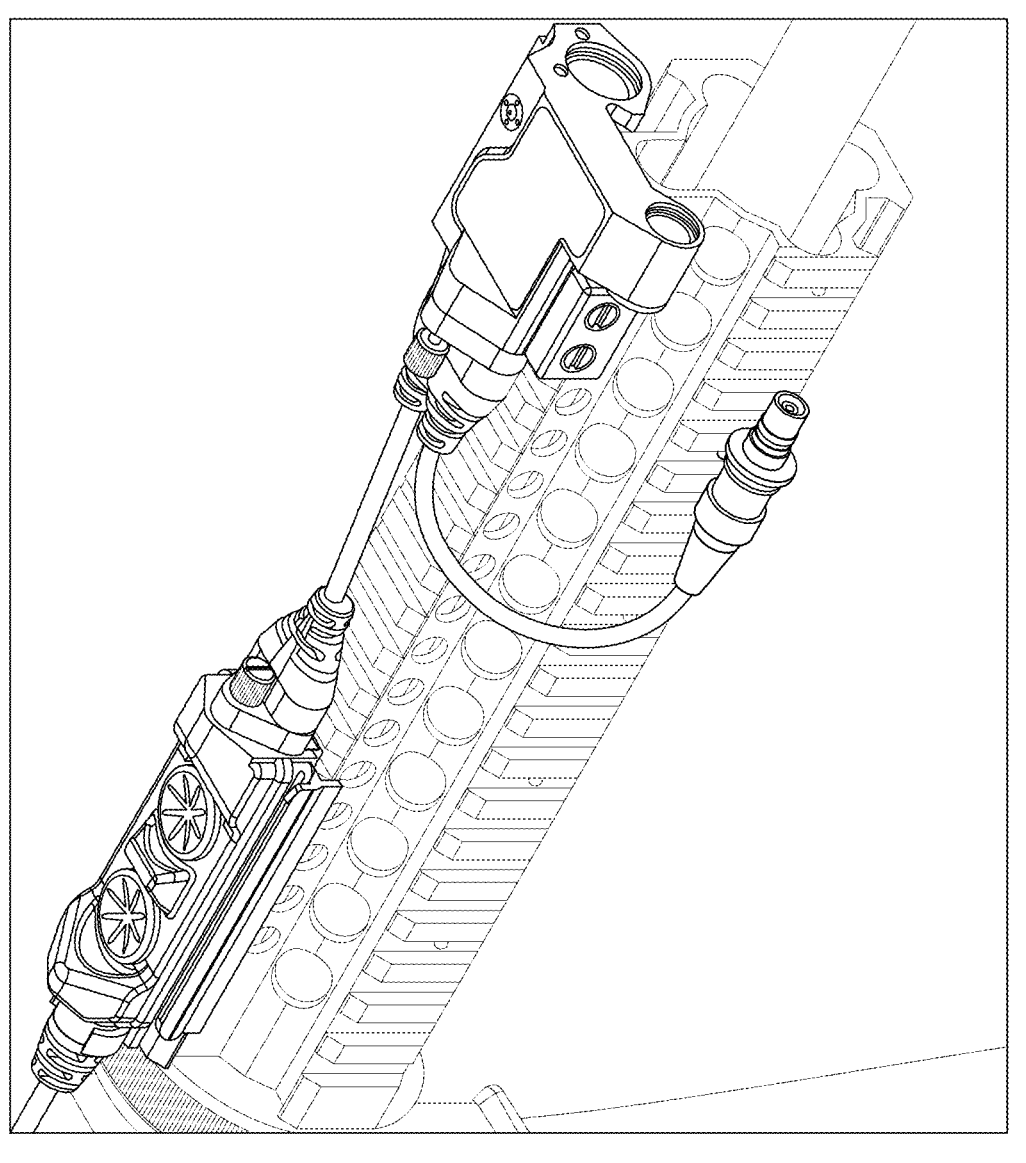
FIG. 95 is another representative depiction of a illumination enabler connected to the picatinny rail and connected to a remote for a viewing optic with an integrated display system.

FIG. 95 is another representative depiction of a illumination enabler connected to the picatinny rail and connected to a remote for a viewing optic with an integrated display system.

The illumination enabler (9400) has a pogo pin target header (9140) that allows a connection cable (9420) to connect the illumination enabler (9400) to a remote for the viewing optic (9430). This allows the illumination enabler (9400) to draw power and be controlled by the smart remote (9430). This makes the illumination enabler (9400) cheaper, lighter, and reduces the number of controls a user needs to manage.

The connection cable (9420) can be secured to the illumination enabler (9400) with a cable retention screw (9410) that screws into a threaded cable retention receptacle (9150) on top of the illumination enabler (9400). This will help maintain the connection under recoil and during movement.

The pogo pin target header (9140) has 7 target pads. This provides 2 pins for power supply and 2 pins for data transmission. There are also 2 pins available that can serve as a relay to control a white light illuminator or another device if a Y cable is connected to the illumination enabler (9400).

In one embodiment, the illumination device can have a cable retention screw (9410) and the threaded cable retention receptacle (9150) replaced by a lever or another retention mechanism. The cable retention screw may be screwed in my hand, or may require a tool, or could be tightened by either.

In one embodiment, the illumination device is an IR illumination device. In another embodiment, the illumination device could be visible Illuminators, SWIR illuminators, or any wavelength variant of an illuminator. In one embodiment, the illumination device has more than one illuminator. In one embodiment, the illumination device can have two or more illuminators. In another embodiment, the illumination device can have two illuminators with one illuminator being IR, and the other illumination being visible light.

In another embodiment, the illumination device may have multiple illuminators or multiple sources of light. In another embodiment, the illumination device may have multiple illuminators with fixed patterns. In another embodiment the illumination device may have a variable narrow beam illuminator with fixed adjustments. In another embodiment, the illumination device may have a variable narrow beam illuminator that is adjustable between its widest and narrowest range. In another embodiment, the beam divergence of the narrow beam illuminator may be tighter than 5 mRad and/or wider than 110 mRad.

In another embodiment, the illumination device may have two illuminators that are adjustable for zeroing. In another embodiment, the illumination device may have two illuminators, wherein neither illuminator is adjustable.

In another embodiment, the pattern from the illuminator could be emitted as a non-circle (rectangle, triangle, etc.). In one embodiment, the beam pattern may be adjustable for windage or elevation.

In another embodiment, the illumination device can have two illuminators, wherein either illuminator could be a Laser, a LED, or another illumination mechanism.

In another embodiment, the illumination device can have two illuminators, wherein both illuminators could be wide beam, or both illuminators could be narrow beam with different adjustable beam angles and/or ranges.

In another embodiment, the illumination device could have an integrated cable. In another embodiment, the illumination device can be connected to the remote, or directly to the viewing optic via a wireless connection or data and power rail.

In another embodiment, the illumination device can have any number of pogo pins for the pogo pin receptacle including but not limited to 1, 2, 3, 4, 5, 6, 7, 8, 9, 10, 11, 12, 13, 14, 15, and greater than 15. In another embodiment, the pogo pins on the illuminator can be male. In another embodiment, the pogo pins on the illuminator can be female. In another embodiment, the pogo pins could alternate in some form between male and female. In another embodiment, the illumination device uses a different, non-pogo pin connector, such as a USD, Micro USB, CRANE, Surefire, or another appropriate connector that could send the necessary data and/or power.

In one embodiment the illumination device can have an integral separate power supply.

In one embodiment the illumination device can have a receptacle to accept a white light illuminator cable so that the white light could be plugged directly into the illumination device.

In one embodiment the location of the illumination device could be rearranged to offer a different profile or shape to accommodate for potential interference with the weapon, gear, or other element or enabler.

In one embodiment the illumination device can have a button, buttons, switch/es or another control to act as redundant control device to the remote.

XVI. Connector Between Remote for a Viewing Optic and Illumination Device

In one embodiment, the disclosure relates to connector. In one embodiment, the disclosure relates to a connector designed to connect a remote for a viewing optic with an IR illumination device. In one embodiment, the connector is a waterproof, rugged pogo pin connector.

Figure 96:
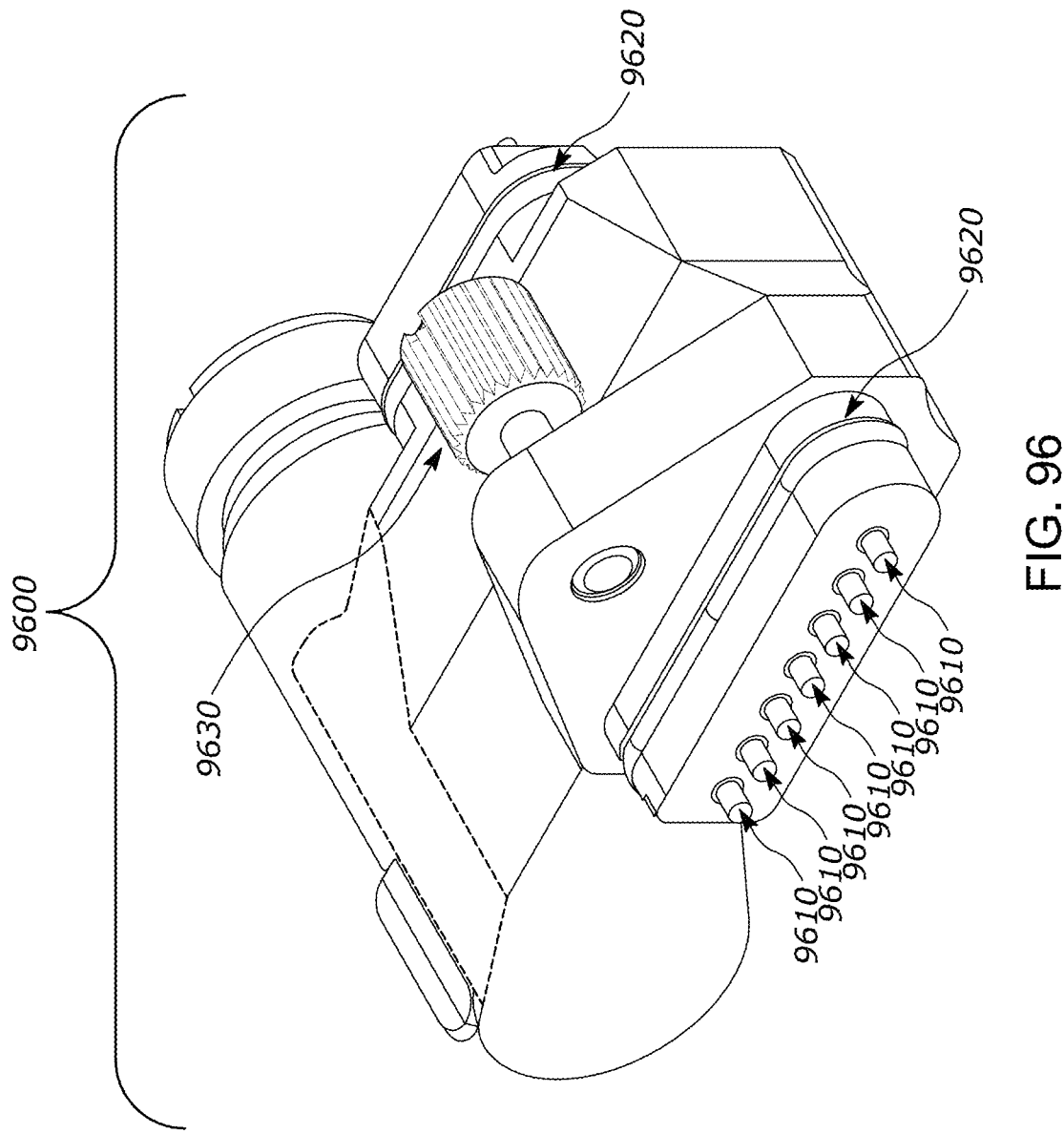
FIG. 96 is a representative depiction of a connector that connects an illumination device to a remote for a viewing optic with an integrated display system.
Figure 97:
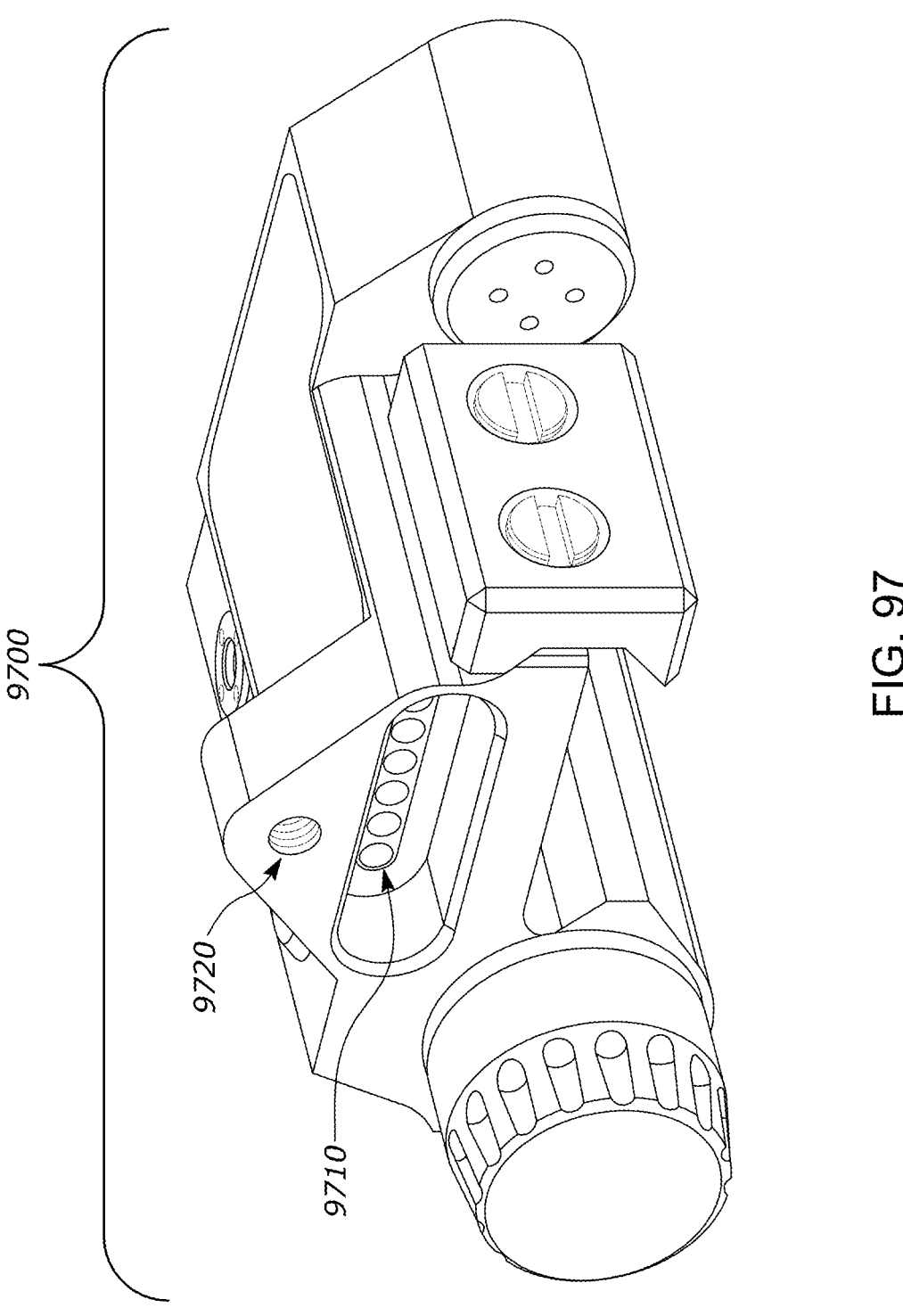
FIG. 97 is a representative depiction of an illumination device.

FIGS. 96 and 97 provide a representative example of a connector and an illumination device. The single lead connector (9600) has pogo pins (9610) on each side, which connect to pogo pin target headers (9710) on the illumination device (9700). A first side of the connector connects to the illumination device and a second side connects to the remote for the viewing optic. This allows data/commands and power to be transferred from the remote to the illumination device.

Each connection is sealed by an O-Ring (9620), which environmentally seals the connections from water, dirt, dust, and other particulates. In this embodiment, the single lead connector (9600) is secured to the illumination device (9700) by a connector retention screw (9630) that screws into a threaded connector retention receptacle (9720) on the illumination device (9700).

Figure 98:
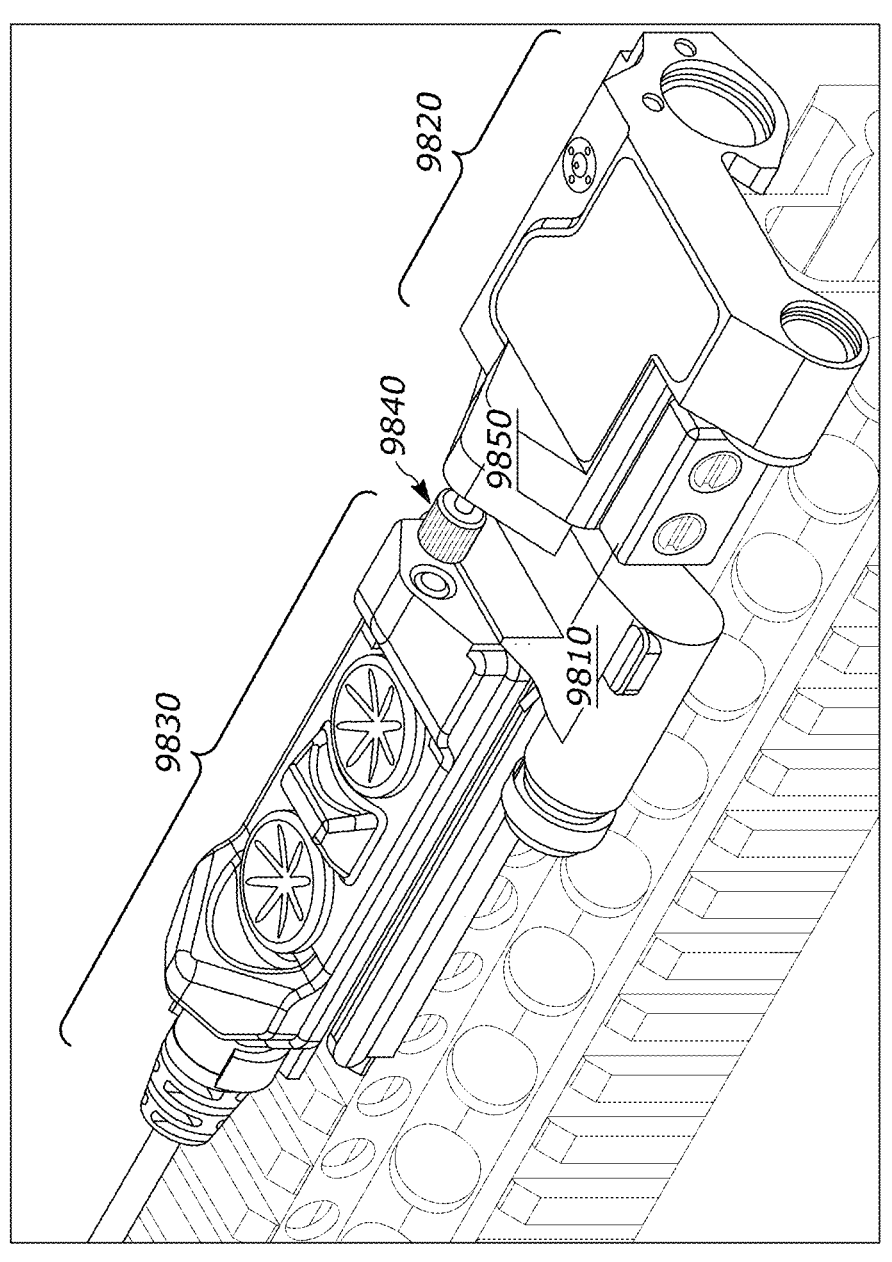
FIG. 98 is a representative depiction of the illumination device, the connector, and the remote for the viewing optic with an integrated display system.

As shown by a representative depiction in FIG. 98, the remote (9830) is mounted to a picatinny rail and can be pressed up tightly against the single Lead Connector (9810) so additional retention methods are not required. In another embodiment, the single lead connector (9810) and the remote (9830) may use the same connector retention screw (9630) and threaded connector retention receptacle (9720) mechanism as the single lead connector (9600) and the illuminator device (9700). In that case, the threaded connector retention receptacles (9720) may be offset from one another so that the connector retention screws (9630) do not impede one another as they are tightened or loosened.

Figure 99:
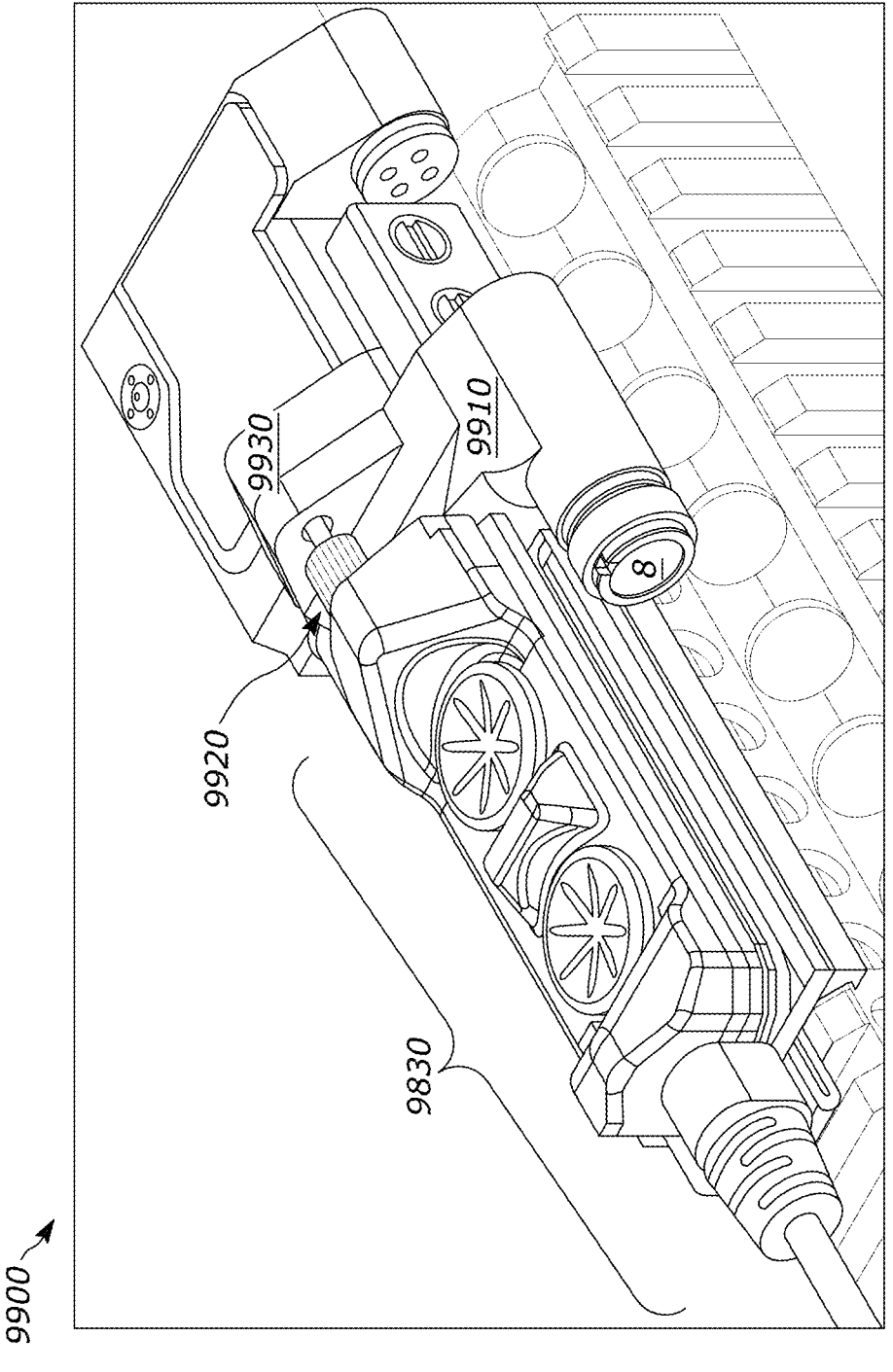
FIG. 99 is a representative depiction of the illumination device, the connector, and the remote for the viewing optic with an integrated display system.

FIG. 99 provides a representative depiction of the remote (9830) connected to the connector (9910), which is connected to the illumination device (9900). The single lead connector (9910) is secured to the illumination device (9900) by a connector retention screw (9920) that screws into a threaded connector retention receptacle (9930) on the illumination device (9900).

Figure 100:
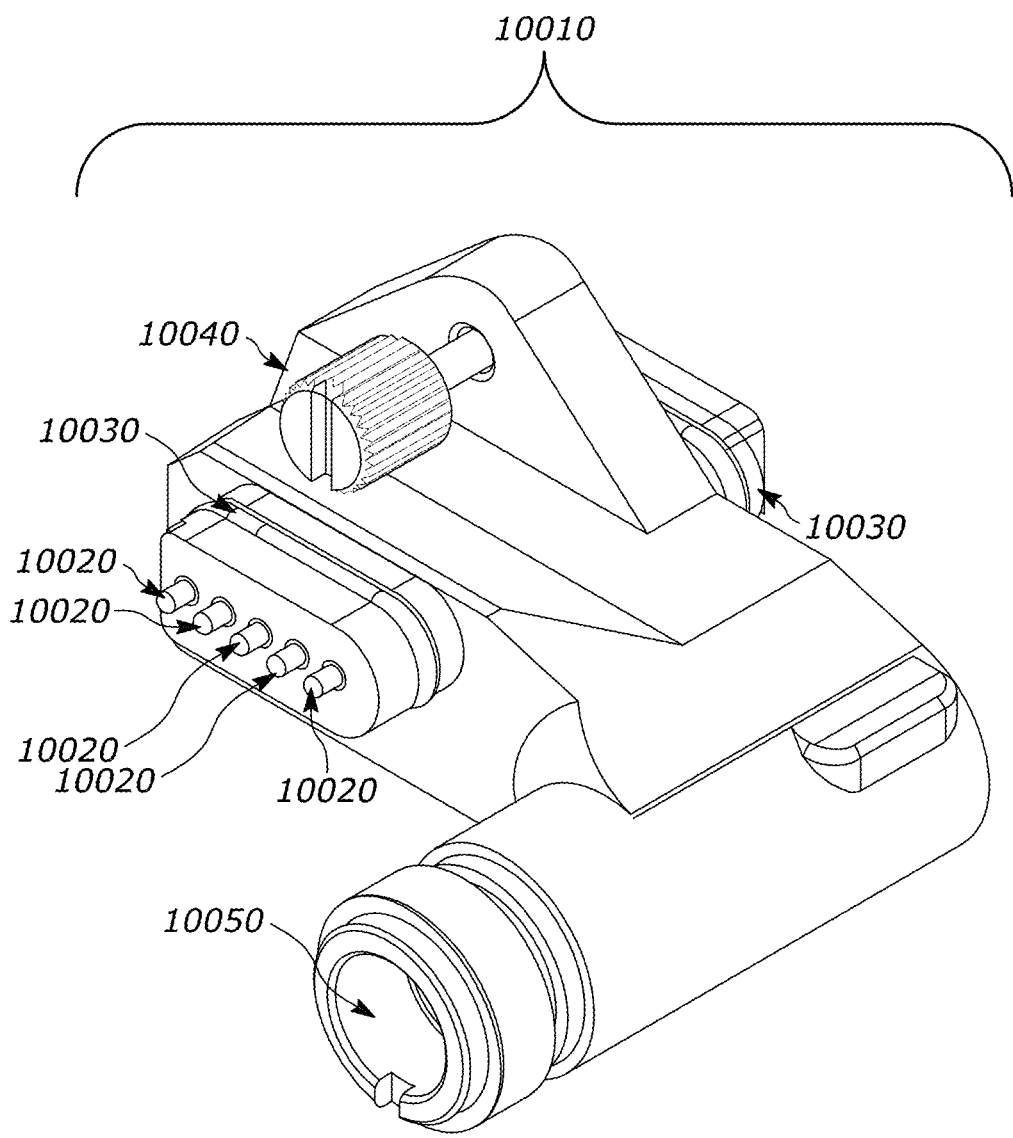
FIG. 100 is a representative depiction of the connector with a white light receptacle connector.

As shown by a representative depiction in FIG. 100, the connector (10010) can also have a white light connector receptacle (10050) that allows a surefire weapon light cable to be plugged in. This allows the Surefire to be controlled via the same remote (9830).

The connector (10010) has pogo pins (10020). Each connection is sealed by an O-Ring (10030). A connector retention screw (10040) can be used to couple the connector (10010) to an illumination enabler or device.

In another embodiment, the white light connector receptacle (10050) may be removed, replaced with a different connector style, or be replaced by a male white light cable and connector rather than a female white light connector receptacle.

Figure 101:
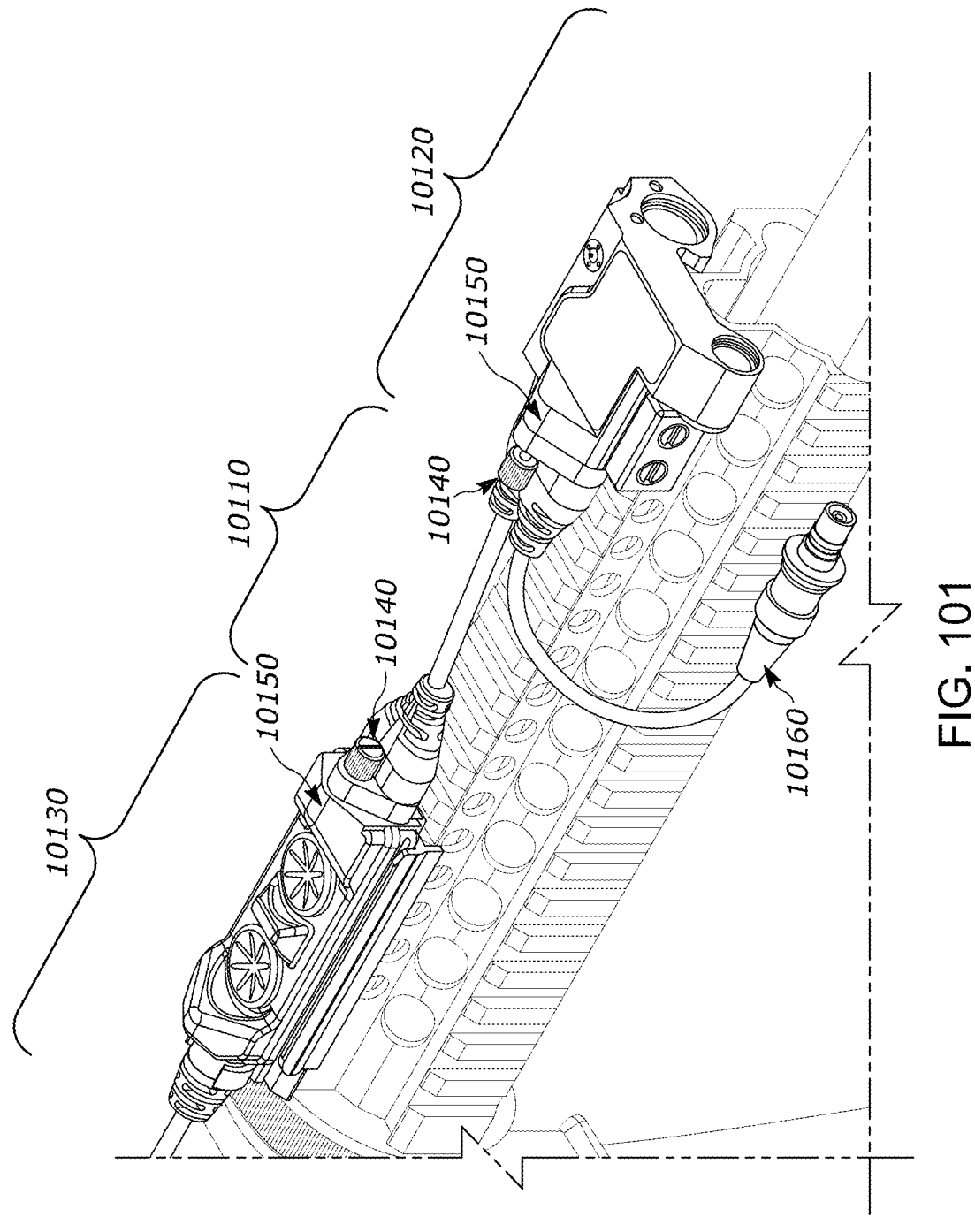
FIG. 101 is a representative depiction of the illumination device, a double lead flexible connector, and the remote for the viewing optic with an integrated display system and an auxiliary illuminator cable.

In another embodiment, and as shown by the representative depiction in FIG. 101, the disclosure relates to a double lead flexible connector (10110) with auxiliary illuminator cable (10120) that connects an illumination device (10120)

and a white light weapon light to the remote for the viewing optic (10130). A connector retention screw (10140) can be used to couple the connector (10110) to an illumination enabler (10120) using a threaded connector retention receptacle (10150).

Figure 102:
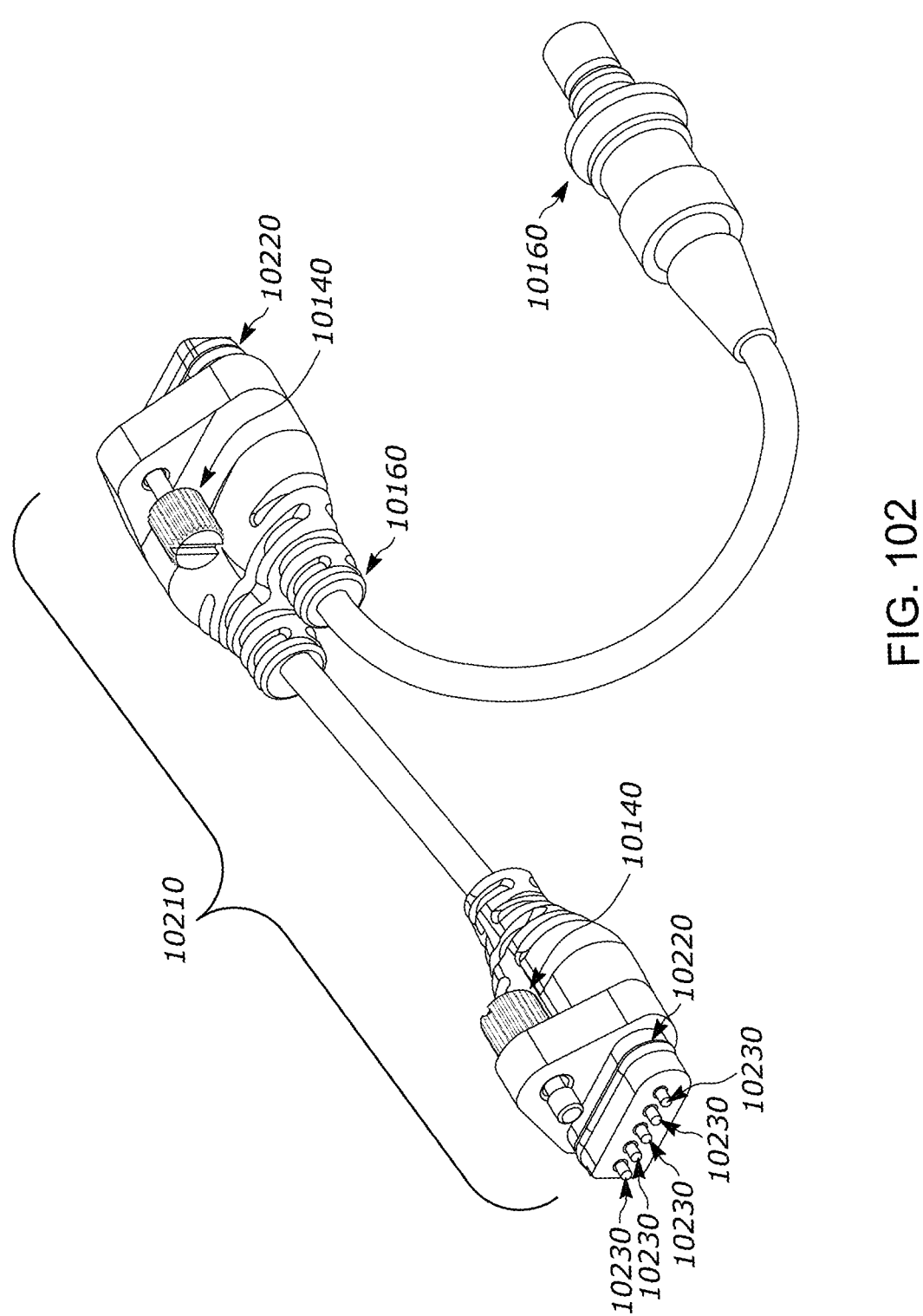
FIG. 102 is a representative depiction of a double lead connector with an auxiliary illuminator cable.

As shown by representative depiction in FIG. 102, the double lead flexible connector (10210) with auxiliary illuminator cable (10160) has pogo pins (10230) on each side that connect pogo pin target headers on the illumination device to the remote for the viewing optic. This allows data and power to be transmitted from the remote (3) to the illumination device (2).

The double lead flexible connector with auxiliary illuminator cable (10210) has connector retention screws (10140) on both ends of the connector that screw into the threaded connector retention receptacles on both the illumination device and the remote for the viewing optic.

Figure 103:
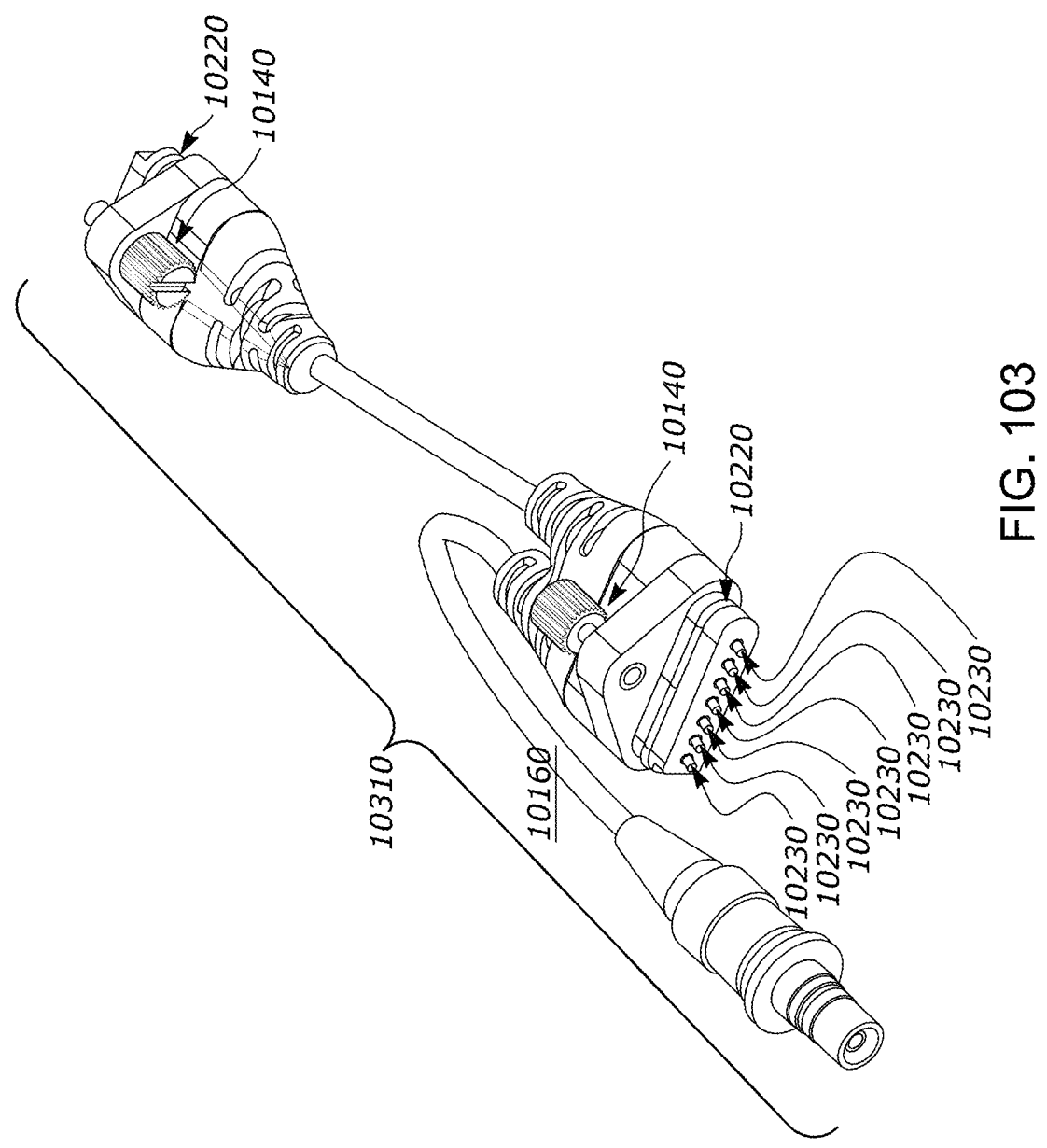
FIG. 103 is a representative depiction of a double lead connector with an auxiliary illuminator cable.

As shown in FIGS. 102 and 103, a separate white light cable and connector (10160) that connects a white light weapon light to the remote by passing the connection thorough the connector. In other embodiments the Y cable connection may be on the side of the remote instead of the illumination device. In another embodiment, there could be more than two cables and/or the design could integrate a white light connector receptacle or similar port as seen in the single lead connector configuration.

Figure 104:
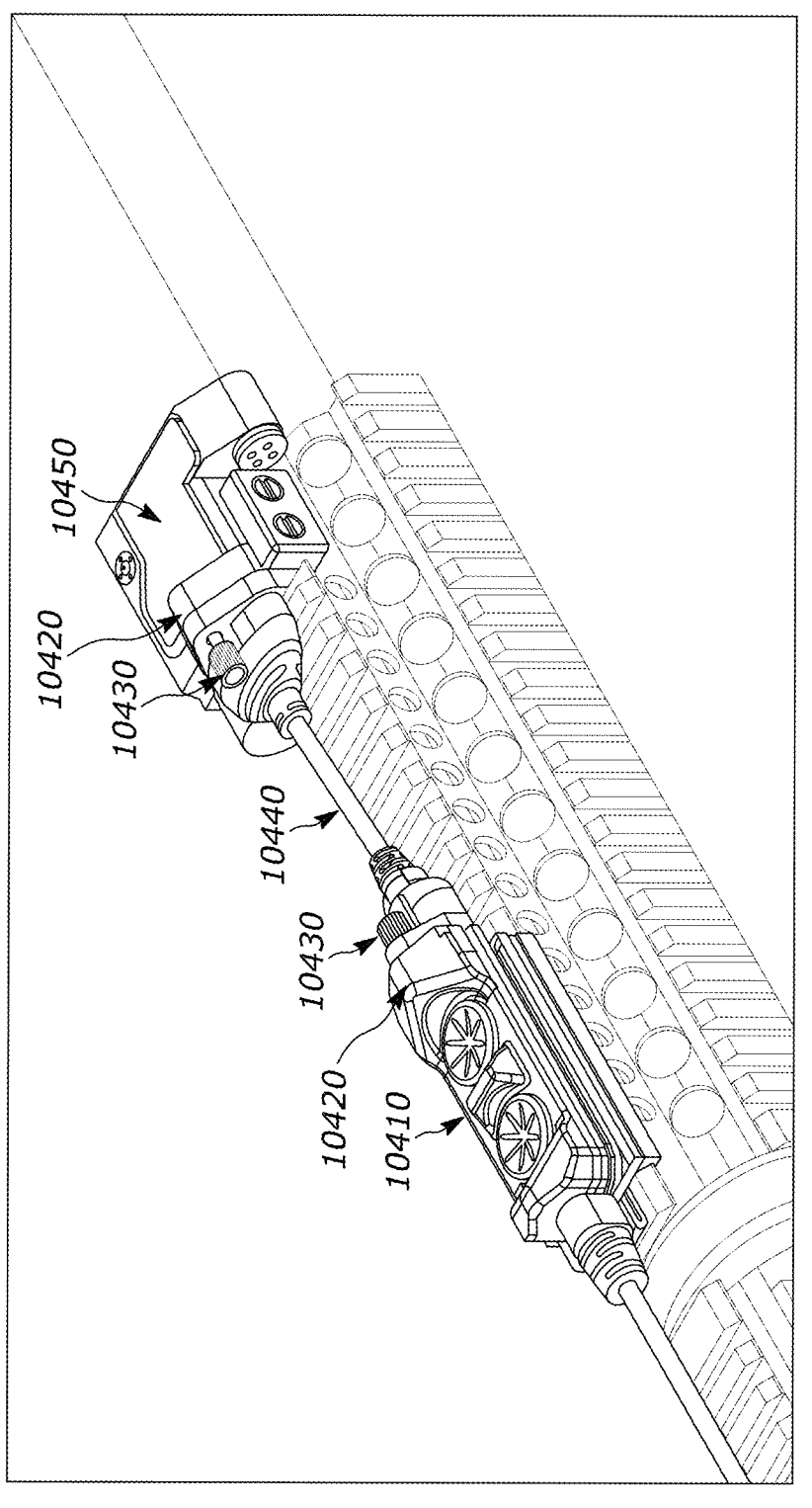
FIG. 104 is a representative depiction of the illumination device, a double lead flexible connector, and the remote for the viewing optic with an integrated display system and an auxiliary illuminator cable.

As shown in FIG. 104, the auxiliary cable can also be used with the single lead connector. Single lead flexible connector (10440) functions nearly the same as the double lead flexible connector with auxiliary illuminator cable, just with a single connection cable.

The connector (10440) couples the viewing optic remote (10410) to the illumination enabler (10450). The connector (10440) has connector retention screws (10430) on both ends that screw into the threaded connector retention receptacles (10420) on both the illumination device (10450) and the remote (10410) for the viewing optic.

In another embodiment, the single lead flexible connector (10440) could still incorporate a white light connector receptacle into either end of the connector.

As depicted herein, the drawings show the connector as a separate piece. However, if desired, the connector elements could be incorporated directly into the illumination device, the remote for the viewing optic, another enabler, or the viewing optic itself.

XVII. Viewing Optic with an Enabler Interface

In one embodiment, the disclosure relates to a viewing optic having a mounting system for one or more enabler devices. In one embodiment, the disclosure relates to a viewing optic having a mounting system comprising a front enabler interface configured to accept an enabler device. In yet another embodiment, the disclosure relates to a viewing optic having a mounting system comprising a rear enabler interface configured to accept an enabler device. In still another embodiment, the disclosure relates to a viewing optic having a mounting system comprising a front enabler interface configured to accept a first enabler device and a rear enabler interface configured to have a second enabler device.

In one embodiment, the disclosure relates to a viewing optic with an integrated display system having one or more enabler interfaces configured to accept one or more enabler devices. In one embodiment, the disclosure relates to a viewing optic with an integrated display system having a front enabler interface configured to accept an enabler device. In one embodiment, the disclosure relates to a viewing optic with an integrated display system having a rear enabler interface configured to accept an enabler device. In one embodiment, the disclosure relates to a viewing optic with an integrated display system having a front enabler interface configured to accept a first enabler device and a rear enabler interface configured to accept a second enabler device.

Figure 105:
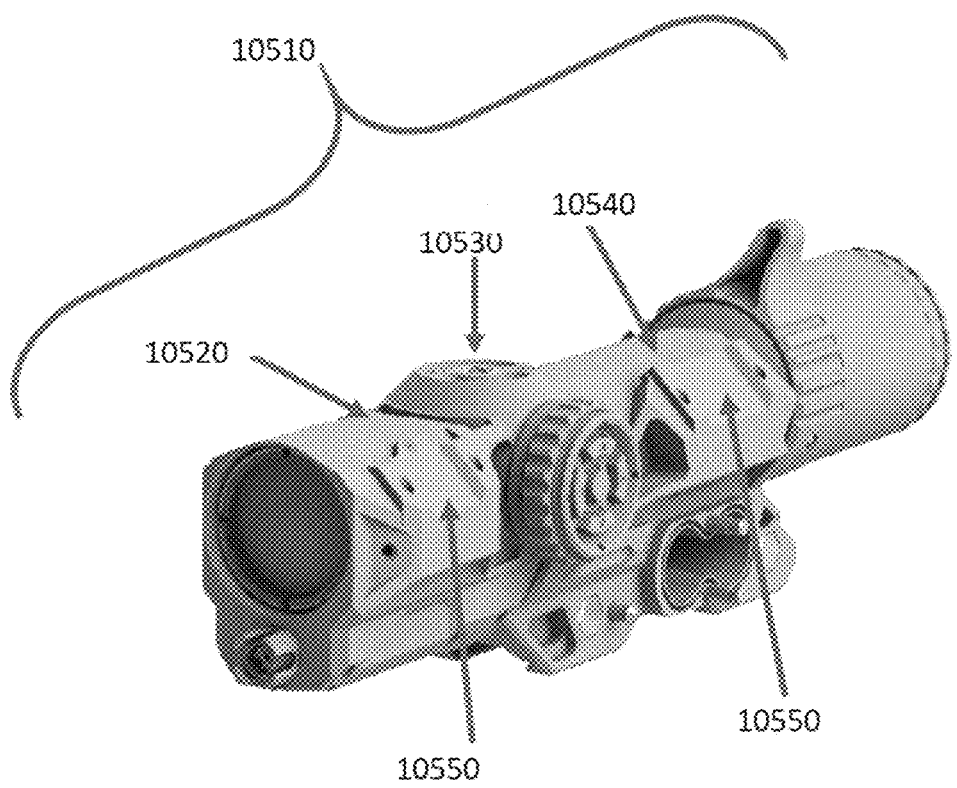
FIG. 105 is a representative depiction of a viewing optic with a front enabler interface and a rear enabler interface and covers located over the enabler interface.

FIG. 105 depicts a representative example of a viewing optic 10510 having two enabler interfaces on a top portion of the main body of the viewing optic with a cover over each of the enabler interfaces. The front enabler interface 10520 is forward the etched reticle elevation adjustment 10530 and the rear enabler interface 10540 is behind the etched reticle elevation adjustment 10530. Covers 10550 are installed over the 20 pin connectors of the front enabler interface 10520 and the rear enabler interface 10530.

As depicted in FIG. 105, the front and/or rear enabler interfaces can consist of a sloping 45° degree angle off to the right and left side of the viewing optic. In one embodiment, the interface can slop from 45° to 40°, or from 40° to 35° or from 35° to 30°, or from 30° to 20°, or from 20° to 15°, or from 15° to 10°, or less than 10° degrees off to the right and left of the viewing optic.

In one embodiment, the top of the front and/or rear interface is level. In one embodiment, the front and/or rear interface can have screw holes. As shown in FIG. 105, the interface can have four (4) screw holes 10550. Two (2) of these screw holes 10550 are on each side (left and right) of the front and rear enabler interface, thereby allowing the enabler to be secured to the viewing optic 10510.

In one embodiment, the viewing optic can have more than one enabler interfaces, including 2, 3, 4, 5, and greater than 5 enabler interfaces. In one embodiment, the enabler interfaces can be located on a top portion of the viewing optic, a bottom portion of the viewing optic, a right side of the viewing optic, or a left side of the viewing optic. In one embodiment, the enabler interfaces are located on one surface of the viewing optic. In yet another embodiment, the enabler interfaces are located on two or more surfaces of the viewing optic. In one embodiment, the enabler interfaces are parallel to one another. In yet another embodiment, the enabler interfaces are perpendicular to one another.

Figure 106:
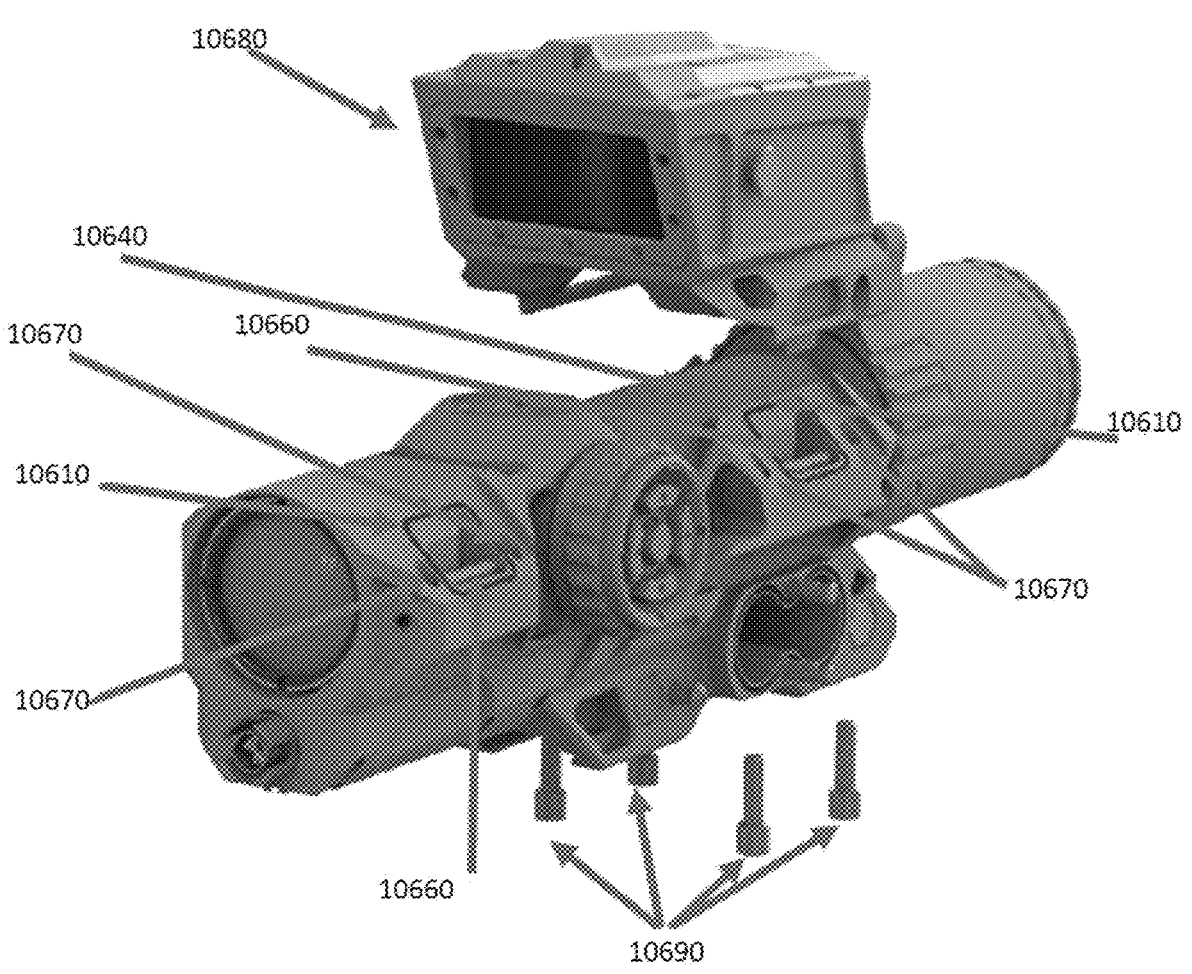
FIG. 106 is a representative depiction of a viewing optic with a front enabler interface and a rear enabler interface, along with a laser rangefinder above the rear enabler interface.

FIG. 106 is a representative example of a viewing optic with an integrated display system having two enabler interfaces on a top portion of the main body of the viewing optic with no covers over the enabler interfaces. A laser range finder 10680 is being lowered onto the rear enabler interface 10640. The LRF 10680 will sit atop the rear enabler interface 10640. The bottom of the LRF 10680 will match the slopes and dimensions of the rear enabler interface 10640 to provide maximum connecting surface area between the two units. Screws 10690 will be inserted up through each of the 4 rear interface screw holes 10670 and will be threaded into the bottom of the LRF 10680. This will secure the LRF 10680 to the viewing optic. An industry standard 20 pin connector 10660 is on the left side of the viewing optic and is present on both the front and rear interface 10640. The 20 pin connectors 10660 have O-rings 10610 around their opening to help with waterproofing the connection point.

In one embodiment, the enabler interface is a cut-out or pocket at the top of the body of the viewing optic. In one embodiment, the cut-out or pocket is present at both the left and right sides of the body of the viewing optic.

Figure 107:
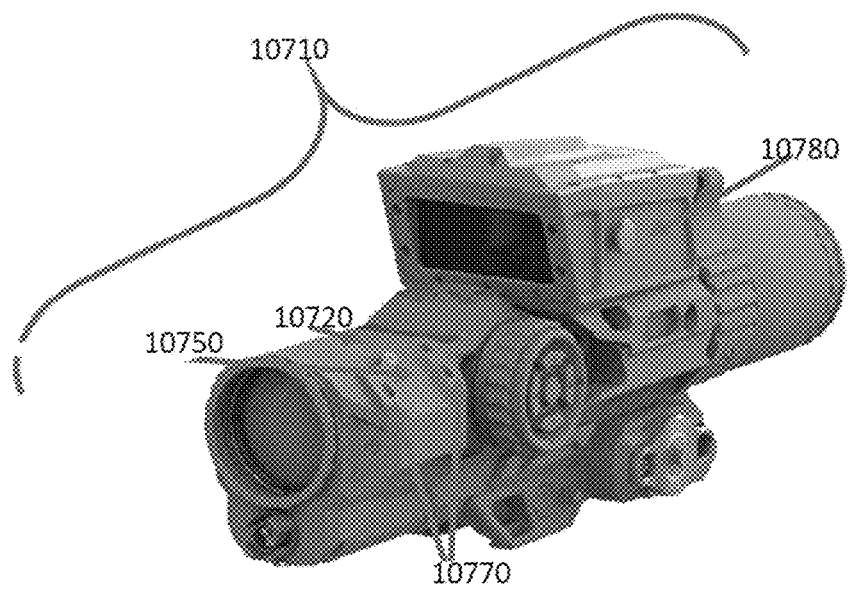
FIG. 107 is a representative depiction of a viewing optic with a laser rangefinder coupled to a rear enabler interface, which is located toward the ocular side of the viewing optic, and a front enabler interface without an enabler or accessory component.

FIG. 107 is a representative example of a final assembled configuration of the viewing optic with a laser rangefinder, wherein the laser rangefinder is coupled to the viewing optic through the rear enabler interface. A LRF 10780 has been installed on the viewing optic 10710 to the rear interface 10640. The front interface 10720 is left unused. The front enabler interface 20 pin connector 10660 has a cover 10750 installed over the top. The cover 10750 is secured to the viewing optic 10710 using the same interface screw holes 10770 that would allow an enabler to be secured to the viewing optic.

XVIII. Enabler Driven Software

In one embodiment, the disclosure relates to a viewing optic with an integrated display system that customizable software for a particular user, a particular situation or particular event or a combination thereof. In one embodiment, the disclosure relates to a viewing optic with an integrated display system that allows for software to be customized to the needs of a particular individual or to the needs of a particular group of individuals or team members.

In one embodiment, the disclosure relates to a viewing optic with an integrated display system having an indicator that allows an individual to determine the capabilities and/or software capabilities of the viewing optic.

In one embodiment, the disclosure relates to a viewing optic with an integrated display system having numerous software programs that are tailored to the specific needs of an individual/team/unit. In one embodiment, the viewing optic has from 1-5, or 6-10, or 11-15, or 16-20, or 21-30, or greater than 30 software programs. In one embodiment, the viewing optic has at least 5 or at least 10 or at least 15, or at least 25 or at least 50 software programs.

In one embodiment, the disclosure relates to a system comprising a viewing optic with an integrated display system and an enabler having numerous software programs that are tailored to the specific needs of an individual/team/unit. In one embodiment, the enabler has from 1-5, or 6-10, or 11-15, or 16-20, or 21-30, or greater than 30 software programs. In one embodiment, the enabler has at least 5 or at least 10 or at least 15, or at least 25 or at least 50 software programs.

In one embodiment, the disclosure relates to a viewing optic with an integrated display system having an enabler that can be used to store software (SW) programs that may not be utilized on a day-to-day basis or on a routine basis. In one embodiment, the enabler can store software programs that are used for specific situations or occurrences.

In one embodiment, the disclosure relates to a viewing optic with an integrated display system having an attachment or device configured to store one or more software programs.

In one embodiment, the attachment or device is an enabler configured to store one or more software programs. The attachment or device can be used to select the software and/or graphical user interface (GUI) of the viewing optic.

In one embodiment, the attachment or device can be an enabler configured to store one or more software programs and configured to connect to an enabler interface of the viewing optic, a remote for the viewing optic, or a plug-in to a remote for the viewing optic, or another physical device.

In one embodiment, the attachment or device is configured to store an entirely new or separate software package to command the viewing optic, or it can store an operation command to lock or unlock software having a capability already within the viewing optic.

In one embodiment, the enabler is configured to provide the processing unit of the viewing optic access to one or more software programs. In one embodiment, the enabler is configured to unlock one or more software programs stored on the processing unit of the viewing optic.

In one embodiment, the attachment or device can be a stand-alone module or it may be combined with hardware to provide another capability. By way of non-limiting example, the attachment or device can be combined into an illumination module. In one embodiment, the attachment or device is configured to provide additional processing power for the viewing optic or an associated distinct enabler.

In one embodiment, the attachment or device can operate only with the controls of the viewing optic. In another embodiment, the attachment or device can have additional switches, buttons, knobs, or other controls to aid in task execution.

In one embodiment, the attachment or device can be colored in a specific manner to correspond to specific software. For example, the attachment or device may have an exterior housing having a dark blue color to signify the attachment houses software used during night operations.

In another embodiment, attachment or device can change the commands of existing controls—such as buttons or rotary knobs.

In one embodiment, the attachment or device can be used to implement software for a training module. The module can be color coded to serve as a visual indicator to trainers for the system status. By way of non-limiting example, the PEQ-15 (a military issued aiming laser) has a small blue screw that locks out the high-power lasers and serves as an easily visible status indicator.

In the simplest iteration, the module sends a training program message and locks out high power aiming lasers from use. The training program can also limit ballistic solutions so that only the most relevant weapons are available and lock out maintainer capability so that trainees don't have access to features that are not needed.

In another iteration, the module could be associated with hardware capabilities. One example is the addition of Bluetooth, wifi, or another wireless communication capability to the system so that the viewing optic can send and receive information and messages. This could be useful on the firing line as it could send shot data to a trainer or a data recorder about the shooter's weapon movement as they were firing. This information then could be used to provide marksmanship feedback to the user. In a stateside training environment, Bluetooth opens up a much wider range of connectable options over a military wireless system. It could also be used for civilian applications.

The Bluetooth could also send instructions to users or it could be used to walk students through a group instruction. The Bluetooth capabilities can also be used to share relevant information to team members.

The Bluetooth could also be used for ensuring scopes are powered off when racked for the night or could be used to toggle other commands.

In addition, adding a speaker capability would greatly increase versatility. When used with the above wireless communication hardware, commands like cease fire, or load and make ready, could be given on the shooting line. If wirelessly connected, the device could also emit a sound to help locate lost/misplaced rifles during field exercises. A speaker could also provide shot timer functionally.

In one embodiment, adding LEDs to the enabler or viewing optic could also add training functionality. The LEDs could display the status of the viewing optic or if connected to a weapon interface, the LEDs could potentially show weapon status, including but not limited to loaded or unloaded. This feature could make firing lines much safer as instructors could more easily tell a weapon's status. The LEDs could also be used to help locate lost/misplaced rifles during field exercises. The LEDs could also be used to locate trainees during nighttime operations.

In one embodiment, adding a charging functionality to the system could significantly save battery costs. If the viewing optic had rechargeable batteries, a charge port could be added. The charge port could accept a plug-in charging cable of any appropriate design, or it could serve as a connection for a wireless charge plate or a charging rack that could charge multiple viewing optics at once—ideally while still mounted to the firearm.

In another embodiment, the attachment/device could be used to enable a night vision module or the software for a night vision module. The night vision module could be a separate remote plug-in like the above-mentioned training module, or it could be incorporated into an illumination enabler for use with a viewing optic having an integrated display system. Examples of features that a night vision module could control include but are not limited to:

Night Vision Brightness Settings. The viewing optic may have night vision brightness settings to allow passive aiming (no forward emission like a laser) though a set of night vision goggles (NVG). If NVGs are not used, the night vision illumination settings can be a hinderance as they make the digital reticle so dim it often can't be seen during daylight. By narrowing the use of the night vision brightness settings to a night vision module, a common source of user error and a troubleshooting step is removed.

IR lasers. Under the same logic as the night vision brightness settings, the module could unlock IR aiming lasers and/or IR aiming laser power settings as they would not be visible without NVGs. This prevents the accidental emission of IR lasers, which if the user does not have NVGs, they may not even realize they have on.

Laser and Illumination Combinations. The viewing optic may not have illumination without a separate illumination enabler. If that is the case, the use of an illumination enabler may prompt more menu selections to determine the illuminator and/or laser-illuminator combo that is activated. Viewing illuminator controls without illuminator hardware being present makes the menu more complicated than it needs to be. So, by pairing the software selections with the associated hardware capability, the system creates a more relevant GUI for all users.

In another embodiment, the attachment/device can be used to enable a maintainer module or the software for a maintainer module. A maintainer module would be issued for individuals who needed to maintain, update, and manage viewing optics in a manner that would not be applicable to the average user.

When installed, the maintainer module or maintenance module would allow access to maintainer menu capability. Several features or variants include but are not limited to:

If a Bluetooth or another wireless capability was included, the module could connect to the bootloader and replace the need for a special programing cable. This wireless capability would allow multiple viewing optics to be updated at once, would prevent remotes from having to be uninstalled, and would generally allow for faster updates. It could also allow for function checks on multiple systems at once.

Similar to the training module, a charge port could be added to the maintainer module to keep viewing optics powered for use or for updates. If a wireless chip was not included, the charge port could include data transfer in addition to, or instead of, power transfer. This would allow the same functionality as a wireless chip in terms of being to update the viewing optic and without having to remove remotes from weapons. Instead of a remote module plug in, the attachment/device could also be a remote replacement.

In another embodiment, the attachment/device could be used to enable an advanced user module. An advanced user module could include, but is not limited to, the following features:

Weapon Trueing. Weapon trueing allows the user to manipulate a ballistic drag curve to better match a specific weapon and ammo. Often the trueing mechanism is often only useful for scenarios that require extreme accuracy at a distance. Short ranges seldom see much difference in drops between a trued and untrued system if accurate ballistic information is input into the system. If truing software is placed into an advanced user module, it provides the capability to those who need it, keeps software updates simple, and keeps the menu more streamlined for regular users.

Munition and Weapon Types. Advanced users, like SOCOM, have access to weapons that conventional forces do not have. The advanced user module could unlock weapons that are used by SOCOM and other units but are not used by conventional troops. Once again, this keeps things streamlined for updates and menu options.

A sub element to munition and weapon types is super and subsonic munition capability. Some SOCOM elements have adopted the .300 black out cartridge for use. The cartridge can be very versatile in that it can fire a very quiet sub sonic round and a more powerful supersonic round. The problem is that both rounds have very different ballistics. The advanced user module could allow for both ballistics to be displayed simultaneously—possibly being differentiated by colors.

Another option would be to allow the munitions to be associated with an easily adjustable switch or button press allowing the user to rapidly toggle between munition types as needed.

Another option would be to pair the munition type with a magazine or ammunition sensor on a weapon or remote. The ammunition status and features could change automatically depending on what was in the firearm.

Some advanced users may desire having additional wireless capability, such as blue tooth, for more versatility in connecting to other products.

As more features are added to the menu, the Advanced User Module could allow for reconfiguring controls and menus. This could be done within the viewing optic, or the viewing optic can be connected to a computer or tablet, via a wired or wireless connection, to offer an easier interface. This feature would allow the advanced user to rearrange their menu, streamline menus by removing or adding capability, add or remove weapon combinations, add other desired features, and/or allow users to reconfigure controls to their needs or intended uses.

In another embodiment, the attachment or device could be used to enable a camera module. A camera enabler will bring a host of new capabilities as well as controls/commands to the viewing optic. To facilitate easily transitions between camera module use and regular use, software can be tailored to include or exclude camera capabilities. Like the other iterations, the software could be stored on the camera module itself or once installed the camera module could simply unlock and/or display software that was already installed on viewing optic but not previously accessible.

While multiple embodiments of a viewing optic with an integrated display system have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method system comprising:
viewing a target image of an outward scene with a viewing optic, the viewing optic having an optical system with an objective lens system that focuses the target image from the outward scene to a first focal plane located between the objective lens system and an erector lens system that inverts the target image;
a beam combiner placed between the objective lens system and the erector lens system;
an active display configured to generate a digital image;
a collector lens system configured to collect light from the active display;
a reflective material configured to direct the generated digital image from the active display to the beam combiner, wherein the generated digital image and the target image are viewed in the first focal plane; and
an enabler coupled to an enabler interface located on a top portion of the viewing optic and configured to provide the viewing optic access to one or more software programs that are stored within the viewing optic, the enabler further configured to unlock the one or more software programs, and the enabler further configured to provide a new software program to the viewing optic, wherein the new software program was not present on the viewing optic.

2. The method of claim 1, wherein the enabler is configured to provide software selected from the group consisting of: training software, night vision software, camera software, maintenance software, and advanced user software.

3. The method of claim 1, wherein the enabler is a remote control.

4. The method of claim 1, wherein the enabler is a plug-in apparatus.

5. A system comprising:
a viewing optic having an optical system having an objective lens system that focuses a target image from an outward scene to a first focal plane;

an erector system that inverts the target image;
a beam combiner placed between the objective lens system and the erector lens system;
an active display configured to generate a digital image;
a collector lens system configured to collect light from the active display; and
a reflective material configured to direct the generated digital image from the active display to the beam combiner, wherein the generated digital image and the target image are viewed in the first focal plane; and
an enabler coupled to an enabler interface located on a top portion of the viewing optic and configured to provide the viewing optic access to one or more software programs stored within the viewing optic, the enabler further configured to unlock the one or more software programs, and the enabler further configured to provide a new software program to the viewing optic, wherein the new software program was not present on the viewing optic.

6. The system of claim 5, wherein the enabler is configured to provide software selected from the group consisting of training software, night vision software, camera software, maintainer software, and advanced user software.

7. The system of claim 5, wherein the enabler is a remote control.

8. The system of claim 5, wherein the enabler is a plug-in apparatus.

9. A memory storing instructions for operating a viewing optic, executed by a processor, the viewing optic comprising:
an optical system having an objective lens system that focuses a target image from an outward scene to a first focal plane;
an erector system that inverts the target image; and
an active display configured to generate a digital image;
a collector lens system configured to collect light from the active display;
a reflective material configured to direct the generated digital image from the active display to the beam combiner, wherein the generated digital image and the target image are viewed in the first focal plane; and
an enabler coupled to an enabler interface located on a top portion of the viewing optic and configured to provide the viewing optic access to one or more software programs stored within the viewing optic, the enabler further configured to unlock the one or more software programs, and the enabler further configured to provide a new software program to the viewing optic, wherein the new software program was not present on the viewing optic.

10. The memory of claim 9, wherein the enabler is configured to provide software selected from the group consisting of: training software, night vision software, camera software, maintainer software, and advanced user software.

11. The memory of claim 9, wherein the enabler is a remote control.

12. The memory of claim 9, wherein the enabler is a plug-in apparatus.

* * * * *